US012809462B2

(12) United States Patent
Rohaly et al.

(10) Patent No.: US 12,809,462 B2
(45) **Date of Patent: *Nov. 24, 2026**

(54) SYSTEMS AND METHODS FOR TACTILE INTELLIGENCE

(71) Applicant: GelSight, Inc., Waltham, MA (US)

(72) Inventors: Janos Rohaly, Concord, MA (US); Youssef Benmokhtar, Boston, MA (US)

(73) Assignee: GelSight, Inc., Waltham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/427,502

(22) Filed: Jan. 30, 2024

(65) Prior Publication Data

US 2024/0288943 A1 Aug. 29, 2024

Related U.S. Application Data

(63) Continuation-in-part of application No. 18/179,348, filed on Mar. 6, 2023.

(60) Provisional application No. 63/482,301, filed on Jan. 30, 2023.

(51) Int. Cl.
*G06F 3/01* (2006.01)
*G06F 3/03* (2006.01)

(52) U.S. Cl.
CPC ............ *G06F 3/016* (2013.01); *G06F 3/0304* (2013.01)

(58) Field of Classification Search
CPC ........ G06F 3/016; G06F 3/011; G06F 3/0304; G06F 2111/04; G06F 3/0346; G06F 30/00; G06F 30/17; G06F 3/03
See application file for complete search history.

(56) References Cited

U.S. PATENT DOCUMENTS

| | | | | |
|---|---|---|---|---|
| 2011/0102550 A1 | 5/2011 | Daniel et al. | | |
| 2013/0070074 A1 * | 3/2013 | Won | G02B 6/0013 382/128 | |

(Continued)

OTHER PUBLICATIONS

PCT International Search Report and Written Opinion for International Appln. No. PCT/US24/13608, Applicant Gelsight, Inc., dated Jul. 1, 2024.

*Primary Examiner* — Scott D Au
(74) *Attorney, Agent, or Firm* — Vista IP Law Group, LLP

(57) ABSTRACT

One embodiment is directed to a system for geometric surface characterization, comprising: a deformable transmissive layer coupled to a mounting structure and to an interface membrane; a first illumination source operatively coupled to the deformable transmissive layer and configured to emit first illumination light into the deformable transmissive layer at a known first illumination orientation; a detector configured to detect light from within at least a portion of the deformable transmissive layer; a computing system configured to operate the detector to detect at least a portion of light directed from the deformable transmissive layer, to determine surface orientations pertaining to positions along the interface membrane based at least in part upon interaction of the first illumination light with the deformable transmissive layer, and to utilize the determined surface orientations to characterize a geometric profile of the surface of the object as interfaced against the interface membrane; and a secondary sensor.

17 Claims, 121 Drawing Sheets

(56) References Cited

U.S. PATENT DOCUMENTS

| | | | | |
|---|---|---|---|---|
| 2014/0237401 | A1* | 8/2014 | Krus | G06F 3/0428 715/765 |
| 2018/0049330 | A1* | 2/2018 | Malik | G06F 1/16 |
| 2021/0019009 | A1* | 1/2021 | Jung | G06F 3/044 |
| 2021/0168225 | A1 | 6/2021 | Bates et al. | |
| 2021/0215474 | A1 | 7/2021 | Adelson et al. | |
| 2023/0359308 | A1* | 11/2023 | Rohaly | G06F 3/0425 |

* cited by examiner

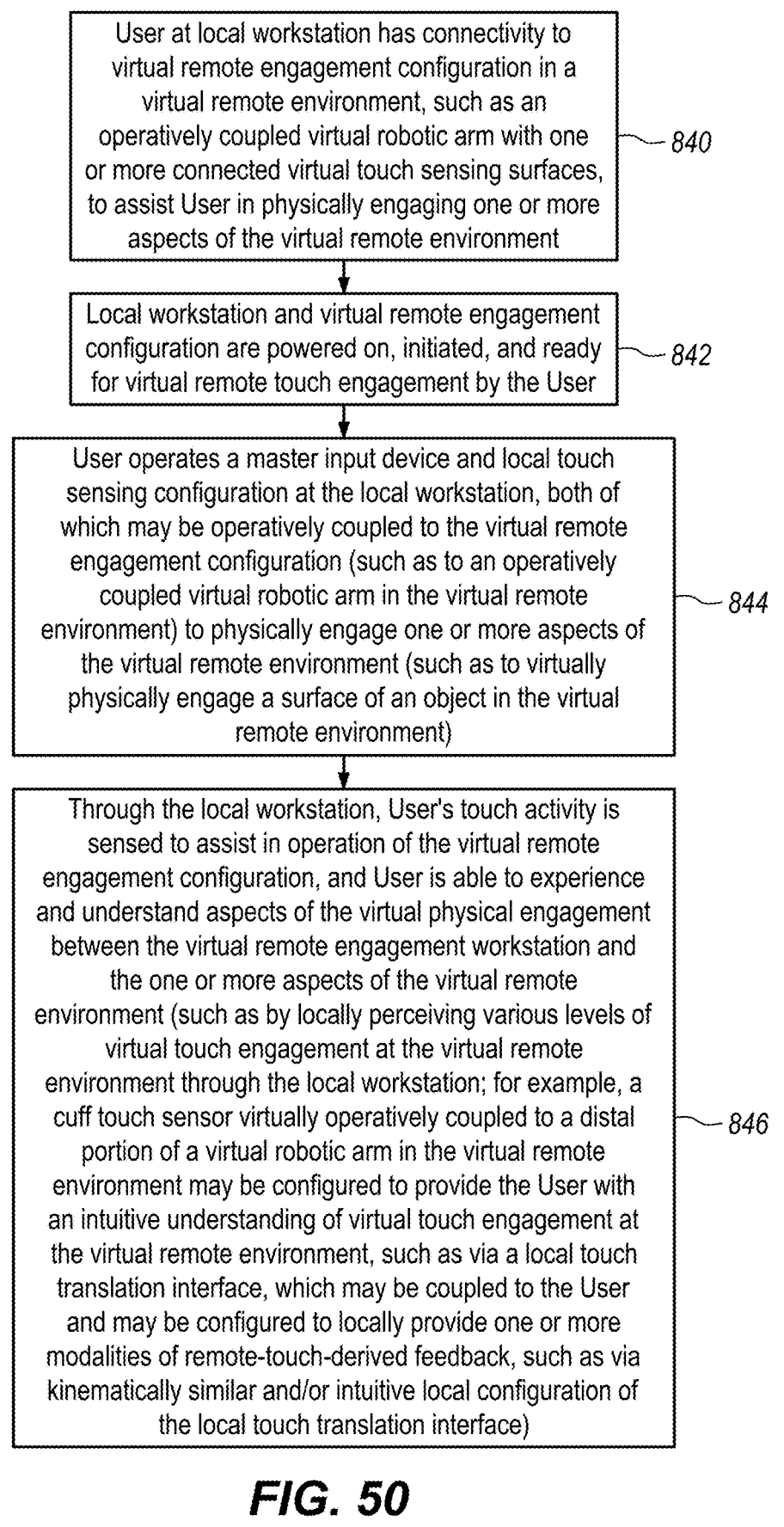

User at local workstation has connectivity to virtual remote engagement configuration in a virtual remote environment, such as an operatively coupled virtual robotic arm with one or more connected virtual touch sensing surfaces, to assist User in physically engaging one or more aspects of the virtual remote environment — 840

↓

Local workstation and virtual remote engagement configuration are powered on, initiated, and ready for virtual remote touch engagement by the User — 842

↓

User operates a master input device and local touch sensing configuration at the local workstation, both of which may be operatively coupled to the virtual remote engagement configuration (such as to an operatively coupled virtual robotic arm in the virtual remote environment) to physically engage one or more aspects of the virtual remote environment (such as to virtually physically engage a surface of an object in the virtual remote environment) — 844

↓

Through the local workstation, User's touch activity is sensed to assist in operation of the virtual remote engagement configuration, and User is able to experience and understand aspects of the virtual physical engagement between the virtual remote engagement workstation and the one or more aspects of the virtual remote environment (such as by locally perceiving various levels of virtual touch engagement at the virtual remote environment through the local workstation; for example, a cuff touch sensor virtually operatively coupled to a distal portion of a virtual robotic arm in the virtual remote environment may be configured to provide the User with an intuitive understanding of virtual touch engagement at the virtual remote environment, such as via a local touch translation interface, which may be coupled to the User and may be configured to locally provide one or more modalities of remote-touch-derived feedback, such as via kinematically similar and/or intuitive local configuration of the local touch translation interface) — 846

*FIG. 50*

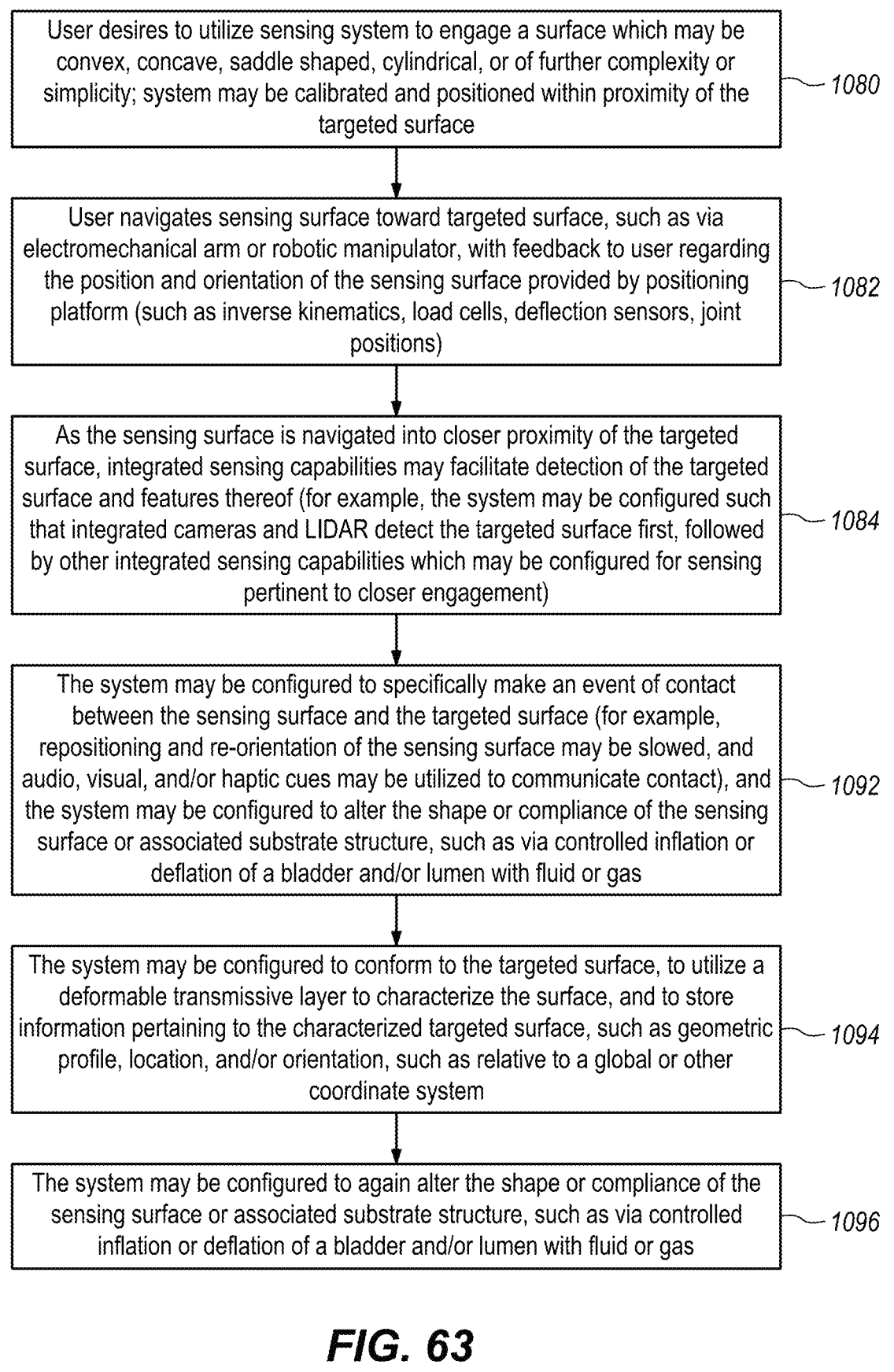

User desires to utilize sensing system to engage a surface which may be convex, concave, saddle shaped, cylindrical, or of further complexity or simplicity; system may be calibrated and positioned within proximity of the targeted surface — 1080

User navigates sensing surface toward targeted surface, such as via electromechanical arm or robotic manipulator, with feedback to user regarding the position and orientation of the sensing surface provided by positioning platform (such as inverse kinematics, load cells, deflection sensors, joint positions) — 1082

As the sensing surface is navigated into closer proximity of the targeted surface, integrated sensing capabilities may facilitate detection of the targeted surface and features thereof (for example, the system may be configured such that integrated cameras and LIDAR detect the targeted surface first, followed by other integrated sensing capabilities which may be configured for sensing pertinent to closer engagement) — 1084

The system may be configured to specifically make an event of contact between the sensing surface and the targeted surface (for example, repositioning and re-orientation of the sensing surface may be slowed, and audio, visual, and/or haptic cues may be utilized to communicate contact), and the system may be configured to alter the shape or compliance of the sensing surface or associated substrate structure, such as via controlled inflation or deflation of a bladder and/or lumen with fluid or gas — 1092

The system may be configured to conform to the targeted surface, to utilize a deformable transmissive layer to characterize the surface, and to store information pertaining to the characterized targeted surface, such as geometric profile, location, and/or orientation, such as relative to a global or other coordinate system — 1094

The system may be configured to again alter the shape or compliance of the sensing surface or associated substrate structure, such as via controlled inflation or deflation of a bladder and/or lumen with fluid or gas — 1096

*FIG. 63*

SYSTEMS AND METHODS FOR TACTILE INTELLIGENCE

REFERENCE TO RELATED APPLICATIONS

This application claims benefit of U.S. Provisional Application No. 63/482,301, filed Jan. 30, 2023, the contents of which is incorporated herein by reference in its entirety. Also this application is a Continuation in Part of U.S. Utility application Ser. No. 18/179,348, filed Mar. 6, 2023, the contents of which also is incorporated herein by reference in its entirety.

FIELD OF THE INVENTION

The present invention relates generally to systems and methods for detecting, characterizing, and/or quantifying aspects of contact or touch interfacing between specialized surfaces and other objects, and more specifically to integrations which may feature one or more deformable transmissive layers configured to assist in various aspects of tactile intelligence.

BACKGROUND

Computing, video communication, and various forms of remote presence have become key components of modern life with the ubiquity of systems such as laptop computers, smartphones, and video teleconferencing. Referring to FIG. 1, a user (4) is shown in a typical work or home environment interacting with both a laptop computer (2) and a smartphone (6) simultaneously. Referring to FIG. 2A, a socalled "smart watch" (8) is shown removably coupled to an arm of a user (4). FIG. 2B illustrates a smartphone (6) held by a user (4) while one hand (12) of the user (4) tries to utilize gesture information to provide commands to the smartphone (6) computing system. While these illustrative systems (2, 6, 8) may be configured to process voice-based or gesture-based commands, for example, much of the operation of such devices continues to occur through physical interfaces such as a keyboard or touchscreen, and much of the information exchanged during a voice of video-based call is in the form of audio and/or video. Referring to FIGS. 3A-3E, many efforts have been made to improve the richness of interpersonal communication and/or socalled "remote presence" utilizing modern systems. FIG. 3A illustrates a laptop (2) based video conferencing configuration wherein a user (4) is able to observe certain aspects of, and communicate with, a group of other participants through a matrix style video user interface (14) viewed through the laptop display (16). FIG. 3B illustrates a conference room based video conferencing system wherein a group of local participants around a local conference table (20) are able to interact with a remote participant through a relatively large display configured to show video of a remote participant through a teleconference user interface (18). Referring to FIG. 3C, another system allows a group of local participants (34) seated around a local conference table in a local conference room (22) to interact via video teleconference with a group of remote participants who are displayed via a plurality of integrated display/camera systems organized relative to the local conference table to assist in creating or simulating a perception that all participants are in the same location, or are able to communicate at least somewhat in the manner that they would if they were all local. Referring to FIGS. 3D and 3E, video systems may be utilized to assist in bringing a remote user into a local discussion about a scenario such as healthcare. FIG. 3D illustrates a configuration wherein one user (4) from a first location is able to operate a multi-display (36, 38, 40) configuration, such as via one or more user input devices (44), to see video of a second operational location along with information and/or data pertaining to the scenario while a camera (42) captures video data of the participant (4) at the first location and provides a video feed to the second operational location for enhanced communication (i.e., beyond simply voice). FIG. 3E illustrates a configuration wherein a group of local healthcare providers (46, 48) with a patient (50) are utilizing a cart (52) based configuration featuring a display (54) to produce a video likeness (58) of a remote participant while video of the local environment is captured for the remote participant using a video camera (56) coupled to the cart (52). FIG. 4 features a somewhat similar video communication system for healthcare wherein a remote user (58), such as a physician, is able to navigate the local healthcare facility room (68) that contains the patient (50) and hospital bed (60) using an electromechanically movable system (62) to which a camera (64) and display (66) are coupled to allow the remote user (58) to have a form of "remote presence" or "local presence" within the hospital room (68).

While each of the aforementioned configurations has a level of utility beyond a conventional voice call, some would argue that they continue to lack some of the key aspects of true local presence. As connectivity, computing, video, audio, and telecom technologies continue to improve, such systems will no doubt continue to evolve to be closer to live local video presence. One key aspect of local presence that is not addressed by such systems, however, is a sense of local "touch" for a remote participant—and this may be related to the continued large demand for air travel in certain business, social, and other scenarios. The ubiquity of touch and tactile intelligence in the everyday existence of the modern human is critical, and it is no coincidence that some people, such as those who may be visually impaired, may very capably navigate the world heavily relying upon touch and tactile intelligence. As we are evolved to utilize the two perspectives of our eyes to develop a basic interpretation of the shape of an object, we are also able to utilize touch and tactile intelligence to understand key aspects of objects that we physically encounter.

To examine a relatively simple example, the scenario of remote inspection may be examined. If in a given user scenario it is critical to inspect a particular object or surface in detail for surface aberrations, potential stress concentrations, and/or deformities, such as in the scenario of a plurality of rivets (72) holding an airplane wing surface (70) in place as shown in FIG. 5A, one solution is to travel to the location of each such airplane wing surface and personally (74) inspect such surface (70), such as with the use of an inspection light (76) configured to vector light across the surface (70) at an angle selected to reveal surface abnormalities. Similarly, referring to FIG. 6A, if it is critical before approving mass manufacture to have a certain texture of exterior paint finish for a smartphone (6) housing (80) design, or a certain fit between a camera assembly (78) of the smartphone (6) and the housing (80) that is "tight, but not too tight", then often it will be the case that personnel will fly across the world to conduct in-person touch inspections of such parts. FIG. 6B illustrates another example wherein a sense of touch may be very valuable in determining whether the crown (86), bezel (88), and/or button (84) materials, fit, and finish for a watch (82) design are appropriate for manufacture. Finally, referring to FIG. 6C, where a design for a removable band (90) for a smart watch (8) is configured to be slidably coupled and decoupled from the watch (8) by a firm, but not too firm, engagement of these parts with the hands (94, 95) of a user, a sense of touch may have high value in conducting an inspection. There is a need for technologies to assist users in having a sense of touch to expand their conventional physical reach, such as to remote locations. Described herein are systems, methods, and configurations for enhancing and broadening the characterization of touch in various scenarios, as well as utilizing such characterization for various purposes, including but not limited to high-precision touch sensor implementations and configurations which may be utilized and configured to assist in providing local users with a perception of touch pertaining to objects out of their conventional reach, such as objects in a remote environment.

SUMMARY

One embodiment is directed to a system for geometric surface characterization, comprising: a deformable transmissive layer coupled to a mounting structure and to an interface membrane, wherein the interface membrane is interfaced against at least one aspect of an interfaced object having a surface to be characterized; a first illumination source operatively coupled to the deformable transmissive layer and configured to emit first illumination light into the deformable transmissive layer at a known first illumination orientation relative to the deformable transmissive layer, such that at least a portion of the first illumination light interacts with the deformable transmissive layer; a detector configured to detect light from within at least a portion of the deformable transmissive layer; a computing system configured to operate the detector to detect at least a portion of light directed from the deformable transmissive layer, to determine surface orientations pertaining to positions along the interface membrane based at least in part upon interaction of the first illumination light with the deformable transmissive layer, and to utilize the determined surface orientations to characterize a geometric profile of the surface of the object as interfaced against the interface membrane; and a secondary sensor operatively coupled to the computing system and configured to provide inputs which may be utilized by the computing system to further geometrically characterize the surface of the interfaced object. The secondary sensor may be coupled to the deformable transmissive layer. The system further may comprise a secondary sensor mounting structure coupled to the deformable transmissive layer, wherein the secondary sensor is coupled to the secondary sensor mounting structure. The secondary sensor and deformable transmissive layer may reside within an operational environment comprising one or more wall structures, and wherein the secondary sensor is coupled to one of the one or more wall structures. The secondary sensor may be selected from the group consisting of: an inertial measurement unit (IMU), a capacitive touch sensor, a resistive touch sensor, a LIDAR device, a strain sensor, a load sensor, a temperature sensor, an image capture device, and a measurement probe. The first illumination source may comprise a light emitting diode. The detector may be a photodetector. The detector may be an image capture device. The image capture device may be a CCD or CMOS device. The system further may comprise a lens operatively coupled between the detector and the deformable transmissive layer. The computing system may be operatively coupled to the detector and configured to receive information from the detector pertaining to light detected by the detector from within the deformable transmissive layer. The computing system may be operatively coupled to the first illumination source and is configured to control emissions from the first illumination source. The deformable transmissive layer may comprise an elastomeric material. The elastomeric material may be selected from the group consisting of: silicone, urethane, polyurethane, thermoplastic elastomer (TPE), and thermoplastic polyurethane (TPU). The deformable transmissive layer may comprise a composite having a pigment material distributed within an elastomeric matrix, the pigment material configured to provide an illumination reflectance which is greater than that of the elastomer matrix. The pigment material may comprise a metal oxide. The interface membrane may comprise an elastomeric material. The surface of the interfaced object may be located and oriented within a global coordinate system, and the computing system may be configured to characterize a geometric profile of the surface of the object as interfaced against the interface membrane with a position and an orientation relative to the global coordinate system. The computer system may be configured to gather two or more geometric profiles of two or more portions of the surface of the object as interfaced against the interface membrane and determine a position and an orientation pertaining to the two or more geometric profiles relative to each other in the global coordinate system. The computing system may be configured to provide a three-dimensional mapping pertaining to the two or more geometric profiles relative to each other in the global coordinate system. The computing system may be configured to stitch geometrically adjacent geometric profiles together using interpolation of the geometric profiles and relative positions and orientations thereof.

Another embodiment is directed to a system for geometric surface characterization, comprising: a deformable transmissive layer coupled to a mounting structure and to an interface membrane, wherein the interface membrane is interfaced against at least one aspect of an interfaced object; a first illumination source operatively coupled to the deformable transmissive layer and configured to emit first illumination light into the deformable transmissive layer at a known first illumination orientation relative to the deformable transmissive layer, such that at least a portion of the first illumination light interacts with the deformable transmissive layer; a detector configured to detect light from within at least a portion of the deformable transmissive layer; a computing system configured to operate the detector to detect at least a portion of light directed from the deformable transmissive layer, to determine surface orientations pertaining to positions along the interface membrane based at least in part upon interaction of the first illumination light with the deformable transmissive layer, and to utilize the determined surface orientations to characterize a geometric profile of the surface of the object as interfaced against the interface membrane; and a robotic manipulator operatively coupled to the computing system and deformable transmissive layer, the robotic arm configured to controllably position and orient the deformable transmissive layer relative to the interfaced object such that the computing system may characterize the geometric profile of the surface of the interfaced object as interfaced against the interface membrane with regard to the relative position and orientation of each of the deformable transmissive layer and the interfaced object. The robotic manipulator may comprise a robotic arm. The robotic arm may comprise a plurality of joints coupled by substantially rigid linkage members. The robotic manipulator may comprise a flexible robotic instrument. The system further may comprise an end effector coupled to the robotic manipulator. The end effector may comprise a grasper. The first illumination source may comprise a light emitting diode. The detector may be a photodetector. The detector may be an image capture device. The image capture device may be a CCD or CMOS device. The system further may comprise a lens operatively coupled between the detector and the deformable transmissive layer. The computing system may be operatively coupled to the detector and configured to receive information from the detector pertaining to light detected by the detector from within the deformable transmissive layer. The computing system may be operatively coupled to the first illumination source and is configured to control emissions from the first illumination source. The deformable transmissive layer may comprise an elastomeric material. The elastomeric material may be selected from the group consisting of: silicone, urethane, polyurethane, thermoplastic elastomer (TPE), and thermoplastic polyurethane (TPU). The deformable transmissive layer may comprise a composite having a pigment material distributed within an elastomeric matrix, the pigment material configured to provide an illumination reflectance which is greater than that of the elastomer matrix. The pigment material may comprise a metal oxide. The interface membrane may comprise an elastomeric material. The surface of the interfaced object may be located and oriented within a global coordinate system, and the computing system may be configured to characterize a geometric profile of the surface of the object as interfaced against the interface membrane with a position and an orientation relative to the global coordinate system. The computer system may be configured to gather two or more geometric profiles of two or more portions of the surface of the object as interfaced against the interface membrane and determine a position and an orientation pertaining to the two or more geometric profiles relative to each other in the global coordinate system. The computing system may be configured to provide a three-dimensional mapping pertaining to the two or more geometric profiles relative to each other in the global coordinate system. The computing system may be configured to stitch geometrically adjacent geometric profiles together using interpolation of the geometric profiles and relative positions and orientations thereof. The computing system may be configured to operate the operatively coupled robotic arm to gather the two or more geometric profiles of the two or more portions of the surface of the object automatically based at least in part upon an overall outer geometry of the object. The two or more geometric profiles of the two or more portions of the surface of the object may be automatically created based upon immediately adjacent portions of the object. The computing system may be configured to operate the operatively coupled robotic arm to sequentially gather the two or more geometric profiles of the two or more portions of the surface of the object automatically based at least in part upon a predetermined analysis pathway selected by a user.

Another embodiment is directed to a hand-held system for geometric surface characterization, comprising: a deformable transmissive layer coupled to a mounting structure and to an interface membrane, wherein the interface membrane is interfaced against at least one aspect of an interfaced object having a surface to be characterized; a first illumination source operatively coupled to the deformable transmissive layer and configured to emit first illumination light into the deformable transmissive layer at a known first illumination orientation relative to the deformable transmissive layer, such that at least a portion of the first illumination light interacts with the deformable transmissive layer; a detector configured to detect light from within at least a portion of the deformable transmissive layer; and a computing system configured to operate the detector to detect at least a portion of light directed from the deformable transmissive layer, to determine surface orientations pertaining to positions along the interface membrane based at least in part upon interaction of the first illumination light with the deformable transmissive layer, and to utilize the determined surface orientations to characterize a geometric profile of the surface of the interfaced object as interfaced against the interface membrane; wherein the deformable transmissive layer and computing system are coupled within a hand-held system housing comprising the mounting structure and a power supply, the handheld system housing configured to facilitate manual operation by a user such that the user may manually position and orient the deformable transmissive layer to engage the interface membrane against the interfaced object. The system further may comprise a localization sensor operatively coupled to the hand-held system housing and computing system. The localization sensor may be configured to be utilized by the computing system to determine a position of at least a portion of the hand-held system housing within a global coordinate system. The computing system and localization sensor may be further configured such that an orientation of at least a portion of the hand-held system housing within the global coordinate system may be determined. The computing system and localization sensor may be further configured such that a position and an orientation of the deformable transmissive layer within the global coordinate system may be determined. The first illumination source may comprise a light emitting diode. The detector may be a photodetector. The detector may be an image capture device. The image capture device may be a CCD or CMOS device. The system further may comprise a lens operatively coupled between the detector and the deformable transmissive layer. The computing system may be operatively coupled to the detector and configured to receive information from the detector pertaining to light detected by the detector from within the deformable transmissive layer. The computing system may be operatively coupled to the first illumination source and is configured to control emissions from the first illumination source. The deformable transmissive layer may comprise an elastomeric material. The elastomeric material may be selected from the group consisting of: silicone, urethane, polyurethane, thermoplastic elastomer (TPE), and thermoplastic polyurethane (TPU). The deformable transmissive layer may comprise a composite having a pigment material distributed within an elastomeric matrix, the pigment material configured to provide an illumination reflectance which is greater than that of the elastomer matrix. The pigment material may comprise a metal oxide. The interface membrane may comprise an elastomeric material. The surface of the interfaced object may be located and oriented within a global coordinate system, and the computing system may be configured to characterize a geometric profile of the surface of the object as interfaced against the interface membrane with a position and an orientation relative to the global coordinate system. The computer system may be configured to gather two or more geometric profiles of two or more portions of the surface of the object as interfaced against the interface membrane and determine a position and an orientation pertaining to the two or more geometric profiles relative to each other in the global coordinate system. The computing system may be configured to provide a three-dimensional mapping pertaining to the two or more geometric profiles relative to each other in the global coordinate system. The computing system may be configured to stitch geometrically adjacent geometric profiles together using interpolation of the geometric profiles and relative positions and orientations thereof. The system further may comprise a secondary sensor operatively coupled to the computing system and configured to provide inputs which may be utilized by the computing system to further geometrically characterize the surface of the interfaced object. The secondary sensor may be selected from the group consisting of: an inertial measurement unit (IMU), a capacitive touch sensor, a resistive touch sensor, a LIDAR device, a strain sensor, a load sensor, a temperature sensor, an image capture device, and a measurement probe. The secondary sensor may comprise an IMU configured to output rotational and linear acceleration data to the computing system, and the computing system may be configured to utilize the rotational and linear acceleration data to assist in characterizing the position or orientation of the deformable transmissive layer within the global coordinate system. The secondary sensor may comprise an image capture device configured to capture image information pertaining to the surface of the interfaced object, and the computing system may be configured to utilize the image information to assist in determining a location or orientation of the object relative to deformable transmissive layer. The system further may comprise one or more tracking tags coupled to the interfaced object, and one or more detectors operatively coupled to the computing system, such that the computing system may be utilized to identify and provide location information pertaining to the interfaced object based at least in part upon predetermined locations of the one or more tracking tags relative to the interfaced object. The one or more tracking tags may comprise radiofrequency identification (RFID) tags, and the one or more detectors may comprise RFID detectors.

Another embodiment is directed to a method for geometric surface characterization, comprising: providing a deformable transmissive layer coupled to a mounting structure and to an interface membrane, wherein the interface membrane is interfaced against at least one aspect of an interfaced object having a surface to be characterized; providing a first illumination source operatively coupled to the deformable transmissive layer and configured to emit first illumination light into the deformable transmissive layer at a known first illumination orientation relative to the deformable transmissive layer, such that at least a portion of the first illumination light interacts with the deformable transmissive layer; providing a detector configured to detect light from within at least a portion of the deformable transmissive layer; providing a computing system configured to operate the detector to detect at least a portion of light directed from the deformable transmissive layer, to determine surface orientations pertaining to positions along the interface membrane based at least in part upon interaction of the first illumination light with the deformable transmissive layer, and to utilize the determined surface orientations to characterize a geometric profile of the surface of the object as interfaced against the interface membrane; and providing a secondary sensor operatively coupled to the computing system and configured to provide inputs which may be utilized by the computing system to further geometrically characterize the surface of the interfaced object. The secondary sensor may be coupled to the deformable transmissive layer. The method further may comprise providing a secondary sensor mounting structure coupled to the deformable transmissive layer, wherein the secondary sensor is coupled to the secondary sensor mounting structure. The secondary sensor and deformable transmissive layer may reside within an operational environment comprising one or more wall structures, and wherein the secondary sensor is coupled to one of the one or more wall structures. The secondary sensor may be selected from the group consisting of: an inertial measurement unit (IMU), a capacitive touch sensor, a resistive touch sensor, a LIDAR device, a strain sensor, a load sensor, a temperature sensor, an image capture device, and a measurement probe. The first illumination source may comprise a light emitting diode. The detector may be a photodetector. The detector may be an image capture device. The image capture device may be a CCD or CMOS device. The method further may comprise providing a lens operatively coupled between the detector and the deformable transmissive layer. The computing system may be operatively coupled to the detector and configured to receive information from the detector pertaining to light detected by the detector from within the deformable transmissive layer. The computing system may be operatively coupled to the first illumination source and is configured to control emissions from the first illumination source. The deformable transmissive layer may comprise an elastomeric material. The elastomeric material may be selected from the group consisting of: silicone, urethane, polyurethane, thermoplastic elastomer (TPE), and thermoplastic polyurethane (TPU). The deformable transmissive layer may comprise a composite having a pigment material distributed within an elastomeric matrix, the pigment material configured to provide an illumination reflectance which is greater than that of the elastomer matrix. The pigment material may comprise a metal oxide. The interface membrane may comprise an elastomeric material. The surface of the interfaced object may be located and oriented within a global coordinate system, and the computing system may be configured to characterize a geometric profile of the surface of the object as interfaced against the interface membrane with a position and an orientation relative to the global coordinate system. The computer system may be configured to gather two or more geometric profiles of two or more portions of the surface of the object as interfaced against the interface membrane and determine a position and an orientation pertaining to the two or more geometric profiles relative to each other in the global coordinate system. The computing system may be configured to provide a three-dimensional mapping pertaining to the two or more geometric profiles relative to each other in the global coordinate system. The computing system may be configured to stitch geometrically adjacent geometric profiles together using interpolation of the geometric profiles and relative positions and orientations thereof.

Another embodiment is directed to a method for geometric surface characterization, comprising: providing a deformable transmissive layer coupled to a mounting structure and to an interface membrane, wherein the interface membrane is interfaced against at least one aspect of an interfaced object; providing a first illumination source operatively coupled to the deformable transmissive layer and configured to emit first illumination light into the deformable transmissive layer at a known first illumination orientation relative to the deformable transmissive layer, such that at least a portion of the first illumination light interacts with the deformable transmissive layer; providing a detector configured to detect light from within at least a portion of the deformable transmissive layer; providing a computing system configured to operate the detector to detect at least a portion of light directed from the deformable transmissive layer, to determine surface orientations pertaining to positions along the interface membrane based at least in part upon interaction of the first illumination light with the deformable transmissive layer, and to utilize the determined surface orientations to characterize a geometric profile of the surface of the object as interfaced against the interface membrane; and providing a robotic manipulator operatively coupled to the computing system and deformable transmissive layer, the robotic arm configured to controllably position and orient the deformable transmissive layer relative to the interfaced object such that the computing system may characterize the geometric profile of the surface of the interfaced object as interfaced against the interface membrane with regard to the relative position and orientation of each of the deformable transmissive layer and the interfaced object. The robotic manipulator may comprise a robotic arm. The robotic arm may comprise a plurality of joints coupled by substantially rigid linkage members. The robotic manipulator may comprise a flexible robotic instrument. The method further may comprise providing an end effector coupled to the robotic manipulator. The end effector may comprise a grasper. The first illumination source may comprise a light emitting diode. The detector may be a photodetector. The detector may be an image capture device. The image capture device may be a CCD or CMOS device. The method further may comprise providing a lens operatively coupled between the detector and the deformable transmissive layer. The computing system may be operatively coupled to the detector and configured to receive information from the detector pertaining to light detected by the detector from within the deformable transmissive layer. The computing system may be operatively coupled to the first illumination source and is configured to control emissions from the first illumination source. The deformable transmissive layer may comprise an elastomeric material. The elastomeric material may be selected from the group consisting of: silicone, urethane, polyurethane, thermoplastic elastomer (TPE), and thermoplastic polyurethane (TPU). The deformable transmissive layer may comprise a composite having a pigment material distributed within an elastomeric matrix, the pigment material configured to provide an illumination reflectance which is greater than that of the elastomer matrix. The pigment material may comprise a metal oxide. The interface membrane may comprise an elastomeric material. The surface of the interfaced object may be located and oriented within a global coordinate system, and the computing system may be configured to characterize a geometric profile of the surface of the object as interfaced against the interface membrane with a position and an orientation relative to the global coordinate system. The computer system may be configured to gather two or more geometric profiles of two or more portions of the surface of the object as interfaced against the interface membrane and determine a position and an orientation pertaining to the two or more geometric profiles relative to each other in the global coordinate system. The computing system may be configured to provide a three-dimensional mapping pertaining to the two or more geometric profiles relative to each other in the global coordinate system. The computing system may be configured to stitch geometrically adjacent geometric profiles together using interpolation of the geometric profiles and relative positions and orientations thereof. The computing system may be configured to operate the operatively coupled robotic arm to gather the two or more geometric profiles of the two or more portions of the surface of the object automatically based at least in part upon an overall outer geometry of the object. The two or more geometric profiles of the two or more portions of the surface of the object may be automatically created based upon immediately adjacent portions of the object. The computing system may be configured to operate the operatively coupled robotic arm to sequentially gather the two or more geometric profiles of the two or more portions of the surface of the object automatically based at least in part upon a predetermined analysis pathway selected by a user.

Another embodiment is directed to a hand-held method for geometric surface characterization, comprising: providing a deformable transmissive layer coupled to a mounting structure and to an interface membrane, wherein the interface membrane is interfaced against at least one aspect of an interfaced object having a surface to be characterized; providing a first illumination source operatively coupled to the deformable transmissive layer and configured to emit first illumination light into the deformable transmissive layer at a known first illumination orientation relative to the deformable transmissive layer, such that at least a portion of the first illumination light interacts with the deformable transmissive layer; providing a detector configured to detect light from within at least a portion of the deformable transmissive layer; and providing a computing system configured to operate the detector to detect at least a portion of light directed from the deformable transmissive layer, to determine surface orientations pertaining to positions along the interface membrane based at least in part upon interaction of the first illumination light with the deformable transmissive layer, and to utilize the determined surface orientations to characterize a geometric profile of the surface of the interfaced object as interfaced against the interface membrane; wherein the deformable transmissive layer and computing system are coupled within a hand-held system housing comprising the mounting structure and a power supply, the handheld system housing configured to facilitate manual operation by a user such that the user may manually position and orient the deformable transmissive layer to engage the interface membrane against the interfaced object. The method further may comprise providing a localization sensor operatively coupled to the hand-held system housing and computing system. The localization sensor may be configured to be utilized by the computing system to determine a position of at least a portion of the hand-held system housing within a global coordinate system. The computing system and localization sensor may be further configured such that an orientation of at least a portion of the hand-held system housing within the global coordinate system may be determined. The computing system and localization sensor may be further configured such that a position and an orientation of the deformable transmissive layer within the global coordinate system may be determined. The first illumination source may comprise a light emitting diode. The detector may be a photodetector. The detector may be an image capture device. The image capture device may be a CCD or CMOS device. The method further may comprise providing a lens operatively coupled between the detector and the deformable transmissive layer. The computing system may be operatively coupled to the detector and configured to receive information from the detector pertaining to light detected by the detector from within the deformable transmissive layer. The computing system may be operatively coupled to the first illumination source and is configured to control emissions from the first illumination source. The deformable transmissive layer may comprise an elastomeric material. The elastomeric material may be selected from the group consisting of: silicone, urethane, polyurethane, thermoplastic elastomer (TPE), and thermoplastic polyurethane (TPU). The deformable transmissive layer may comprise a composite having a pigment material distributed within an elastomeric matrix, the pigment material configured to provide an illumination reflectance which is greater than that of the elastomer matrix. The pigment material may comprise a metal oxide. The interface membrane may comprise an elastomeric material. The surface of the interfaced object may be located and oriented within a global coordinate system, and the computing system may be configured to characterize a geometric profile of the surface of the object as interfaced against the interface membrane with a position and an orientation relative to the global coordinate system. The computer system may be configured to gather two or more geometric profiles of two or more portions of the surface of the object as interfaced against the interface membrane and determine a position and an orientation pertaining to the two or more geometric profiles relative to each other in the global coordinate system. The computing system may be configured to provide a three-dimensional mapping pertaining to the two or more geometric profiles relative to each other in the global coordinate system. The computing system may be configured to stitch geometrically adjacent geometric profiles together using interpolation of the geometric profiles and relative positions and orientations thereof. The method further may comprise providing a secondary sensor operatively coupled to the computing system and configured to provide inputs which may be utilized by the computing system to further geometrically characterize the surface of the interfaced object. The secondary sensor may be selected from the group consisting of: an inertial measurement unit (IMU), a capacitive touch sensor, a resistive touch sensor, a LIDAR device, a strain sensor, a load sensor, a temperature sensor, an image capture device, and a measurement probe. The secondary sensor may comprise an IMU configured to output rotational and linear acceleration data to the computing system, and the computing system may be configured to utilize the rotational and linear acceleration data to assist in characterizing the position or orientation of the deformable transmissive layer within the global coordinate system. The secondary sensor may comprise an image capture device configured to capture image information pertaining to the surface of the interfaced object, and the computing system may be configured to utilize the image information to assist in determining a location or orientation of the object relative to deformable transmissive layer. The method further may comprise providing one or more tracking tags coupled to the interfaced object, and one or more detectors operatively coupled to the computing system, such that the computing system may be utilized to identify and provide location information pertaining to the interfaced object based at least in part upon predetermined locations of the one or more tracking tags relative to the interfaced object. The one or more tracking tags may comprise radiofrequency identification (RFID) tags, and the one or more detectors may comprise RFID detectors.

BRIEF DESCRIPTION OF THE DRAWINGS

FIGS. 48-50 illustrate aspects of integrations wherein one or more sensing and/or touch translation interfaces may be utilized to assist with a local user perception experience as well as for facilitating commands issued by the user.

FIGS. 62-65 illustrate various process or method configurations featuring deformable transmissive layers employed for geometric characterization of one or more objects.

DETAILED DESCRIPTION

Figure 7A:
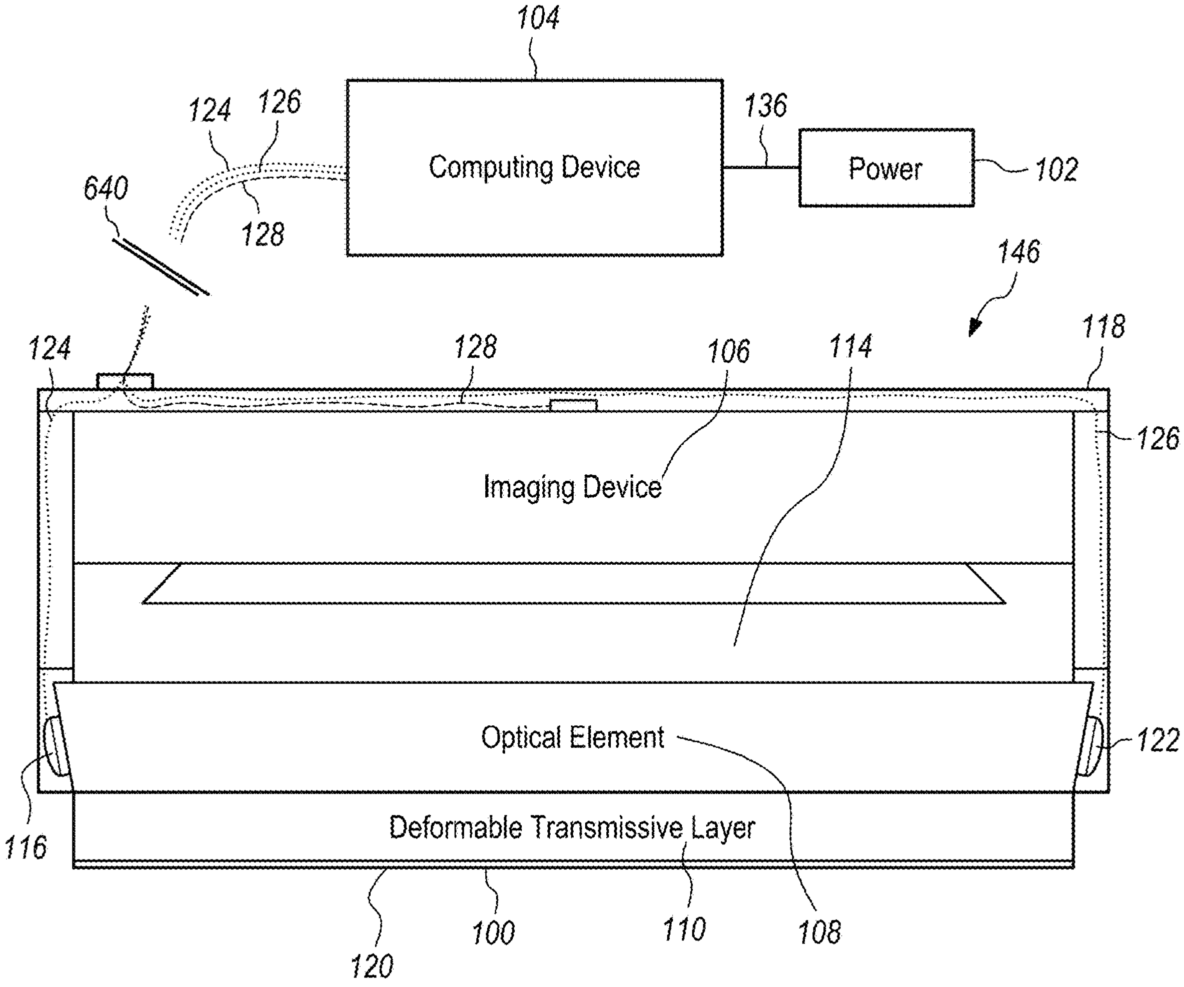
FIGS. 7A-7H and FIG. 8 illustrate various aspects of touch sensing assemblies configured to utilize deformable transmissive layers.

Referring to FIG. 7A, a digital touch sensing assembly (146) is illustrated featuring an a deformable transmissive layer (110) operatively coupled to an optical element (108)

which is illuminated by one of more intercoupled light sources (116, 122) and positioned within a field of view of an imaging device (106). A housing (118) is configured to retain positioning of the components relative to each other, and to expose a touch sensing contact surface (120). An interface membrane (100), which may comprise a fixedly attached or removably coupled substantially thin layer comprising a relatively low bulk modulus polymeric material, for example, may be positioned and operatively coupled to, or comprise a portion of, the deformable transmissive layer for direct contact between other objects and the digital touch sensing assembly (146) for touch determination and characterization; thus in the case of a configuration wherein an interface membrane (100) is coupled to or comprises a portion of the deformable transmissive layer, the ultimate outer touch contact surface (120) becomes the outer aspect of such interface membrane (100). Aspects of suitable digital touch sensing assembly (146) configurations generally featuring elastomeric deformable transmissive layer materials are described, for example, in U.S. Pat. Nos. 10,965,854, 9,127,938, and 8,411,140, each of which is incorporated by reference herein in its entirety. As shown in FIG. 7A, the depicted digital touch sensing assembly (146) may feature a gap or void (114), which may contain an optically transmissive material (such as one that has a refractive index similar to that of the optical element 108), air, or a specialized gas, such as an inert gas, geometrically configured to place aspects of the optical element (108) and/or deformable transmissive layer (110) within a desired proximity of the imaging device (106), which may comprise an imaging sensor such as a digital camera chip, single light sensing element (such as a photodiode), or an array of light sensing elements, and which may be configured to have a field of view and depth of field that is facilitated by the geometric gap or void (114) (i.e., the gap or void 114 may be positioned to accommodate the field of view and/or depth of view pertaining to a particular imaging device 106). In various embodiments the optical element (108) may comprise a substantially rigid material, a material of known elastic modulus, or of known structural modulus (i.e., given an unloaded shape and a loaded shape, a loading profile may be determined given structural modulus information pertinent to the shape). Various suitable optical elements (108) may define outer shapes including, for example, cylindrical, cubic, and/or rectangular-prismic. As illustrated and described below, various illumination sources may be coupled to one or more sidewall surfaces which define an optical element (108). In another embodiment, the optical element (108) may be configured to be deformable or conformable such that impacts of the rigidity of such structure upon other associated elements is minimized (i.e., impulse loading, such as force/delta-time, may be minimized with greater impact compliance; further, with a lower structural modulus at the contact interface, greater surface contact may be maintained over a given surface, such as one with terrain or geometric features).

Also shown in FIG. 7A is a computing device or system (104) which may comprise a computer, microcontroller, field programmable gate array, application specific integrated circuit, or the like, which is configured to be operatively coupled (128) to the imaging device (106), and also operatively coupled (124, 126) to the one or more light sources (30), to facilitate control of these devices in gathering data pertaining to touch against the deformable transmissive layer (110). For example, in one embodiment, each of the light sources (116, 122) comprises a light emitting diode ("LED") operatively coupled (124, 126) to the computing device (104) using an electronic lead (124, 126), and the imaging device (106) comprises a digital camera sensor chip operatively coupled to the computing device using an electronic lead (128), as shown in FIG. 7A. A power source (102) may be operatively coupled to the computing device (104) to provide power to the computing the device (104), and also may be configured to controllably provide power to interconnected devices such as the imaging device (106) and light sources (116, 122), through their couplings (128, 124, 126, respectively). As shown in FIG. 7A, a separation (640) is depicted to indicate that these coupling interfaces (128, 124, 126) may be short or relatively long (i.e., the digital touch sensing assembly 146 may be in a remote location relative to the computing device 104), and may be direct physical connections or transmissions of data through wired or wireless interfaces, such as via light/optical networking protocols, or wireless networking protocols such as Bluetooth® or 802.11 based configurations, which may be facilitated by additional computing and power resources local to the digital touch sensing assembly (146).

Figure 7B:
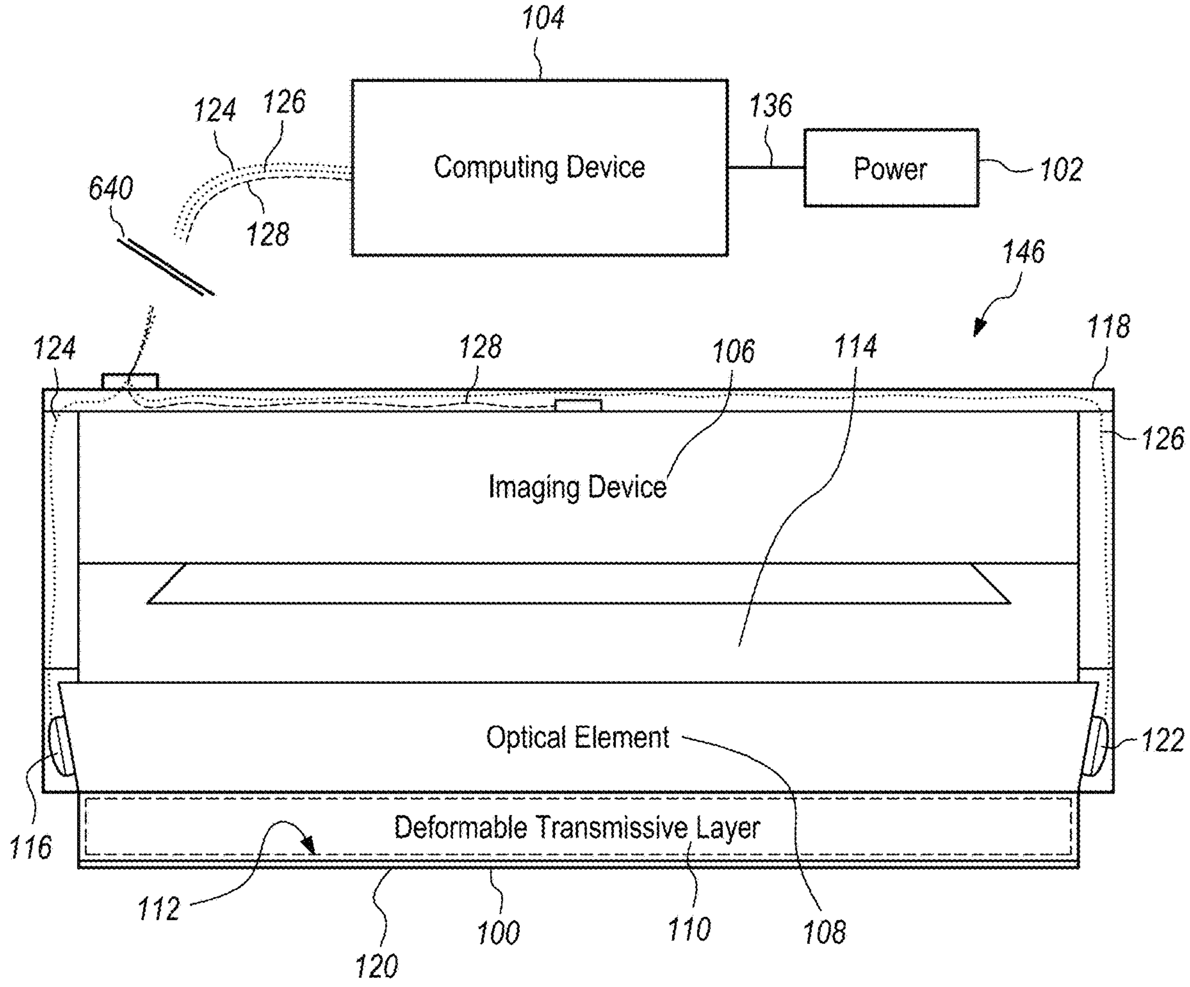

Referring to FIG. 7B, a configuration similar to that shown in FIG. 7A is illustrated, with the exception that the deformable transmissive layer (110) of FIG. 7B comprises one or more bladders or enclosed volumes (112) which may be occupied, for example, by a fluid (such as a liquid or gas, which may be physically treated as a form of fluid). In one embodiment, for example, the deformable transmissive layer (110) may comprise several separately-controllable inflatable segments or sub-volumes, and may comprise a cross-sectional shape selected to provide specific mechanical performance under loading, such as a controllable honeycomb type cross-sectional shape configuration. As noted above, a deformable transmissive layer (110) may comprise a material or materials selected to match the touch sensing paradigm in terms of bulk and/or Young's Modulus. In other words, for sensing relatively low loads, such as in a digital touch scenario of interfacing with soap bubbles or a surface of a live photosynthesizing leaf of a plant, a relatively low modulus (i.e., generally locally flexible/deformable; not stiff) material such as an elastomer, as described, for example, in the aforementioned incorporated references, may be utilized for the deformable transmissive layer (110) and or outer interface membrane (100), which, as noted above, may be removable. The outer interface membrane (100) may comprise an assembly of relatively thin and sequentially removable membranes, such that they may be sequentially removed when they become coupled to dirt or dust, for example, in a "tear-off" type fashion. With an embodiment such as that shown in FIG. 7B wherein the deformable transmissive layer (110) comprises an at least temporarily captured volume of liquid or gas, the gas or liquid, along with the pressure thereof, may be modulated to address the desired bulk modulus and sensitivity of the overall deformable transmissive layer (110) (for example, the pressure and/or volume may be modulated pertaining to the one or more bladder segments 112) to generally change the functional modulus of the deformable transmissive layer 110).

Figure 7C:
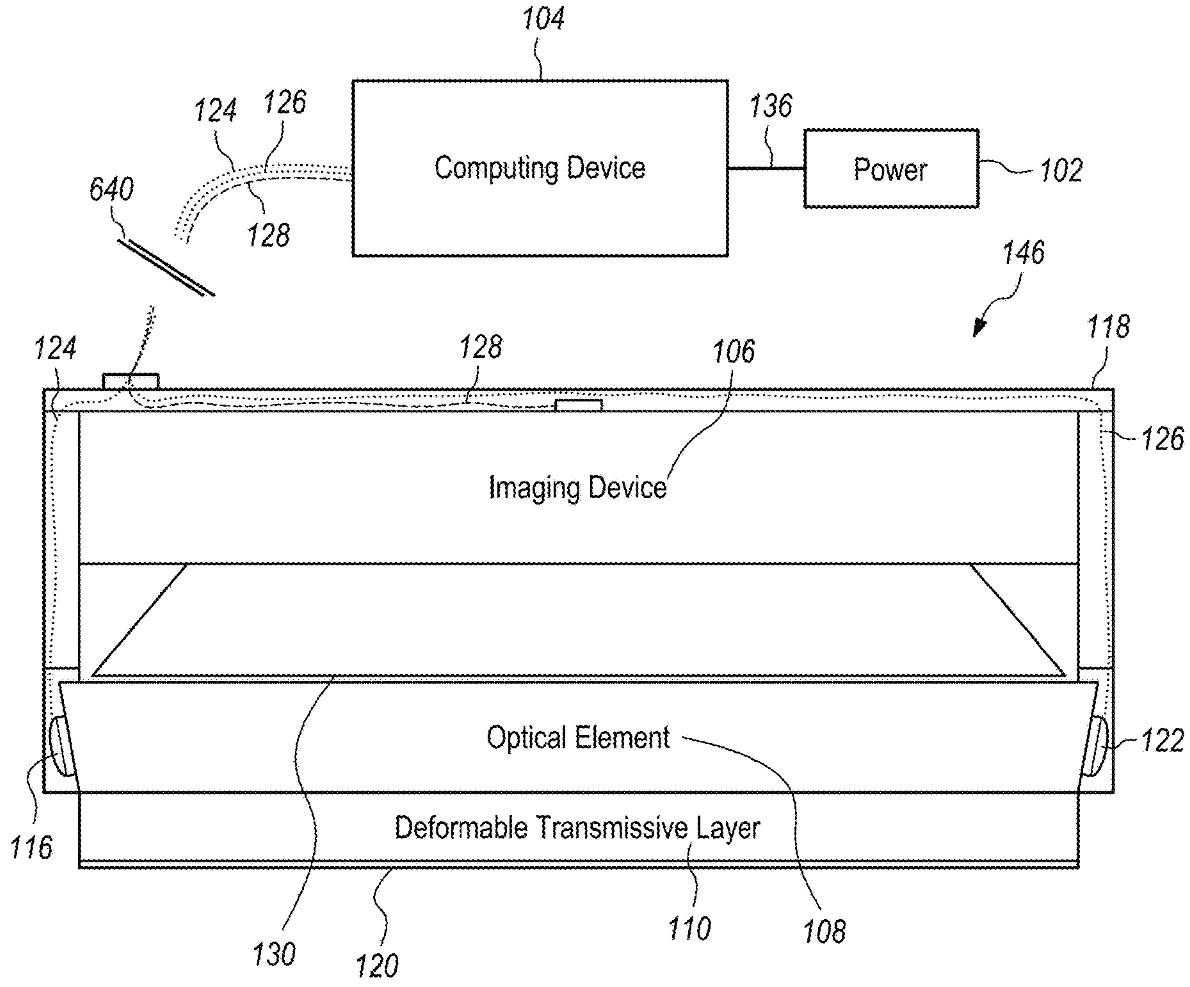

Referring to FIG. 7C, a configuration similar to that of FIG. 7A is illustrated, wherein the configuration of FIG. 7C illustrates that the gap (130) between the imaging device (106) and optical element (108) can be reduced and even eliminated, depending upon the optical layout of the imaging device (106), which may be intercoupled with refractive and/or diffractive optics to change properties such as focal distance of the imaging device (106).

Figure 7D:
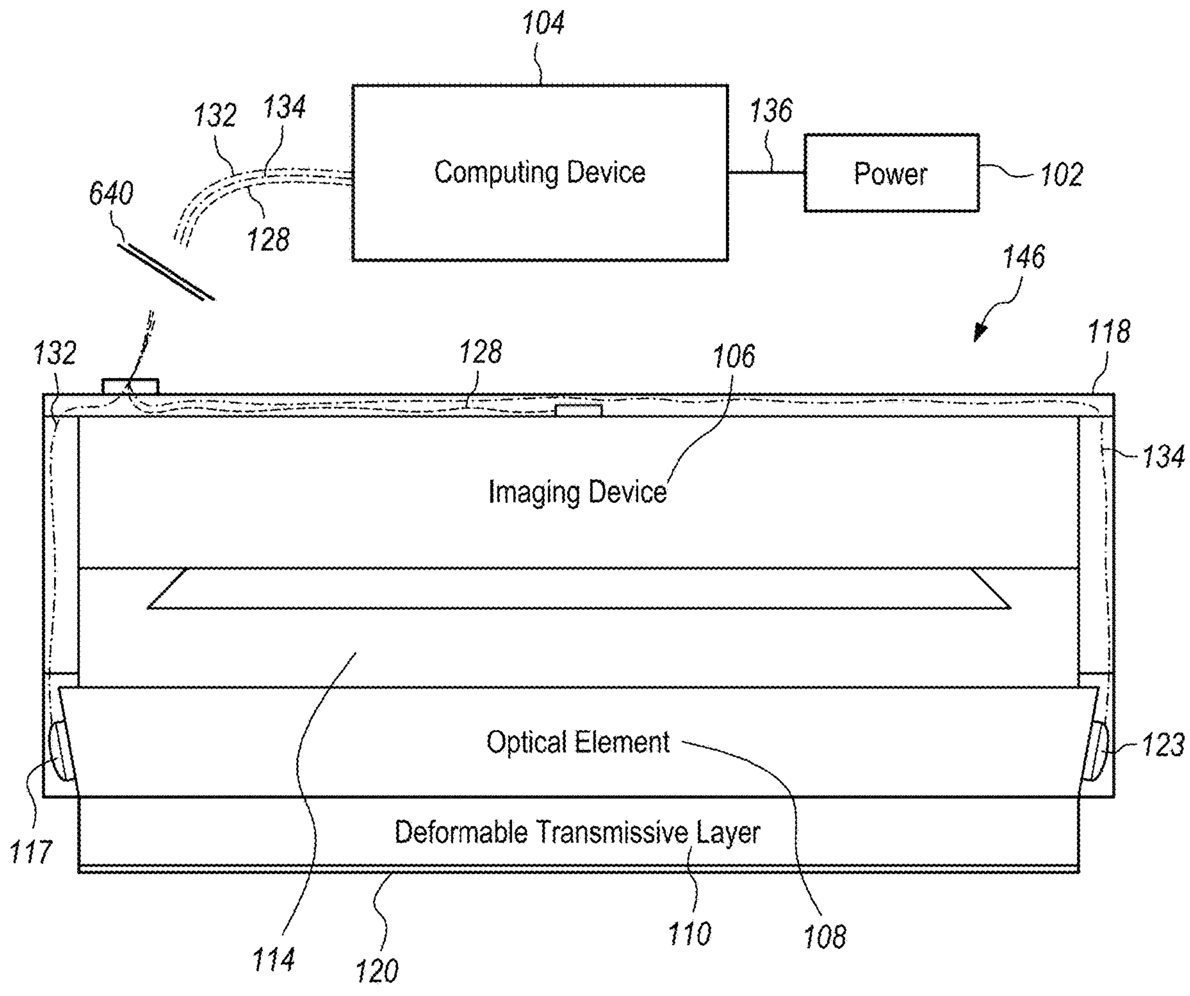

Referring to FIG. 7D, a configuration similar to that of FIG. 7A is illustrated, with exception that the configuration of FIG. 7D illustrates that the one or more light sources may be more akin to light emitters (117, 123) which are configured to emit light that originates at another location, such as coupled to one more light LED light sources which are directly coupled to the computing device (104) and configured to transmit light through a light-transmitting coupling member (132, 134) via a light fiber, "light pipe", or waveguide which may be configured to pass photons, such as via total internal reflection, as efficiently as possible from such sources to the emitters (117, 123).

Figure 7E:
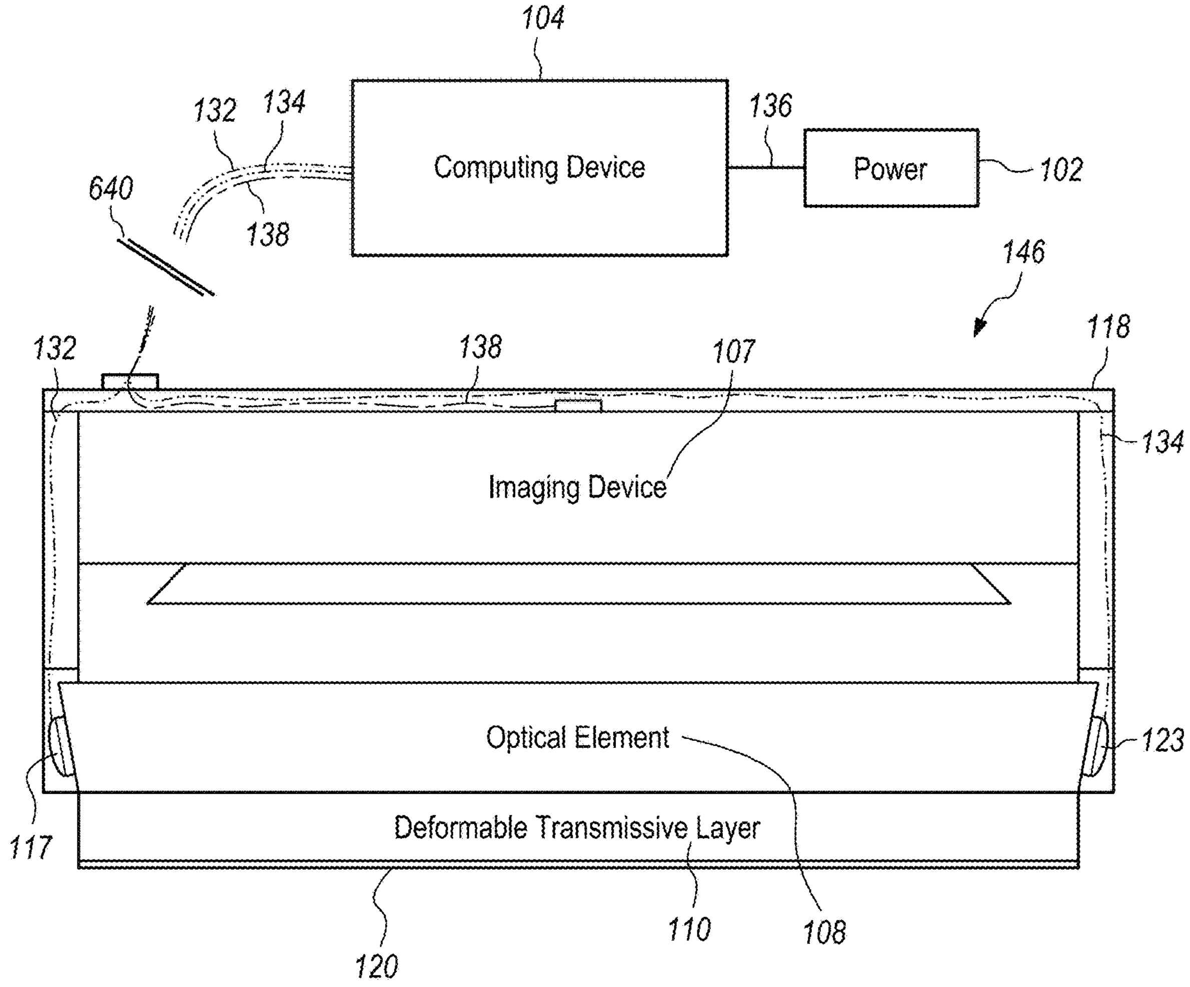

Similarly, referring to FIG. 7E, a configuration similar to that of FIG. 7D is illustrated, wherein the imaging device (107) comprises capturing optics selected to gather photons and transmit them back through a light-transmissive coupling member (138), such as a waveguide or one or more light fibers, to an image sensor which may be positioned within or coupled to the computing device (104) or other structure which may reside separately from the digital touch sensing assembly (146).

Figure 1:
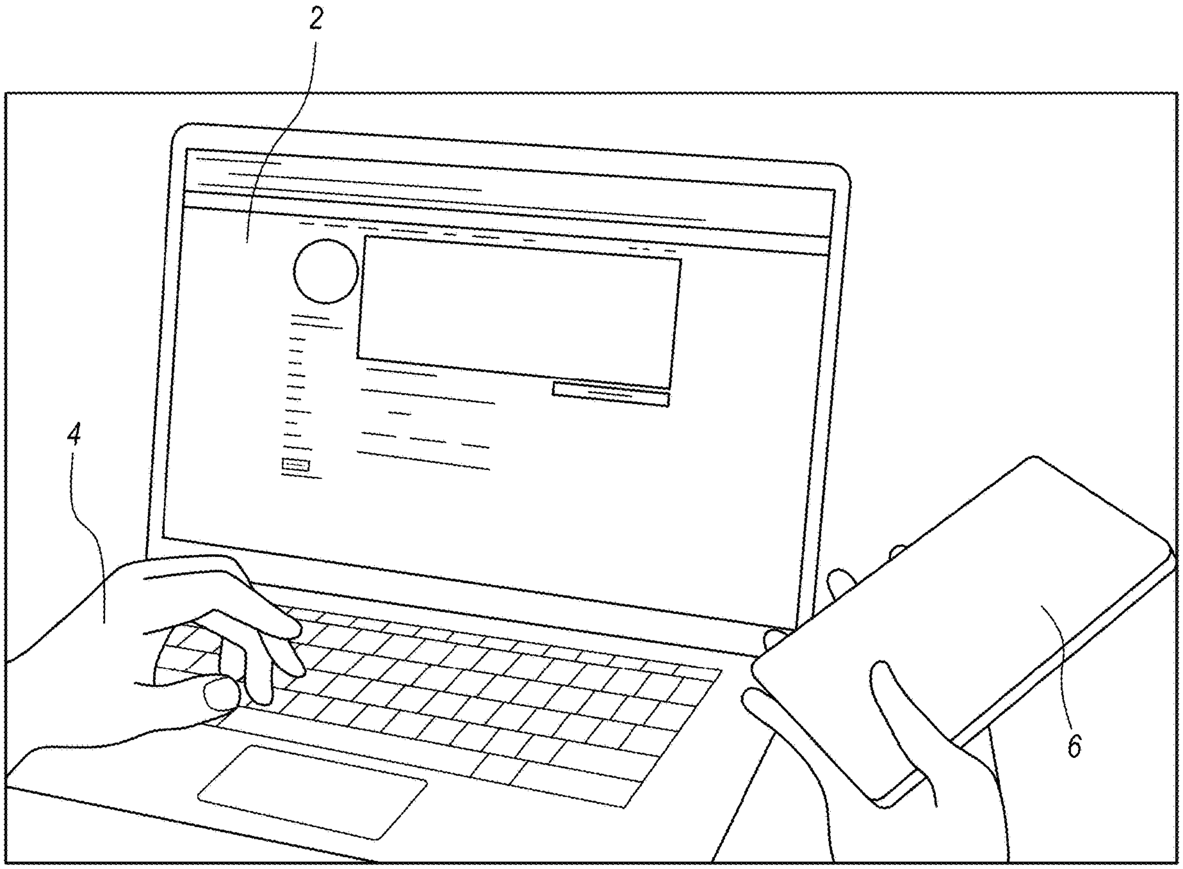
FIGS. 1-4 illustrate various aspects of conventional computing and communication systems.
Figure 2A:
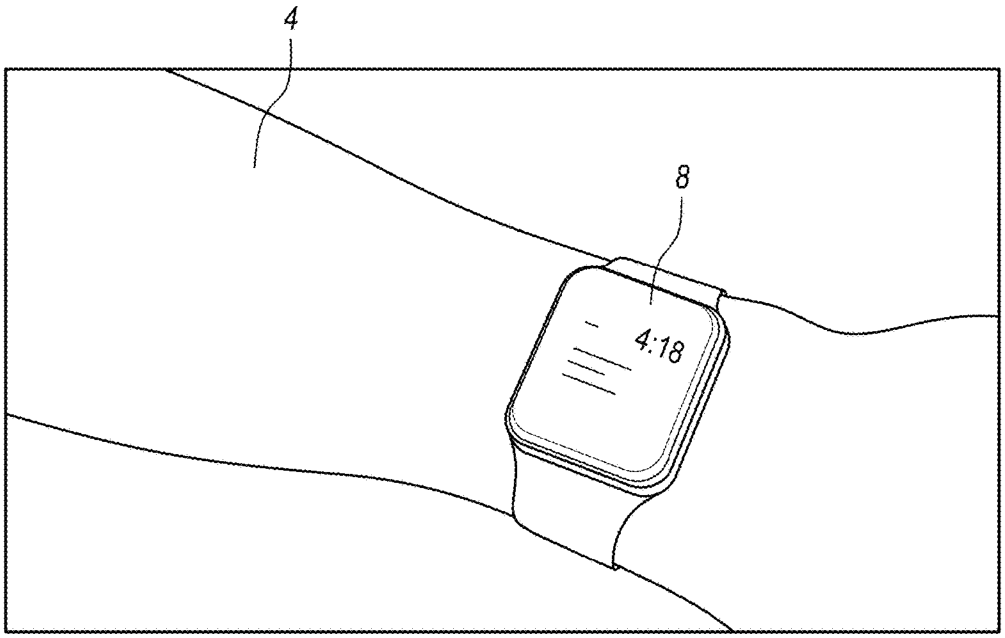
Figure 2B:
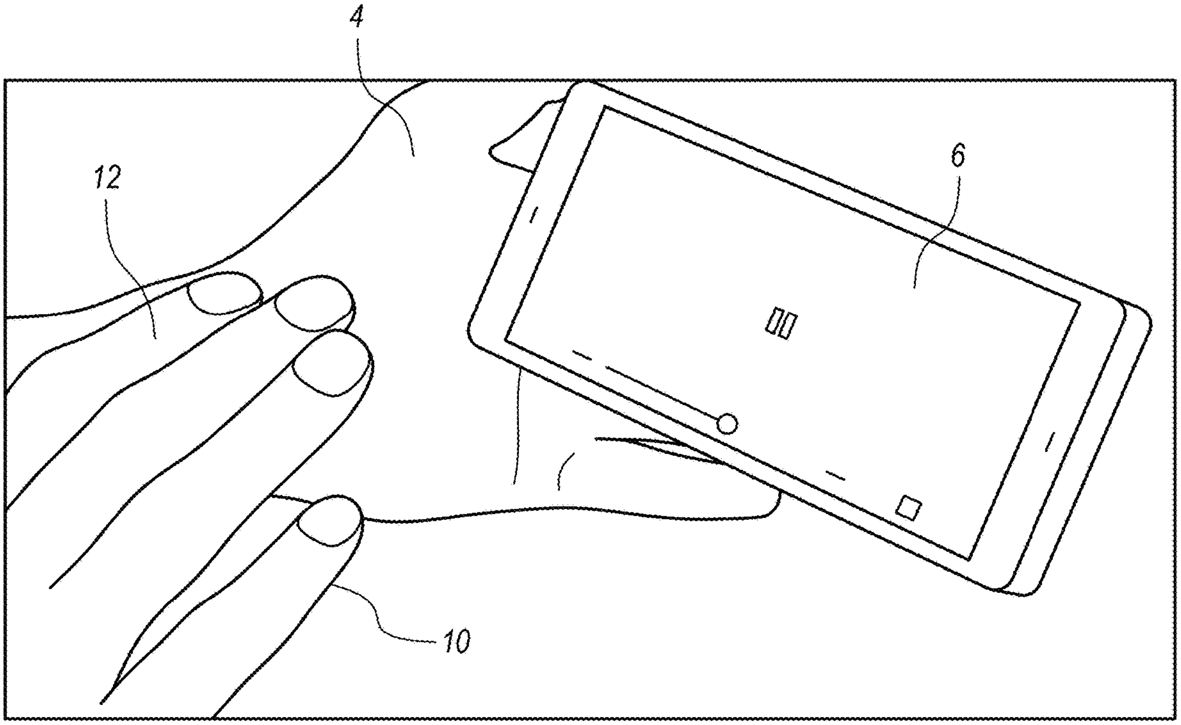
Figure 3A:
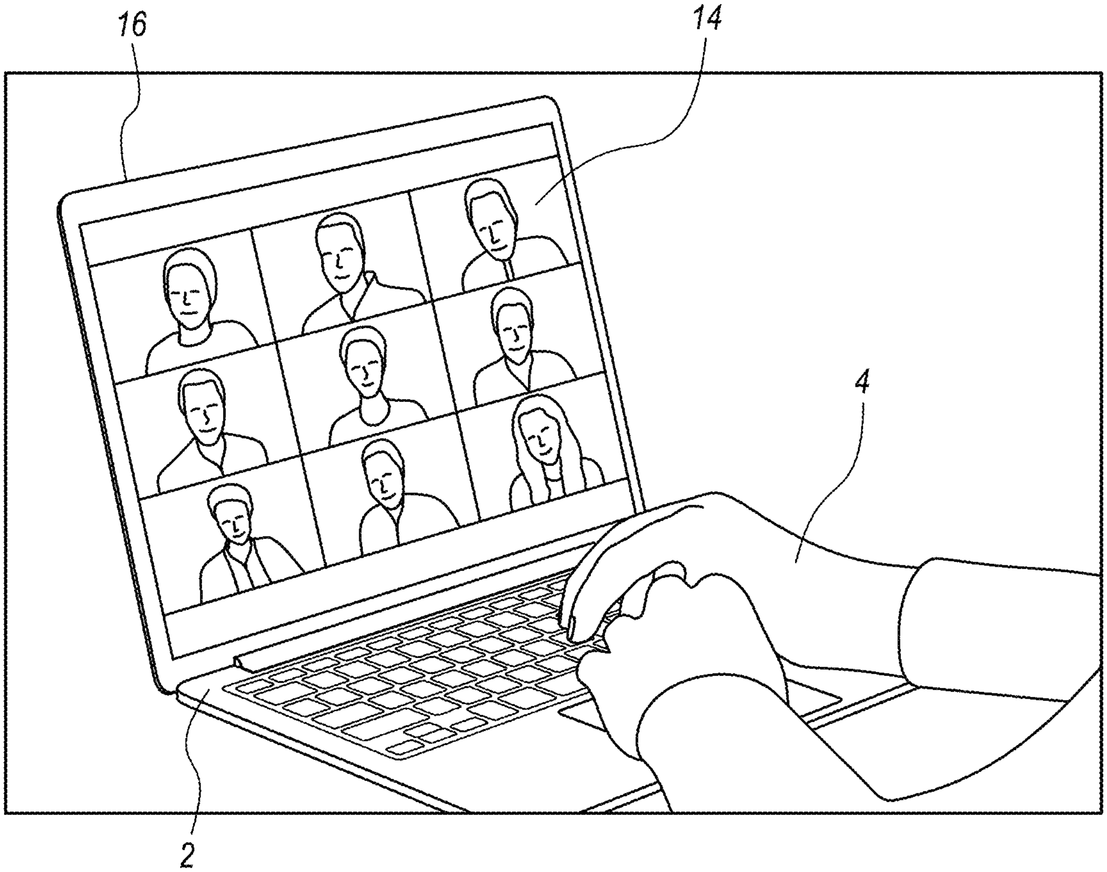
Figure 3B:
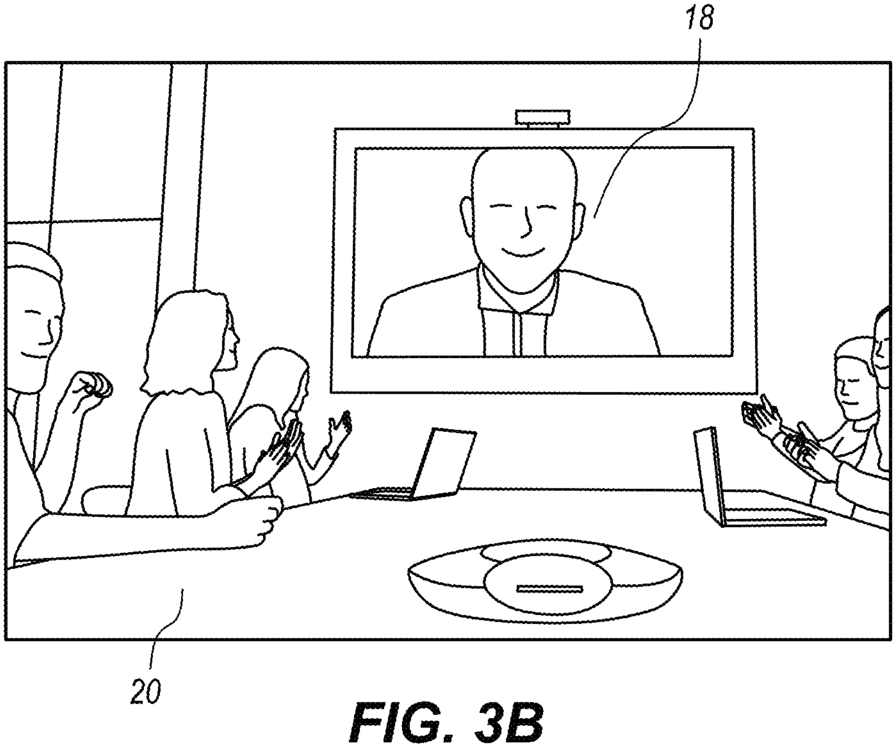
Figure 3C:
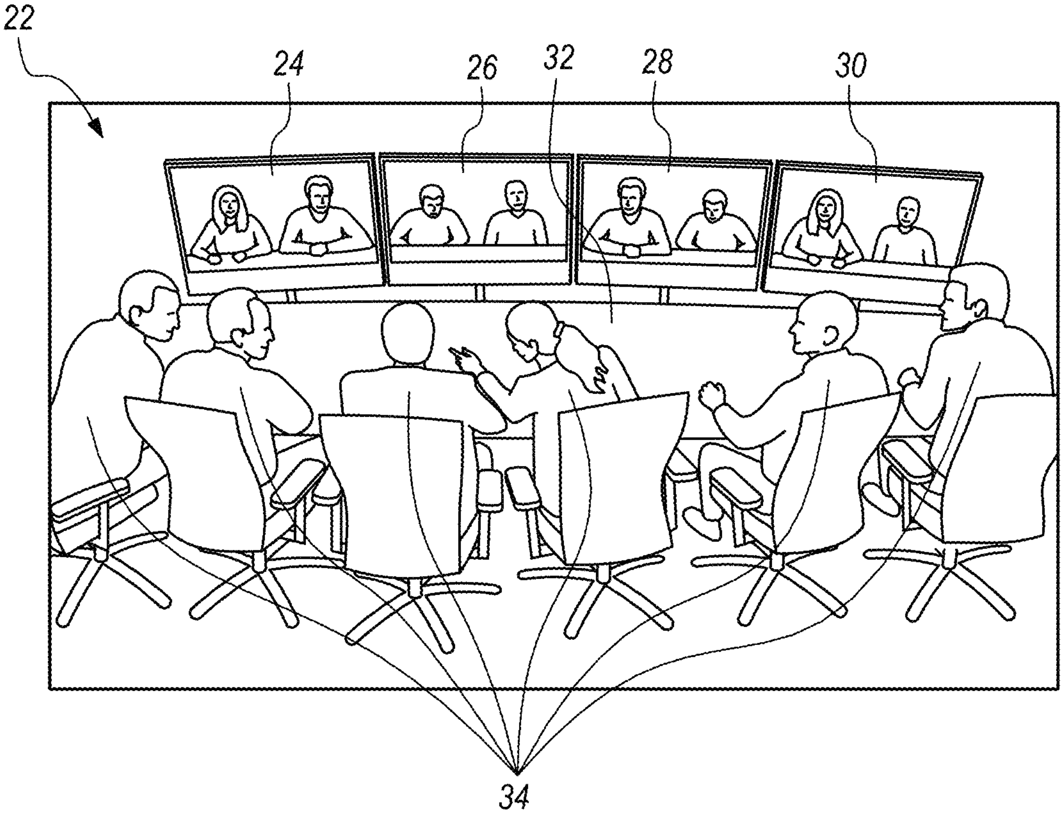
Figure 3D:
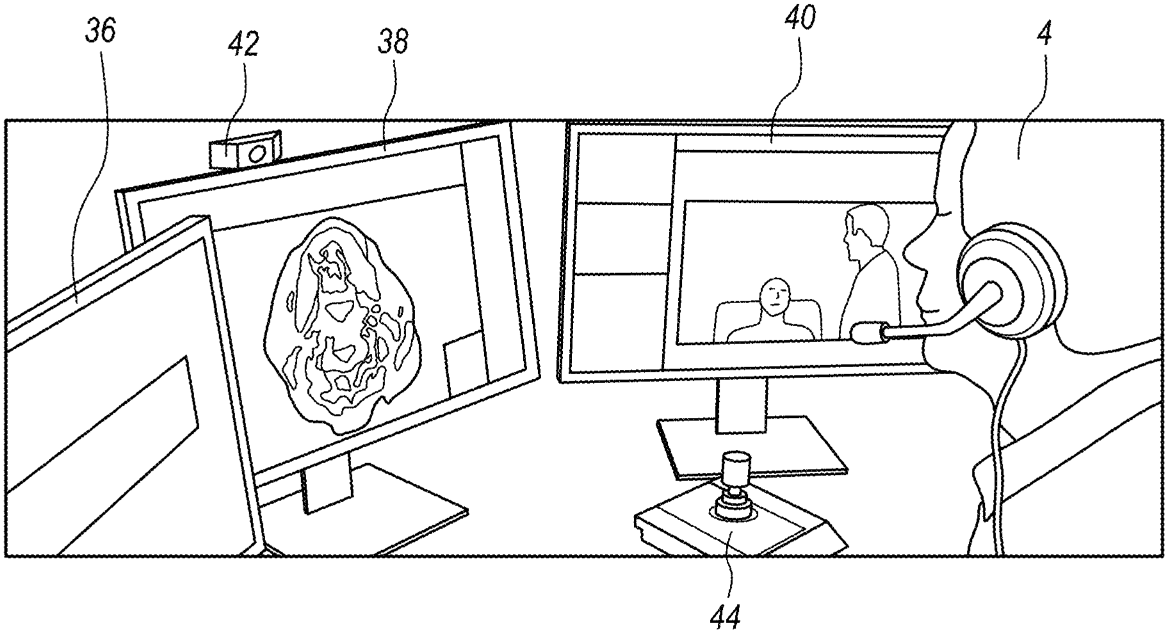
Figure 3E:
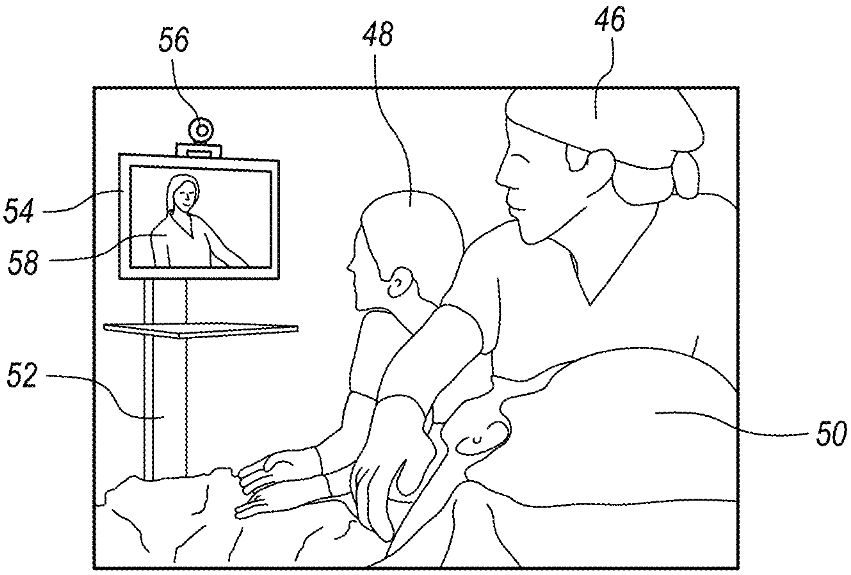
Figure 4:
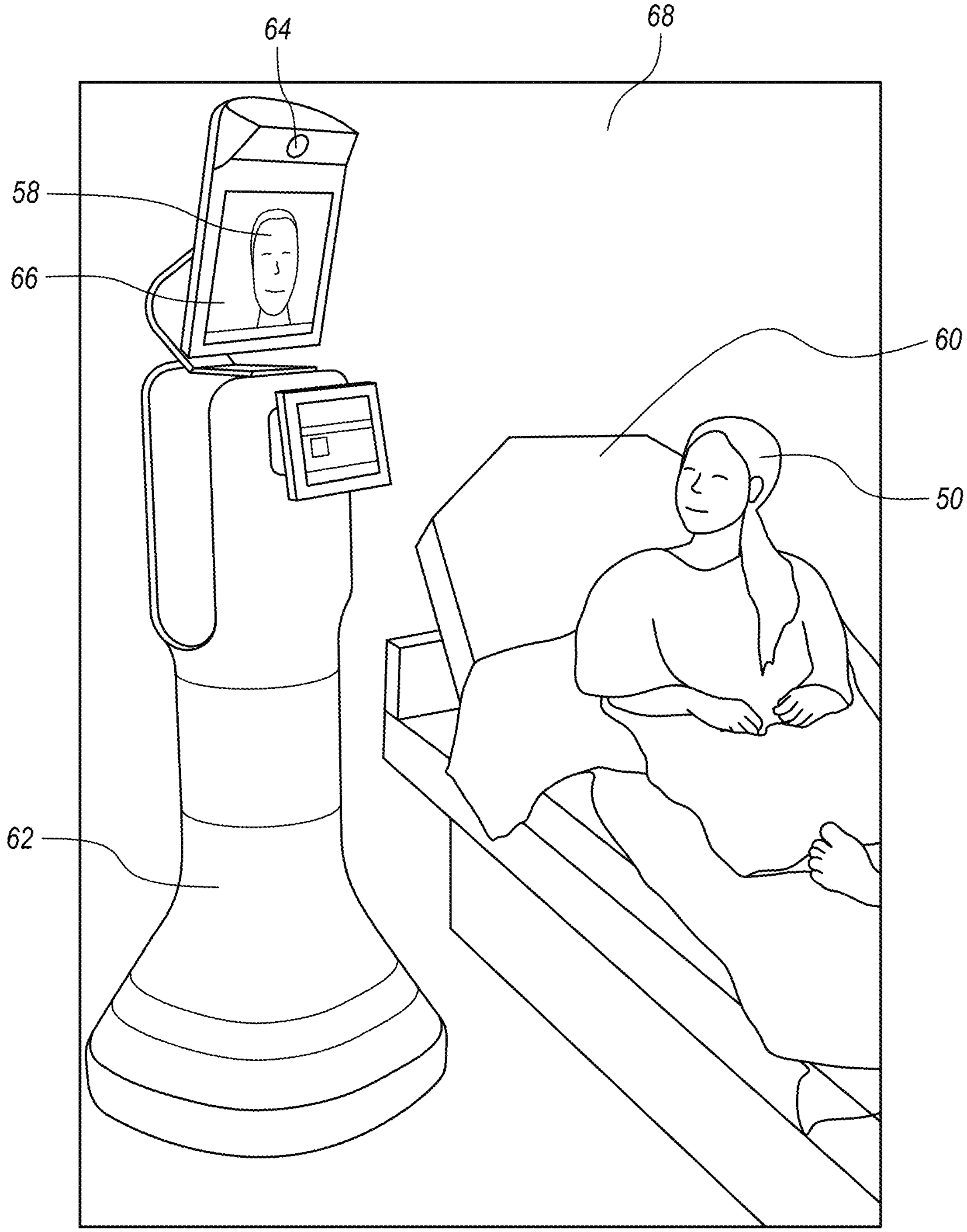
Figure 5A:
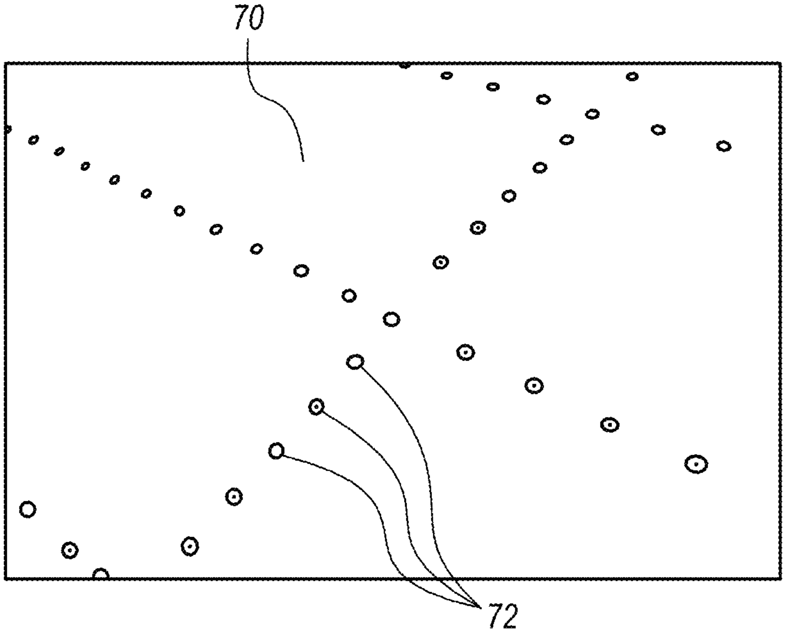
FIGS. 5A-6C illustrate various aspects of scenarios wherein enhanced understanding of surface geometry or profile would be useful.
Figure 5B:
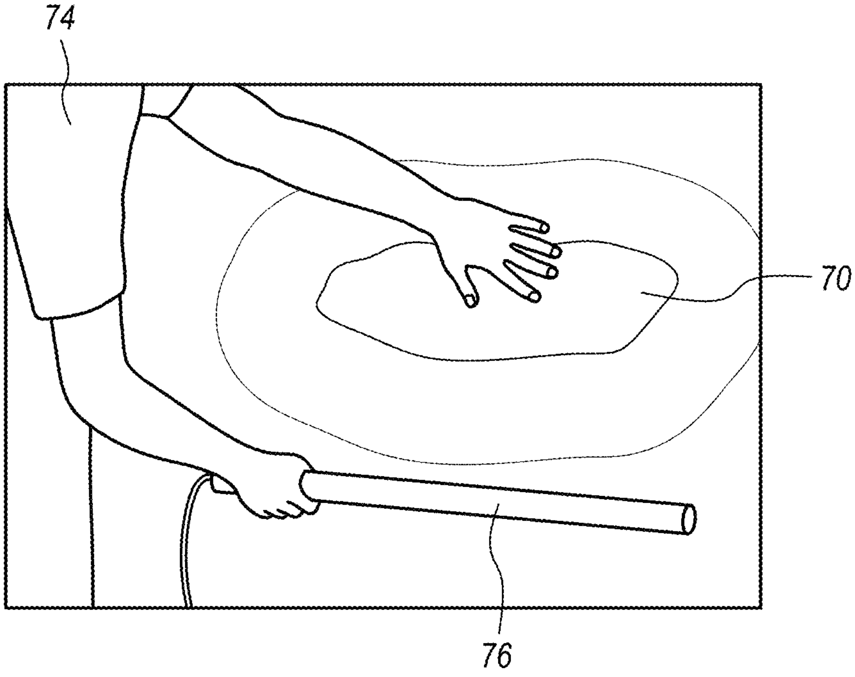
Figure 6A:
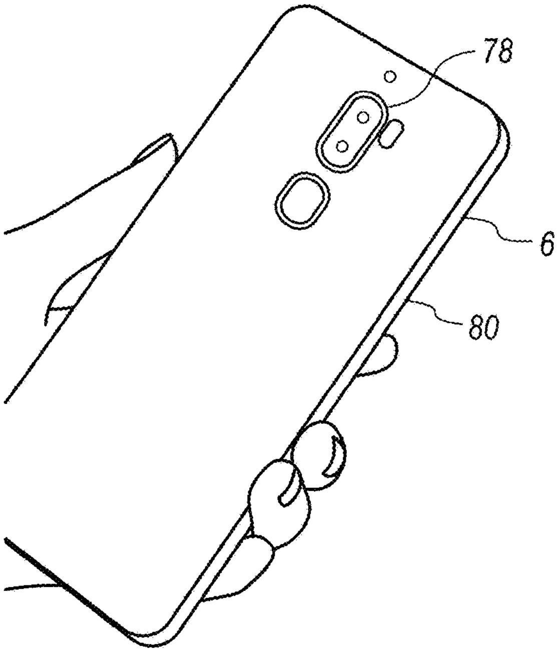
Figure 6B:
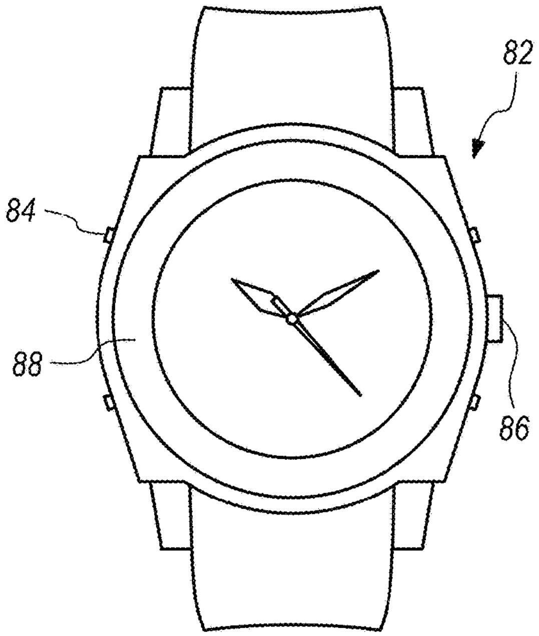
Figure 6C:
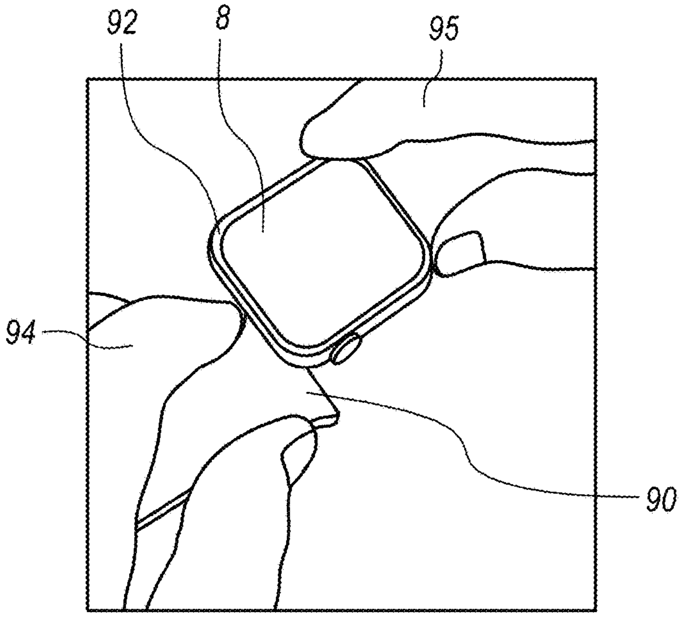
Figure 7F:
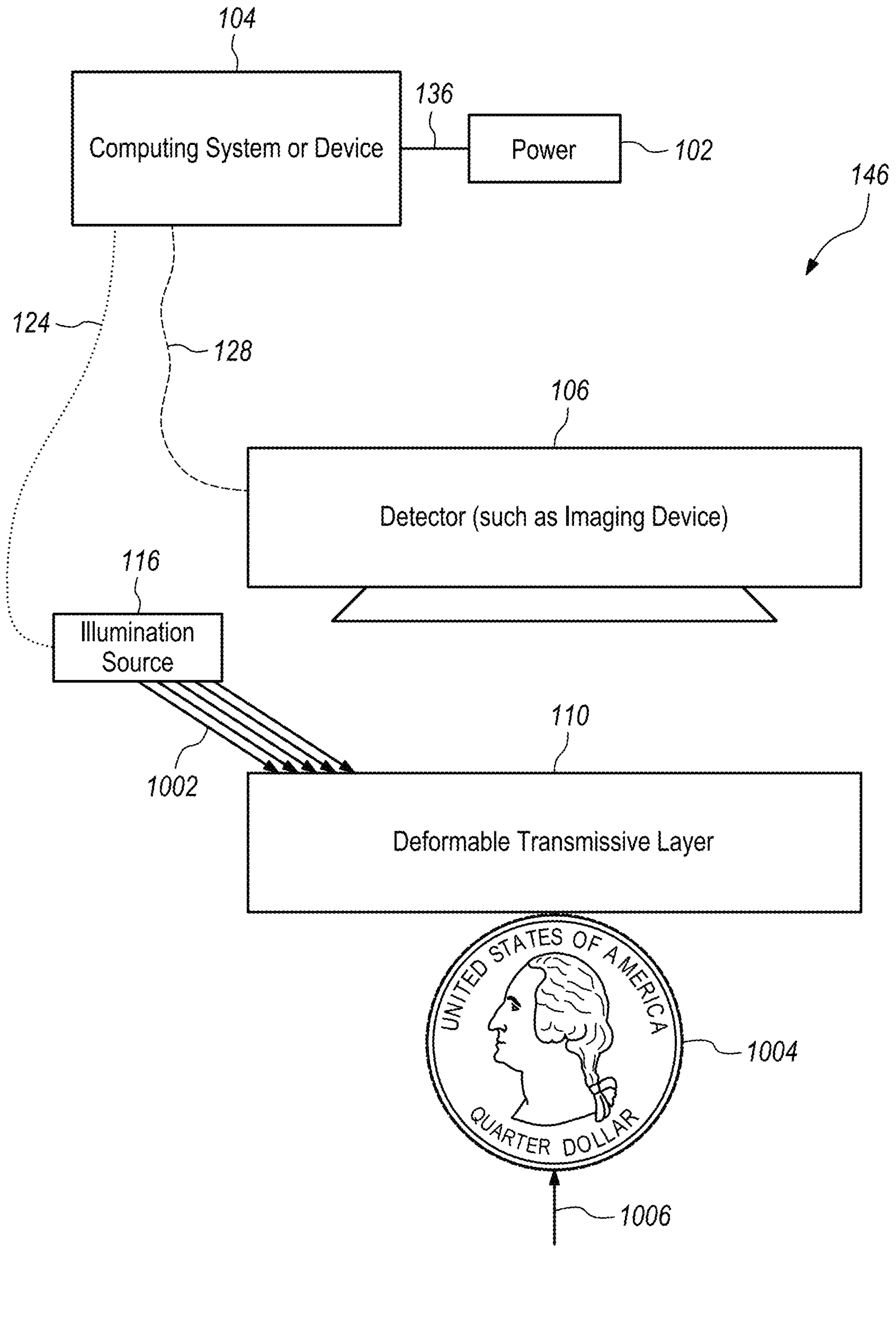
Figure 7G:
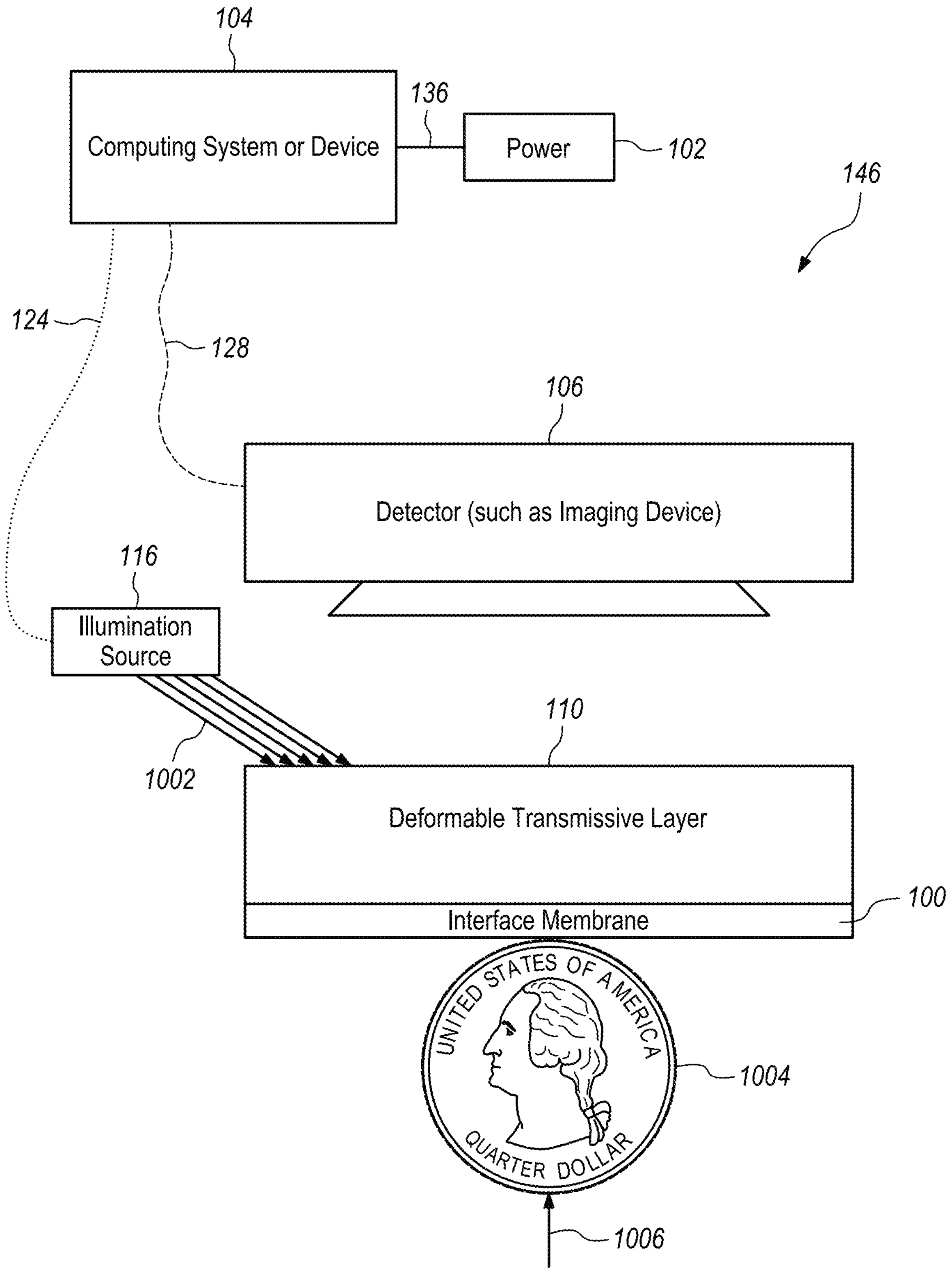
Figure 7H:
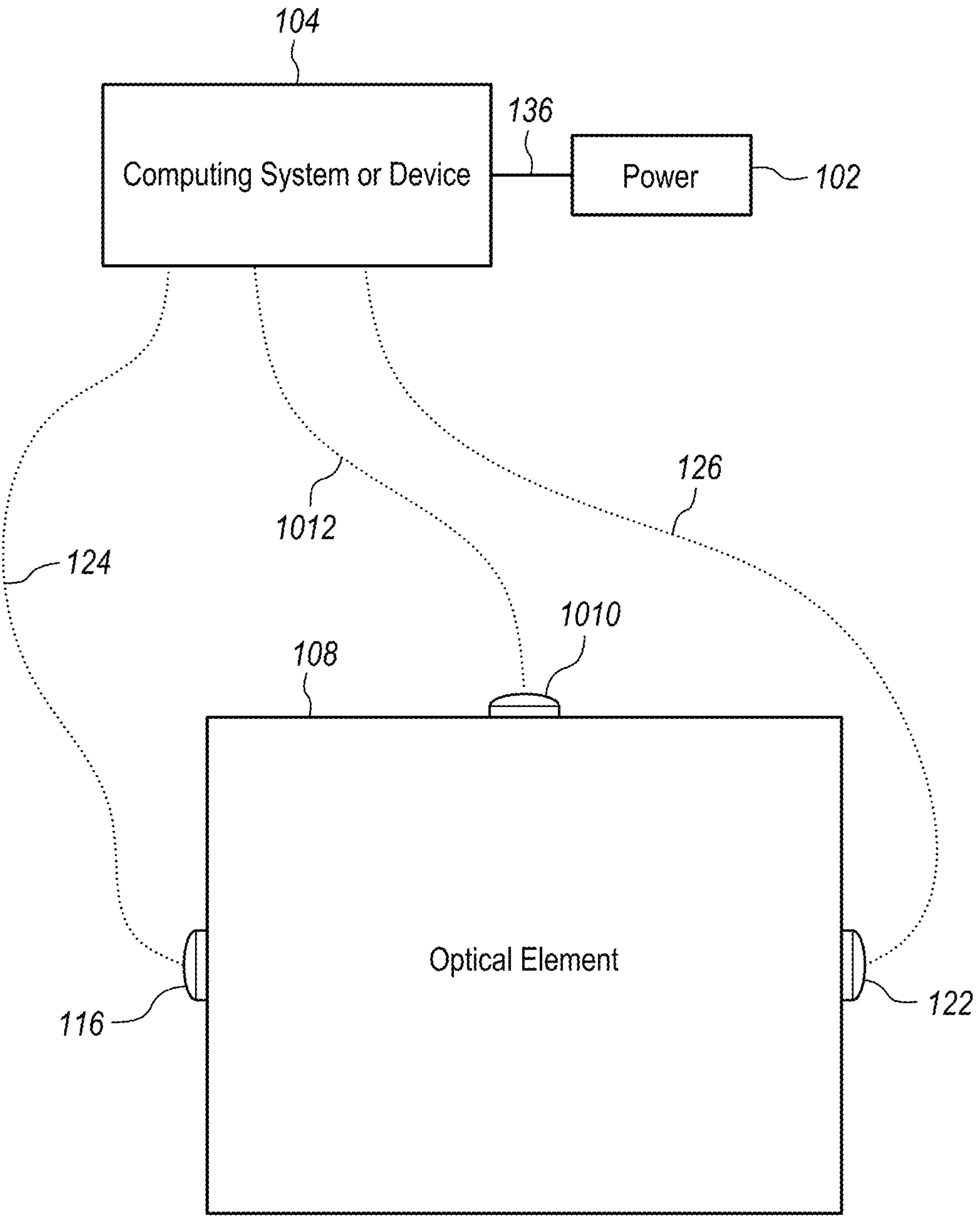

Referring to FIGS. 7F-7H, various aspects of digital touch sensing assembly (146) configurations illustrated featuring a deformable transmissive layer (110) which may be utilized to characterize interaction between surfaces. For example, referring to FIG. 7F, in a simplified illustrative embodiment, a computing system or device (104) operatively coupled (136) to a power supply (102) may be utilized to control, through a control coupling (124) which may be wired or wireless, light (1002) or other emissions from an illumination source (116) which may be directed into a deformable transmissive layer (110). The deformable transmissive layer (110) may be urged (1006) against at least a portion of an interfaced object (1004), such as the edge of a coin, and based upon the interaction of the illumination (1002) with the deformable transmissive layer (110), a detector, such as an image capture device (such as a CCD or CMOS device), which may be operatively coupled (128, such as by wired or wireless connectivity) to the computing system (104) may be configured to detect at least a portion of light directed from the deformable transmissive layer. In other words, with the illumination source (116) operatively coupled (such as optically coupled with an efficient transmission interface) to pass illumination at a known orientation relative to the deformable transmissive layer such that at least a portion of the illumination light interacts with the deformable transmissive layer, and the detector configured to detect light from within at least a portion of the deformable transmissive layer, the computing system may be configured to operate the detector to detect at least a portion of light directed from the deformable transmissive layer, to determine surface orientations pertaining to positions along the interface of the deformable transmissive layer with the interfaced object based at least in part upon interaction of the first illumination light with the deformable transmissive layer, and to utilize the determined surface orientations to characterize a geometric profile of the at least one aspect of the interfaced object as interfaced against the interface membrane. Referring to FIG. 7G, as discussed further below, an interface membrane (100) may be interposed between the interfaced object (1004) and the deformable transmissive layer (110); such interface membrane may have a modulus that is similar to or different from that of the deformable transmissive layer. Preferable an efficient coupling is created between the deformable transmissive layer and the membrane, such that shear, and principal or normal loads are efficiently transferred between these structures. Referring back to FIG. 7A, an embodiment is illustrated wherein an optical element (108) is included, and which may be configured to assist in the precise distribution of light or other radiation throughout the various portions of the assembled system. The optical element may comprise a substantially rigid material which is highly transmissive; it may comprise a top surface, bottom surface, and sides defined therebetween, to form three dimensional shapes such as cylinders, cuboids, and/or rectangular prismic shapes, for example. The depicted optical element (108) may be illuminated by one of more intercoupled light sources (116, 122) and positioned within a field of view of an imaging device (106). A housing (118) is configured to retain positioning of the components relative to each other, and an interface membrane (100), as noted above, which may comprise a fixedly attached or removably coupled substantially thin layer comprising a relatively low bulk modulus polymeric material, for example, and which may be positioned for direct contact between other objects and the digital touch sensing assembly (146) for touch determination and characterization. Preferably the deformable transmissive layer and/or interface membrane comprises an elastomeric material, such as silicone, urethane, polyurethane, thermoplastic polyurethane (TPU), or thermoplastic elastomer (TPE). Other elastomers with less light and/or radiation transmission efficiency may also be utilized, such as natural rubbers, neoprene, ethylene propylene diene monomer (EPDM) rubber, butyl rubber, nitrile rubber, styrene-butadiene rubber (SBR), Viton, fluorosilicone, & polyacrylate. The deformable transmissive layer may comprise a composite having a pigment material, such as a metal oxide (such as, for example, iron oxide, zinc oxide, aluminum oxide, and/or titanium dioxide), metal nanoparticle (such as silver nanoparticles and/or aluminum nanoparticles), or other molecules configured to differentially interact with introduced light or radiation, such as dyes, distributed within an elastomeric matrix. A pigment material may be configured to provide an illumination reflectance which is greater than that of the elastomer matrix. The deformable transmissive layer is bounded by a bottom surface directly coupled to the interface membrane, a top surface most adjacent the detector, and a transmissive layer thickness therebetween, wherein the pigment material is distributed adjacent the bottom surface within the transmissive layer thickness to provide optimized illumination reflectance adjacent the bottom surface. Aspects of suitable digital touch sensing assembly (146) configurations generally featuring elastomeric deformable transmissive layer materials are described, for example, in U.S. Pat. Nos. 10,965,854, 9,127,938, and 8,411,140, each of which is incorporated by reference herein in its entirety. As shown in FIG. 3C, the depicted digital touch sensing assembly (146) may feature a gap or void (114), which may contain an optically transmissive material (such as one that has a refractive index similar to that of the optical element 108), air, or a specialized gas, such as an inert gas, geometrically configured to place aspects of the optical element (108) and/or deformable transmissive layer (110) within a desired proximity of the imaging device (106), which may comprise an imaging sensor such as a digital camera chip, single light sensing element (such as a photodiode), or an array of light sensing elements, and which may be configured to have a field of view and depth of field that is facilitated by the geometric gap or void (114). In another embodiment, the optical element (108) may be configured to be deformable or conformable such that impacts of the rigidity of such structure upon other associated elements is minimized.

Also shown in FIG. 7A is a computing device or system (104) which may comprise a computer, microcontroller, field programmable gate array, application specific integrated circuit, or the like, which is configured to be operatively coupled to the imaging device (106), and also to the one or more light sources (116, 122), to facilitate control of these devices in gathering data pertaining to touch against the deformable transmissive layer (110). For example, in one embodiment, each of the light sources (116, 122) comprises a light emitting diode ("LED") operatively coupled (124, 126) to the computing device (104) using an electronic lead, and the imaging device (106) comprises a digital camera sensor chip operatively coupled to the computing device using an electronic lead (128), as shown in FIG. 7A. A power source (102) may be operatively coupled to the computing device (104) to provide power to the computing the device (104), and also may be configured to controllably provide power to interconnected devices such as the imaging device (106) and light sources (116, 122), through their couplings (128, 124, 126, respectively). As shown in FIG. 7A (640), these coupling interfaces (124, 126, 128) may be short or relatively long (i.e., the digital touch sensing assembly 146 may be in a remote location relative to the computing device 104), and may be direct physical connections or transmissions of data through wired or wireless interfaces, such as via light/optical networking protocols, or wireless networking protocols such as Bluetooth® or 802.11 based configurations, which may be facilitated by additional computing and power resources local to the digital touch sensing assembly (146).

Referring to FIG. 7H, a partial schematic view illustrates that a computing system (104) may be operatively coupled (124, 126, 1012), such as via wired or wireless control leads, two three different illumination sources (116, 122, 1010), or more; these illumination sources may be configured to have different wavelengths of emissions, and/or different polarization, and as depicted, may be configured to emit from different orientations relative to the optical element (108) and associated deformable transmissive layer (110) to allow for further data pertaining to the geometric profiling.

Figure 8:
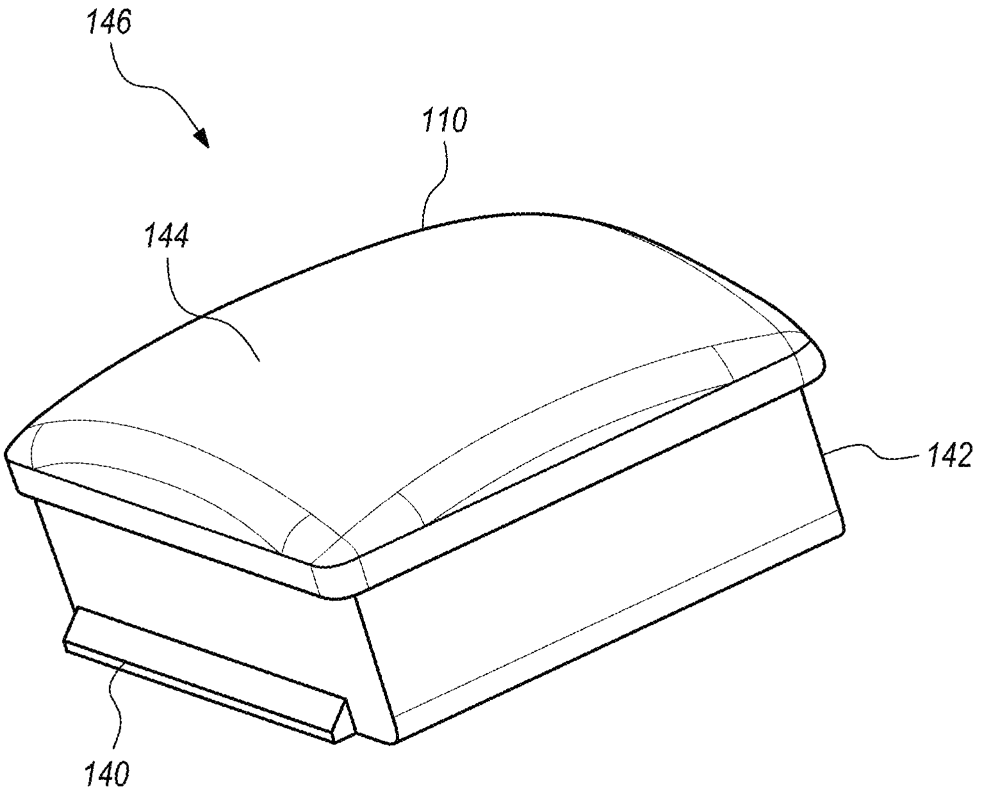

Referring to FIG. 8, as noted in the aforementioned incorporated reference (U.S. Pat. No. 10,965,854), a deformable transmissive layer or member (110) may comprise various geometries and need not be planar or shaped in a form such as a rectangular prism or variation thereof; for example, a deformable transmissive layer or member (110) may be curved, convex (144), saddle-shaped, and the like and may be customized for various particular contact sensing scenarios. For example, a plurality of assemblies (146) with convex-shaped deformable transmissive layers (110) such as that shown in FIG. 8 may be coupled to a gripping interface of a robotic gripper/hand, to facilitate touch sensing/determination pertaining to items being grasped in a manner akin to the paradigm of the skin segments between the joints of a human hand that is grasping an object. The assembly (146) configuration of FIG. 8 features a housing geometry (142) and coupling features (140) to assist in removable attachment to other componentry.

Figure 9A:
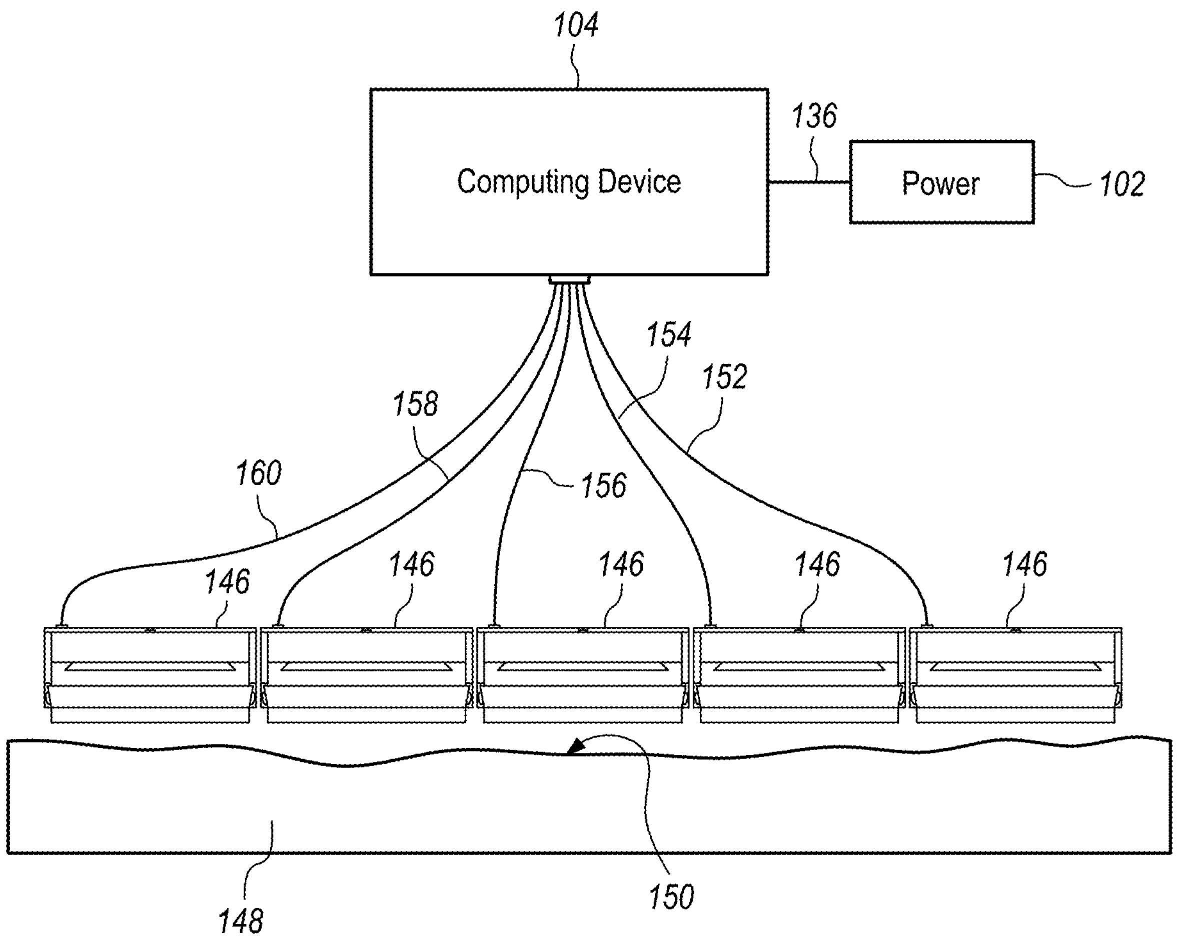
FIGS. 9A and 9B illustrate assemblies of pluralities of touch sensing assemblies, such as those illustrated in FIGS. 7A-7H.

Referring to FIG. 9A, a plurality of digital touch sensing assemblies (146) may be utilized together to sense a larger surface (150) of an object (148). Each of such assemblies (146, five are illustrated in FIG. 9A) may be operatively coupled, such as via electronic lead (and may be interrupted by wireless connectivity, for example, as noted above), to one or more computing devices (104) as illustrated (152, 154, 156, 158, 160), and may therefore be configured to exchange data, and facilitate transmission of power, light, and control and sensing information.

Figure 9B:
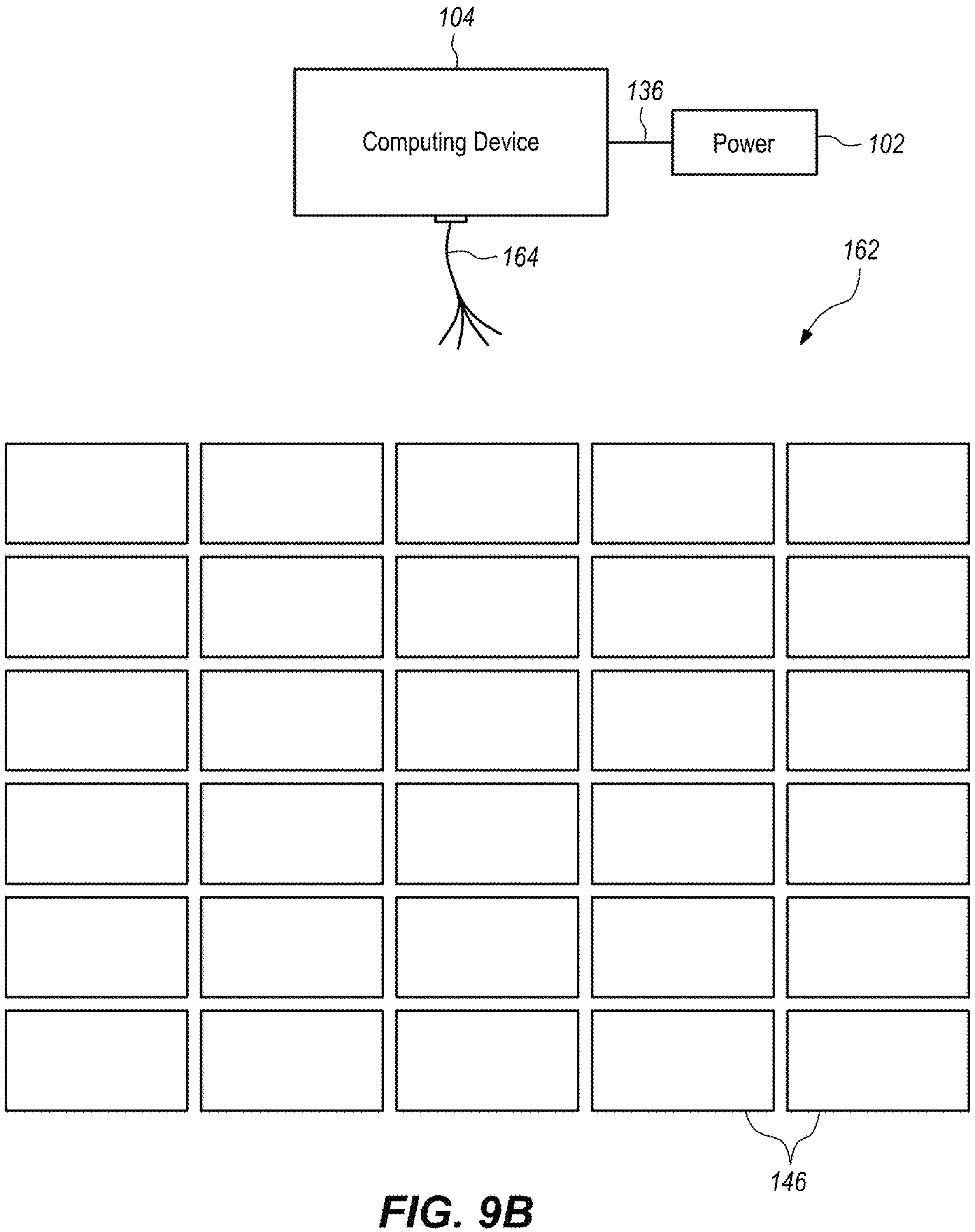

Referring to FIG. 9B, a larger plurality (162), relative to that of FIG. 9A, of digital touch sensing assemblies (146) may be utilized to partially or completely surround an object, or to monitor digital touch with two or more surfaces of such object. Each of the thirty depicted digital touch sensing assemblies (146) depicted in FIG. 9B may be operatively coupled to the same, or a different, computing device (104), and coupling leads may be combined or coupled to form a single combined coupling lead assembly (164), as shown in FIG. 9B.

Figure 10A:
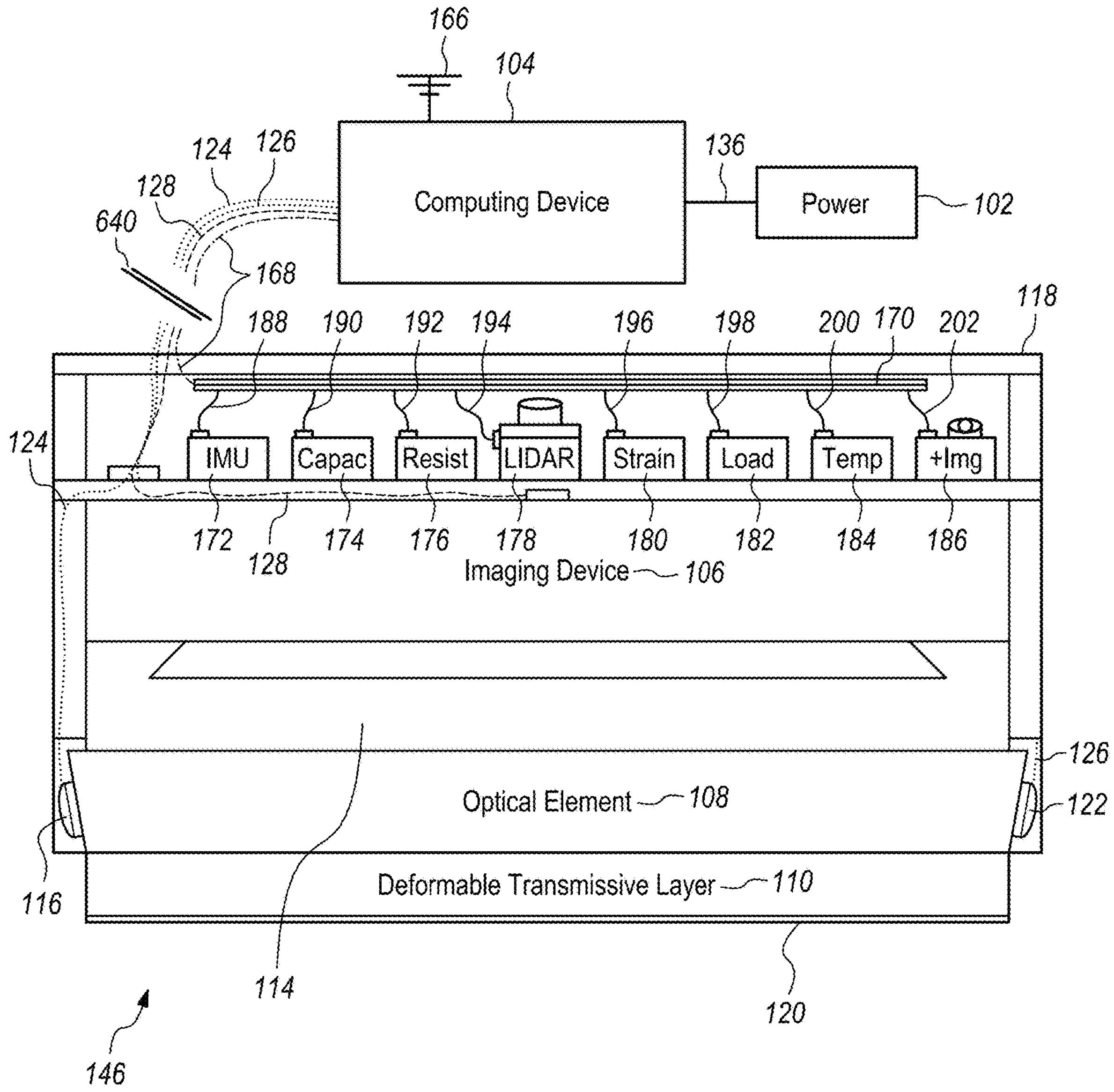
FIGS. 10A-10I illustrate various aspects of touch sensing assembly embodiments which may feature one or more secondary sensor configurations integrated therein.

Referring to FIG. 10A, while an optional geometric separation (640) is shown between various components such as the digital touch sensing assembly (146) and the computing device (104), it is important to note that these components may also be housed together and connected with other systems, components, and devices via wireless transceiver (166), such as those designed to work with IEEE 802.11 socalled "WiFi" standards, and/or wireless connectivity and communications standards known using the "Bluetooth" tradename, such as Bluetooth 4.x and Bluetooth 5. Further, depicted intercoupled (136, such as via direct wire lead) power supply (102) componentry may comprise one or more batteries, or one or more connections (wired or wireless, such as via inductive power transfer) to other power sources to provide further supply of power and/or charging of the integrated power supply (102) component. Various embodiments described herein pertain to miniaturized or miniaturizable configurations to assist with integration into other systems, such as those of an automobile, and it is desirable to facilitate such system integration with connectivity alternatives that may meet or coordinate with known standards. For example, in various embodiments, configurations wherein a touch sensing system, such as that depicted in FIG. 10A, may be miniaturized and packaged in a housing and connectivity configuration designed for relatively simple integration into or with other systems, such system configuration may be deemed to be in the direction of "internet of things" integration capability, wherein various devices are expected to be relatively easily brought into collaboration with other connected and integrated systems.

Referring again to FIG. 10A, a digital touch sensing assembly (146) is illustrated which is similar to that described in reference to FIG. 7A, but also features a panoply of additional sensing capabilities, or "secondary sensor" elements, selected to enhance the general capability of the assembly, such as by providing sensing data from one or more additional sensing subsystems which are generally co-located with the touch sensing capability provided by the deformable transmissive layer, and which may present their own levels of sensing uncertainty and error such that socalled "sensor fusion" techniques may be utilized to improve the overall capability of the integrated configuration, such as via taking advantage of uncorrelated errors between various sensing subsystems. For example, when a digital touch sensor based upon a deformable transmissive layer (110) is possibly indicating contact with another object, but data from an integrated inertial measurement unit (or "IMU", such as accelerometer or gyro data from one or more accelerometers or gyros which may comprise such IMU), LIDAR subsystem (such as point cloud data pertaining to the purported region of contact), and imaging device (such as a camera providing image data pertaining to the purported region of contact) provide additional contravening data with uncorrelated measurement/determination errors to establish that the digital touch sensor is not in contact, there is a reasonable likelihood that the digital touch sensor is not in contact (the notion of at least partially uncorrelated error for other measurement/determination subsystems is important, because if all other measurement/determination subsystems have the same correlated error, they may contribute some level of redundancy or enhanced measurement, field of view, etc, but they may have similar error-based limitations; for example, having three pitot tubes mounted to an airplane wing may provide some redundancy and further measurement relative to a single pitot tube, but if they are all flown through frozen rain and become disabled with the same correlated error, an airplane probably would be better off relying on a subsystem with some uncorrelated error, such as a compass, GPS, trajectory plan, etc; thus the notion of utilizing a plurality of sensors with at least some uncorrelated error provides value, and may be termed a form of "sensor fusion" through the utility of two or more sensors). Also, as noted above, multiple sensors may be aggregated to complement and expand the geometric reach of the sensing paradigm, such as by coupling similar or different sensors adjacent to one another along a given surface or aspect of a structural element. Thus referring back to FIG. 10A, a selection of additional sensing subsystems (IMU 172, capacitive touch sensing 174, resistive touch sensing 176, LIDAR sensing 178, strain or elongation sensing 180, load sensing 182, temperature sensing 184, additional image sensing 186) with at least some uncorrelated error are shown operatively coupled (188, 190, 192, 194, 196, 198, 200, 202, respectively, represent connectivity leads, such as conductive wire leads, which may be joined, as shown in FIG. 10A, to a communications/connection bus 170, which may be directly intercoupled 168 with the computing device 104) as part of the depicted integrated system configuration.

For illustrative purposes, FIGS. 10B-10I depict various embodiments wherein further detail of the various subsystem integrations may be explored.

Figure 10B:
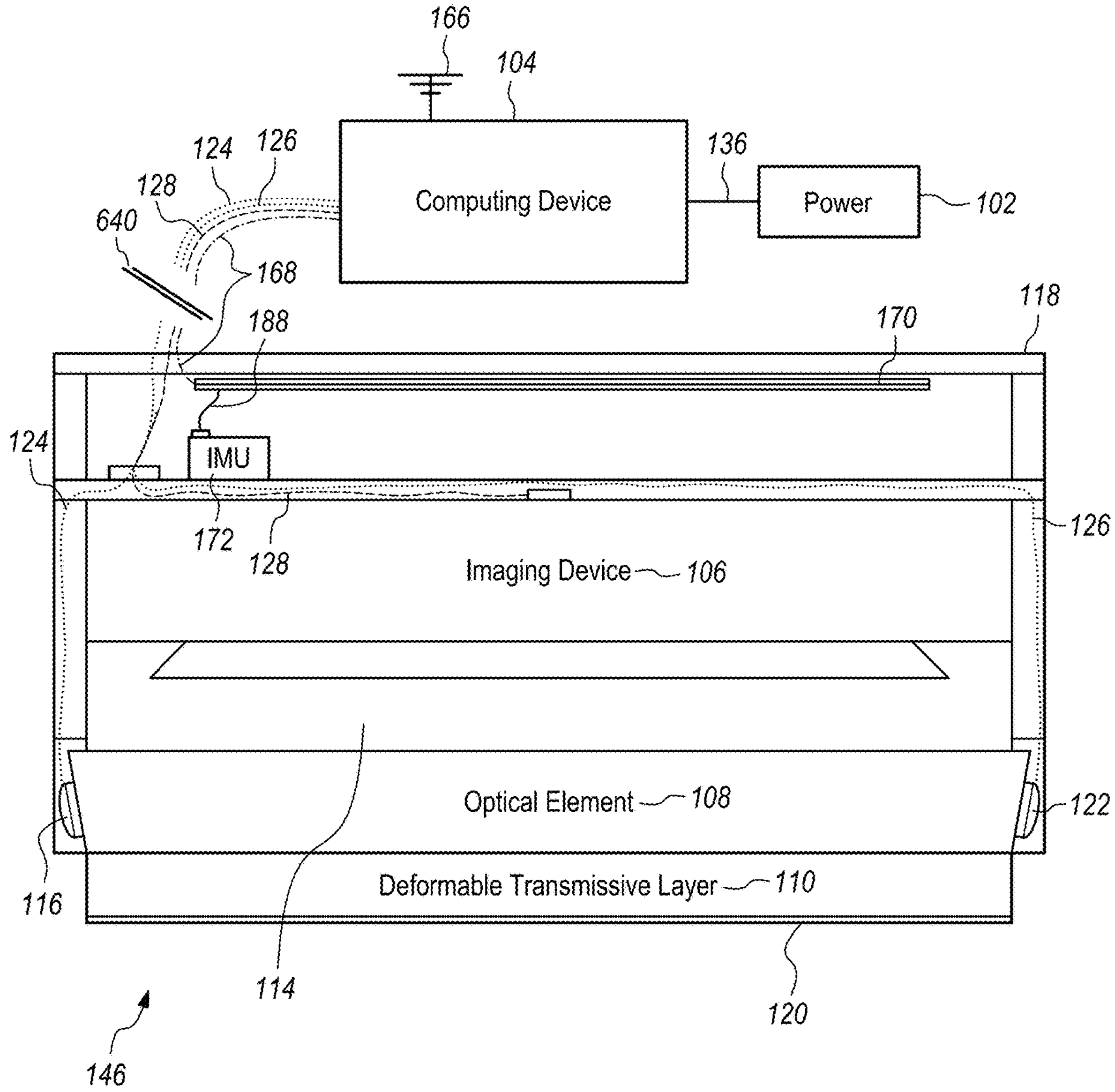

Referring to FIG. 10B, an embodiment is illustrated wherein a digital touch sensing assembly (146) is integrated with an intercoupled IMU (172). The IMU (172) may comprise one or more accelerometers and one or more gyros, and may be fixedly coupled to the housing (118) of the digital touch sensing assembly (146), and operatively coupled, such as via wire lead (188; shown coupled to communications bus 170, which is operatively coupled, such as via wire lead 168, to the computing device 104) to the computing device (104). The computing device (104) may be configured to not only operate the imaging device (106) and illumination sources (116, 122) to facilitate touch sensing by utilizing the deformable transmissive layer (110) as it is physically interfaced against one or more objects, such as at the contact interface (120), but also to operate the IMU (172) to capture data pertaining to angular and axial accelerations which may be associated with contacts to external objects, and/or changes in position or orientation of the housing (118), for example. In one embodiment, for example, the integrated system may be configured to increase the frame rate for touch sensing through the deformable transmissive layer (110) when an unexpected change in axial or angular acceleration is detected utilizing the IMU data and a knowledge of predicted motions and accelerations of the housing (118). In other words, if the digital touch sensing assembly (146) is coupled to an electromechanical movement system such as a robot arm or robotic manipulator (such as in FIG. 11, for example; 234), and the computing system (104) is integrated to receive information pertaining to the timing, direction/orientation, and kinematics pertaining to movement commands for the electromechanical movement system, it can be configured to separate expected accelerations from the IMU vs unexpected ones, and treat the unexpected ones as potential contacts with external objects which can be further explored with enhanced frame rate, computing, and general digital touch sensing through the deformable transmissive layer (110).

Figure 10C:
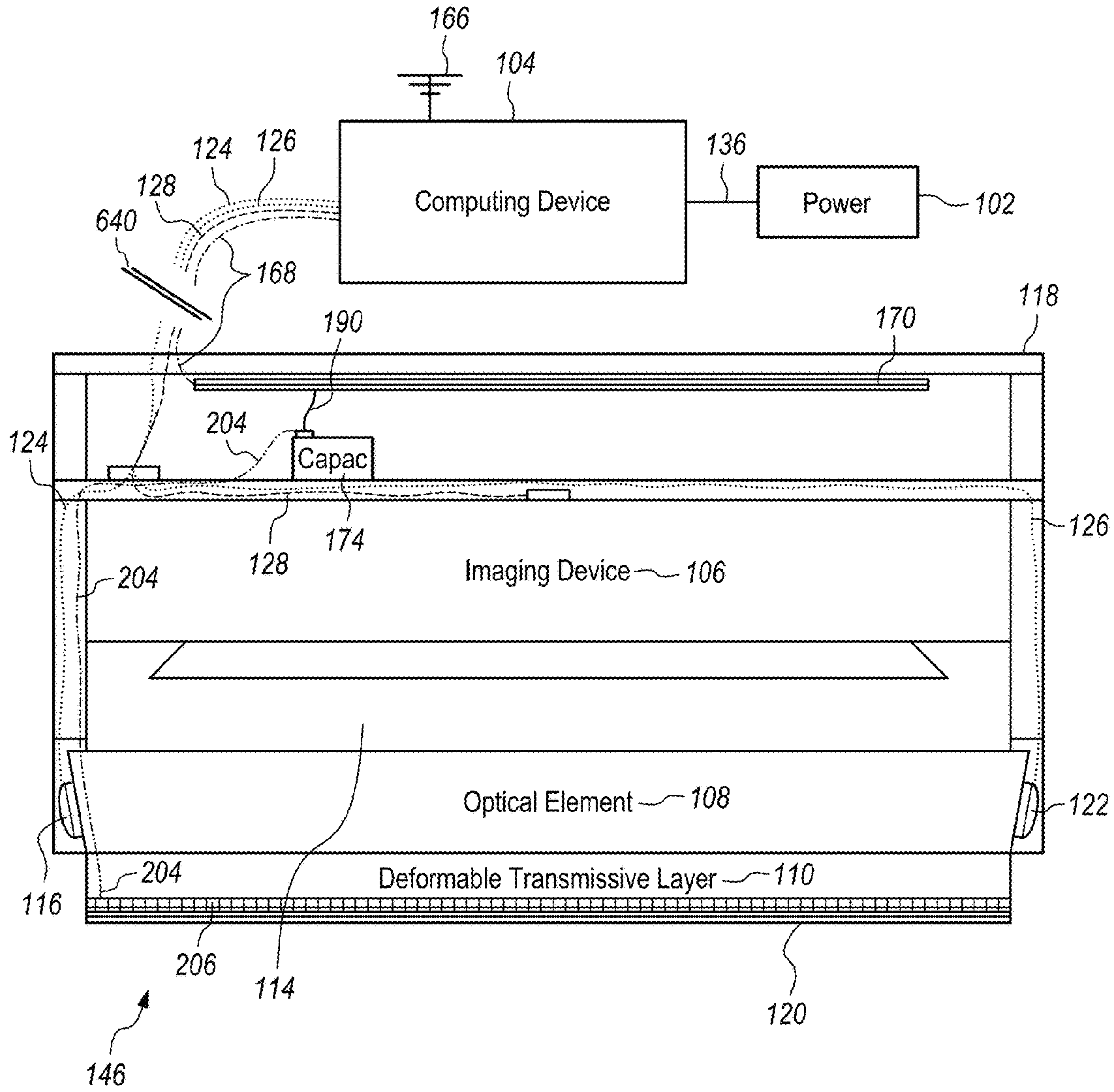

Referring to FIG. 10C, an embodiment is illustrated wherein a digital touch sensing assembly (146) is integrated with an intercoupled capacitive sensing subsystem featuring a capacitive sensing controller (174) operatively coupled, such as via a wire lead (204), to a capacitive sensing element (206) which may be integrated into the deformable transmissive layer and configured to facilitate enhanced contact sensing based upon capacitance sensed between the sensing element (206), which may comprise a grid or plurality of cells, and other objects, somewhat similar to the manner in which some smartphone or other touchscreen interfaces are configured to detect contact based upon detected capacitance. The capacitive sensing controller (174) may comprise one or more amplifiers, and may be fixedly coupled to the housing (118) of the digital touch sensing assembly (146), and operatively coupled, such as via wire lead (190; shown coupled to communications bus 170, which is operatively coupled, such as via wire lead 168, to the computing device 104) to the computing device (104). The computing device (104) may be configured to not only operate the imaging device (106) and illumination sources (116, 122) to facilitate touch sensing by utilizing the deformable transmissive layer (110) as it is physically interfaced against one or more objects, such as at the contact interface (120), but also to operate the capacitive sensing controller (174) to capture data pertaining to detected changes in capacitance near the sensing element (206) which may be associated with contacts to external objects, for example. In one embodiment, for example, the integrated system may be configured to increase the frame rate for touch sensing through the deformable transmissive layer (110) when a change in capacitance is detected utilizing sensed capacitance data pertaining to the sensing element (206). In other words, the system may be configured to utilize the uncorrelated errors of both capacitive and deformable transmissive layer (110) based touch sensing to provide optimized touch sensing output upon determination that there is at least some indication of contact at or near the sensing element (206). In other variations, combinations of various sensors, such as those with uncorrelated errors, may be utilized with various aspects of spatial separation relative to each other, as resolution and/or temporal response requirements may not be the same in each location with a given implementation.

Figure 10D:
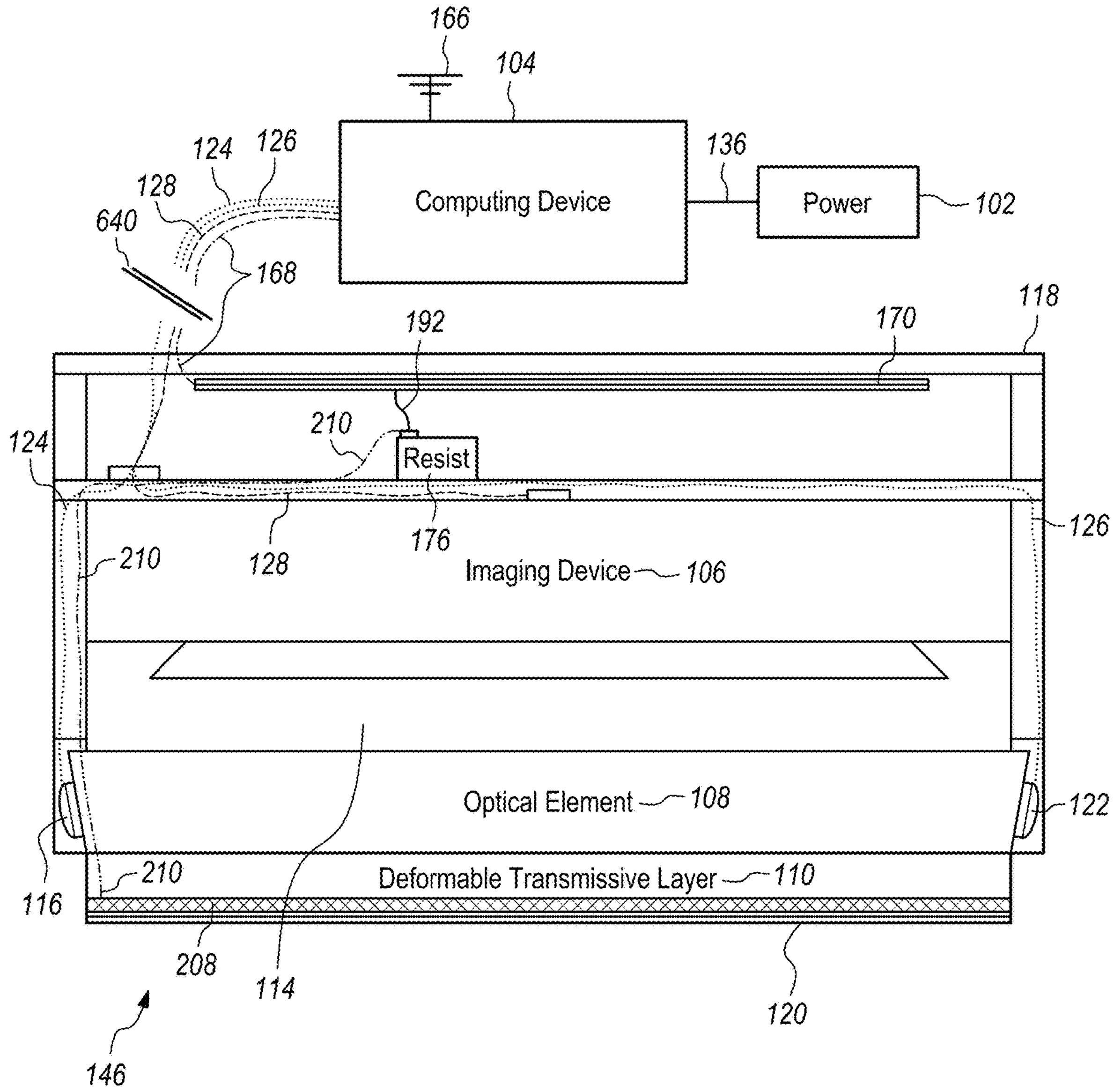

Referring to FIG. 10D, an embodiment is illustrated wherein a digital touch sensing assembly (146) is integrated with an intercoupled resistive sensing subsystem featuring a resistive sensing controller (176) operatively coupled, such as via a wire lead (210), to a resistive sensing element (208) which may be integrated into the deformable transmissive layer (110) and configured to facilitate enhanced contact sensing based upon resistance sensed between the sensing element (208), which may comprise a grid or plurality of cells, and other objects, somewhat similar to the manner in which some smartphone or other touchscreen interfaces are configured to detect contact based upon detected resistance. The resistive sensing controller (176) may comprise one or more amplifiers, and may be fixedly coupled to the housing (118) of the digital touch sensing assembly (146), and operatively coupled, such as via wire lead (192; shown coupled to communications bus 170, which is operatively coupled, such as via wire lead 168, to the computing device

104) to the computing device (104). The computing device (104) may be configured to not only operate the imaging device (106) and illumination sources (116, 122) to facilitate touch sensing by utilizing the deformable transmissive layer (110) as it is physically interfaced against one or more objects, such as at the contact interface (120), but also to operate the resistive sensing controller (176) to capture data pertaining to detected changes in capacitance near the sensing element (208) which may be associated with contacts to external objects, for example. In one embodiment, for example, the integrated system may be configured to increase the frame rate for touch sensing through the deformable transmissive layer (110) when a change in capacitance is detected utilizing sensed capacitance data pertaining to the sensing element (208). In other words, the system may be configured to utilize the uncorrelated errors of both resistive and deformable transmissive layer (110) based touch sensing to provide optimized touch sensing output upon determination that there is at least some indication of contact at or near the sensing element (208).

Figure 10E:
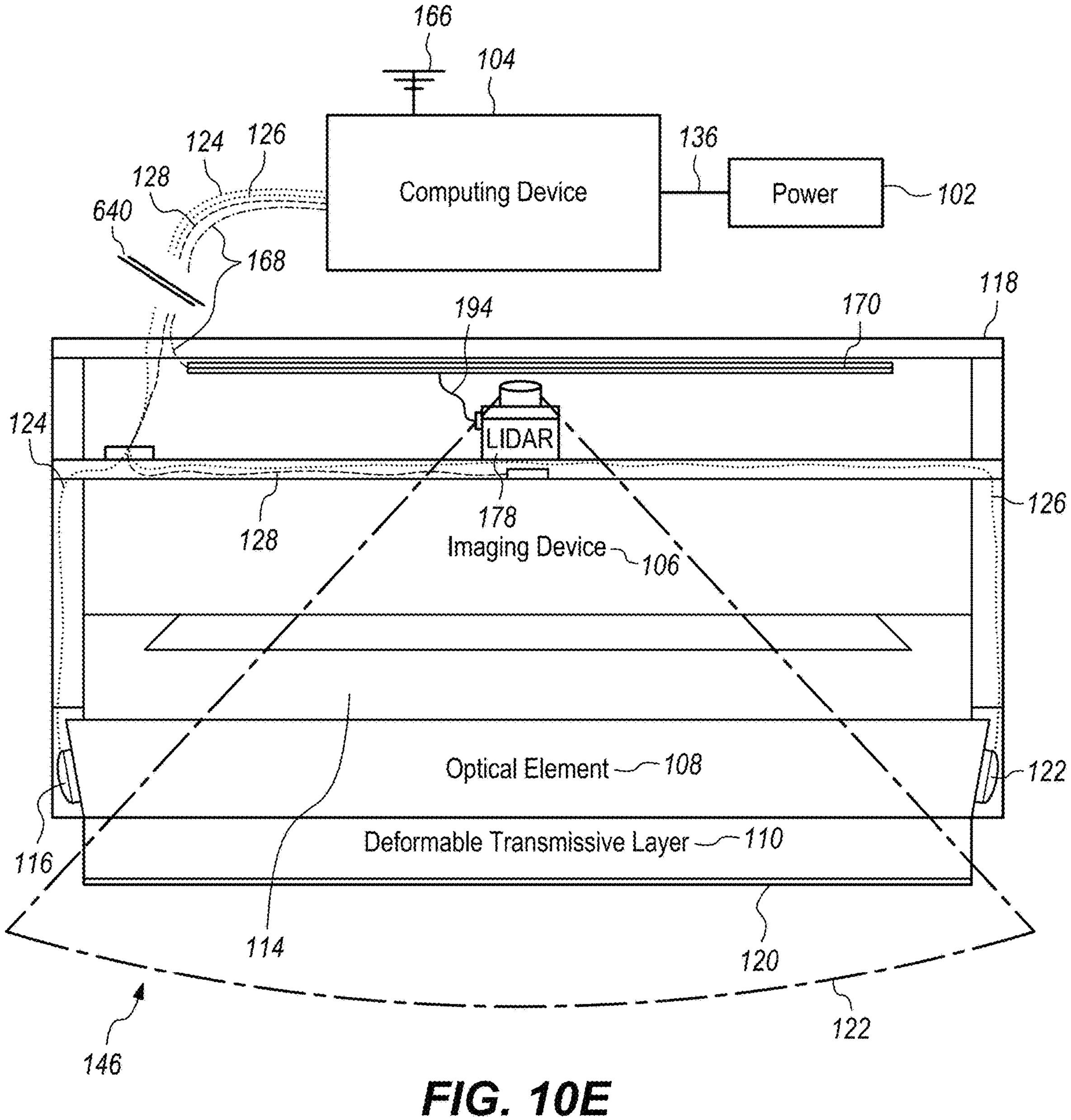

Referring to FIG. 10E, an embodiment is illustrated wherein a digital touch sensing assembly (146) is integrated with an intercoupled LIDAR sensor (178), such as those available from Hokuyo Automatic USA Corporation. The LIDAR sensor (178) may be fixedly coupled to the housing (118) of the digital touch sensing assembly (146), and operatively coupled, such as via wire lead (194; shown coupled to communications bus 170, which is operatively coupled, such as via wire lead 168, to the computing device 104) to the computing device (104). The computing device (104) may be configured to not only operate the imaging device (106) and illumination sources (116, 122) to facilitate touch sensing by utilizing the deformable transmissive layer (110) as it is physically interfaced against one or more objects, such as at the contact interface (120), but also to operate the LIDAR sensor (178) to capture data pertaining to objects within the field of view (212) of the LIDAR sensor (178), such as point clouds pertaining to nearby surfaces and objects, for example. In one embodiment, for example, the integrated system may be configured to increase the frame rate for both LIDAR (178) and touch sensing through the deformable transmissive layer (110) when an unexpected change within the LIDAR (178) field of view (212; which preferably is oriented to align at least somewhat with the position and orientation of the pertinent deformable transmissive layer 110) is detected utilizing the LIDAR (178) data. In other words, when the deformable transmissive layer (110) starts to get close to another object as detected by changes in a point cloud detected by the LIDAR (178) system, the deformable transmissive layer (110) and associated computing and imaging capabilities may be moved into an enhanced mode of functionality to detect and characterize any touch/contact.

Figure 10F:
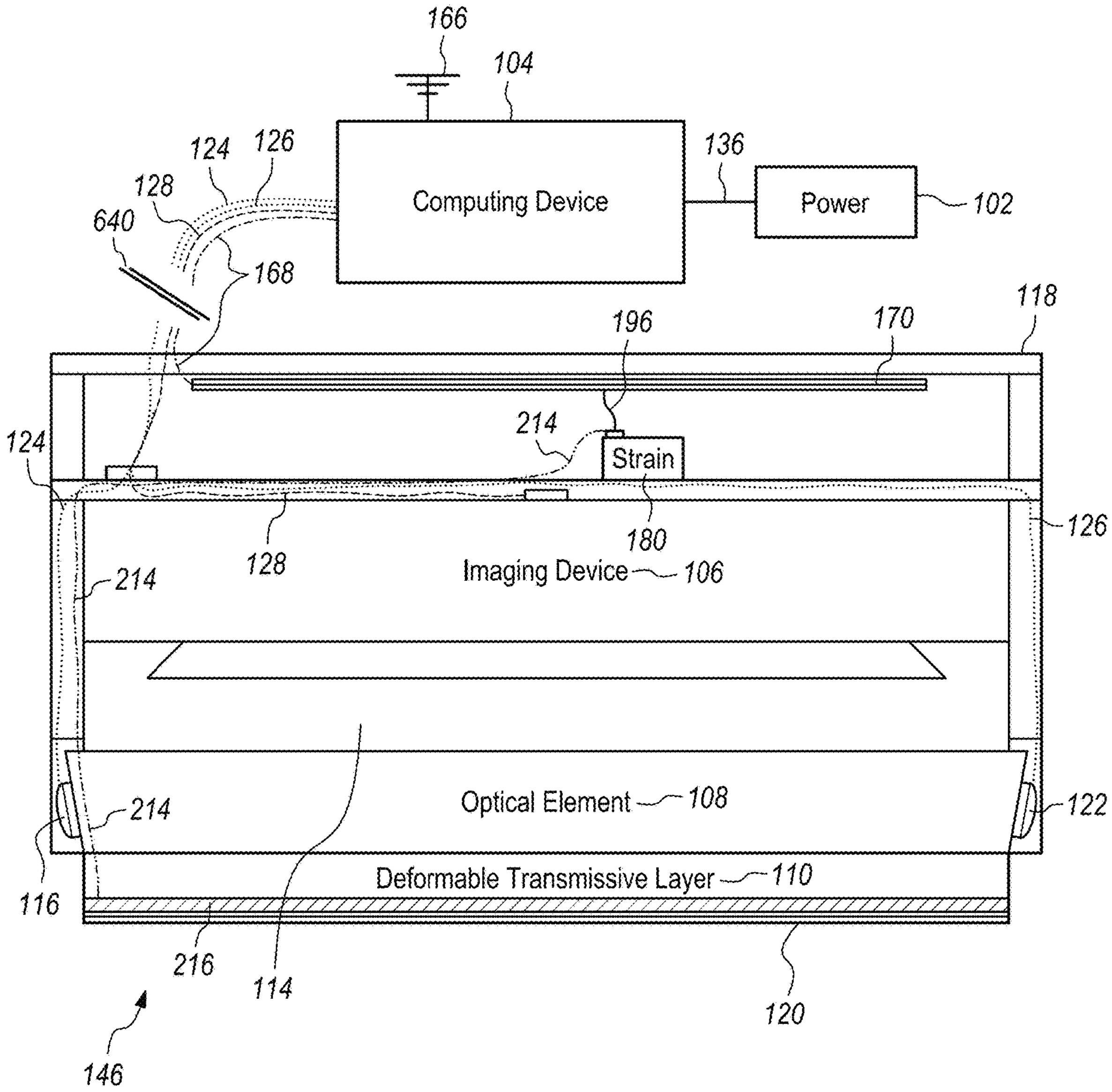

Referring to FIG. 10F, an embodiment is illustrated wherein a digital touch sensing assembly (146) is integrated with an intercoupled strain or elongation sensor (180). The strain sensor (180) may comprise one or more elongation detection elements (216), such as in a strain gauge wherein electrical resistance may be correlated with elongation. Such elongation detection elements (216) may be integrated or embedded into the deformable transmissive layer (110), and a strain controller (180) may be fixedly coupled to the housing (118) of the digital touch sensing assembly (146), and operatively coupled, such as via wire lead (196; shown coupled to communications bus 170, which is operatively coupled, such as via wire lead 168, to the computing device 104) to the computing device (104). The computing device (104) may be configured to not only operate the imaging device (106) and illumination sources (116, 122) to facilitate touch sensing by utilizing the deformable transmissive layer (110) as it is physically interfaced against one or more objects, such as at the contact interface (120), but also to operate the strain controller (180) to capture data pertaining to strain or elongation which may be associated with contacts to external objects, for example. The elongation detection element or elements may comprise a grid or network, and may be operatively coupled to the strain controller (180), such as via one or more wire leads (214). In one embodiment, for example, the integrated system may be configured to optimize touch sensing magnitude determinations through the deformable transmissive layer (110) as changes in elongation are detected utilizing the strain sensor data. For example, if the deformable transmissive layer (110) is moved over a bump in a surface, the magnitude of the bump as determined using the deformable transmissive layer (110) may be compared with changes in contact surface deflection detected with the strain sensor (180, 216), thereby providing two data sources for such determination with at least some uncorrelated measurement/determination error.

Figure 10G:
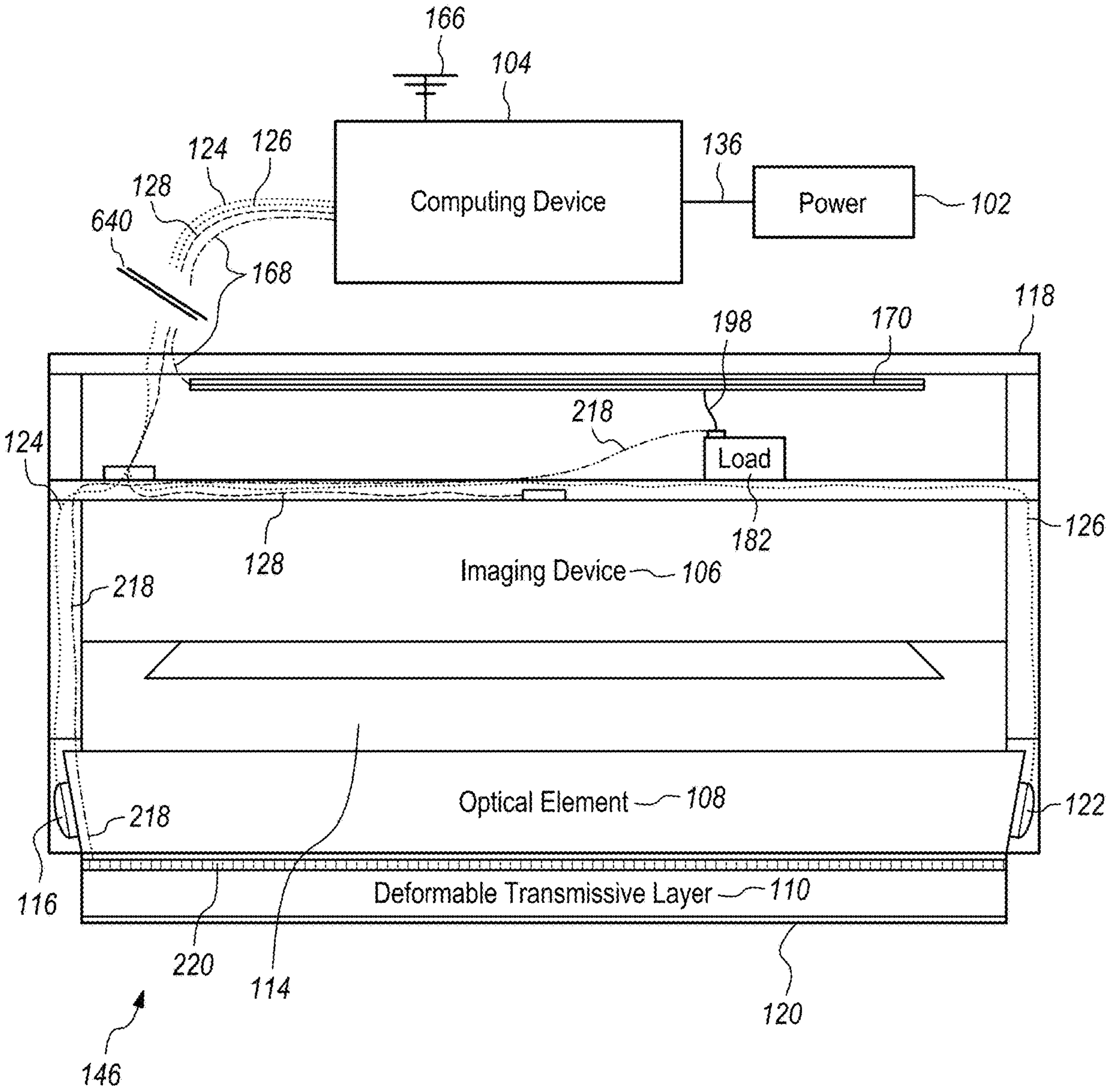

Referring to FIG. 10G, an embodiment is illustrated wherein a digital touch sensing assembly (146) is integrated with an intercoupled load sensor (182). The load sensor (182) may comprise one or more load sensing elements or cells (220) which, for example, may comprise one or more devices configured to produce an electrical output which varies with applied load, such as one or more piezoelectric load cells. Such load sensing elements (220) may be integrated or embedded into the deformable transmissive layer (110), and a load sensor controller (182) may be fixedly coupled to the housing (118) of the digital touch sensing assembly (146), and operatively coupled, such as via wire lead (198; shown coupled to communications bus 170, which is operatively coupled, such as via wire lead 168, to the computing device 104) to the computing device (104). The computing device (104) may be configured to not only operate the imaging device (106) and illumination sources (116, 122) to facilitate touch sensing by utilizing the deformable transmissive layer (110) as it is physically interfaced against one or more objects, such as at the contact interface (120), but also to operate the load sensing controller (182) to capture data pertaining to loads which may be associated with contacts to external objects, for example. The load detection element or elements may comprise a grid or network, and may be operatively coupled to the load sensing controller (182), such as via one or more wire leads (218). In one embodiment, for example, the integrated system may be configured to optimize touch sensing magnitude determinations through the deformable transmissive layer (110) as changes in loading are detected utilizing the load sensor data. For example, if a portion of the deformable transmissive layer (110) is pressed against a surface of another object, the magnitude of the contact as determined using the deformable transmissive layer (110) may be compared with changes in contact surface loading detected with the load sensor (182, 220), thereby providing two data sources for such determination with at least some uncorrelated measurement/determination error.

Figure 10H:
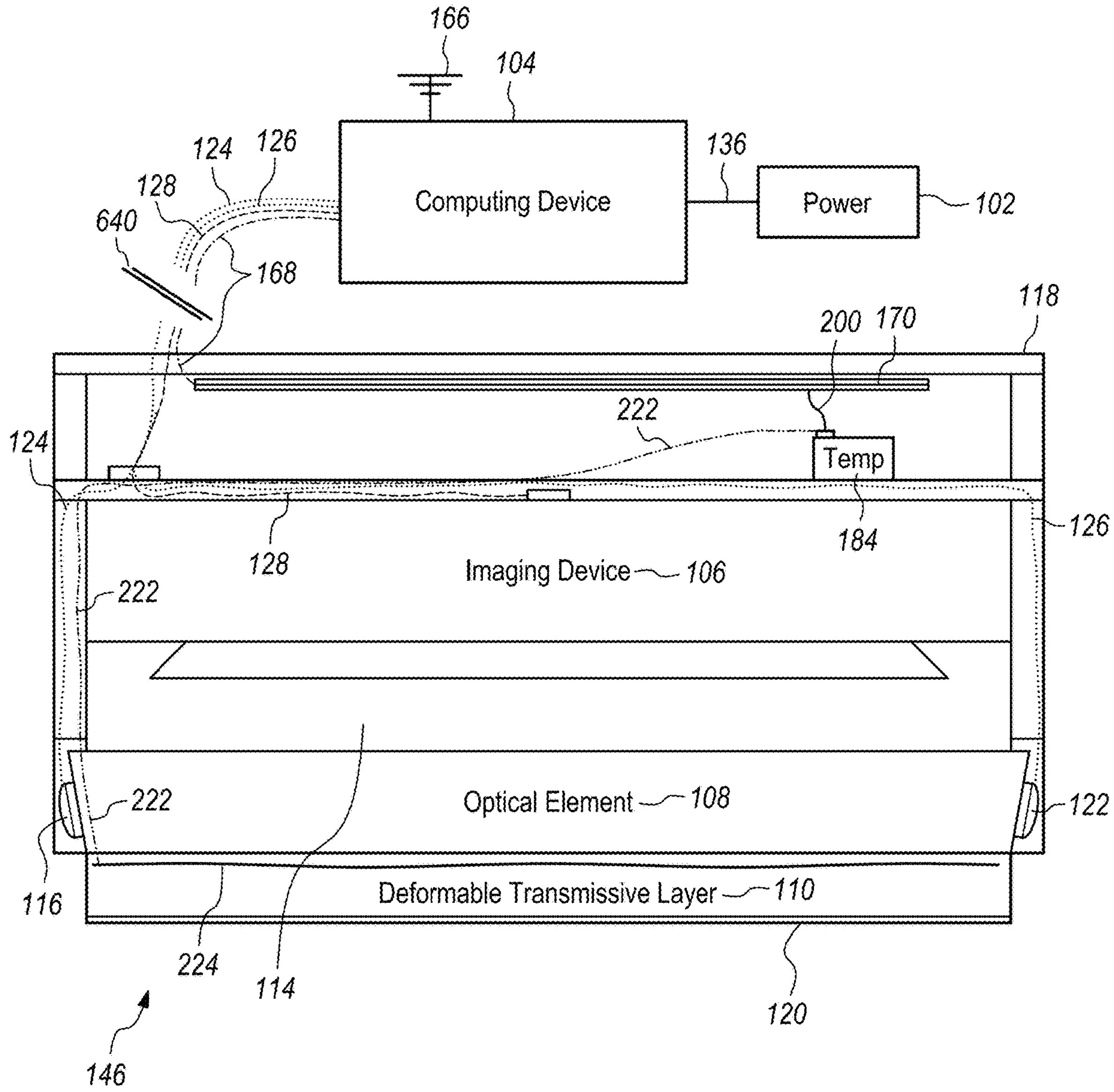

Referring to FIG. 10H, an embodiment is illustrated wherein a digital touch sensing assembly (146) is integrated with an intercoupled temperature sensor (184). The temperature sensing subsystem may comprise a temperature sensor controller (184), which may, for example, comprise an amplifier and/or a microcontroller, and one or more temperature sensing elements or cells (224) which, for example, may comprise one or more devices configured to produce an electrical output which varies with temperature, such as one or more thermocouple elements. Such temperature sensing elements (224) may be integrated or embedded into the deformable transmissive layer (110), and a temperature sensor controller (184) may be fixedly coupled to the housing (118) of the digital touch sensing assembly (146), and operatively coupled, such as via wire lead (200; shown coupled to communications bus 170, which is operatively coupled, such as via wire lead 168, to the computing device 104) to the computing device (104). The computing device (104) may be configured to not only operate the imaging device (106) and illumination sources (116, 122) to facilitate touch sensing by utilizing the deformable transmissive layer (110) as it is physically interfaced against one or more objects, such as at the contact interface (120), but also to operate the temperature sensing controller (184) to capture data pertaining to one or more temperatures which may be associated with contacts to external objects, for example. The temperature detection element or elements (224) may comprise a grid or network, and may be operatively coupled to the temperature sensing controller (184), such as via one or more wire leads (222). In one embodiment, for example, the integrated system may be configured to optimize touch sensing characterization through the deformable transmissive layer (110) as changes in temperature are detected. For example, if a portion of the deformable transmissive layer (110) is pressed against a surface of another object which has a temperature different from the ambient temperature (such as would likely be the case if touching most live tissue in a surgical environment), the magnitude of the contact as determined using the deformable transmissive layer (110) may be compared with changes in contact surface temperature detected with the temperature sensor (184, 224), thereby providing two data sources pertinent to contact profile determination with at least some uncorrelated measurement/determination error.

Figure 10I:
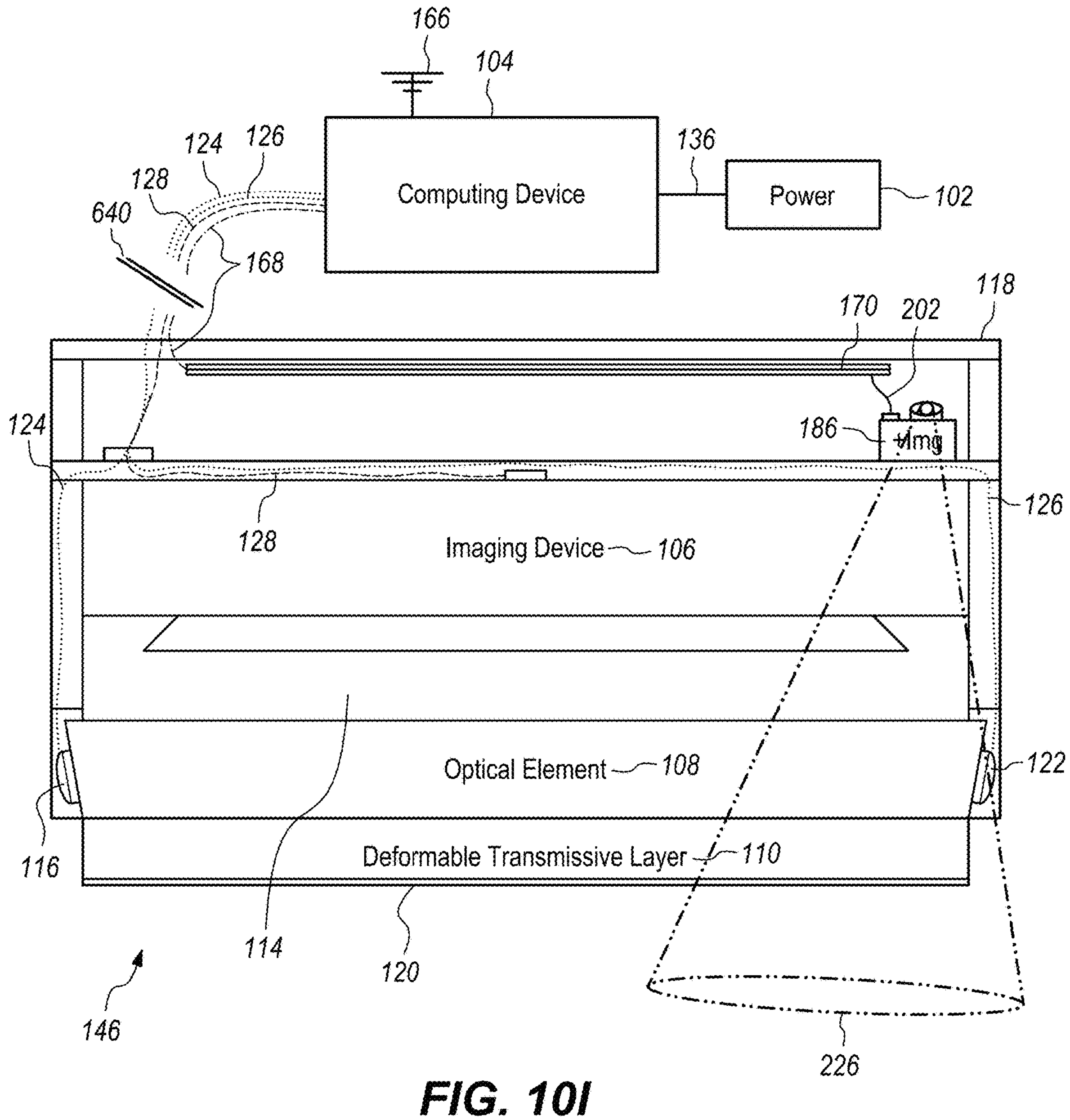

Referring to FIG. 10I, an embodiment is illustrated wherein a digital touch sensing assembly (146) is integrated with an intercoupled imaging sensor (186), in addition to the imaging device (106) that is operationally integrated with the deformable transmissive layer (110). The imaging sensor (186) may comprise a camera and may be configured to operate at various selected wavelengths, such as visible light, infrared, and the like. The imaging sensor (186) may be fixedly coupled to the housing (118) of the digital touch sensing assembly (146), and operatively coupled, such as via wire lead (202; shown coupled to communications bus 170, which is operatively coupled, such as via wire lead 168, to the computing device 104) to the computing device (104). The computing device (104) may be configured to not only operate the imaging device (106) and illumination sources (116, 122) to facilitate touch sensing by utilizing the deformable transmissive layer (110) as it is physically interfaced against one or more objects, such as at the contact interface (120), but also to operate the imaging sensor (186) to capture data pertaining to objects within the field of view (226) of the imaging sensor (186), such as images pertaining to nearby surfaces and objects, for example. In one embodiment, for example, the integrated system may be configured to increase the frame rate for both the imaging sensor (186) and touch sensing through the deformable transmissive layer (110) when an unexpected change within the imaging sensor (186) field of view (226; which preferably is oriented to align at least somewhat with the position and orientation of the pertinent deformable transmissive layer 110) is detected utilizing data from the imaging sensor (186). In other words, when the deformable transmissive layer (110) starts to get close to another object as detected by changes in image data detected by the imaging sensor (186) system, the deformable transmissive layer (110) and associated computing and imaging capabilities may be moved into an enhanced mode of functionality to detect and characterize any touch/contact. In alternative embodiments, the imaging sensor (186) may be configured to operate in the infrared wavelengths to assist in detecting, for example, heat profiles; further, the imaging sensor (186) may comprise a socalled "depth camera" or "time of flight" image sensor, such as those available from PrimeSense, Inc., a division of Apple, Inc., which may be configured to acquire not only image data, but also data pertaining to the depth or z-axis position of such image data relative to the imaging sensor (186).

Referring to FIGS. 10B-10I and also referring back to FIG. 10A, various combinations and permutations of these illustrated sensing configurations may be integrated together in various embodiments. For example, in one embodiment, it may be desirable to have IMU sensor capability along with LIDAR to complement digital touch sensing through a deformable transmissive layer (110). Various examples and embodiments are described below.

Figure 11:
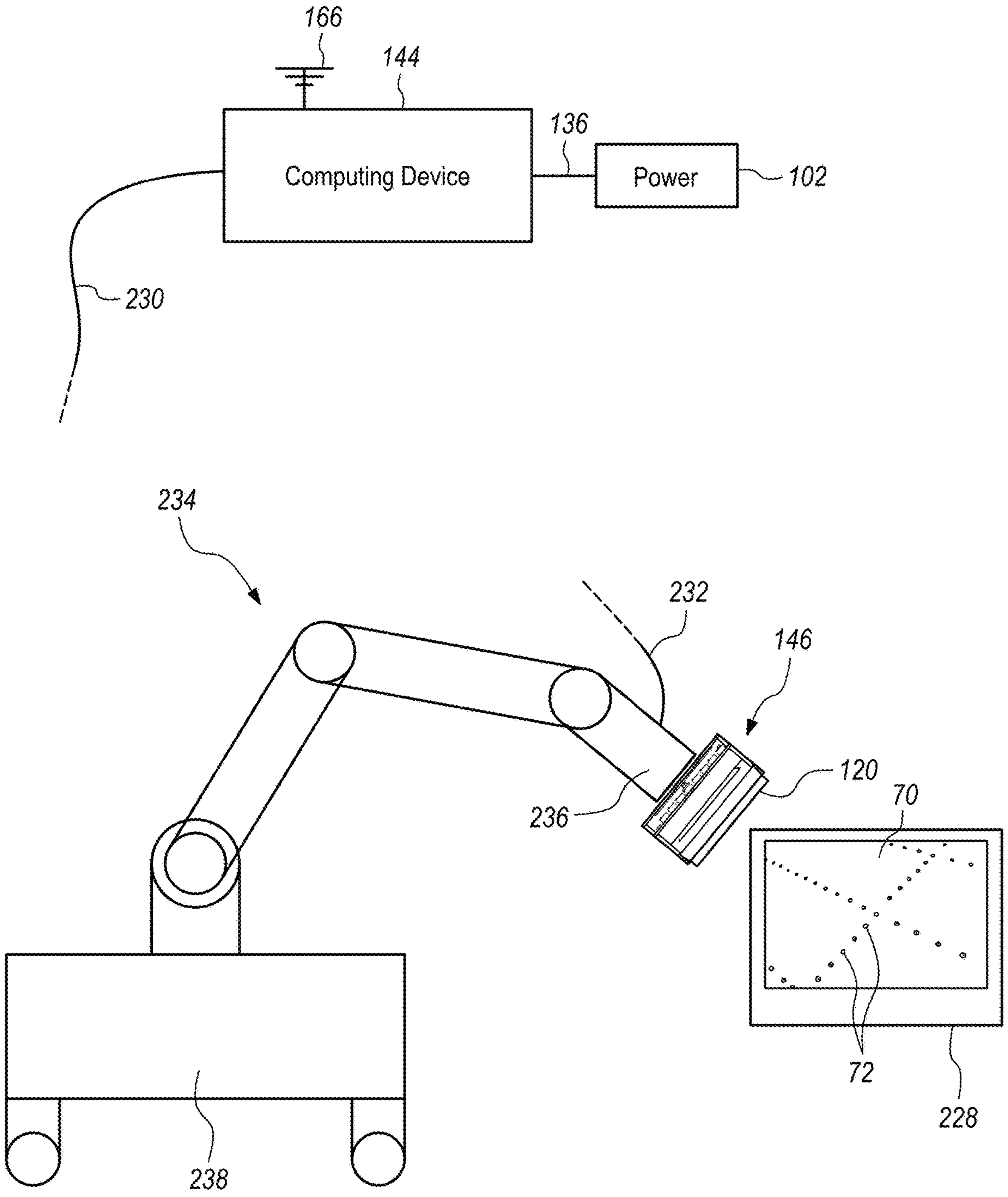
FIGS. 11-15 illustrate aspects of touch sensing assembly integrations wherein electromechanical systems such as robots may be utilized to gain further tactile intelligence regarding a targeted object or surface.

Referring to FIG. 11, a configuration employing a digital touch sensing assembly (146) is illustrated coupled to a distal portion (236) of a robotic arm or robotic manipulator (234) that is mounted to a movable base (238). The robotic manipulator may comprise an elongate arm formation comprising various movable joints between rigid or semi-rigid linkages, as illustrated (234), or may comprise a flexible robotic manipulator, such as those which may be referred to as robotic catheters or tubular flexible robots (which may be available, for example, from Intuitive Surgical, Inc. or Johnson & Johnson, Inc.). The digital touch sensing assembly (146) is depicted operatively coupled, such as via wired or wireless connection (232, 230, 166) to a computing device (144), which is coupled (136) to a power supply (102). The robotic arm (234) may be operated by the computing system (144) to advance toward and inspect an object (228) having a surface (70) of interest, which may comprise elements such as rivets (72) which may be prone to failure or in need or regular inspection.

Figure 12:
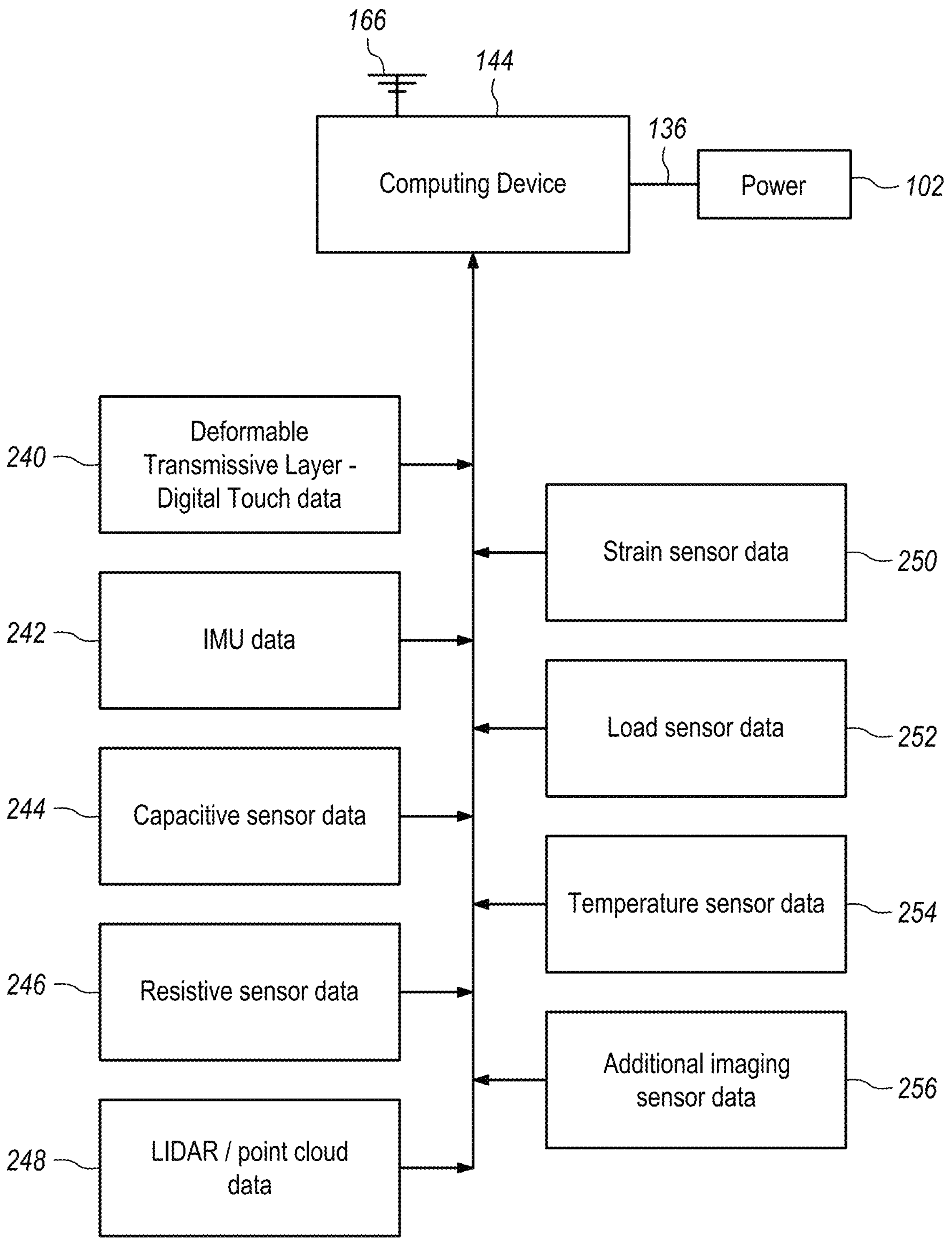

Referring to FIG. 12, by utilizing various aspects of the aforementioned configurations, the digital touch sensing assembly (146) may be utilized to inspect this surface (70) and these features (72) through controlled interfacing with the interface surface (120). In other words, as noted above and as illustrated further in FIG. 12, various other sensing configurations and related data in addition to digital touch sensing through a deformable transmissive layer (240) may be utilized together, including but not limited to IMU data (242) capacitive sensor data (244), resistive sensor data (246), LIDAR/point cloud data (248), strain or elongation sensor data (250), load sensor data (252), temperature sensor data (254), and data from additional imaging devices (256).

Figure 13A:
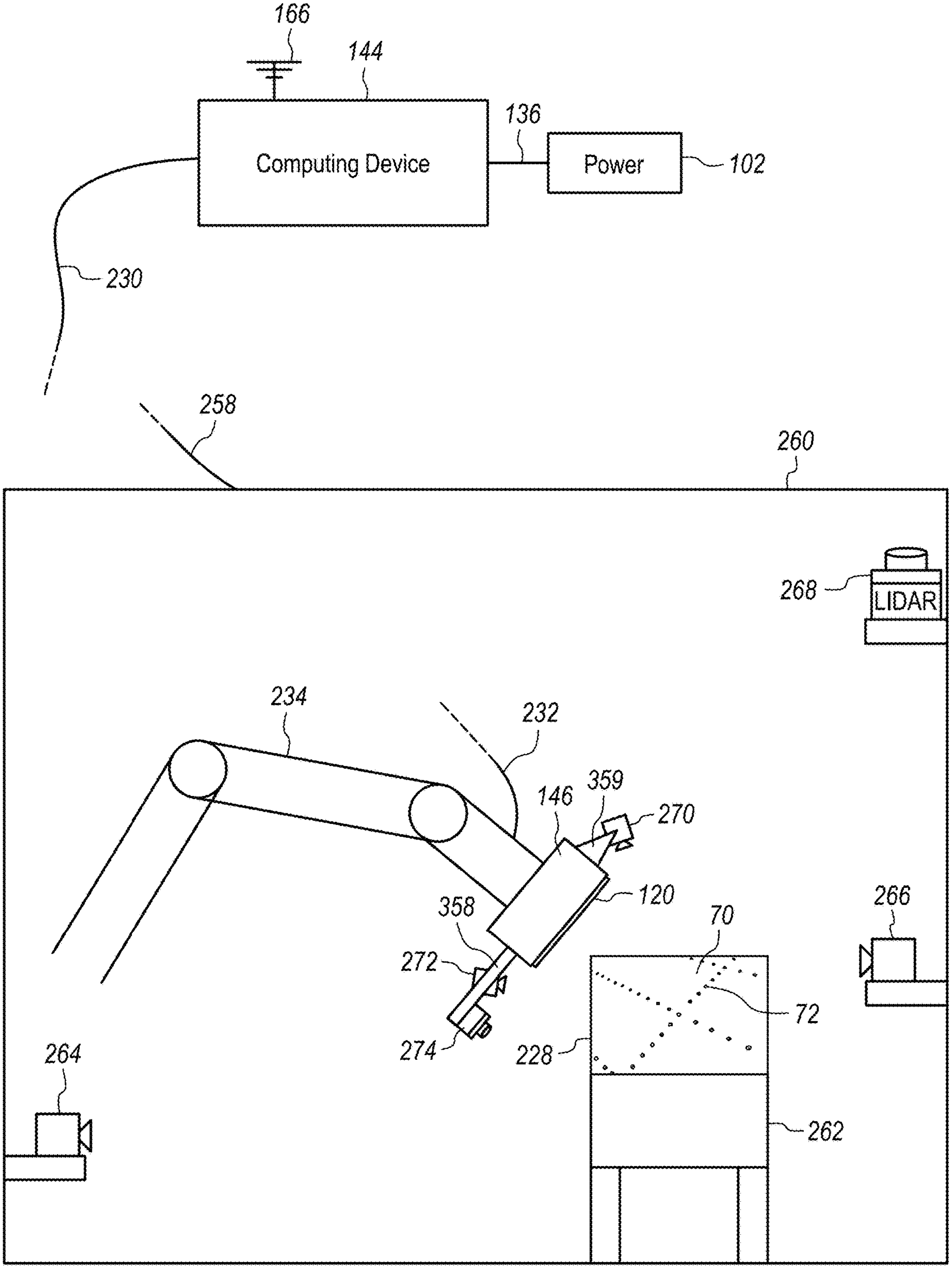

Referring to FIG. 13A, a system configuration similar to that of FIG. 11 is illustrated, with the addition of additional sensing capabilities coupled to the connected (258, 230, 166, such as via wired or wireless connectivity to the computing system 144) room or operating environment (260), as well as additional sensing capabilities coupled to the digital touch sensing assembly (146). As shown in FIG. 13A, one mounting member (359) is configured to couple an additional imaging device (270) to the digital touch sensing assembly (146) in a position and orientation wherein it may capture a field of view pertinent to a zone in front of the interface surface (120) of the digital touch sensing assembly (146); another mounting member (358) is configured to couple a further additional imaging device (272) to the digital touch sensing assembly (146) in a position and orientation wherein it may capture a different perspective field of view pertinent to a zone in front of the interface surface (120) of the digital touch sensing assembly (146); further a LIDAR device (274) is coupled to the second mounting member (358) in a position and orientation to assist in capturing point cloud and other data pertaining to the operating environment around the digital touch sensing assembly (146). As noted above, in this embodiment, the connected room (260) also features enhanced sensing capabilities, with a plurality of imaging devices (264, 266) and an additional LIDAR sensor (268) coupled to the room (260) in positions and orientations selected to assist in the precision analysis of the robot (234) operation relative to the object (228) to be inspected as this object is positioned on a table (262) in the room (260).

Figure 13B:
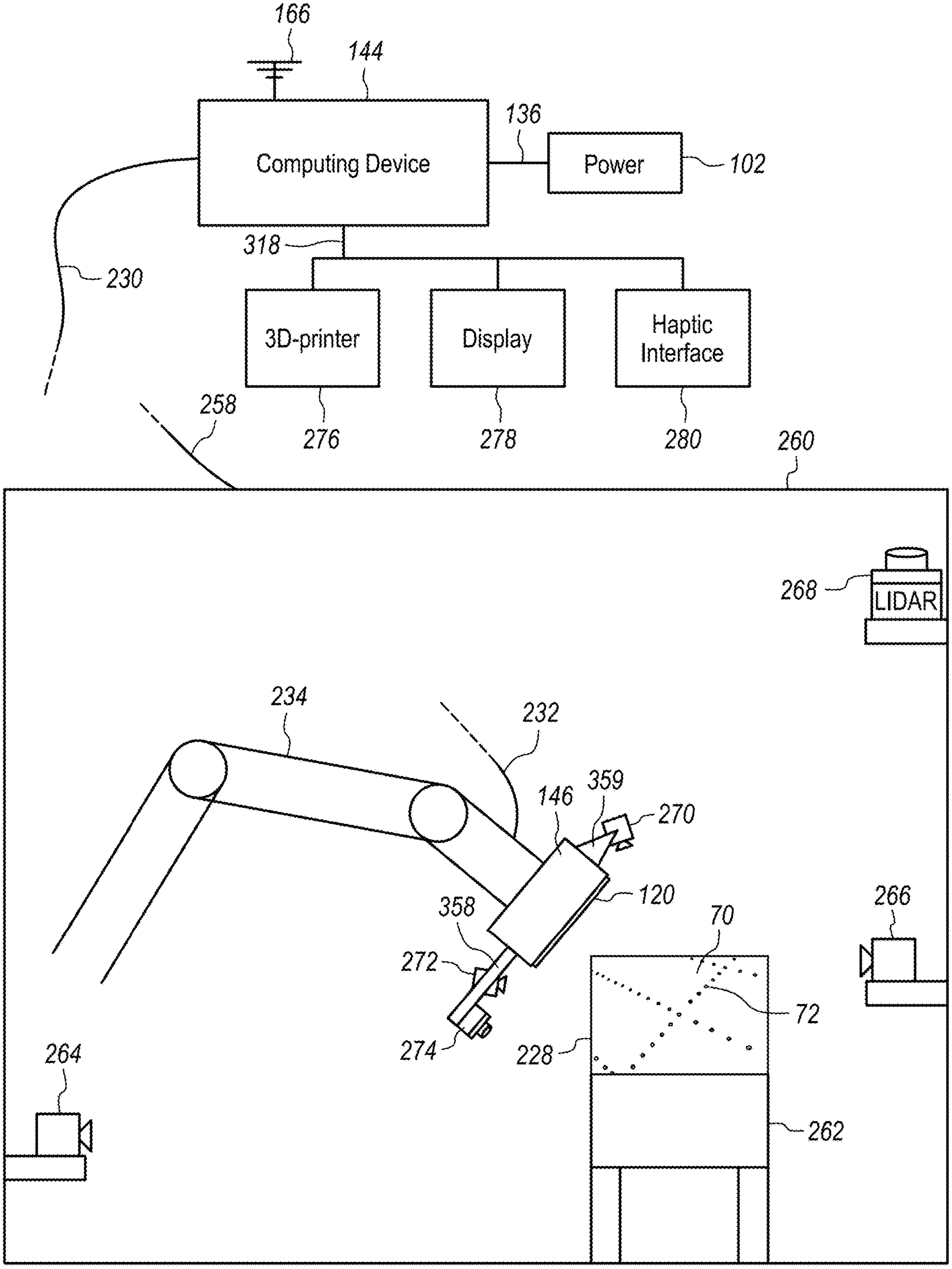

Referring to FIG. 13B, further enhancements may be included and intercoupled (318) on the computing device side of the system to allow a user that is operating the computing system (144) to remotely understand aspects of the surface (70) of the object (228) being inspected by the digital touch sensing assembly (146). As shown in FIG. 13B, a display (278) may be utilized to assist the associated user in viewing output from the digital touch sensing assembly (146), as well as images or point clouds from the other intercoupled sensing subsystems (270, 272, 274, 268, 264, 266). Further, a haptic interface (280), such as those illustrated in FIGS. 13C-13F, may be utilized to assist the user in experiencing representations of the detected surface features. An intercoupled 3-D printer (276) may also be utilized to complement this “touch sensing workstation”, such that the user may decide to directly experience a few layers of a detected geometry by printing the geometry locally for direct manipulation (such as via the user’s hand).

Figure 13C:
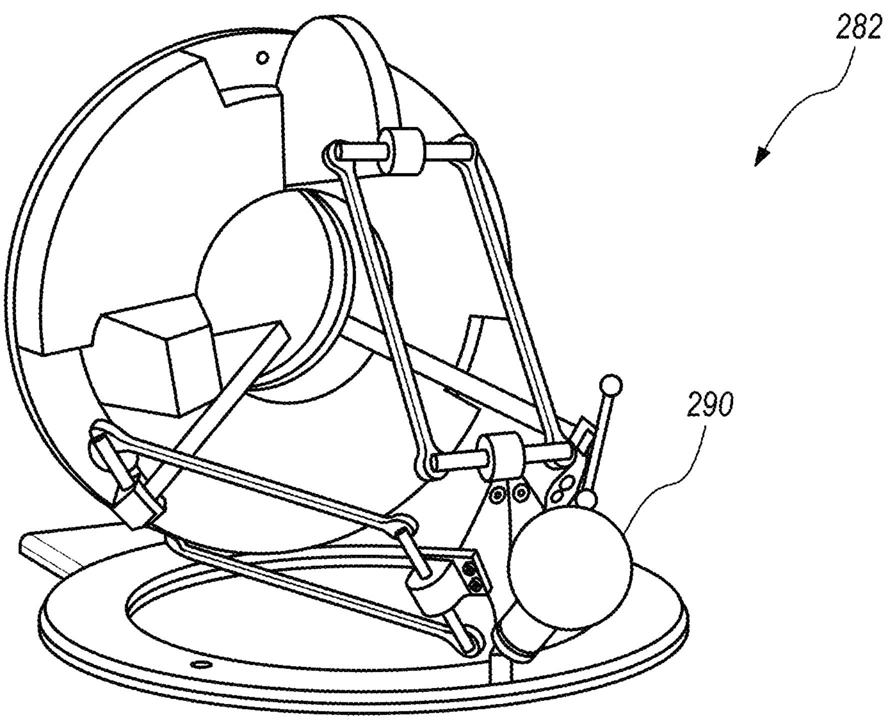
Figure 13D:
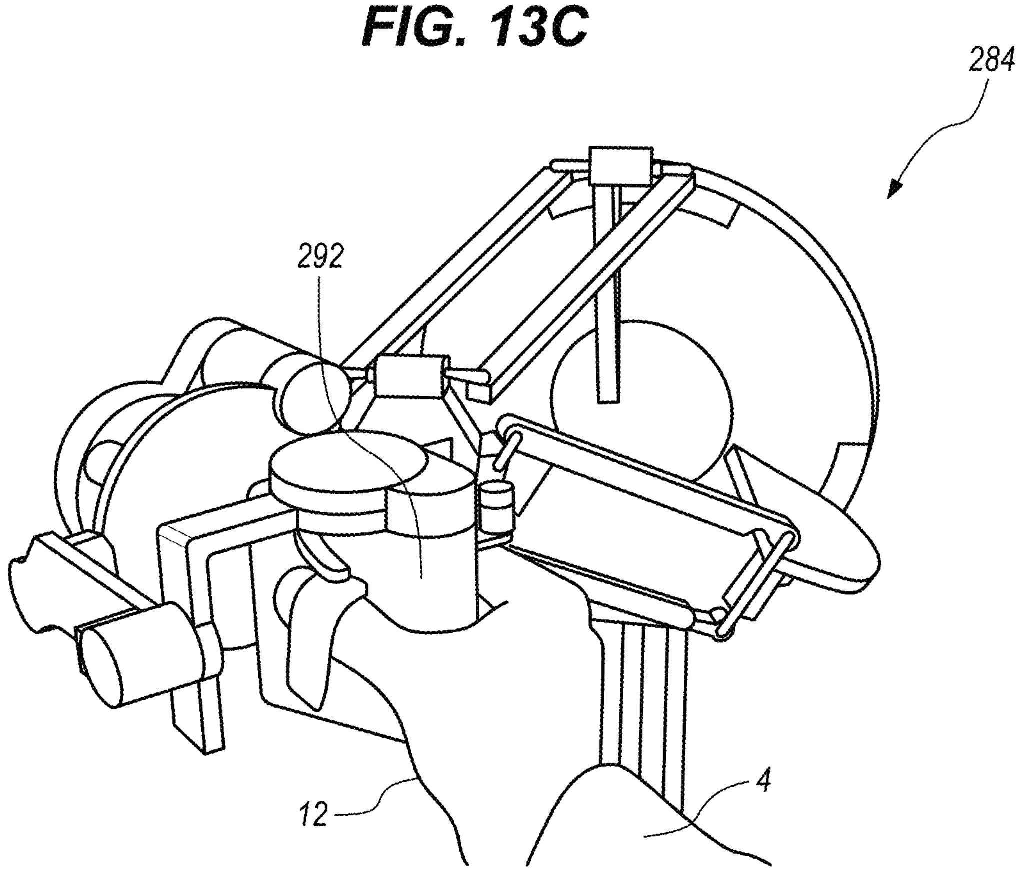
Figure 13E:
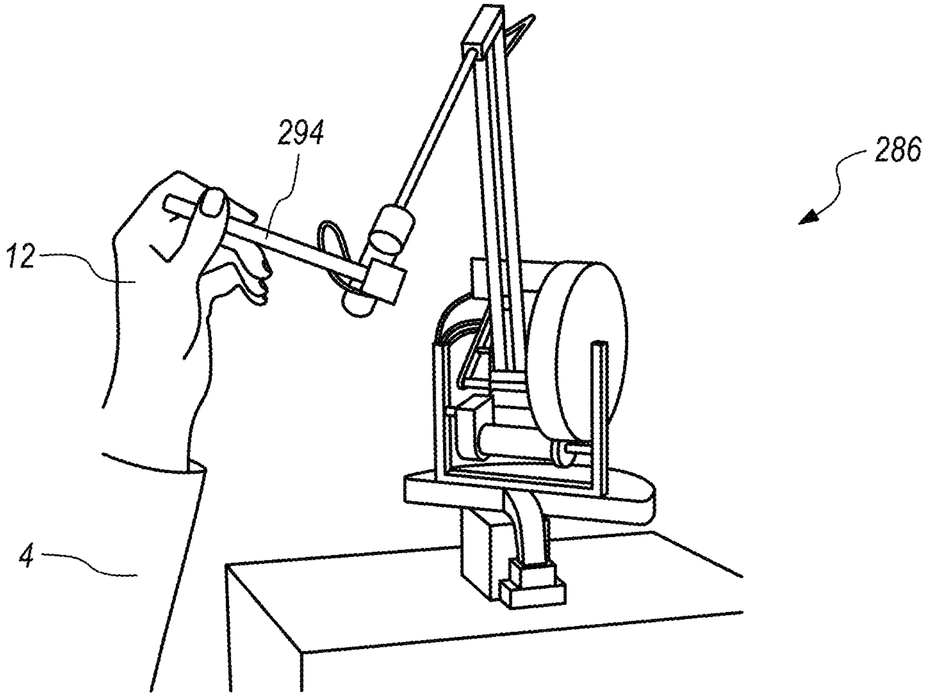
Figure 13F:
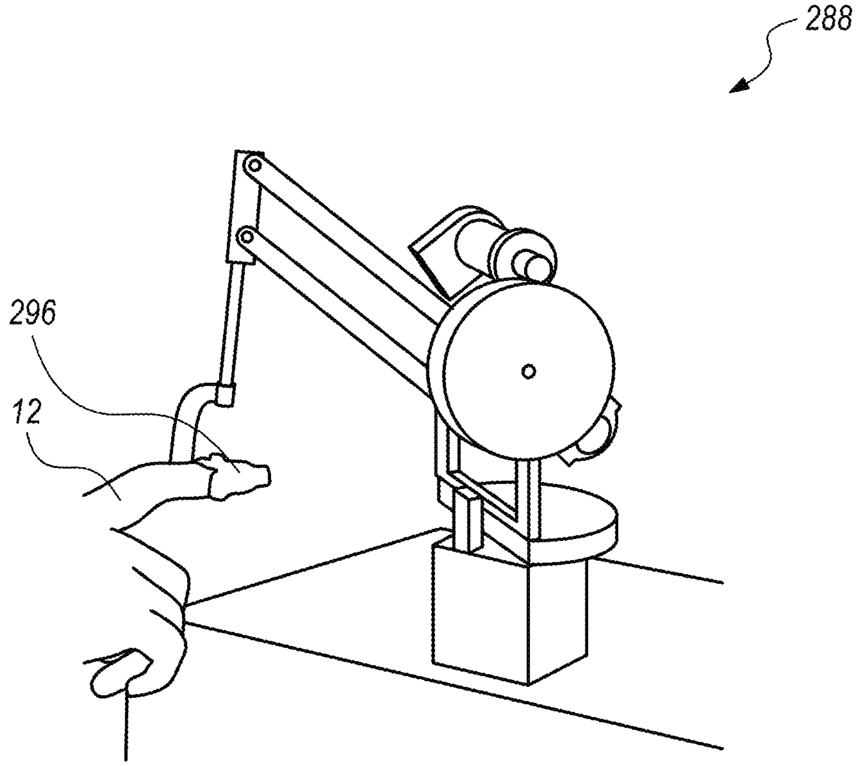

Referring to FIG. 13C, a haptic interface variation (282) may be configured to be coupled to a computing system (not shown) and provide a user with a sense of experiencing an actual or virtual surface through a manipulation interface such as a spherical member (290) configured to be held by the hand of the user. FIG. 13D illustrates a haptic interface variation (284) configured to provide a user (4) with a hand (12) grip manipulation interface (292) for experiencing aspects of real or virtual surfaces through an intercoupled computing system (not shown). FIGS. 13E and 13F illustrate further haptic interface variations (286, 288) wherein a hand (12) of a user (4) may be able to experience aspects of a real or virtual surface through a pen-like (294) manipulation interface, or a finger-socket (296) manipulation interface. Thus utilizing the “touch workstation” configuration of FIG. 13B with one of the illustrated haptic interfaces, a user, from a nearby or remote location, may be able to observe (through the display 278), directly feel/manipulate (through the 3-D printer 276), and haptically experience (through the haptic interface 280) aspects of the surface (70) of the inspected object (228). Thus referring to FIGS. 14 and 15, aspects of variations of such configurations are illustrated.

Figure 14:
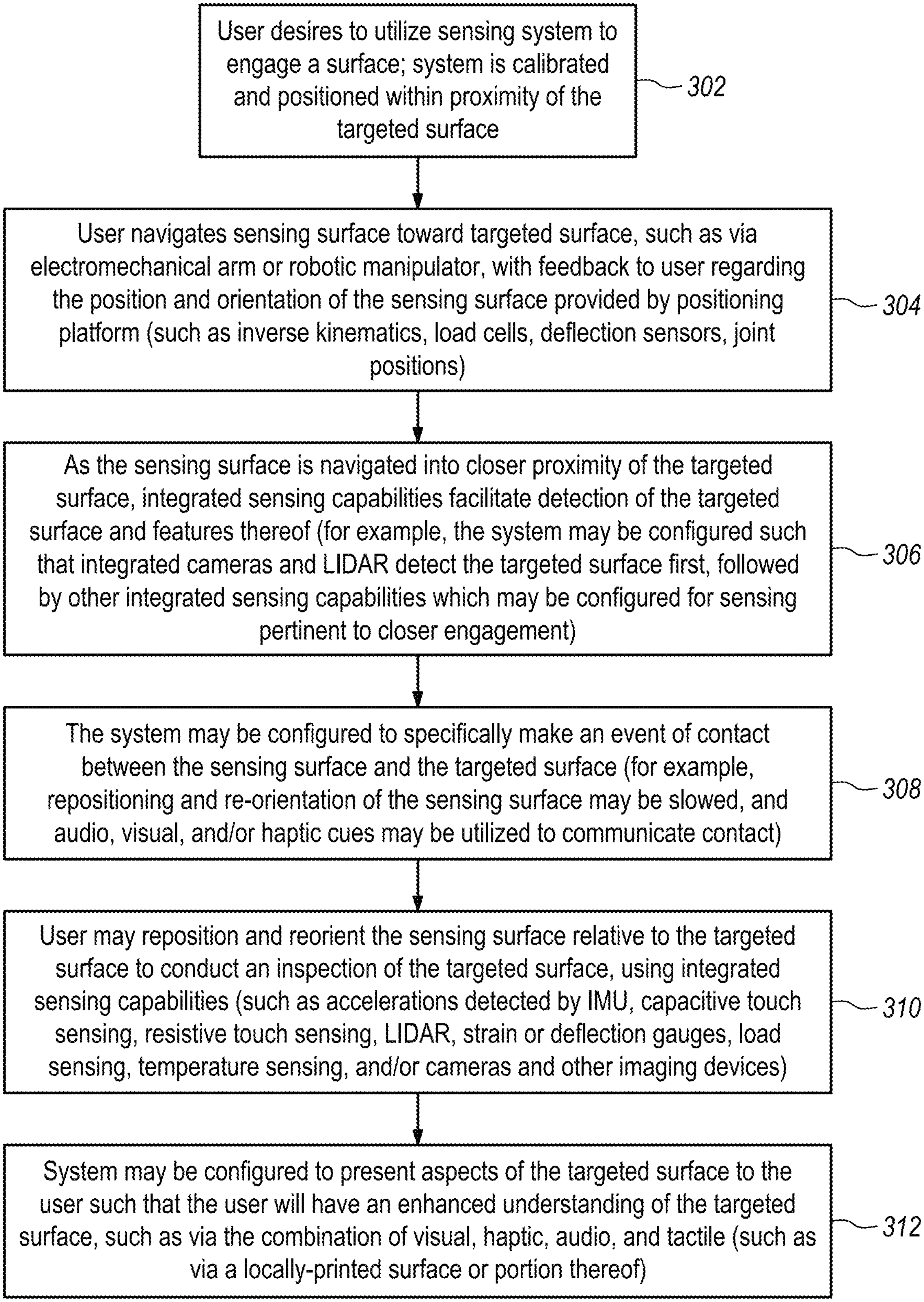

Referring to FIG. 14, a user desires to utilize sensing system to engage a surface; system is calibrated and positioned within proximity of the targeted surface (302). The User navigates sensing surface toward targeted surface, such as via electromechanical arm or robotic manipulator, with feedback to user regarding the position and orientation of the sensing surface provided by positioning platform (such as inverse kinematics, load cells, deflection sensors, joint positions) (304). As the sensing surface is navigated into closer proximity of the targeted surface, integrated sensing capabilities facilitate detection of the targeted surface and features thereof (for example, the system may be configured such that integrated cameras and LIDAR detect the targeted surface first, followed by other integrated sensing capabilities which may be configured for sensing pertinent to closer engagement) (306). The system may be configured to specifically make an event of contact between the sensing surface and the targeted surface (for example, repositioning and re-orientation of the sensing surface may be slowed, and audio, visual, and/or haptic cues may be utilized to communicate contact) (308). The user may reposition and reorient the sensing surface relative to the targeted surface to conduct an inspection of the targeted surface, using integrated sensing capabilities (such as accelerations detected by IMU, capacitive touch sensing, resistive touch sensing, LIDAR, strain or deflection gauges, load sensing, temperature sensing, and/or cameras and other imaging devices) (310). The system may be configured to present aspects of the targeted surface to the user such that the user will have an enhanced understanding of the targeted surface, such as via the combination of visual, haptic, audio, and tactile (such as via a locally-printed surface or portion thereof) (312).

Figure 15:
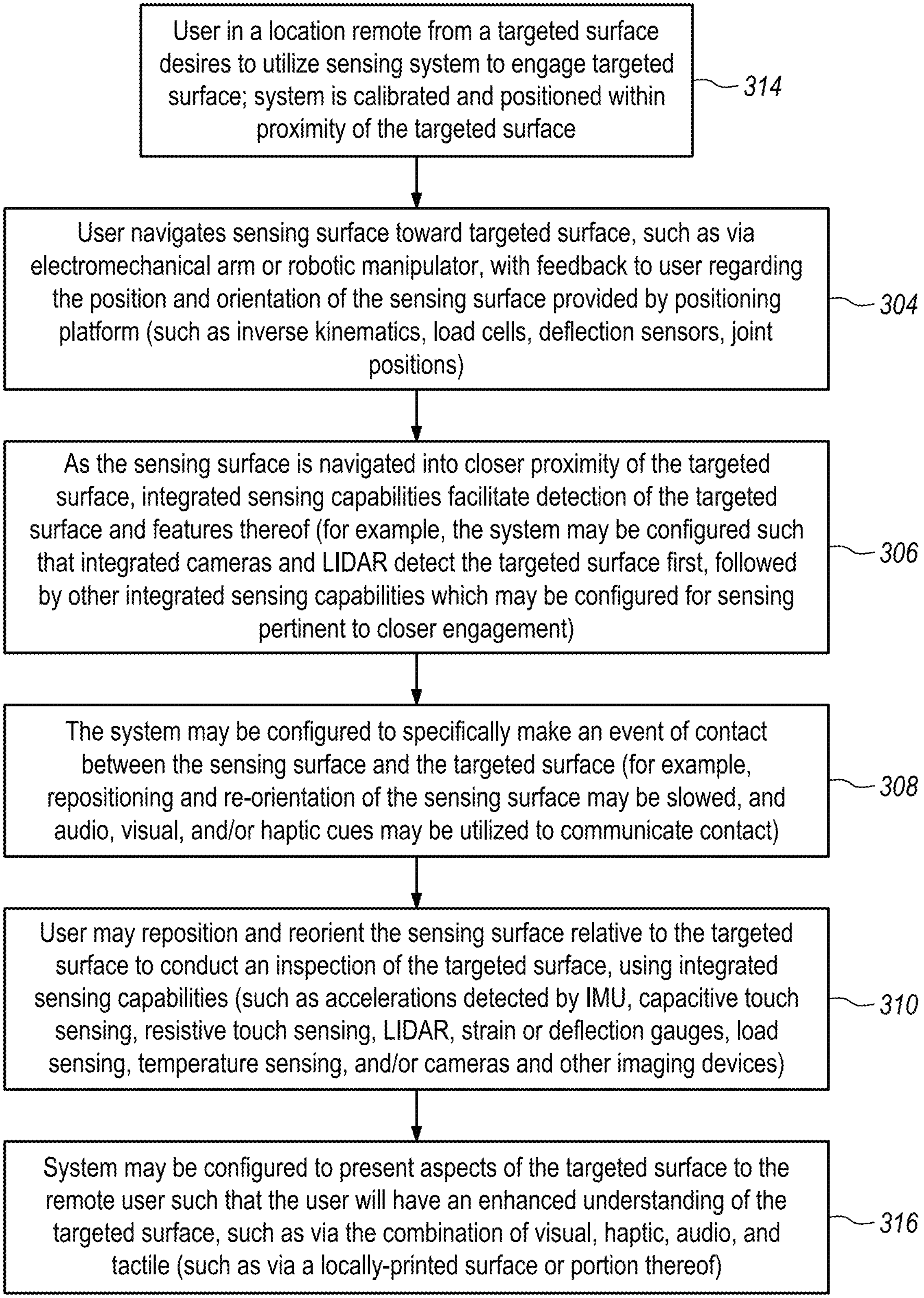

Referring to FIG. 15, a user in a location remote from a targeted surface desires to utilize sensing system to engage targeted surface; system is calibrated and positioned within proximity of the targeted surface (314). The user navigates sensing surface toward targeted surface, such as via electromechanical arm or robotic manipulator, with feedback to user regarding the position and orientation of the sensing surface provided by positioning platform (such as inverse kinematics, load cells, deflection sensors, joint positions) (304). As the sensing surface is navigated into closer proximity of the targeted surface, integrated sensing capabilities facilitate detection of the targeted surface and features thereof (for example, the system may be configured such that integrated cameras and LIDAR detect the targeted surface first, followed by other integrated sensing capabilities which may be configured for sensing pertinent to closer engagement) (306). The system may be configured to specifically make an event of contact between the sensing surface and the targeted surface (for example, repositioning and re-orientation of the sensing surface may be slowed, and audio, visual, and/or haptic cues may be utilized to communicate contact) (308). The user may reposition and reorient the sensing surface relative to the targeted surface to conduct an inspection of the targeted surface, using integrated sensing capabilities (such as accelerations detected by IMU, capacitive touch sensing, resistive touch sensing, LIDAR, strain or deflection gauges, load sensing, temperature sensing, and/or cameras and other imaging devices) (310). The system may be configured to present aspects of the targeted surface to the remote user such that the user will have an enhanced understanding of the targeted surface, such as via the combination of visual, haptic, audio, and tactile (such as via a locally-printed surface or portion thereof) (316).

Figure 16A:
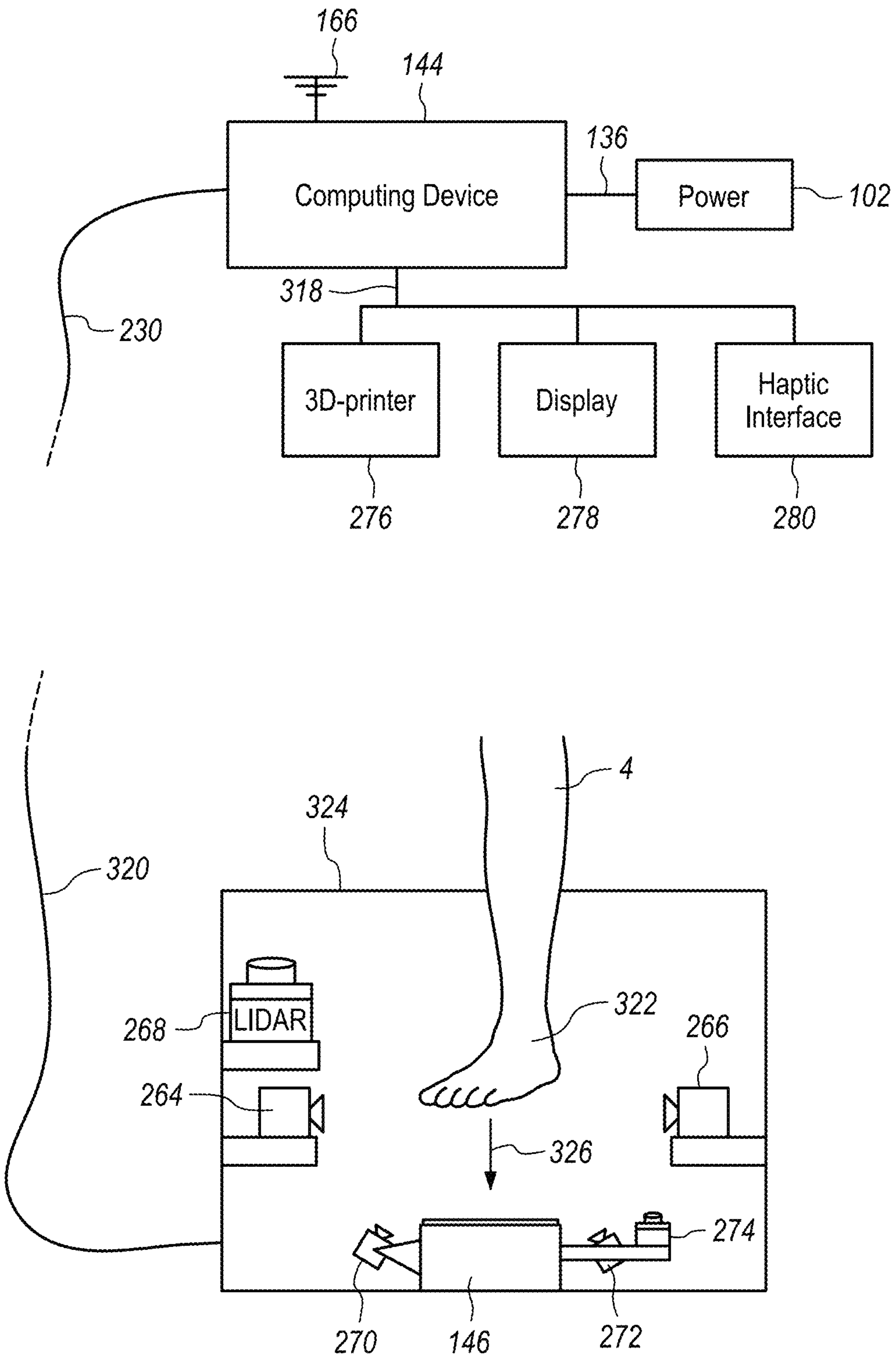
FIGS. 16A-16B and 17 illustrate aspects of configurations wherein one or more touch sensing assemblies may be utilized to at least partially characterize a portion of an appendage, such as a portion of a foot or arm of a user.
Figure 16B:
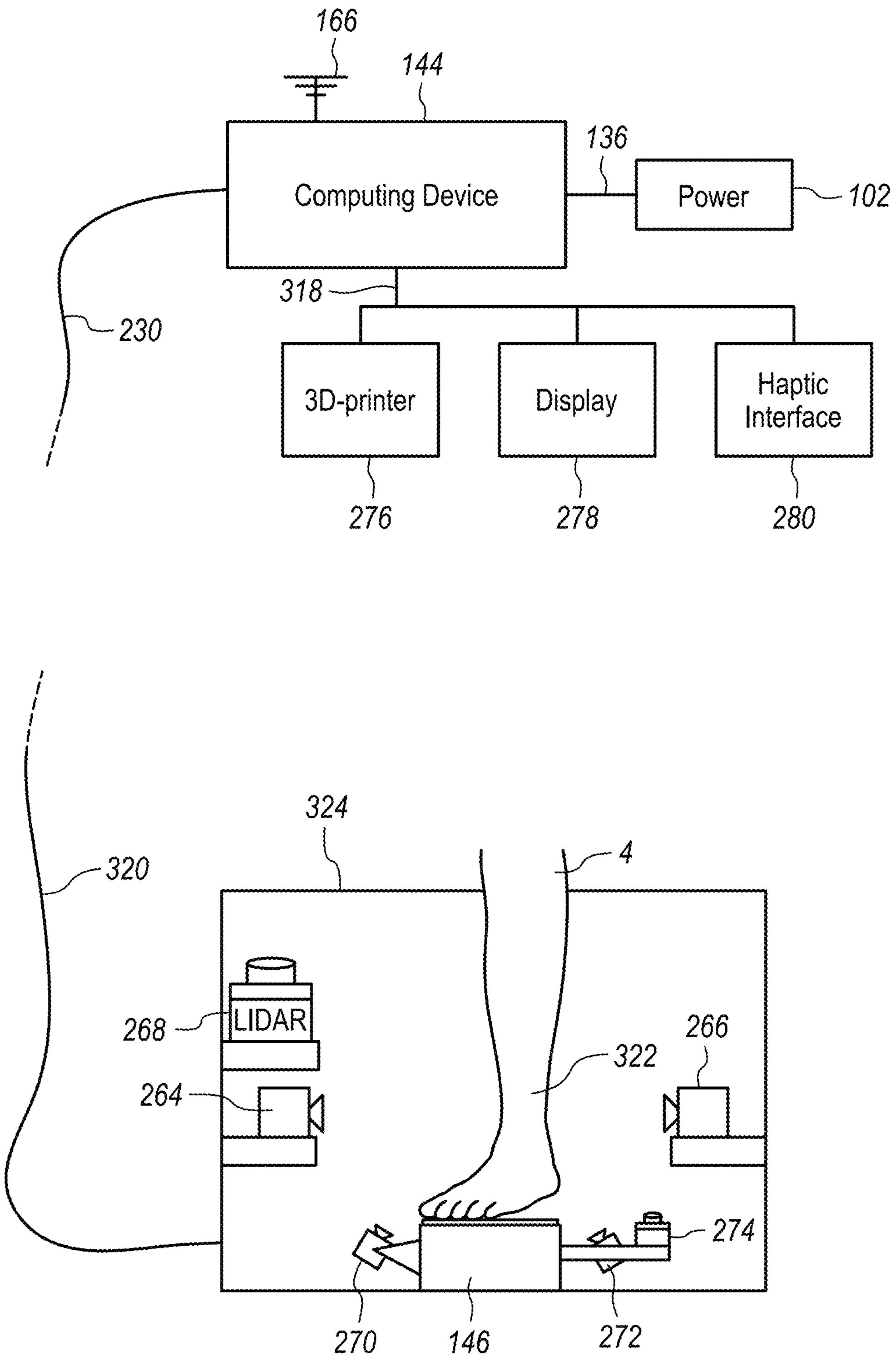
Figure 17:
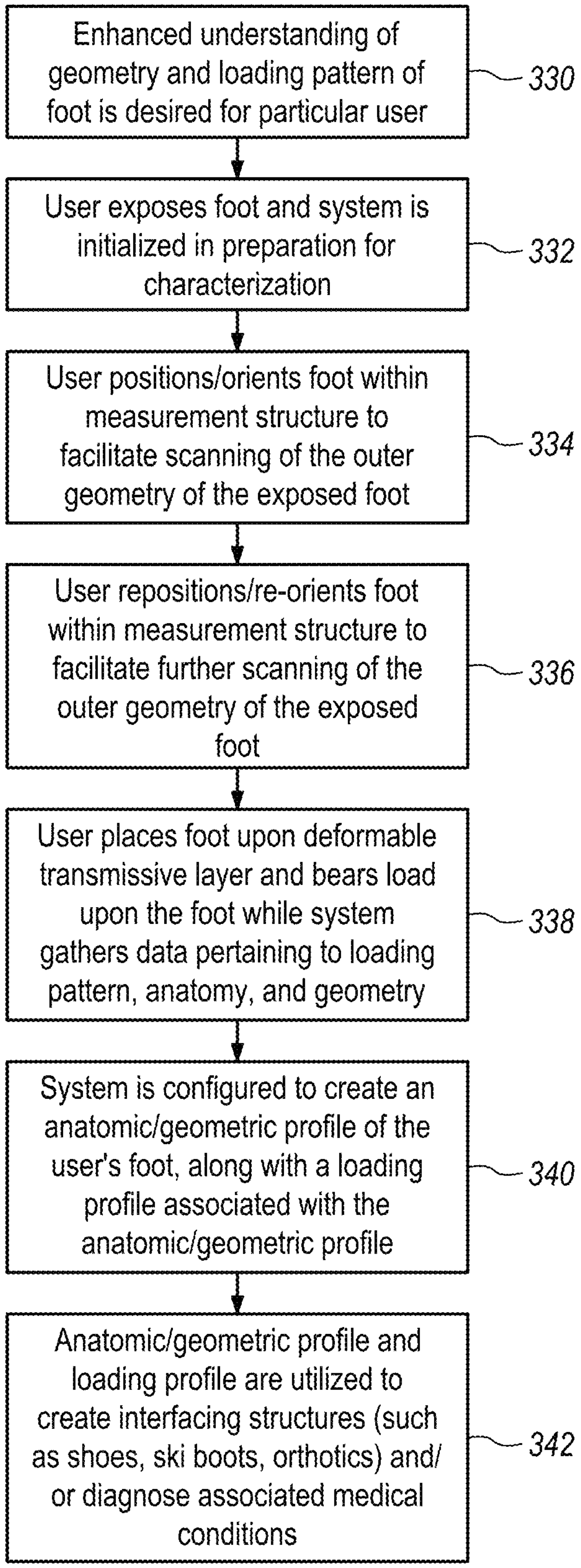

Referring to FIGS. 16A-17, various aspects of another illustrative configuration utilizing the integrated touch sensing systems described herein are shown. Referring to FIG. 16A, an interconnected room, kiosk, or measurement housing (324; connected via wired or wireless connectivity 320, 230, 166, to the computing system 144, which, as described above, is integrated with and intercoupled to other aspects of the touch workstation, such as a power supply 102, 3-D printer 276, display 278, and/or haptic interface 280) is shown featuring several imaging, sensing, and detection intercoupled resources, such as a LIDAR device (286), one or more imaging devices (264, 266), and a digital touch sensing assembly (146) intercoupled to further imaging devices (270, 272) and a LIDAR detector (274), each of which may be configured to assist in characterizing the geometry and surface of an object such as a foot (322) of a person (4) which may be lowered (326) into a position wherein the foot engages the digital touch sensing assembly (146), as shown in FIG. 16B. In other words, the measurement housing or kiosk (324) may be configured to facilitate convenient engagement of a portion of the user's appendage, such as a portion of the user's leg or arm, to gather precision information pertaining to such objectives as the plantar aspect of a user's foot, which may be utilized to design orthotics, ski boots, and the like. The combined data available at the interconnected workstation may be utilized to not only inspect the subject object (such as a foot of a user), but also to characterize precisely its geometry. For example, the digital touch sensing assembly (146) may be utilized to precisely characterize the primary loading surface (i.e., the bottom surface of the foot 322 of the user 4), and the image and point cloud data may be utilized to further understand the geometry of the object (the foot and lower leg of the user 4), such that these findings may be utilized to assist with orthopaedic research, surgical pre-operative or post-operative studies, custom shoe design, and the like. One such configuration is illustrated in FIG. 17.

Referring to FIG. 17, in one embodiment, an enhanced understanding of geometry and loading pattern of foot is desired for particular user (330). The user may expose their foot, and the system may be initialized in preparation for characterization (332). User may position/orient their foot within measurement structure to facilitate scanning of the outer geometry of the exposed foot (334). User may reposition/re-orient their foot within the measurement structure to facilitate further scanning of the outer geometry of the exposed foot (336). User may place their foot upon a deformable transmissive layer and bear load upon the foot while system gathers data pertaining to loading pattern, anatomy, and geometry (338). The system may be configured to create an anatomic/geometric profile of the user's foot, along with a loading profile associated with the anatomic/geometric profile (340). The Anatomic/geometric profile and loading profile may be utilized to create interfacing structures (such as shoes, ski boots, orthotics) and/or diagnose associated medical conditions (342).

Referring back to FIGS. 13A and 13B, some surfaces and objects may be presented in a somewhat easily-accessed configuration. Many other fine manipulation and/or contact scenarios involve greater geometric or spatial complication. For example, referring to FIG. 18A, a scenario that would be fairly simple for a human (346) is illustrated, wherein the hand (348) of the human (346) may be utilized to controllably approach and then touch, inspect, and/or grasp a targeted object, such a cookie (354), which happens to reside within a container (344) which may be fragile, such that relatively high load or impulse contacts are to be avoided in order to preserve the integrity of the container (344) and/or the object (here a cookie 354 which also may be fragile). The supporting structure or substrate (such as a table 352) upon the container (344) rests also may be fragile or susceptible to damage under high load or high impulse. The human upper extremity happens to be quite deft in facilitating successful handling of this example situation due, in part, to smooth motor neuron, muscle, and kinematic activity of the upper extremity, as well as sensory neuron innervation of tissues such as the skin. For example, the depicted human (346) typically will have sensory neurons throughout the skin, such as in the areas of the wrist (350) and hand (348), so that the associated human (346) may carefully navigate the geometry of the container and targeted object (354) as well as the mechanical failure mechanisms associated with both. In other words, the human may utilize touch sensing through the skin and other tissues to navigate the scenario without destroying the associated structures. Approaching the same scenario with a mechanical system, such as with a backhoe tractor (in a scaled up version of the scenario) or remotely-controlled robot, brings about many challenges, because a human at the controls in a remote location (such as across the room from the robot, or across the country from the robot as connected by computing connectivity capabilities) typically does not have a human-level sense or touch or feel that pertains to the interaction, and may not perceive that one or more related structures are about to be damaged until it is too late, such as via visual or audio confirmation.

Figure 18A:
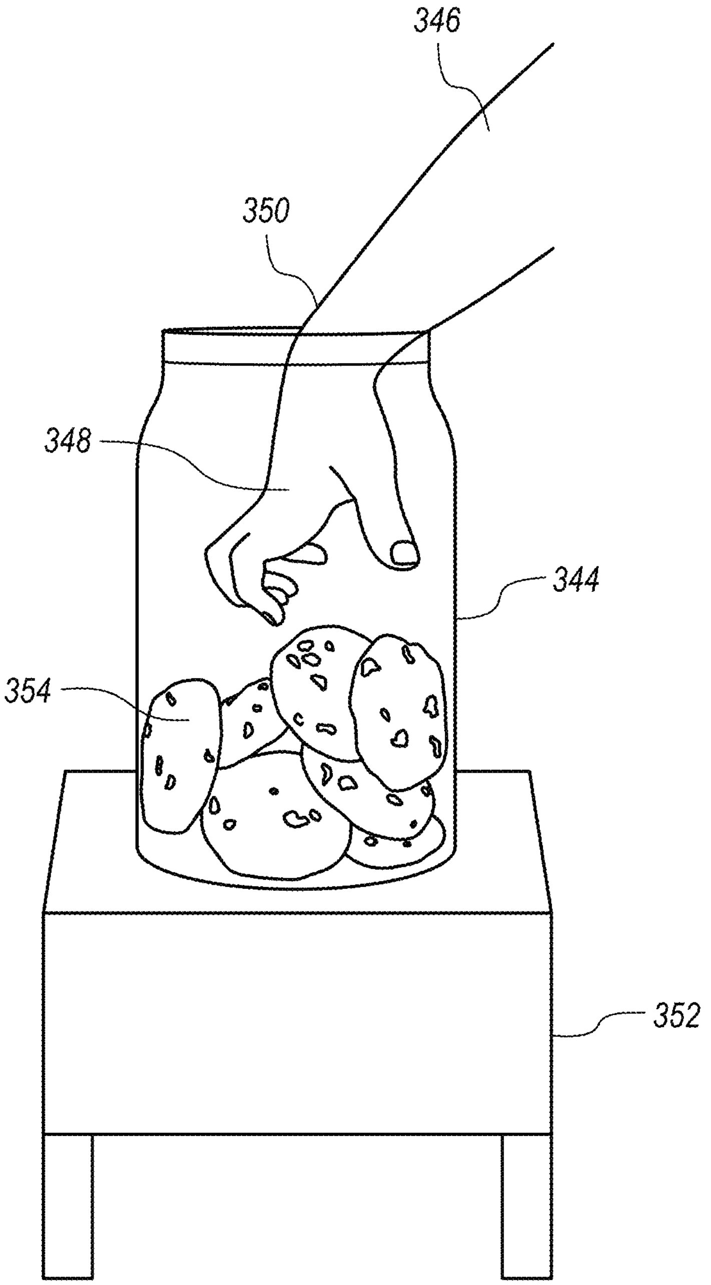
FIGS. 18A-18L illustrate aspects of configurations for integrating one or more touch sensing assemblies into sophisticated systems which may involve controlled electromechanical movement, such as via robotics, and placement of deformable transmissive layers at various positions along lengths of various assemblies, as well as around outer surface shape profiles of various assemblies, such as perimetrically relative to elongate instruments.
Figure 18B:
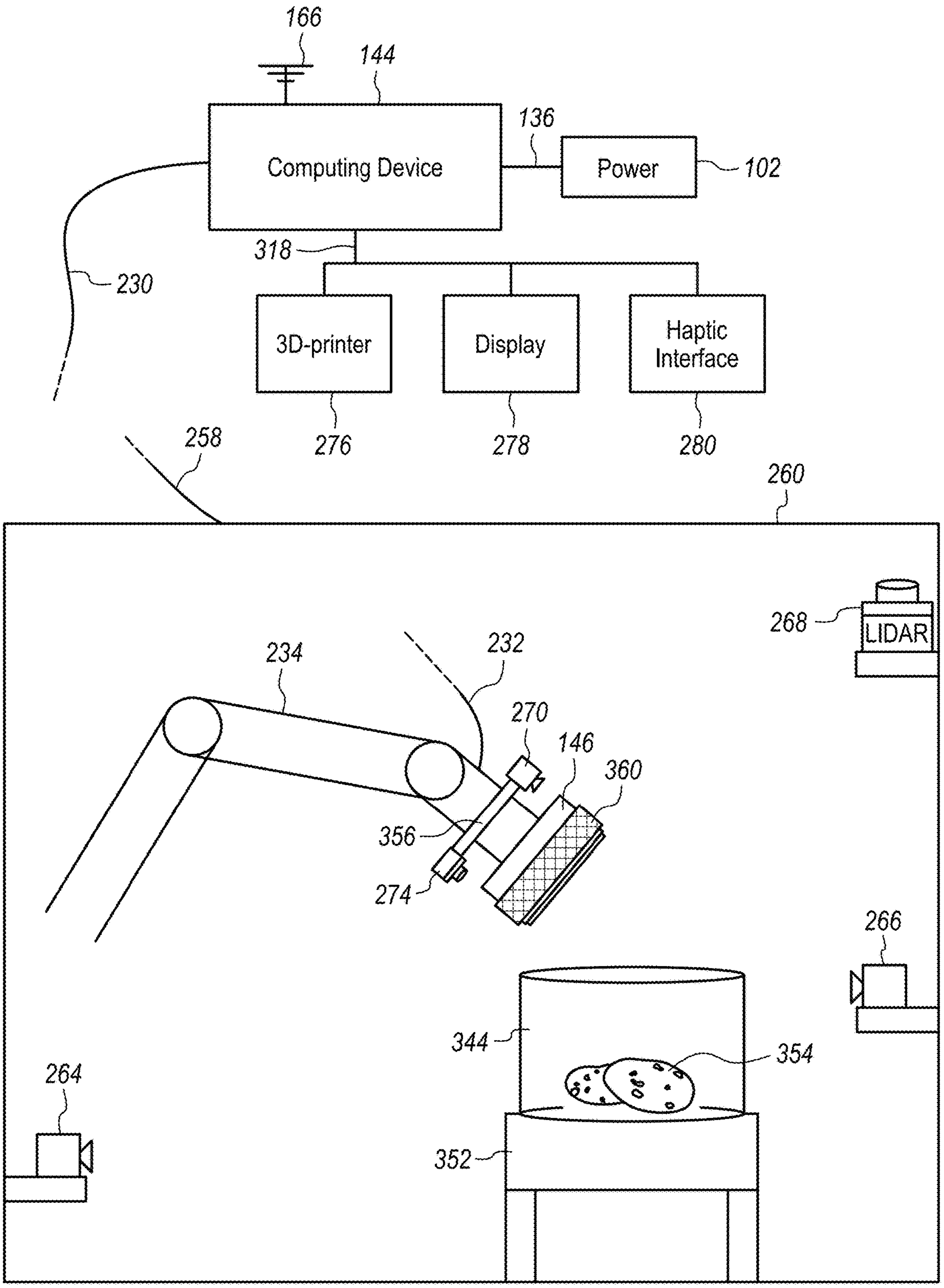

Referring to FIGS. 18A and 18B, the subject touch sensing technologies may be utilized to address such scenarios, and to bring to a user in a nearby or remote location a greater sense of the physical engagements at issue.

As shown in FIG. 18B, an electromechanically-controllable robot arm (234) is shown in a room (260) with an intercoupled touch sensing assembly (146) such as those described above positioned to inspect an object (such as a cookie 354) within a container (such as a jar 344) which rests upon a substrate or support structure (such as a table 352). The room (260) may be configured to have a plurality of sensors, such as a LIDAR (268) and one or more image capture devices (264, 266) coupled thereto and positioned to capture information pertaining to the volume around the robot and/or targeted object (354), preferably in a manner which provides high quality data from multiple sources with uncorrelated errors, as described above. One or more additional sensing devices, such as an additional image capturing device (270) and LIDAR (274) may be coupled to the robot arm (234) to provide further information pertaining to the volume around the intercoupled touch sensing assembly (146), and further high quality data from multiple sources with uncorrelated errors, for enhanced data fusion capability. Each of the sensors (146, 264, 266, 268, 270, 274) may be coupled (232, 258, 230), such as via wired or wireless connection, to one or more computing devices (104) which may be configured to facilitate control of the interaction. With such a configuration, the distal and target-facing touch sensing assembly (146) may be configured to assist a user who may be in a nearby or remote location with gaining a perception of the physical interaction at the deformable transmissive layer (110) of the touch sensing assembly (146), as described above. Further, as noted in reference to FIG. 13B above, the user may be provided with a workstation capable of providing one or more means for perceiving physical engagements, such as a haptic interface (280), a display (278), and/or a 3-D printer (276, i.e., to facilitate printing one or more layers of a subject object). To further enhance the user's perception of the physical engagement scenario with the remotely-operable manipulation or inspection configuration (such as a robot 234, as shown), an additional touch sensing assembly (360) may be coupled to the remotely controllable engagement system (234), such as in a configuration which is partially or wholly perimetric about a distal portion of such system, as shown. In other words, the additional touch sensing assembly (360) may comprise similar components as the aforementioned touch sensing assemblies (146) and be coupled around a portion of the perimeter of the pertinent structure in a manner that provides one or more outward-facing deformable transmissive layers (110) to be operatively coupled (232, 230), such as via wired or wireless connectivity, to the computing device (104) to provide additional touch sensing for the user of the remote workstation. As shown in FIG. 18B, the additional touch sensing assembly (360) preferably is positioned upon the remotely controllable engagement system (234) in a location which will assist the remote user in understanding key aspects of the remote engagement, such as at a distal or "wrist" location wherein contacts with targeted or associated objects are likely to occur. For example, the positioning of the additional touch sensing assembly (360) perimetrically around at least a portion of the distal touch sensing assembly (146) may be helpful in assisting the remote user with navigating through the mouth of the container (344) and down to the targeted object (354), as glancing or more direct contacts with either sensing assembly (360, 146) may occur during such approach.

Figure 18C:
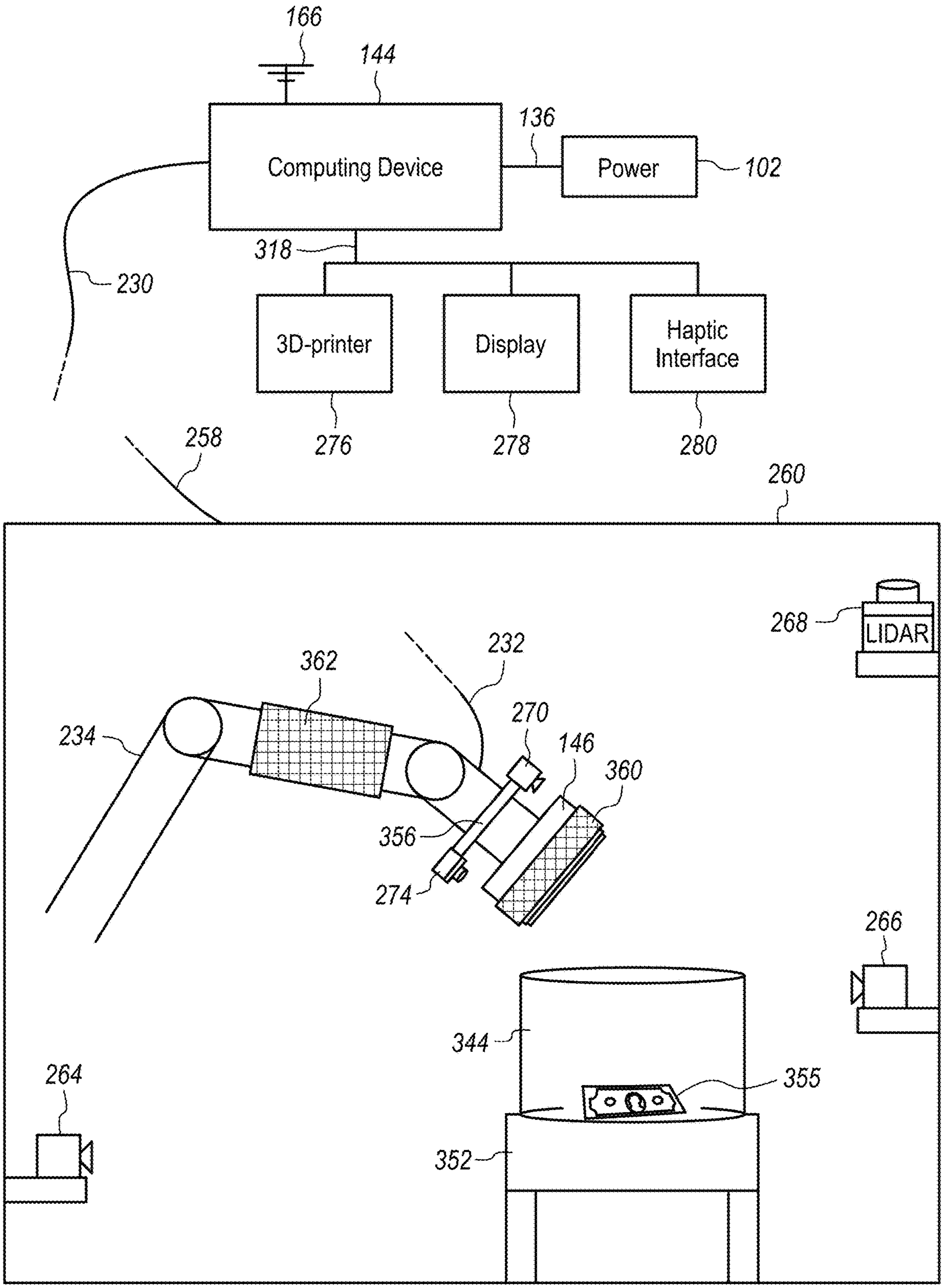

Referring to FIG. 18C, a configuration similar to that of FIG. 18B is illustrated, with the addition of another touch sensing assembly (362) coupled perimetrically around at least a portion of what may be termed a "forearm" member of the depicted robot (234), and again operatively coupled (232, 230), such as via wired or wireless connectivity, to the computing system (104). Indeed, both touch sensing assemblies (360, 362) may be configured to sense perimetrically around the elongate assembly (234), such as via diametrically opposed pairs of touch sensing assemblies (146), groups of three or more touch sensing assemblies, which may be separated from each other, for example, in a circumferentially equivalently spaced configuration (i.e. to maximize coverage relative to the environment nearby), etc. Such an additional sensing capability at the depicted location may further assist a remote user in successfully navigating the illustrated physical engagement challenge to touch, inspect, and/or grasp the targeted object (here a dollar bill 355).

Figure 18D:
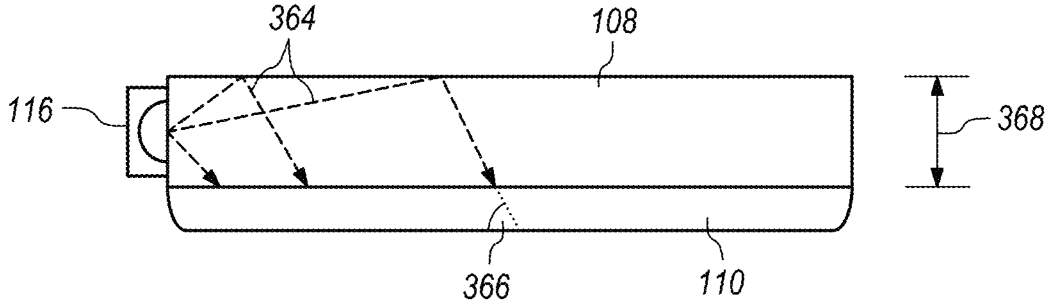
Figure 18E:
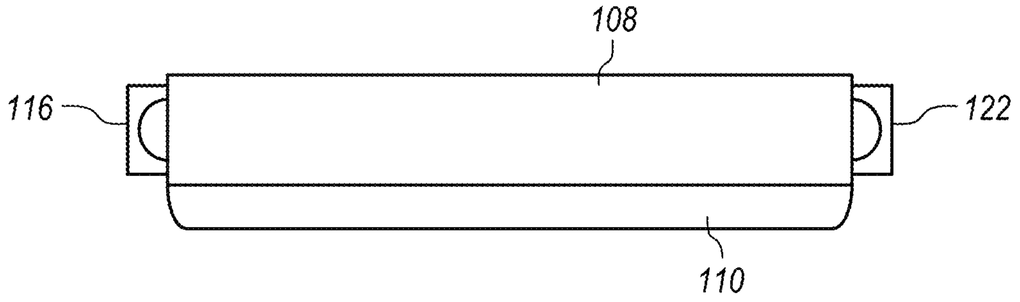

As described in reference to FIGS. 9A and 9B above, various sensor configurations may be created by assembling and operatively coupling a plurality of touch sensing assemblies (146), and such intercoupling may be utilized to create a perimetric or partially-perimetric type of touch sensing assembly such as is shown in FIGS. 18B and 18C (360, 362). Also as noted above, such as in reference to FIGS. 7A-7E, components such as light fibers and/or waveguides may be utilized to move sensors to various positions relative to emitted or captured radiation, such as captured light (i.e., rather than having an optical sensor or image capture device directly positioned at a capture location, light may be captured at the capture location using a waveguide, transmissive fiber, or combination or plurality thereof, to facilitate transmission from such capture location to a more remotely-positioned optical sensor or image capture device). Referring to FIGS. 18D-18K, various configurations are illustrated which provide alternatives for radiation transmission pertaining to touch sensing assemblies such as those described above (146, 360, 362). Referring to FIG. 18D, for example, an configuration similar to that illustrated in FIG. 7A is shown comprising an optical element (108) operatively coupled with a light (or other wavelength radiation; for example, alternatively may be infrared wavelength) emitting device (116) in a configuration selected to result in photon propagation (364) from emission at the light emitting device (116) to various positions along the optical element (108) where the photons may cross into the deformable transmissive layer (110), such as with an exit angle (366) prescribed by reflective/refractive properties of the materials and geometries of the structures, such as between about 20 degrees and about 40 degrees. FIG. 18E illustrates a similar configuration with light emission from two sides (116, 122), as in the assembly of FIG. 7A. Referring back to FIG. 7A, with an image capture device having dimensions in the range of a 3-dimensional cube that has an edge dimension of about 1.5 mm, a distance to imaging object of about 3 mm, and a working distance of about 5 mm, combined with optical element (108) comprising a material such as a polymer or glass selected to facilitate illumination therethrough, such as polymethylmethacrylate ("PMMA"), which is relatively inexpensive, easy to form, and relatively easy to polish to facilitate optical properties such as predictable reflectance, in a layer of about 4 mm thickness (368), and about 1-2 mm of deformable transmissive layer (110) polymeric material, an assembly may be in the range of 1-15 mm in thickness, such dimensions being at least partially dependent from a selection perspective upon illumination requirements and in-situ loading demands. Such an assembly dimension is workable in various configurations, but may be minimized with alternative configurations.

Figure 18F:
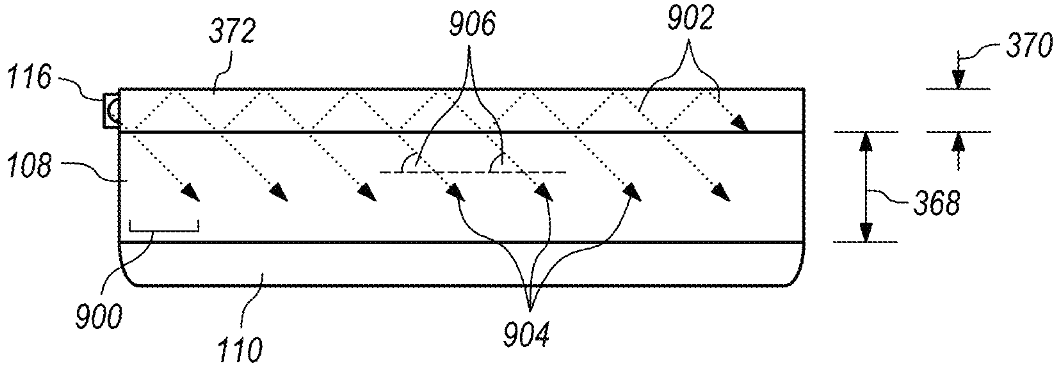
Figure 18G:
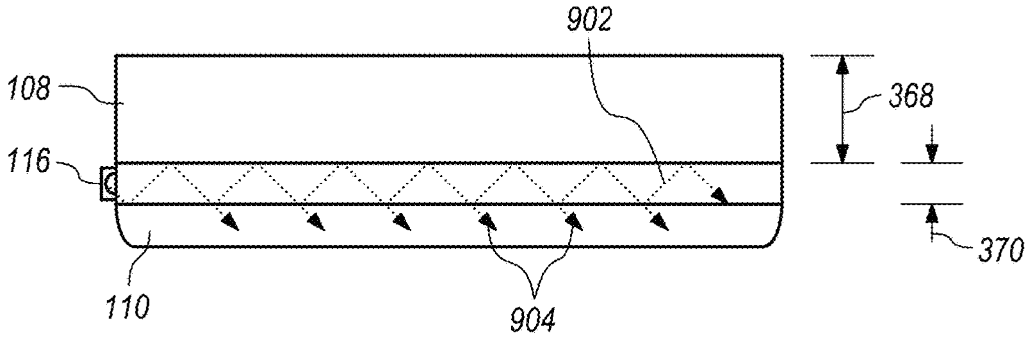
Figure 18H:
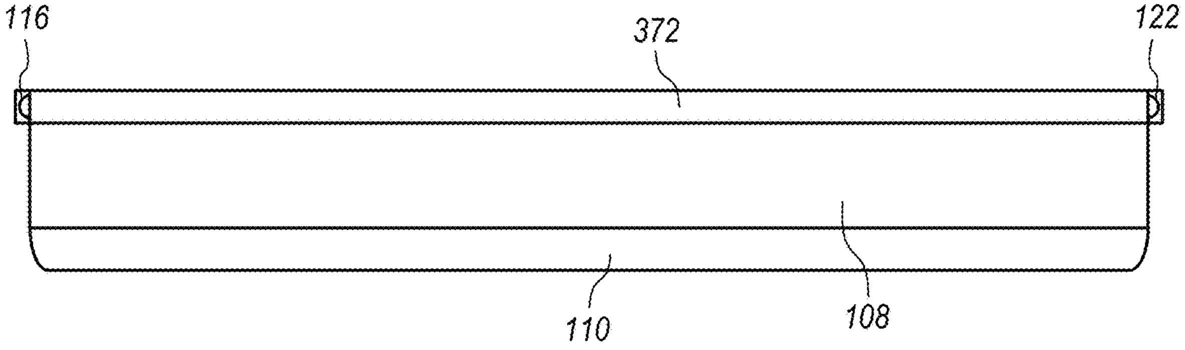
Figure 18I:
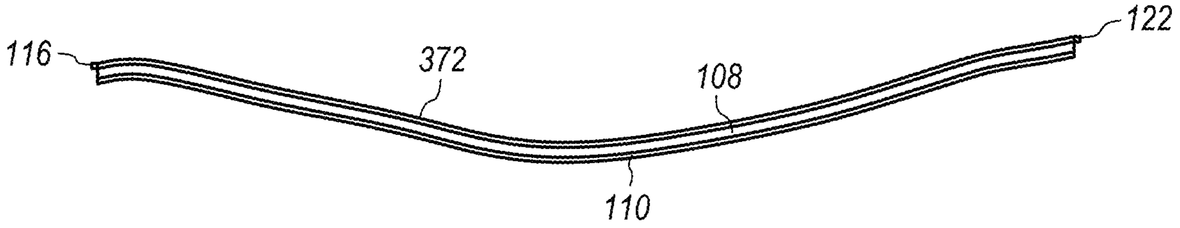
Figure 18J:
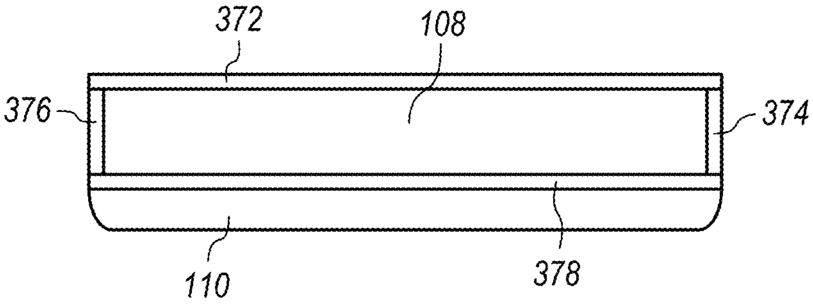

Referring to FIG. 18F, for example, certain socalled "front lighting" or "front illumination" films (372), such as those utilized in computing device displays (for example, in mobile devices which may be utilized outdoors or in other brightly lit environments wherein conventional back-lit configurations may not be as effective; for example, devices such as those available under the tradename Kindle® may utilize reflective display configurations selected to employ ambient light, such that an illumination layer resides between the pixels of the display and the viewer), may comprise light extraction features to controllably extract light or other radiation in a preferred direction, such as toward or back out of the deformable transmissive layer (110; i.e., the light may bounce 902, such as via total internal reflection, through an illumination film 372, and exit 904 the film and enter into the deformable transmissive layer 110, which may function as a carrier of the various optical layers and a spacer to allow sufficient spacing perpendicular to the plane of the deformable transmissive layer, i.e., "z axis spacing", for mixing of the light) as shown in FIG. 18F at desired locations or distributions along the length of the optical element (108) with desired angles (366) of exit, and may have thickness (370) in the range of 100 microns. A cladding layer (not shown), such as one comprising silicone material, may be coupled to the exterior surface of the film (372), and a carrier layer also may be intercoupled to provide additional structure and localized planarity, for example. With such a configuration, the assembly thickness may be cut in about half, to about 5-6 mm, for example, depending upon the materials and light extraction features of the film (372). With a configuration such as that shown in FIG. 18F, there may be portions (900) of the deformable transmissive layer (110) which are difficult to access given the positioning of the illumination layer (372) and exit paths/angles (904, 906). FIG. 18G illustrates another embodiment wherein the film 372 is positioned between the optical element 108 and the deformable transmissive layer 110, and is thus closer to the deformable transmissive layer (110), as in various so-called "front lighting" configurations. As with the configuration of FIG. 18F, features within the illumination layer may assist in the controlled bouncing/reflection 902, such as via total internal reflection, and exit or extraction 904, to direct the illumination toward other layers such as the deformable transmissive layer (110) as shown. Illumination film (372) thickness (370) may be determined by factors that pertain to the illumination requirements, such as high tightly controlled an illumination is required (for example, more light may require a thicker illumination film; tighter angular control may require a thinner illumination film). Importantly, such layers may be substantially planar, but also may be non-planar or curved with various levels of complexity (convex, concave, cylindrical, etc), and also may be illuminated from various locations, as well as elongated, as illustrated in FIGS. 18H and 18I—which may, for example, facilitate perimetric geometries such as those illustrated in the cuff-like perimetric sensors of FIGS. 18B and 18C (360, 362). Further, as illustrated in FIG. 18J, such film (372) may be coupled to not only a single side for controlled reflectance, but also at a plurality of sides; FIG. 18J illustrates a configuration with controlled reflectance front illumination films intercoupled to four sides (372, 374, 376, 378) as illustrated around the depicted optical element (108), or in other embodiments, as many as six sides in a configuration similar to that of FIG. 18I, wherein two additional illumination films are intercoupled to either side of the optical element (108) in a manner co-planar with the drawing sheet as illustrated.

Figure 18K:
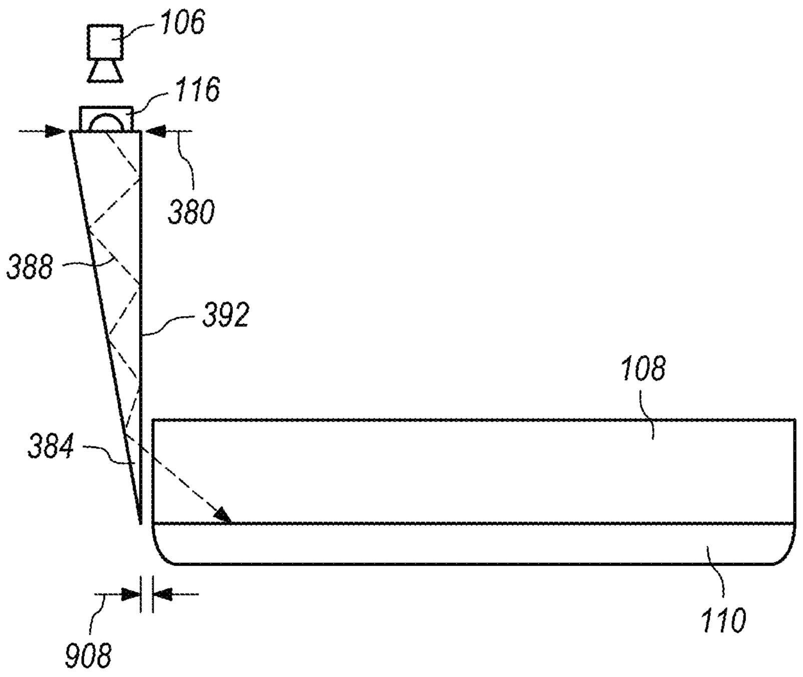
Figure 18L:
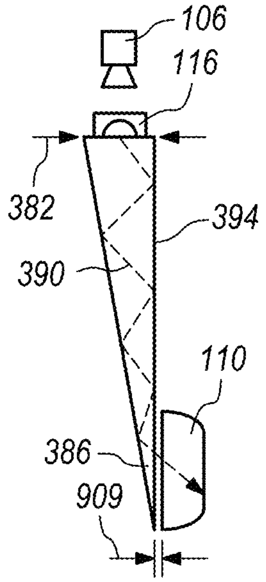

Referring to FIGS. 18K and 18L, as noted above, waveguides may be utilized and transmission or intercoupling members to move light efficiently between various elements. FIG. 18K, for example, illustrates a wedge-type waveguide with a maximum thickness (380) which may be in the range of 1-5 mm, and which may have an included angle (384) in the range of 1-15 degrees, to assist in propagating (388) light from the emission device (116), across the waveguide (392) into the optical element (108), and into the deformable transmissive layer (110); an air gap (908) may be configured to assist in transmission across from the waveguide (392) into the optical element (108). FIG. 18L illustrates a similar wedge-type waveguide with a maximum thickness (382) which may be in the range of 1-2 mm, and which may have an included angle (386) in the range of 2-8 degrees, to assist in propagating (390) light from the emission device (116), across the waveguide (394) (again an air gap 909 is shown to assist in transmission, and to prevent total internal reflection) and straight into the deformable transmissive layer (110). With the configuration of FIG. 18K, a membrane (not shown) may be disposed upon the right-most depicted surface of the deformable transmissive layer (110), and additional capture devices or cameras, as well as additional illumination sources, may be added to the contralateral (shown left) side of the waveguide (394) so long as such contralateral side does not have mirror reflective coating. Mirror coatings and elements of so-called "turning films" may be included to further assist in efficiently guiding and transmitting light or other radiation between the elements (for example, light leaving the depicted waveguide 392 may be at an exit vector nearly parallel to the vertical face of the waveguide 392, and it may be desirable to "turn" the exiting light to create a desired illumination angle, such as by coupling a turning film to the waveguide 392). The components, materials, geometries, and refractive/reflective properties may be tailored for various particular geometric challenges, such as those presented various use cases described and illustrated herein.

Figure 19A:
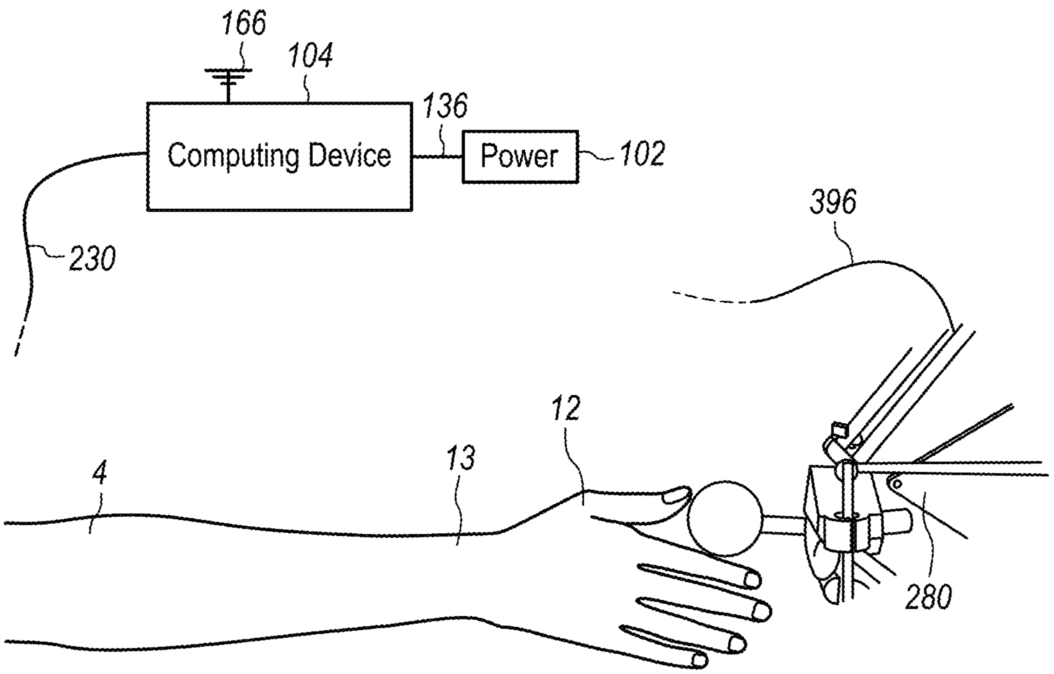
FIGS. 19A-35 illustrate aspects of system and method integrations wherein one or more touch sensing assemblies may be utilized to assist in translating physical engagement back to a user at a workstation which may be local or remote relative to the physical engagement.
Figure 19B:
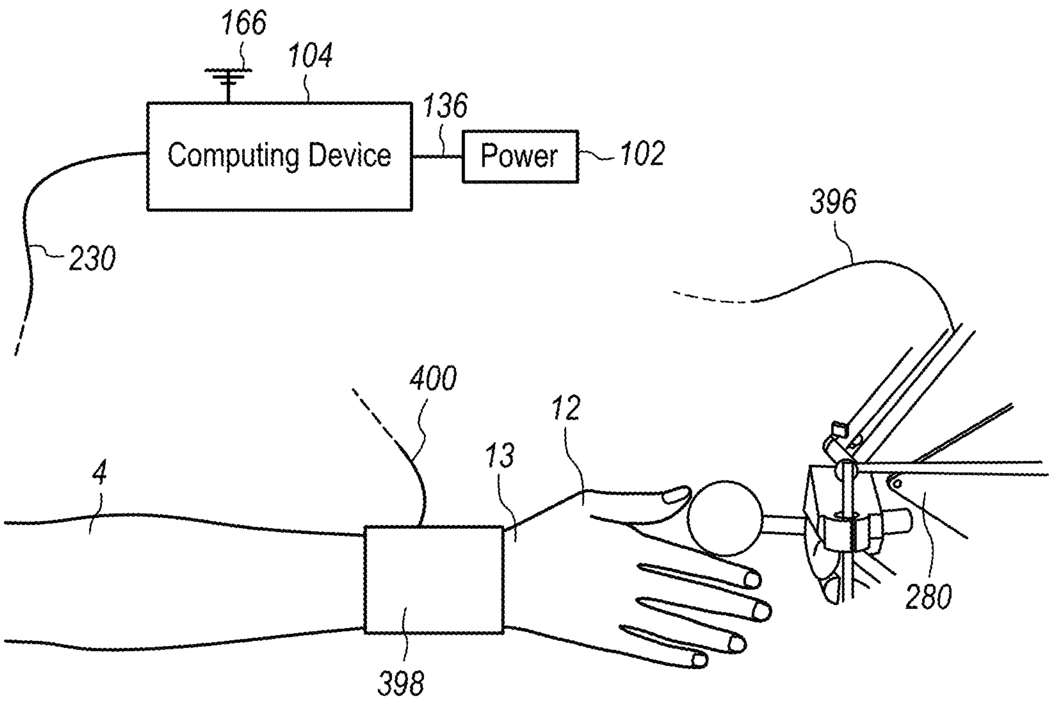

As noted above, increasing the perception of activities at a remote location through a local workstation for a user, whether the user is across the room, in another building, or across the world, is a key challenge for many computerized systems such as telecommunications, remote presence, remote inspection, or remote action systems. Referring to FIG. 19A, one enhancement of perception at a local workstation for a user (4) may be via a haptic master input device (280) which may be operatively coupled (396, 230), such as via wired or wireless connection, to an interconnected computer system (104), to enable the user (4) to perceive aspects of feeling, such as simulated translations of contact, friction, textures, and the like, locally at the workstation through the user's hand (12) and/or wrist (13). Referring to FIG. 19B, in another embodiment, it may be valuable to facilitate further local perception of remote physical interactions by virtue of what may be termed a "touch translation interface" (398), such as one which may be removably coupled to the wrist (13) of the user, operatively coupled to the computing system (400, 230), such as via wired or wireless communications, and configured to provide the user (4) with one or more sensations at the wrist (13) or other location that pertain and/or may be intuitively associated with activities at the remote location, such as contacts between objects at the remote location. Such sensations may be in addition to sensations provided to the user (4) through, for example, a haptic master input device or controller (280). In other words, in various embodiments, multi-modal sensations may be provided to the user (4) to assist the user in perceiving activities at the remote location with enhanced fidelity.

Figure 20A:
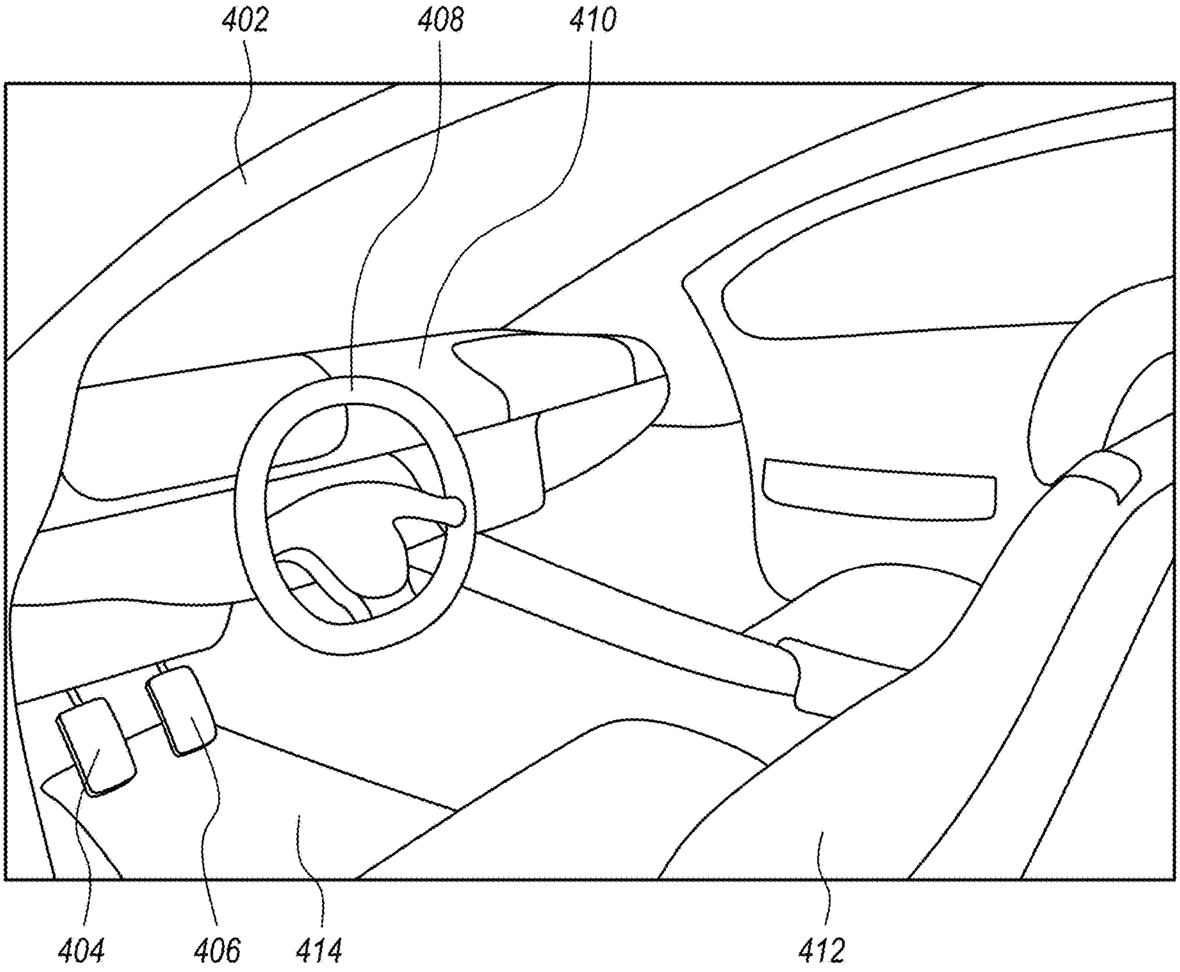
Figure 20B:
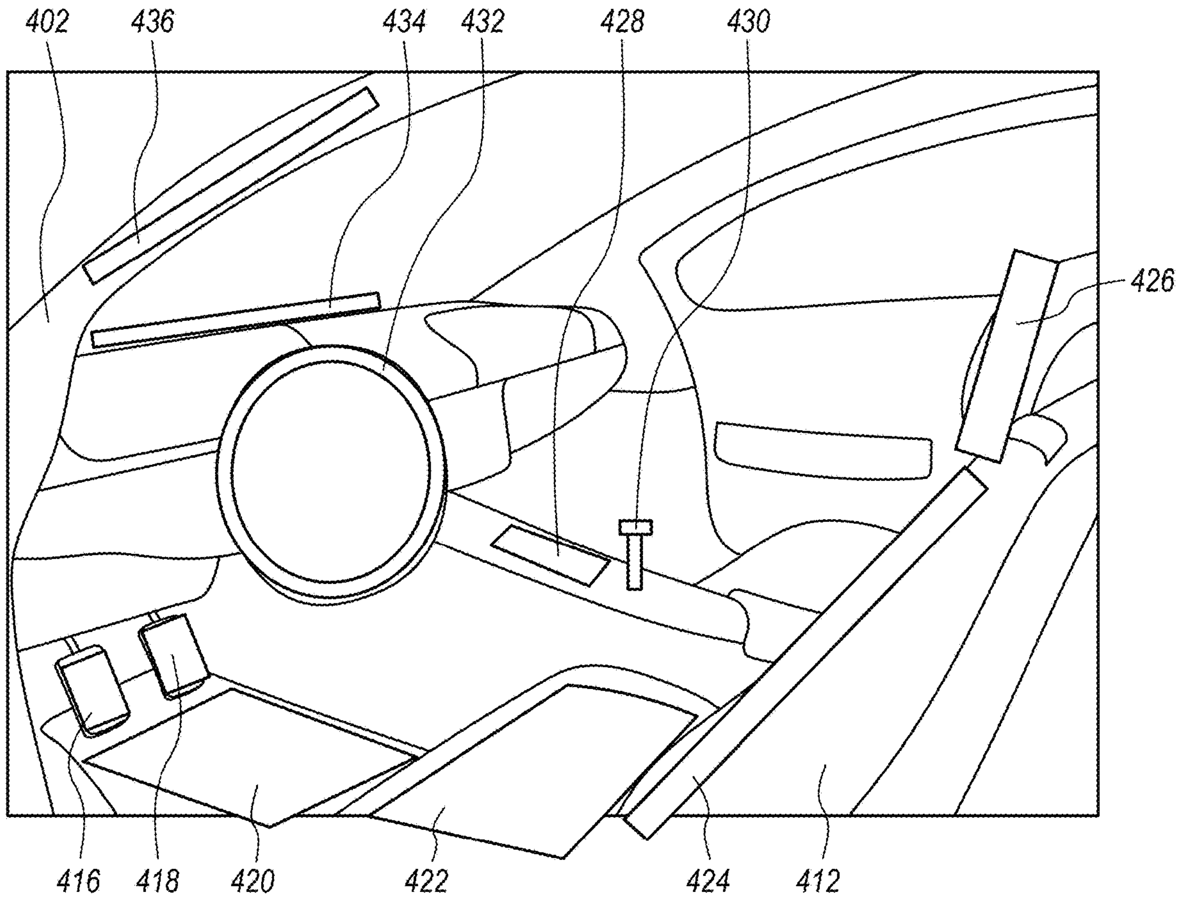
Figure 20C:
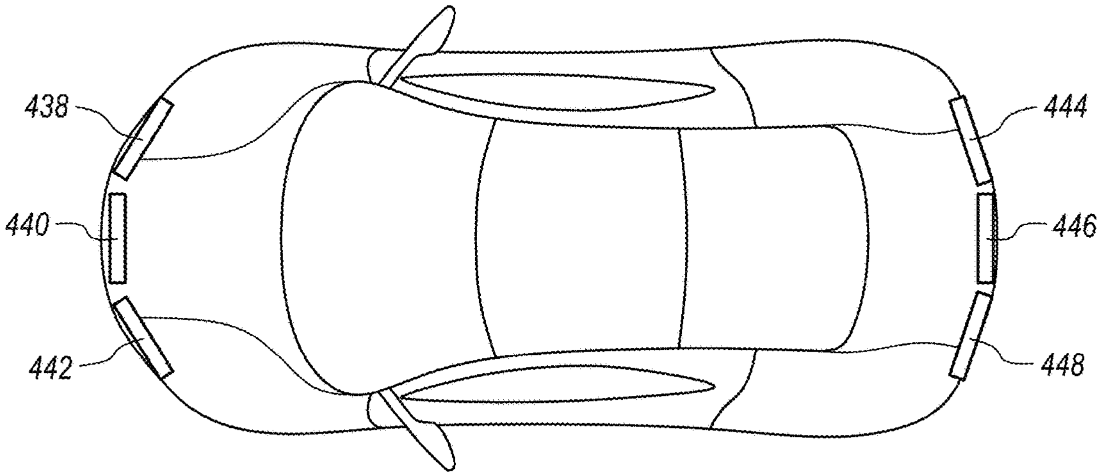

Referring to FIGS. 20A-20C, various aspects of a road vehicle, such as a computerized electric car, present opportunities for touch integration and enhancement. For example, typically a human operator will have fairly consistent touch interfacing with the pedals (404, 406), the floor (414), the driver seat (412), a steering wheel (408), aspects of a dash control and/or display interface (410), and portions of the structure of the vehicle, such as what may be known as portions of the "A pillar" (402). Each of these structures, as well as others, presents an opportunity for integrated touch sensing to assist in operation, control, and safety, for example. For example, referring to FIGS. 20B and 20C, touch sensing assemblies featuring deformable transmissive layers may be operatively coupled to various aspects of front (438, 440, 442) and rear (444, 446, 448) vehicle bumper or frame structures to assist in detecting deformation pertaining to impacts, and may be utilized to trigger safety systems such as seatbelt tighteners or passenger airbags in addition to, or as a replacement for other more conventional sensors configured to provide such functionality, such as embedded accelerometers, which may introduce more latency into the controls for such safety systems than touch sensing assemblies featuring deformable transmissive layers. In other words, placement of touch sensing assemblies featuring deformable transmissive layers may be selected to provide intrusion detection very early into an intrusion, perhaps before certain acceleration detection systems detect actionable changes in acceleration, such as at certain frame components. FIG. 20B shows various locations and positions within the interior of a vehicle which may be operatively coupled to touch sensing assemblies featuring deformable transmissive layers, such that a central controller or computing system may detect user touching and/or contact through touch sensors operatively coupled to each of the pedals (416, 418), the driver floor (420), the driver seat base (422), the driver seat back (424), the driver headrest (426), a shifter interface (430), a center control console interface (428), a steering wheel (432), a dash board portion (434), and a portion (436) of an A-pillar (402) structure. The touch sensing assemblies featuring deformable transmissive layers for each of these illustrative structures may have different geometries and comprise various materials to provide structural properties tailored to each use scenario. For example, the structural modulus of a seat base (422) touch sensor may be generally relatively low, with the information sought to be relatively low resolution (such as the general weighting profile of the operator, without particularly high resolution, to assist in determining that a child below a certain weight, or a dog, is not trying to operate the vehicle, for example); this may be compared to a center console (428) interface, wherein the structural modulus may be selected to be relatively high, such that an operator may repeatedly control various aspects of the vehicle through touches to the interface without significant physical intrusion with typical touch loading, while also providing enough intrusion with such typical touch loading to gain desired information, such as general fingerprint geometry correlation which may be analyzed at the time of starting the vehicle for a layer of biometric security pertaining to authorized users/operators.

Figure 21A:
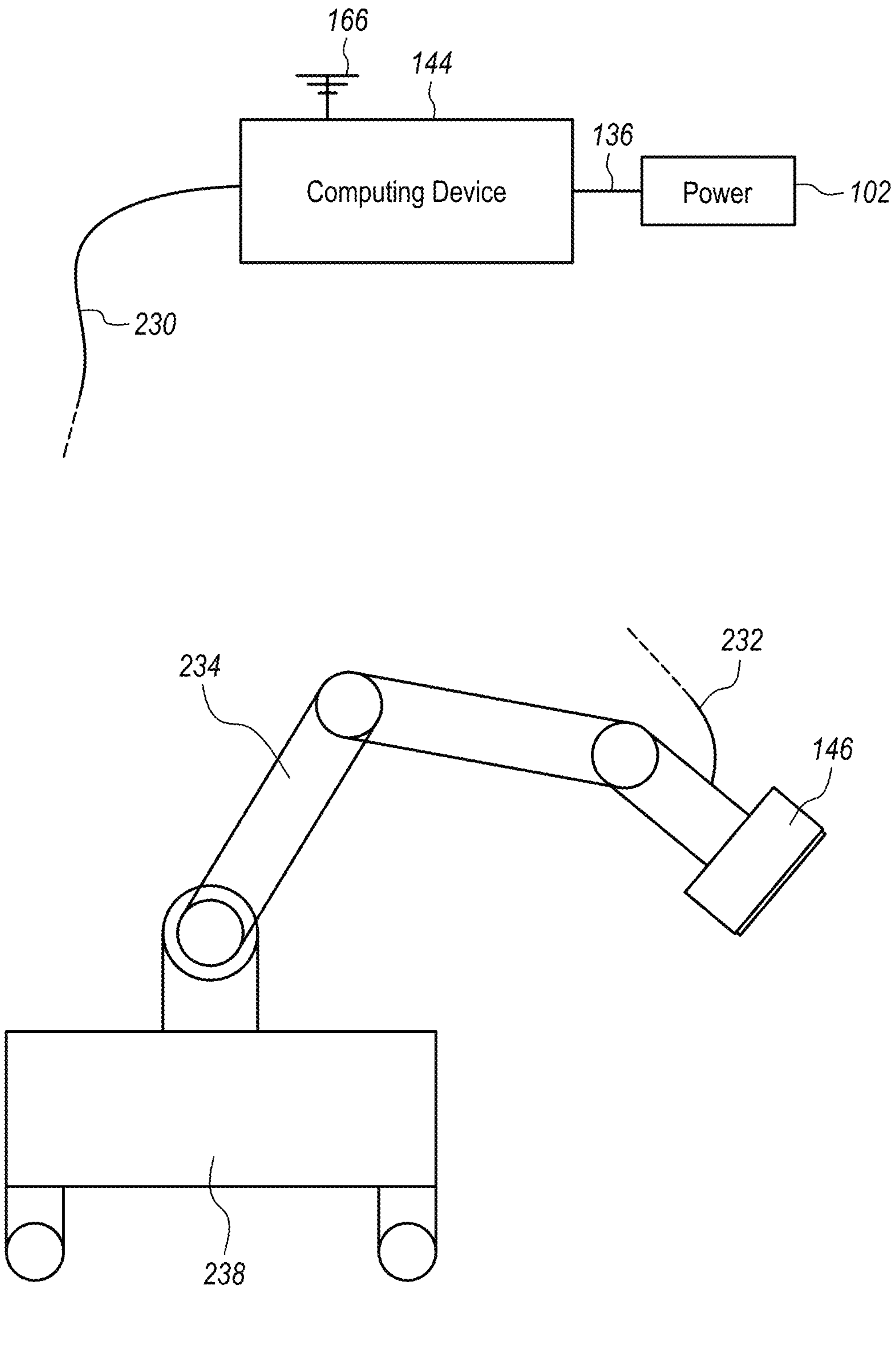
Figure 21B:
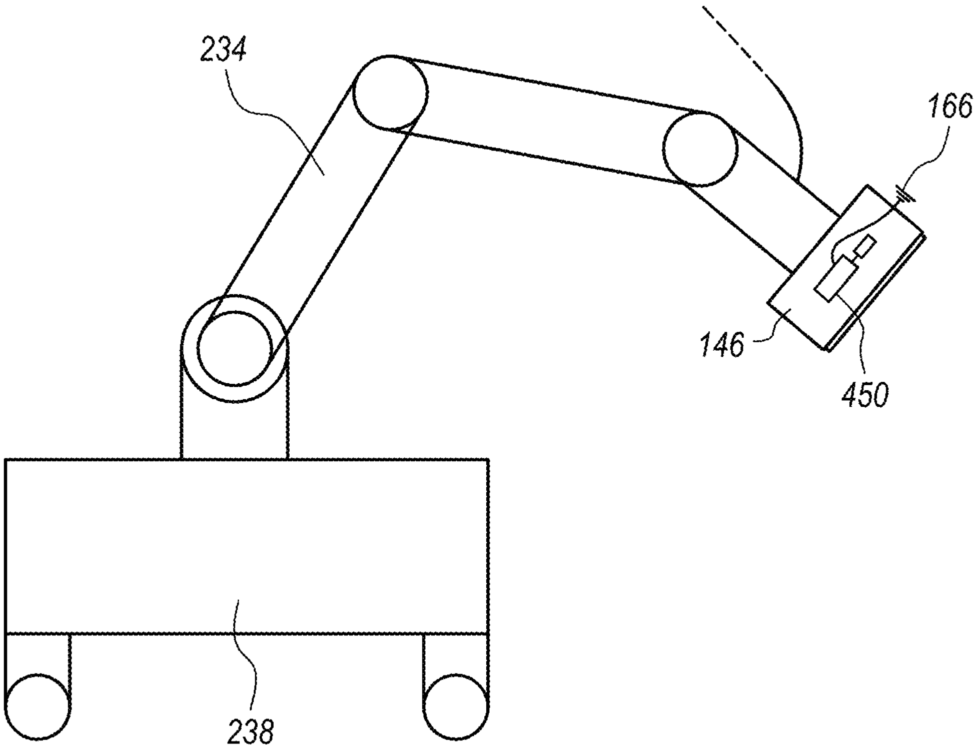

One of the challenges with integration of multiple touch sensing assemblies featuring deformable transmissive layers into systems such as automobiles or robots is interconnectivity. Referring to FIG. 21A, for example, as noted above, various aspects of control, signal, power, and/or actuation connectivity (232, 230) between a system such as a robot (234) featuring a touch sensing assembly (146), and a computing system (144), may be through hardwired leads or wireless connectivity, such as via Bluetooth®, IEEE 802.11, or various other standards. Indeed, referring to FIG. 21B, it may be desirable to have at least some components or aspects of a system such as a robot (234) featuring a touch sensing assembly (146) in a relatively tetherless form, such that, as shown in magnified views in FIGS. 21C and 21D, wireless transceivers (166) may be utilized for much, if not all, of the communications with other intercoupled systems, while power and certain levels of controller and/or computing capability may be provided by on-board computing devices (144) and power systems (102) such as embedded chipsets, microcontrollers, field programmable gate arrays, application specific integrated circuits, and the like, as well as batteries, which may be rechargeable, such as via wireless inductance. Such integration and general bias toward tetherless configuration may be termed "internet of things" variations and may be useful in many system integration challenges. For example, referring to FIG. 22, a wirelessly-connected touch sensing assembly (146) similar to that shown in FIG. 21C may be integrated into a door locking system configuration wherein thumb (452) or other digit of a person may be utilized to engage a deformable transmissive layer to provide biometric authentication/lock access functionality to facilitate unlocking. The touch sensing assembly (146) may be wirelessly connected, for example, to one or more computing systems within the associated building, and/or to one or more computing systems which may be mobile, resident in data centers, and the like.

Figure 21C:
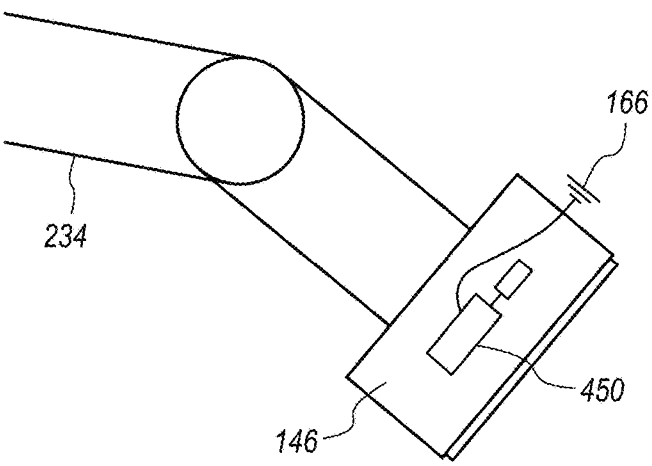
Figure 21D:
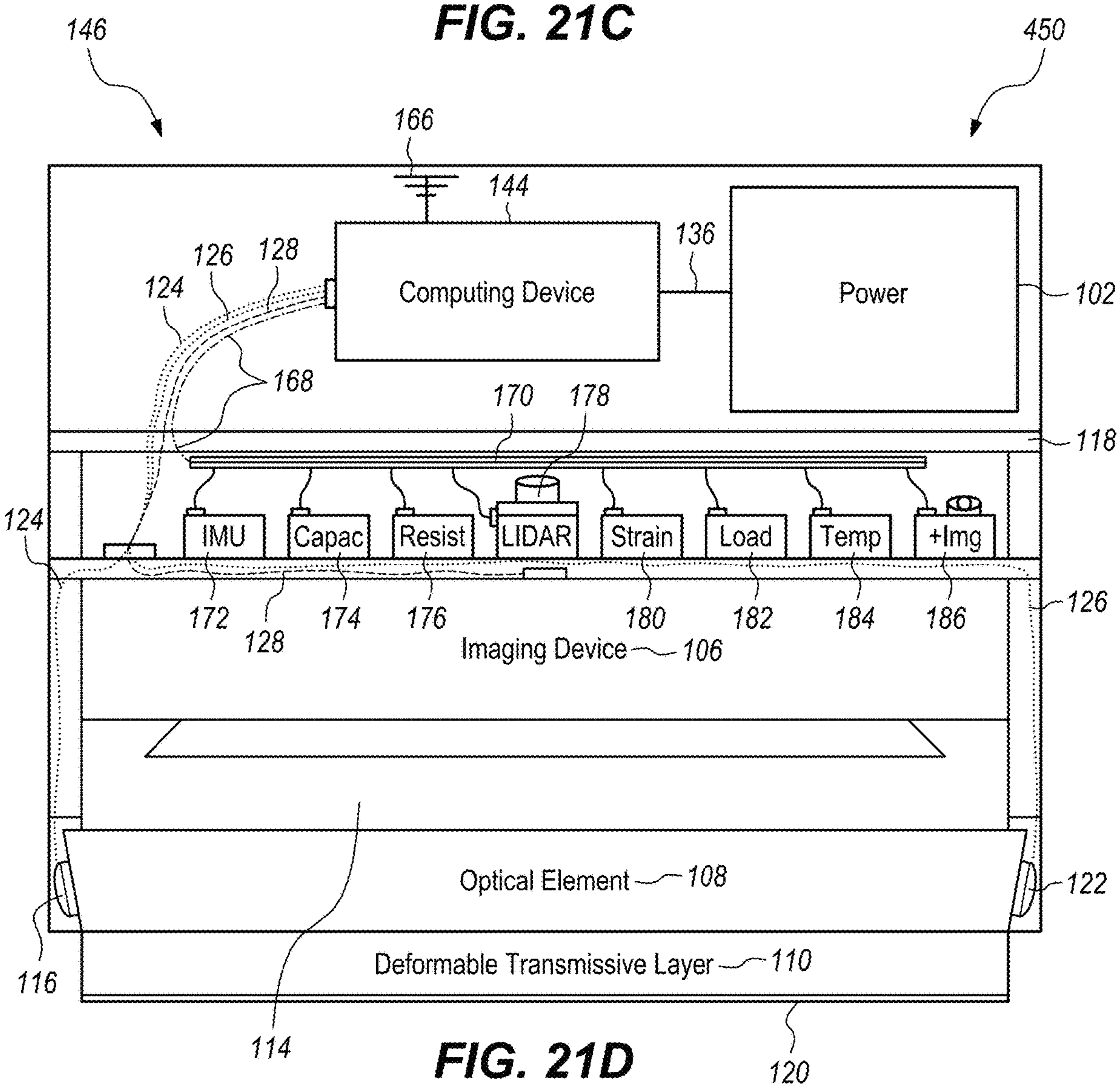
Figure 22:
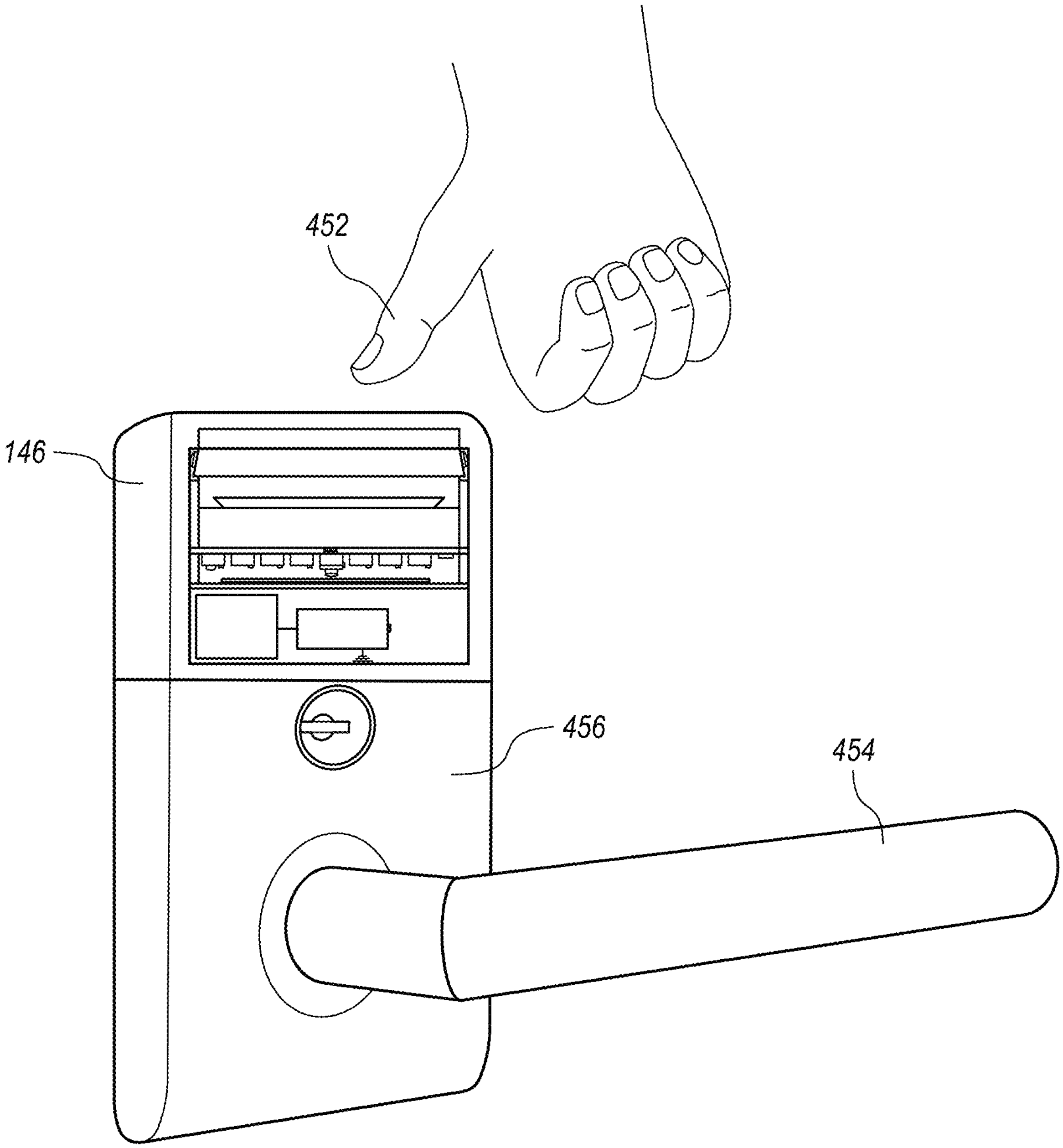
Figure 23A:
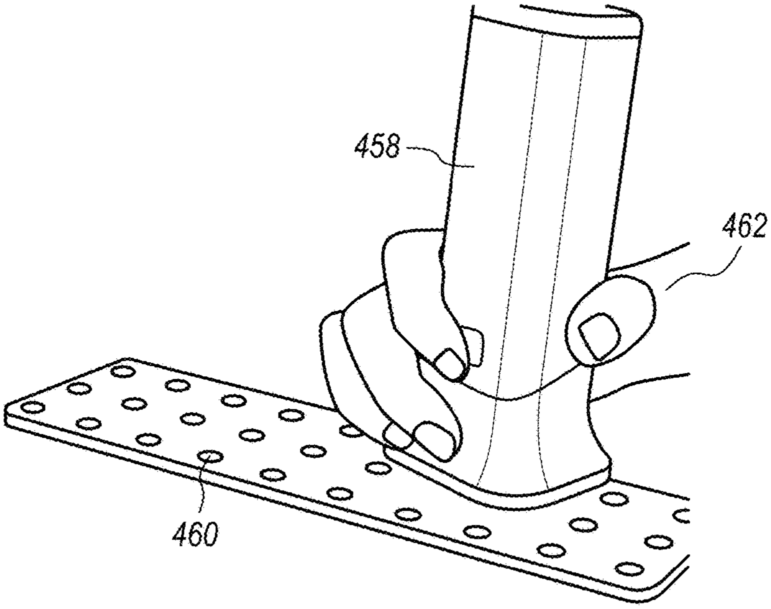
Figure 23B:
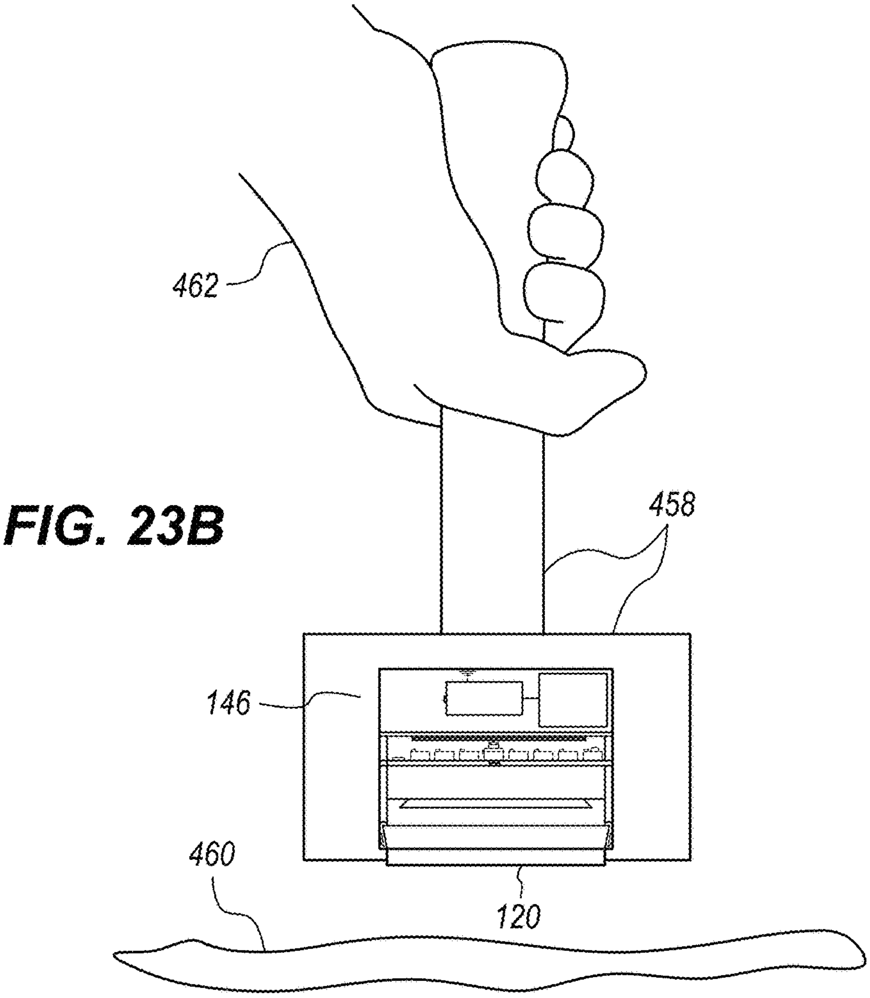

Referring to FIGS. 23A and 23B, variations of a hand-held surface (460) analysis tool featuring a wirelessly connected touch sensing assembly (146) such as that shown in FIG. 21C, wherein a housing (458) may be configured to engage the hand (462) of a user to facilitate engagement of a deformable transmissive layer and associated interface surface (120) with the surface (460) of a targeted object for surface analysis. The touch sensing assembly (146) may be wirelessly connected, for example, to one or more computing systems within the associated building, and/or to one or more computing systems which may be mobile, resident in data centers, and the like; the hand-held assembly may house its own power supply, such as a battery, for operational purposes.

Figure 24A:
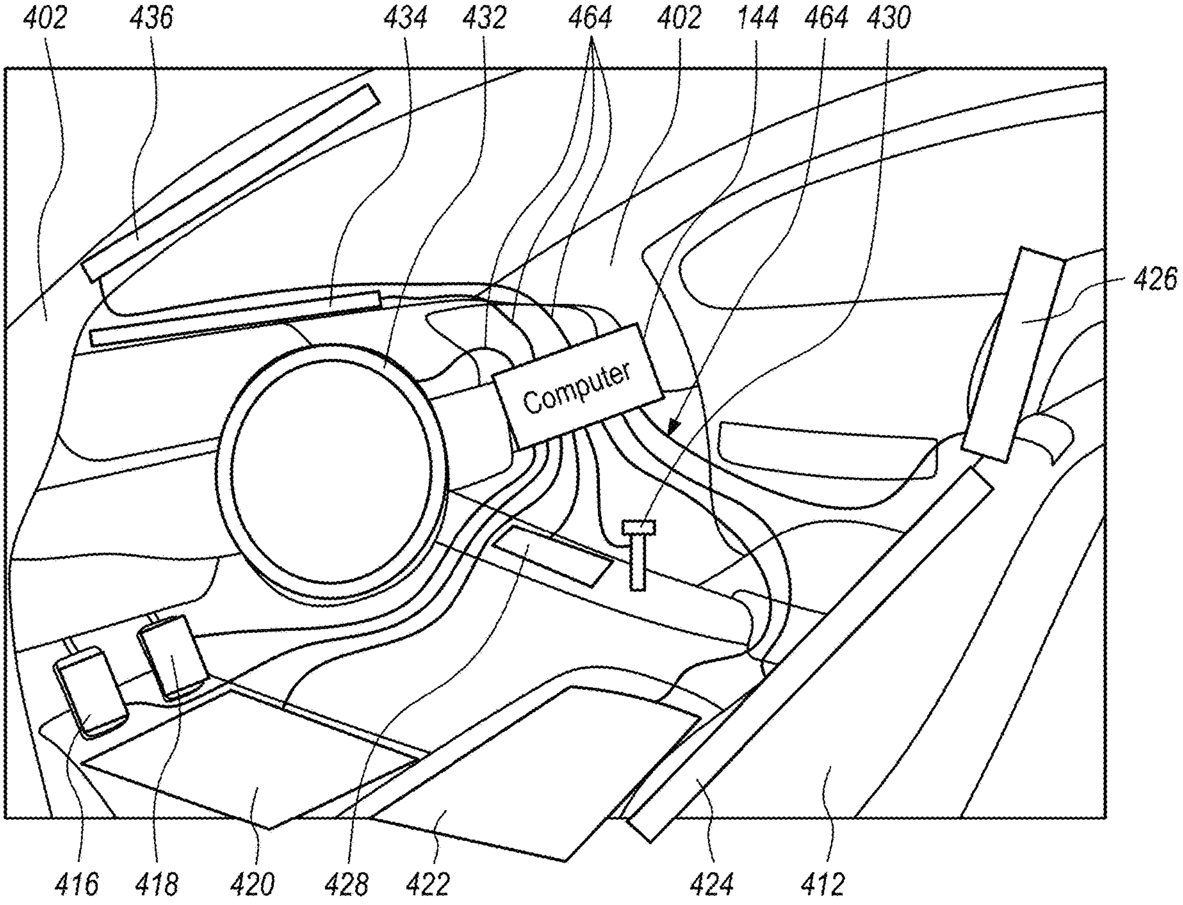

Referring to FIG. 24A, a touch sensor integrated vehicle configuration is illustrated with touch sensing assemblies operatively coupled to various structures, such as an elongate touch sensor (436) coupled to an A-pillar (402) of the vehicle, touch sensors (416, 418) coupled to the pedals, a touch sensor (420) coupled to the driver floor, a touch sensor (428) coupled to a center console, a touch sensor (422) coupled to a driver seat (412) base, a touch sensor (424) coupled to a driver seat back, a touch sensor (426) coupled to a driver headrest, a touch sensor (430) coupled to a shifter member, a touch sensor (432) coupled to the steering wheel, and a touch sensor (434) coupled to a portion of the dash of the vehicle, such sensors connected to a central computing system (144) by virtue of wire lead type of connectivity (464).

Figure 24B:
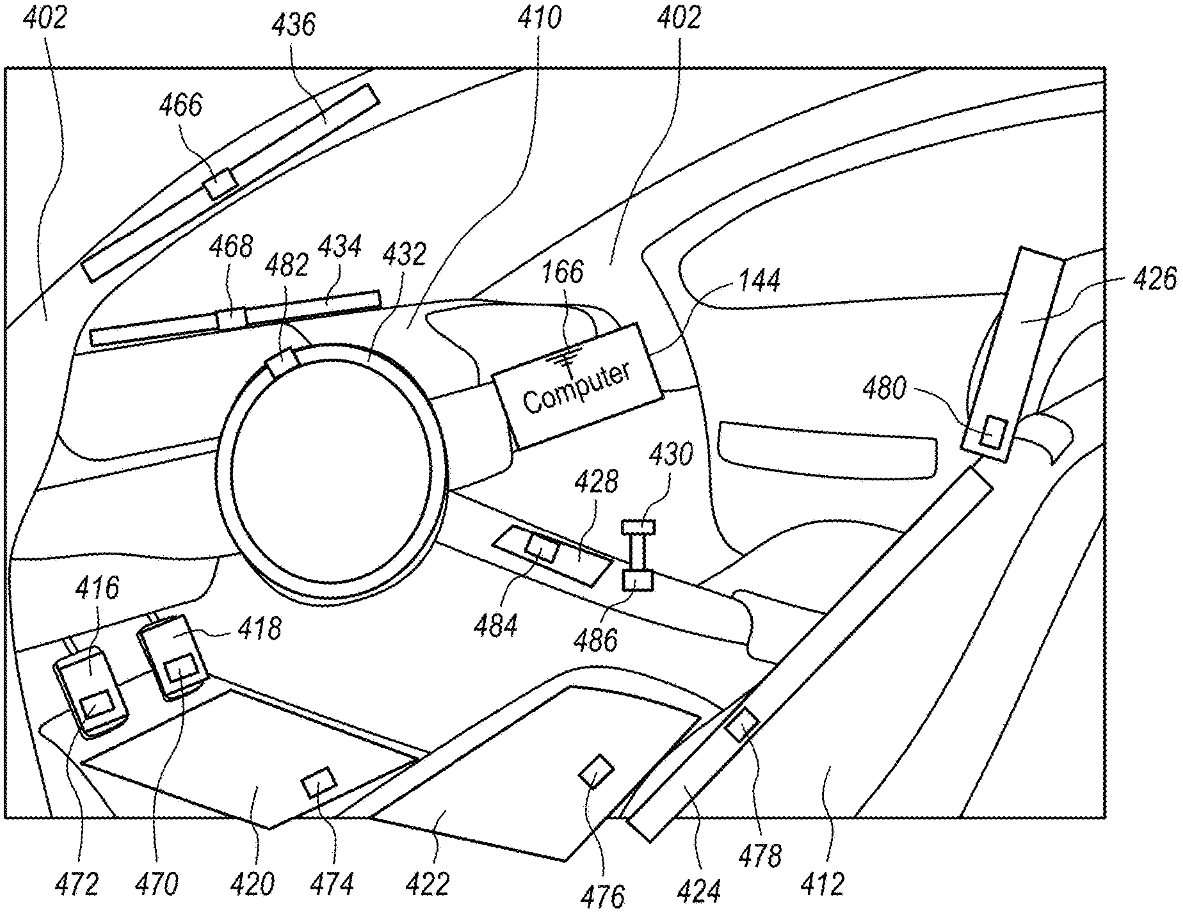

Referring to FIG. 24B, sensors in similar locations which have wireless connectivity to a transceiver (166) of a central computing system (144) may assist in simplifying such integration by removing the need for certain connectivity wiring, and may also remove the need for power supply wiring as well in variations wherein the sensors are operatively coupled to small power supplies such as batteries which may, for example, be rechargeable, such as via wireless inductance. Thus an A-pillar touch sensor (436) is shown operatively coupled to a wireless transceiver (466); pedal touch sensors (416, 418) are shown operatively coupled to wireless transceivers (472, 470, respectively); a floor touch sensor (420) is shown operatively coupled to a wireless transceiver (474); a seat base touch sensor (422) is shown operatively coupled to a wireless transceiver (476); a seat back touch sensor (422) is shown operatively coupled to a wireless transceiver (478); a head rest touch sensor (426) is shown operatively coupled to a wireless transceiver; a shifter assembly touch sensor (430) is shown operatively coupled to a wireless transceiver (486); a center console touch sensor (428) is shown operatively coupled to a wireless transceiver (484); a steering wheel touch sensor (432) is shown operatively coupled to a wireless transceiver (482); and a dash (410) touch sensor (436) is shown operatively coupled to a wireless transceiver (466), each of said touch sensors being wirelessly connected (166) to the central computing system (144) of the vehicle.

Figure 25A:
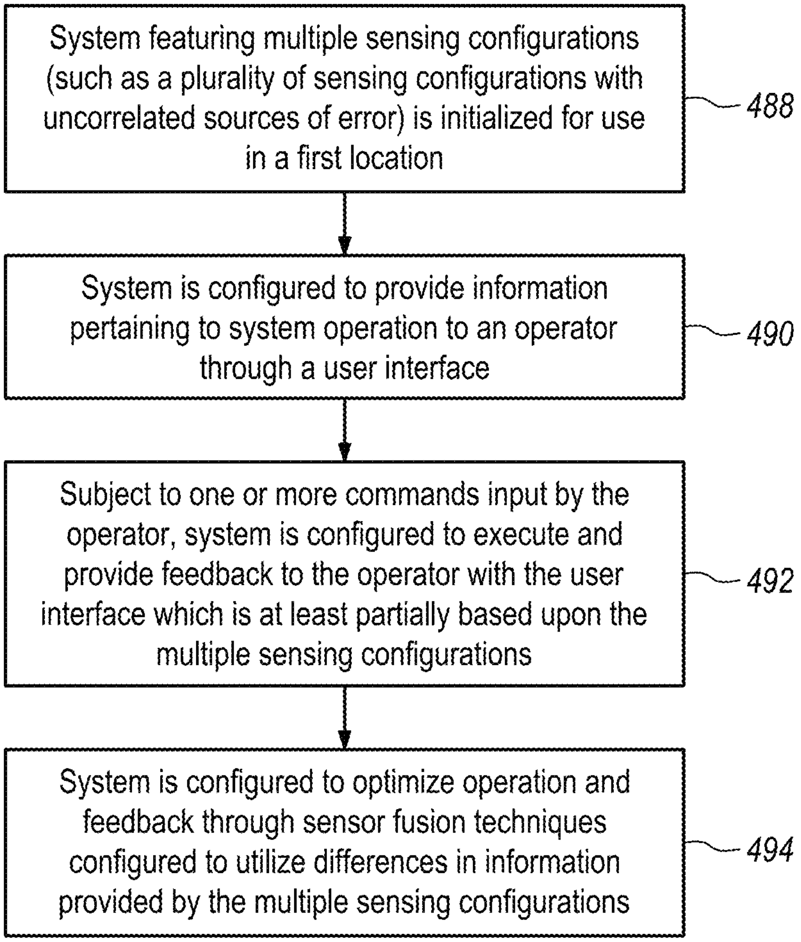

Referring back to a configuration such as that of FIG. 19A, aspects of touch sensing may be utilized to improve and/or enhance the perception of certain operations at a local workstation for a user, and the value of having a plurality of sources of sensing data, such as with uncorrelated error configurations for socalled "sensor fusion" applicability, has been discussed. Referring to FIG. 25A, in one embodiment, a system featuring multiple sensing configurations (such as a plurality of sensing configurations with uncorrelated sources of error) is initialized for use in a first location (488). The system may be configured to provide information pertaining to system operation to an operator through a user interface (490). Subject to one or more commands input by the operator, the system may be configured to execute and provide feedback to the operator with the user interface which is at least partially based upon the multiple sensing configurations (492). The system may be configured to optimize operation and feedback through sensor fusion techniques configured to utilize differences in information provided by the multiple sensing configurations (494).

Figure 25B:
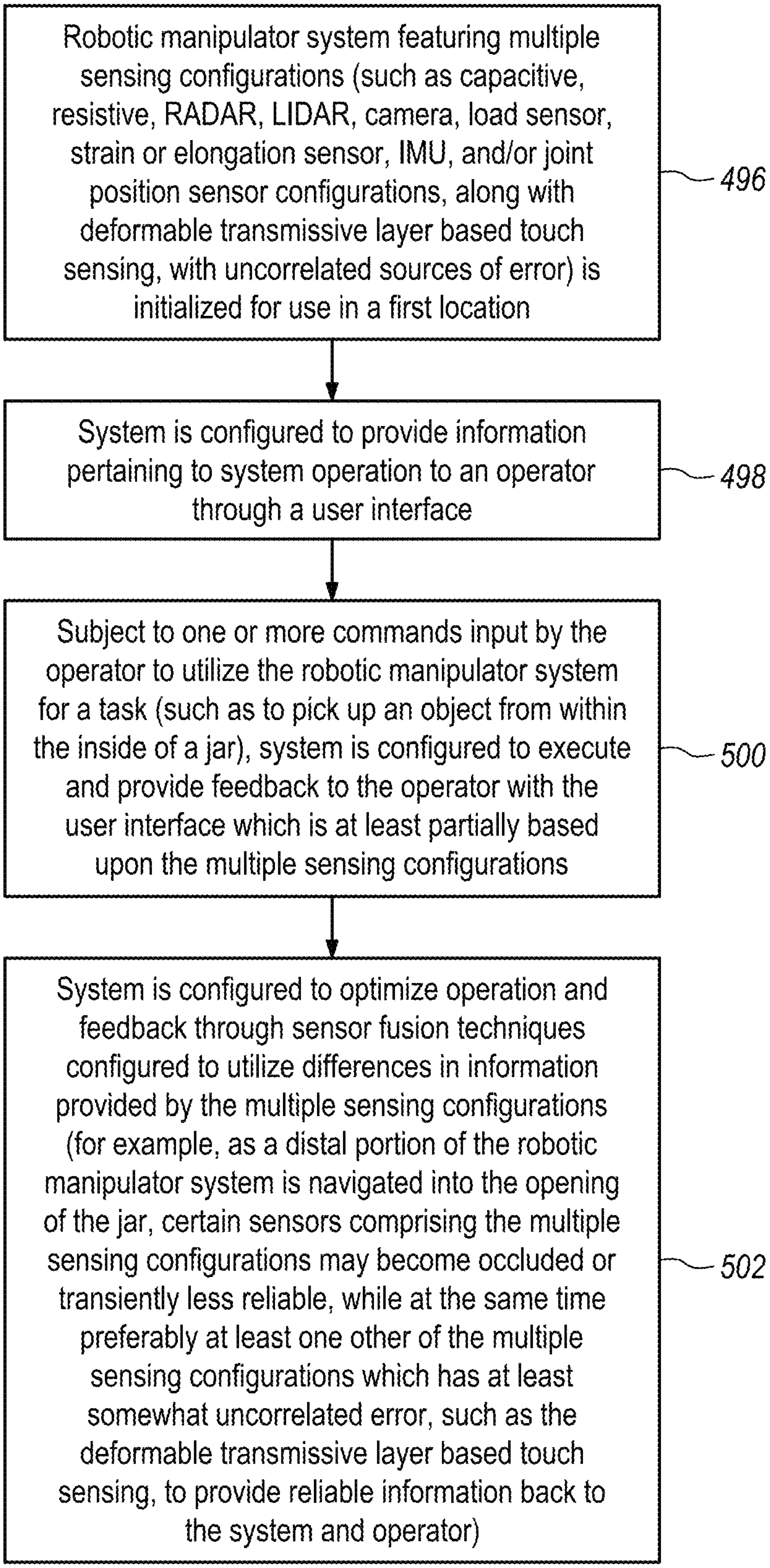

Referring to FIG. 25B, in reference to a system comprising an electromechanical arm or manipulator such as described in reference to FIGS. 21A-21D, a robotic manipulator system featuring multiple sensing configurations (such as capacitive, resistive, RADAR, LIDAR, camera, load sensor, strain or elongation sensor, IMU, and/or joint position sensor configurations, along with deformable transmissive layer based touch sensing, with uncorrelated sources of error) may be initialized for use in a first location (496). The system may be configured to provide information pertaining to system operation to an operator through a user interface (498). Subject to one or more commands input by the operator to utilize the robotic manipulator system for a task (such as to pick up an object from within the inside of a jar), system is configured to execute and provide feedback to the operator with the user interface which is at least partially based upon the multiple sensing configurations (500). The system may be configured to optimize operation and feedback through sensor fusion techniques configured to utilize differences in information provided by the multiple sensing configurations (for example, as a distal portion of the robotic manipulator system is navigated into the opening of the jar, certain sensors comprising the multiple sensing configurations may become occluded or transiently less reliable, while at the same time preferably at least one other of the multiple sensing configurations which has at least somewhat uncorrelated error, such as the deformable transmissive layer based touch sensing, to provide reliable information back to the system and operator) (502).

Figure 26:
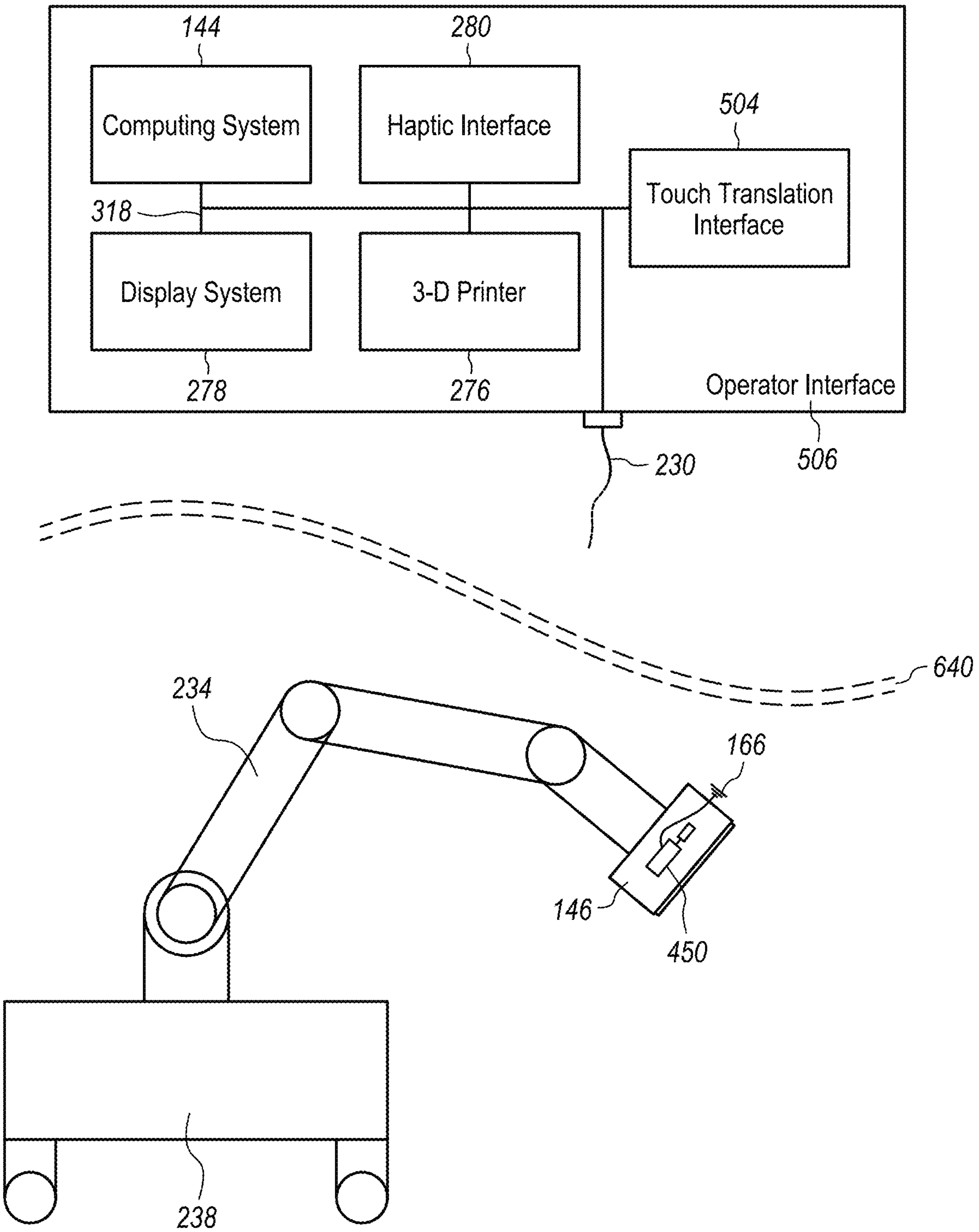
Figure 27:
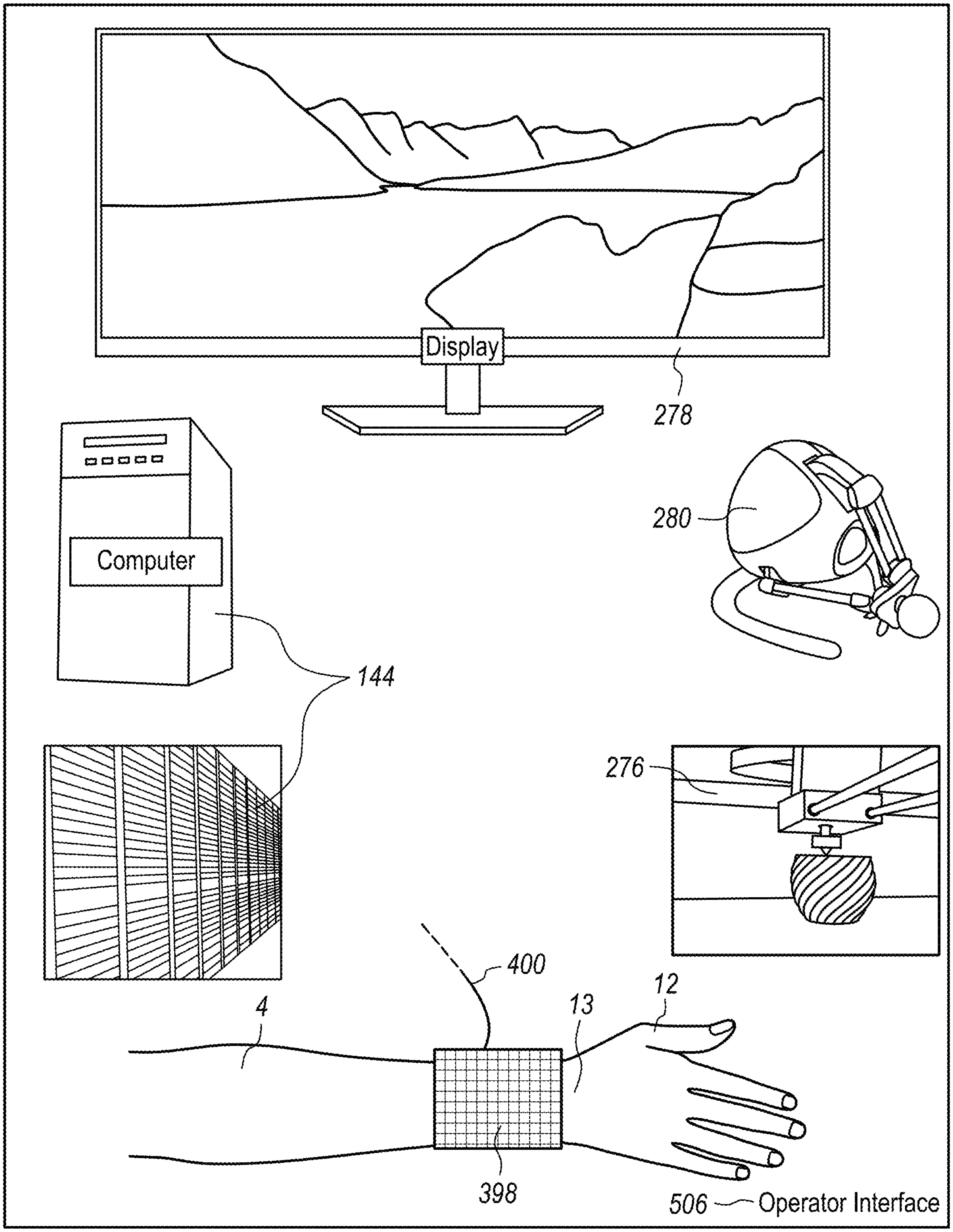

Referring back to FIG. 19B, integration of one or more touch translation interfaces (398), such as at the wrist (13) of the user (4), may provide enhanced perception regarding activities and engagements at a remote location. FIG. 26 illustrates a configuration wherein an operator interface (506) local to a user or operator may feature a computing system (144) intercoupled (318) with each of a haptic interface (280), a display system (278), a 3-D printer (276), and a touch translation interface (504). The operator interface (506), positioned local to the user, generally will be separated (640) from the remote manipulation system (such as a robotic arm 234 featuring a touch sensing assembly 146, as illustrated in FIG. 26), such as by inches, feet, miles, or thousands of miles, depending upon the user configuration, task at hand, and connectivity (230, 166) alternatives, such as wired or wireless connectivity. Referring to FIG. 27, in further illustrative detail, an operator interface (506) may comprise interconnected (400) computing (144), master input device/controller (a haptic-enabled variation shown 280), 3-D printing (276), and display (278) resources, as well as a touch translation interface (398), such as the variation illustrated which may be removably coupleable to the wrist (13) of a user (4) and be configured to provide one or more components of sensation which may be perceptively linked to activities at a remote location, as described in further detail below.

Figure 28A:
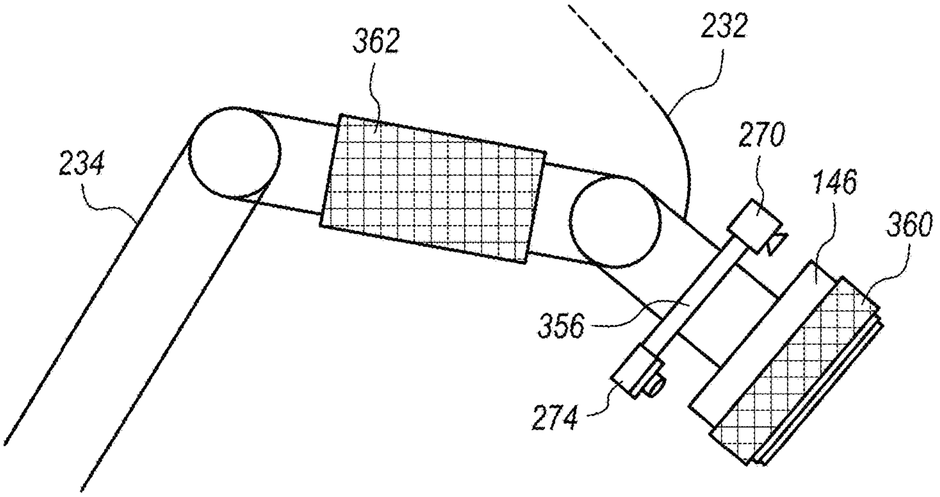

In various embodiments featuring one or more touch translation interfaces at the operator interface (506), it may be desirable to position the one or more touch translation interfaces at locations relative to the user's (4) anatomy which have some kinematic relevance to activities of components at the remote manipulation or actuation site. For example, referring to FIG. 28A, in an embodiment wherein a robotic arm (234) is to be operated at a remote site, and wherein the robotic arm (234) has a kinematic portion which at least somewhat resembles a "wrist", a touch sensing assembly (362) may be functionally coupled to a touch translation interface which may be removably couple to the wrist (13) of a user (4) at an intercoupled operator interface (503). In other words, it may enhance the intuitive level of interactivity between a local user/operator from an operator interface (503) and a remote robotic manipulator if touches/contacts sensed at the "wrist" of the robot are translated to the wrist of the user. Thus in various embodiments, attempts may be made to provide at least somewhat kinematically similar pairings between remote and local touch sensing and translation resources.

Figure 28B:
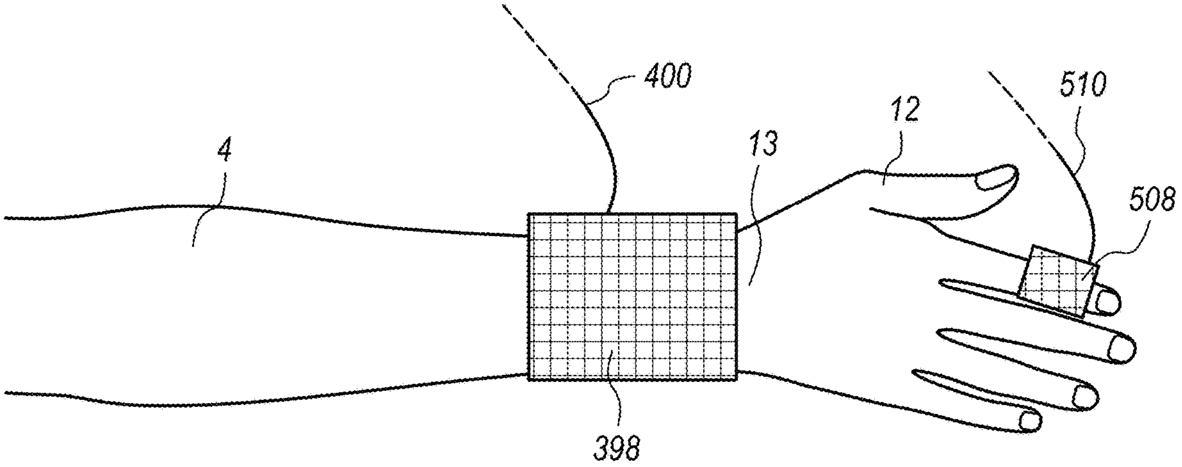

Referring again to FIG. 28A, it also should be emphasized that more than one touch sensing assembly may be integrated for a given implementation, such as an additional at least partially perimetric touch sensing assembly (360) positioned around the distal end of the robotic arm (234) at a location around the sides of the touch sensor (146) and intercoupled (232) along with the other more proximal touch sensing assembly (362) to a computing resource. Referring to FIG. 28B, in a somewhat kinematically similar functional pairing configuration, a more distal touch translation interface (508), such as a finger-sized cuff removably coupleable to an index finger, may be operatively coupled (510), such as via wired or wireless connectivity, to a computing system and configured to translate touch or contact sensed at the more distal touch sensing assembly (360) positioned around the distal end of the robotic arm (234) at the remote location shown in FIG. 28A; the more proximal touch sensing assembly (398) may be removably coupled to the forearm or wrist (13) of the user (4) and operatively coupled (400), such as via wired or wireless connectivity, to a computing system and configured to translate touch or contact sensed at the more proximal touch sensing assembly (362) positioned around the "wrist" of the robotic arm (234) at the remote location shown in FIG. 28A.

Figure 29A:
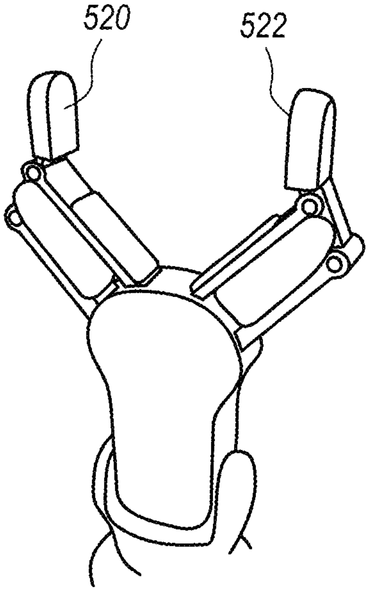
Figure 29B:
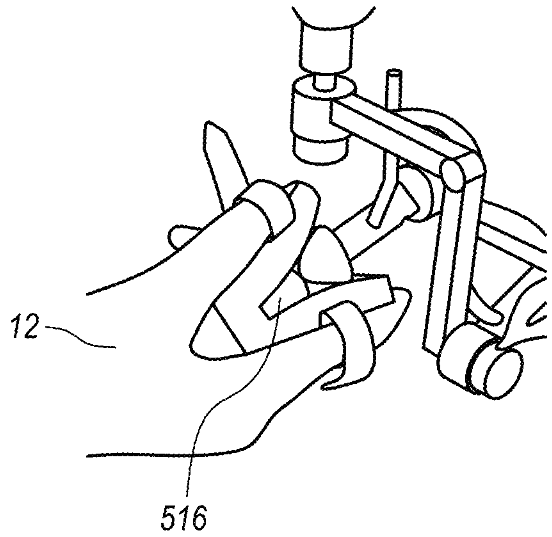

Referring to FIG. 29A, a grasper (518) style end effector is illustrated with two opposing movable members (520, 522) which may be controllably advanced toward each other for a grasp. In various embodiments, touch sensing assemblies may be integrated into and operably coupled with these opposing movable members (520, 522) to assist with perception of actions related thereto. Referring to FIG. 29B, a master input device configuration (516) configured to allow two opposing digits of a user's hand (12) to remotely control a grasping action, such as that of a grasper such as that illustrated in FIG. 29A, in an at least partially kinematically similar manner (i.e., by moving opposing digits toward each other, the opposing movable members 520, 522 may be moved toward each other).

Figure 29C:
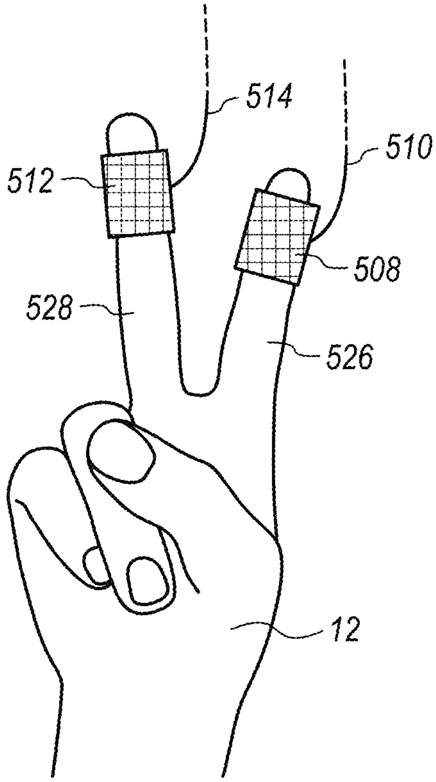
Figure 29D:
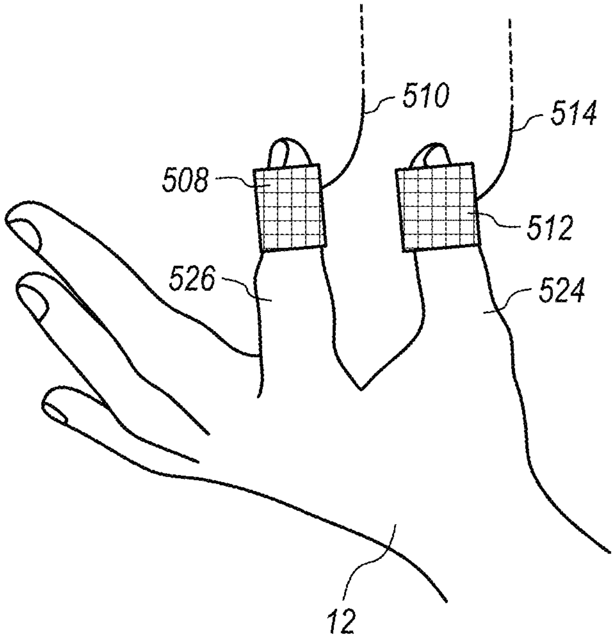

Referring to FIGS. 29C and 29D, a plurality of removably coupleable touch translation interfaces (508, 512) may be operatively coupled (510, 514, respectively), such as via wired or wireless connectivity, to a computing system which may be operatively coupled to a remote instrument such as the grasper (518) illustrated in FIG. 29A to provide enhanced intuitiveness for the user or operator (again, by moving opposing digits toward each other, the opposing movable members 520, 522 may be moved toward each other, and touch/contact information detected by touch sensing assemblies at the opposing movable members 520, 522 may be utilized as inputs to sensations created for the user at the touch translation interfaces 508, 512). FIG. 29C illustrates an embodiment wherein touch translation interfaces (508, 512) are removably coupled to a user's index (526) and middle (528) fingers, while FIG. 29D illustrates an embodiment wherein touch translation interfaces (508, 512) are removably coupled to a user's index finger (526) and thumb (524).

Figure 30A:
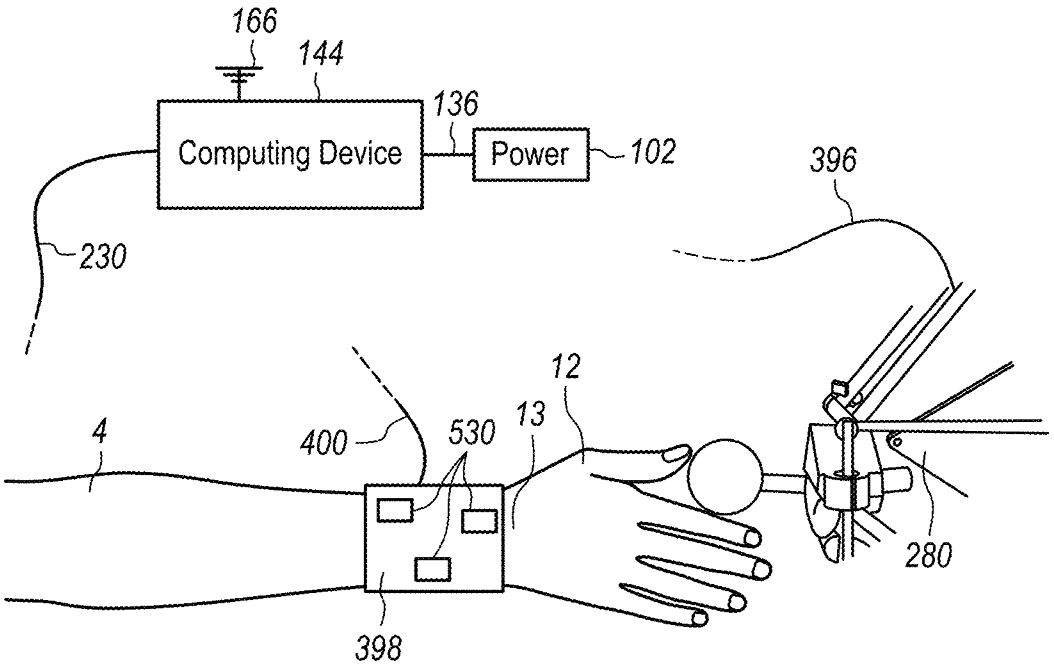
Figure 30B:
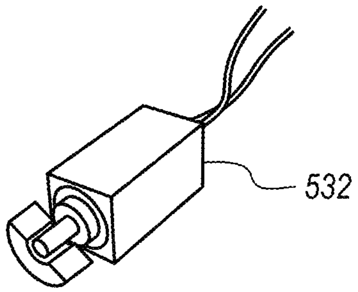
Figure 30C:
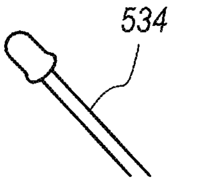
Figure 30D:
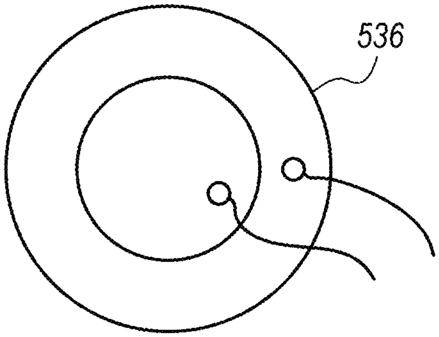
Figure 30E:
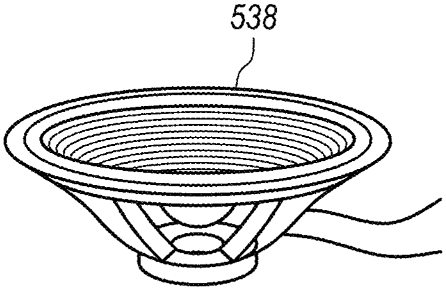
Figure 30F:
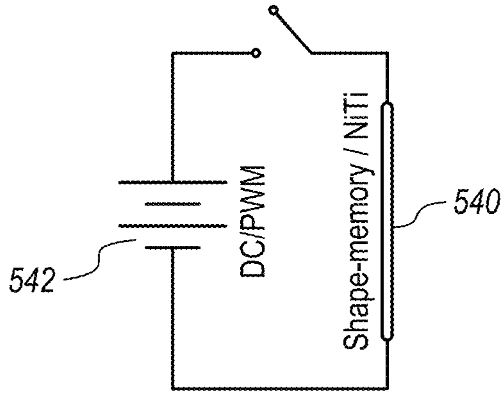
Figure 30G:
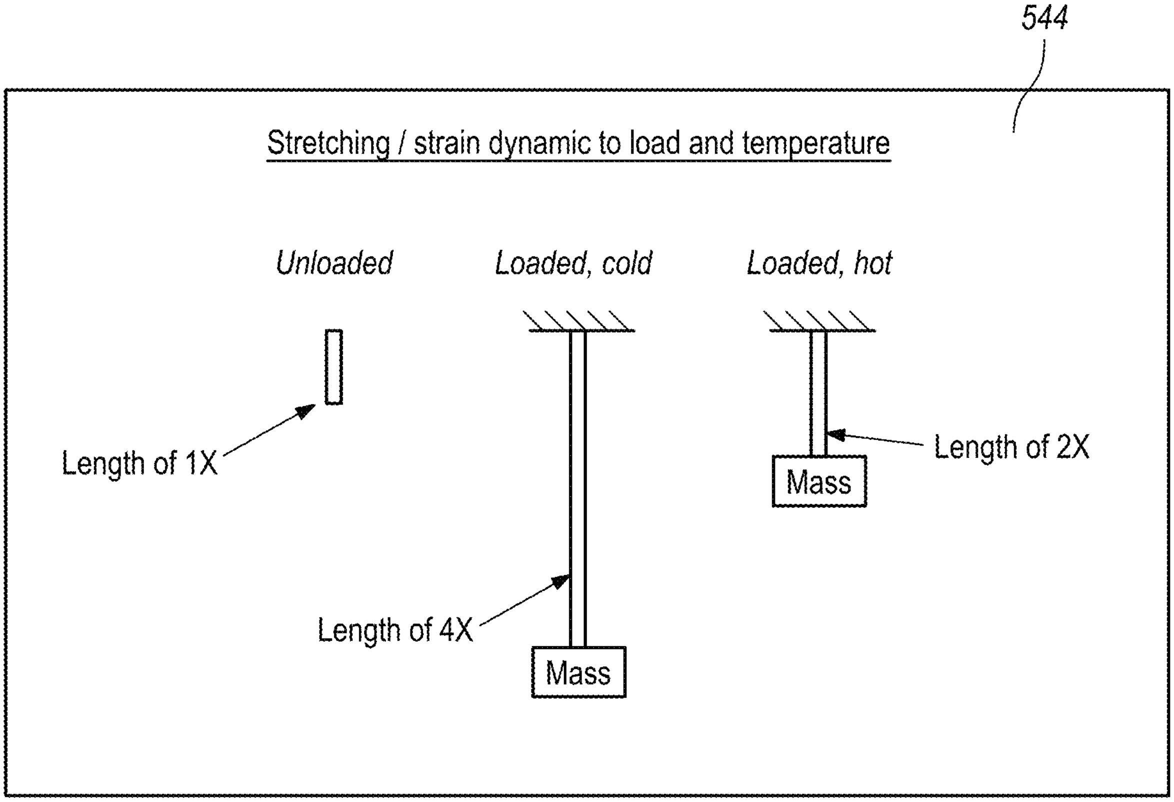

Referring to FIG. 30A, a touch translation interface (398) removably coupleable to a user (4) is illustrated with operative coupling, such as via wired or wireless connectivity (400, 230, 166) to a computing system (144). The touch translation interface (398) may comprise a single touch translation element, or a plurality (530) of touch translation elements, as shown, to assist in providing the user (4) with an enhanced perception of touches and/or contacts with an interconnected touch sensing assembly. Referring to FIGS. 30B-33B, various types, combinations, and permutations of touch translation elements may be utilized in the various embodiments. Referring to FIG. 30B, an imbalanced electric motor (532) may be utilized as a touch translation element to provide vibratory and frequency variable touch translation. Referring to FIG. 30C, a light emitting diode ("LED") (534) may be utilized as a touch translation element, to provide a visual translation to the user that a contact or touch has occurred; brightness output may be varied in accordance with magnitude of touch or contact loading, and various colors/wavelengths may be utilized. Referring to FIG. 30D, a piezoelectric assembly (536) may be utilized as a touch translation element, to provide a relatively high frequency vibratory response in accordance with contact or touch, and frequency and/or intensity may be varied in accordance with magnitude of touch or contact loading. Referring to FIG. 30E, an audio speaker assembly (538) may be utilized as a touch translation element, to provide an audible response in accordance with contact or touch, and frequency and/or intensity may be varied in accordance with magnitude of touch or contact loading. Referring to FIGS. 30F and 30G, one or more socalled "shape memory alloy" ("SMA") segments (540) may be utilized as a touch translation element, comprising alloy materials such as nickel/titanium. As shown in the chart (544) of FIG. 30G, for example, commercially available SMA alloys may be configured to shrink in size fairly dramatically (such as in the range of shrinking to ½ of the cold length when heated through a current-passing circuit such as that shown in FIG. 30F; 542), and thus may be utilized to controllably apply and/or relax a mild hoop-stress and/or hoop-strain when formed into a hoop or cuff type configuration, as shown, for example, in the variations illustrated in FIGS. 32A and 32B.

Figure 31A:
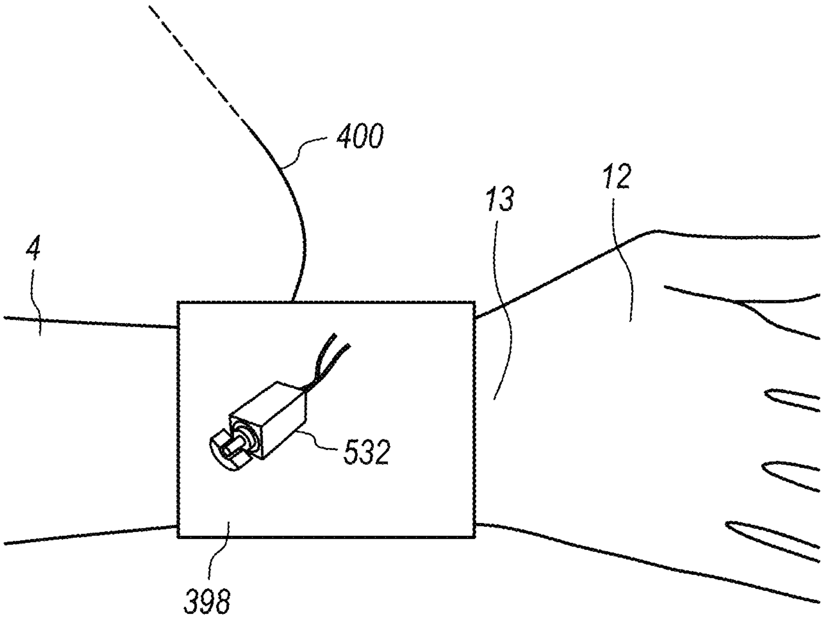
Figure 31B:
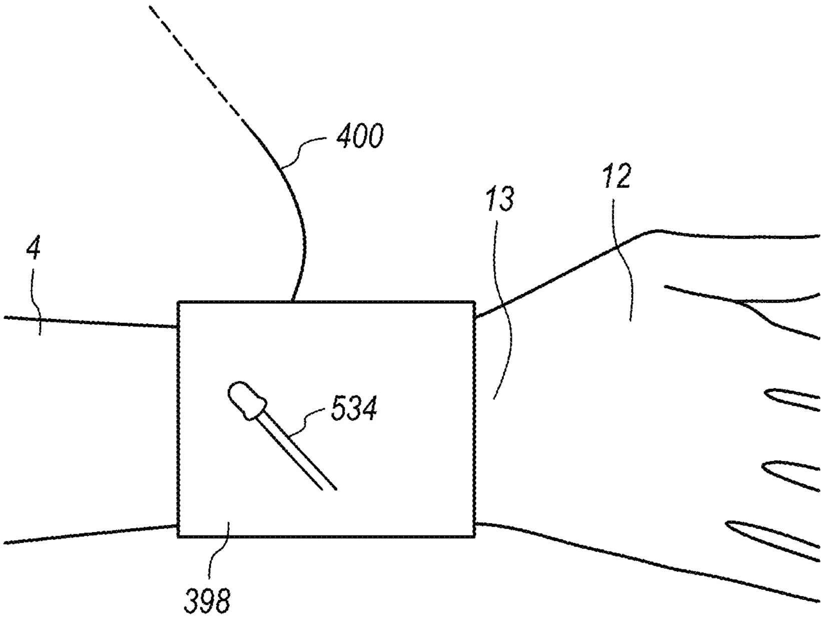
Figure 31C:
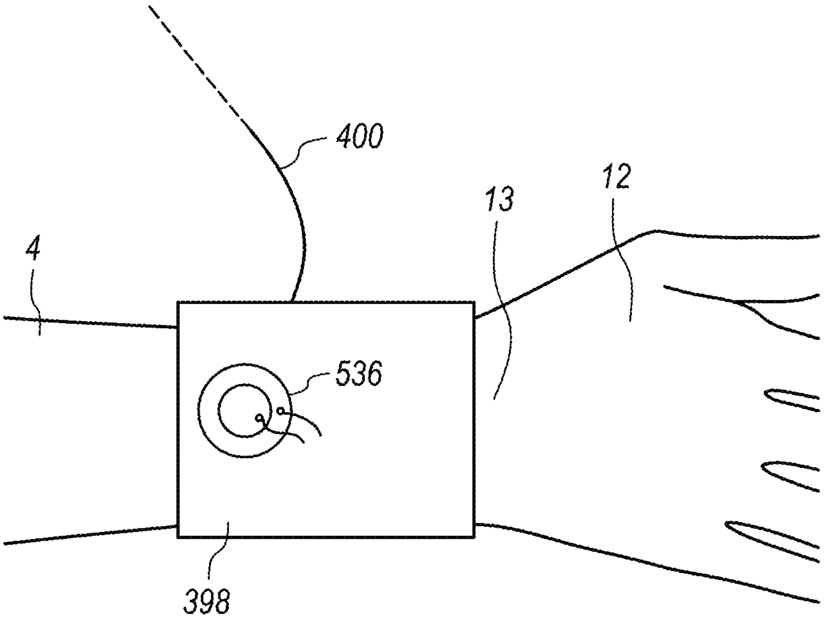
Figure 31D:
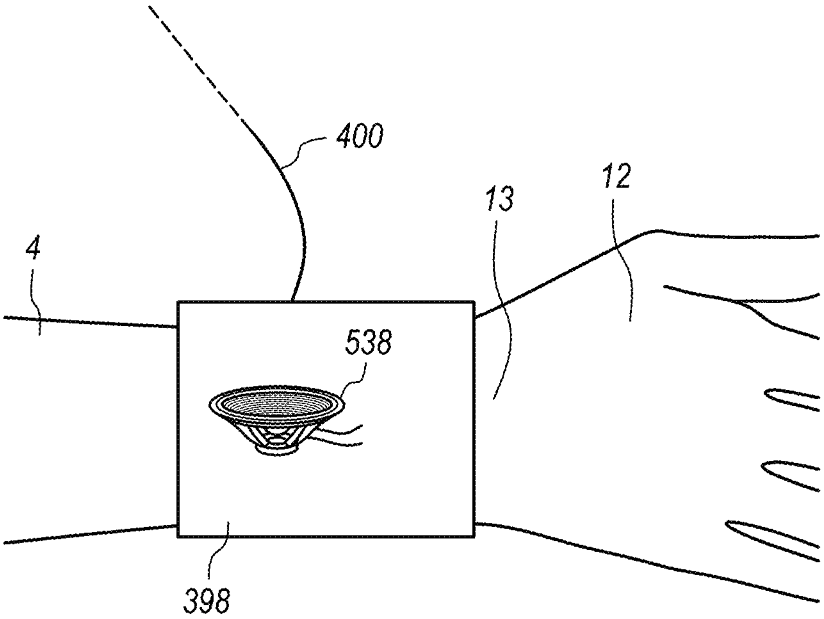
Figure 31E:
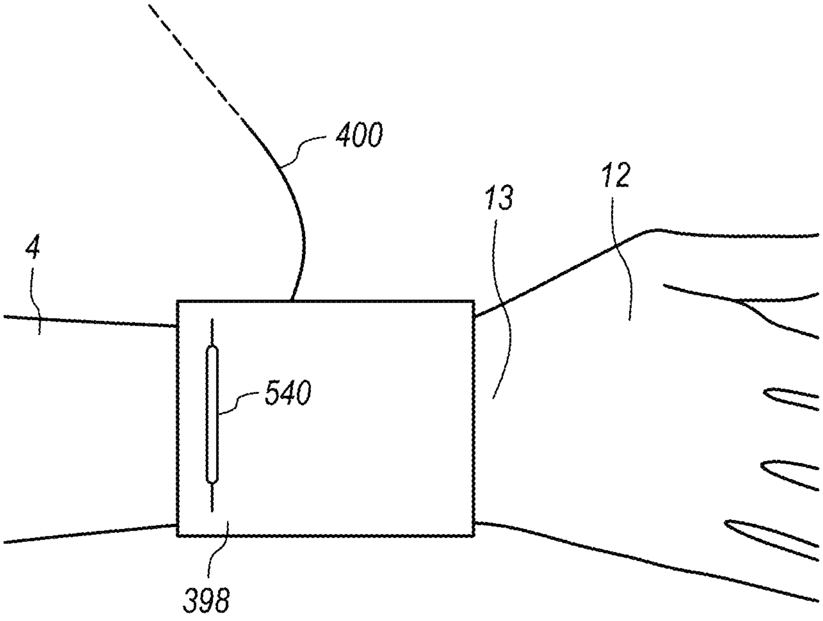
Figure 32A:
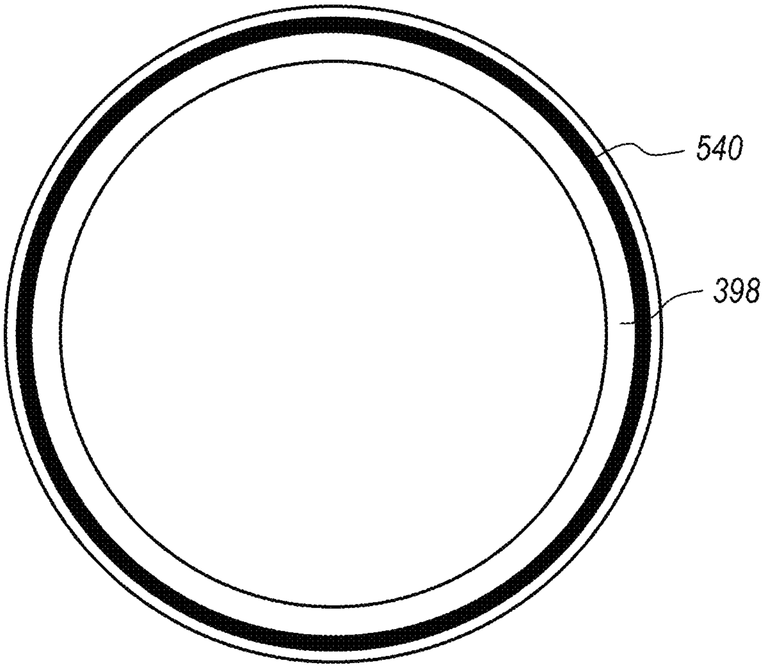
Figure 32B:
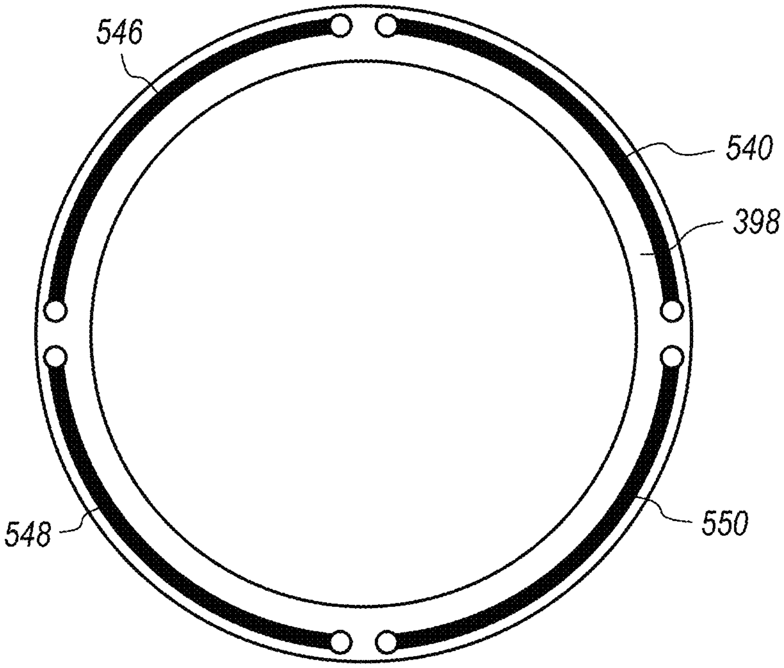

Thus referring to FIG. 31A, a touch translation interface (398), operatively coupled (400), such as via wired or wireless communications configuration, to a computing system, may be removably coupled to a user (4), such as at a wrist (13) position, and may comprise a controllably actuatable haptic actuator motor, such as an imbalanced motor (532). Referring to FIG. 31B, a touch translation interface (398), operatively coupled (400), such as via wired or wireless communications configuration, to a computing system, may be removably coupled to a user (4), such as at a wrist (13) position, and may comprise one or more LEDs (534). Referring to FIG. 31C, a touch translation interface (398), operatively coupled (400), such as via wired or wireless communications configuration, to a computing system, may be removably coupled to a user (4), such as at a wrist (13) position, and may comprise a controllably actuatable piezoelectric assembly (536). Referring to FIG. 31D, a touch translation interface (398), operatively coupled (400), such as via wired or wireless communications configuration, to a computing system, may be removably coupled to a user (4), such as at a wrist (13) position, and may comprise a controllably actuatable audio speaker assembly (538). Referring to FIG. 31E, a touch translation interface (398), operatively coupled (400), such as via wired or wireless communications configuration, to a computing system, may be removably coupled to a user (4), such as at a wrist (13) position, and may comprise one or more controllably actuatable shape memory alloy segments (540). FIGS. 32A and 32B illustrate that when viewed from an orthogonal view, a configuration such as that illustrated in FIG. 31E may comprise a single SMA segment (540), as in the variation of FIG. 32A, or a plurality of SMA segments (540, 546, 548, 550), each of which may be individually controllable.

Figure 33A:
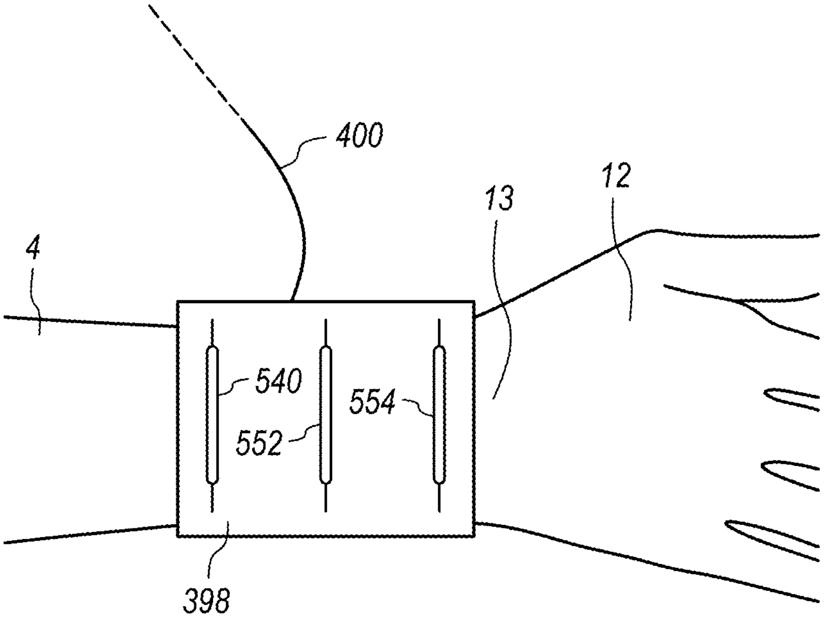
Figure 33B:
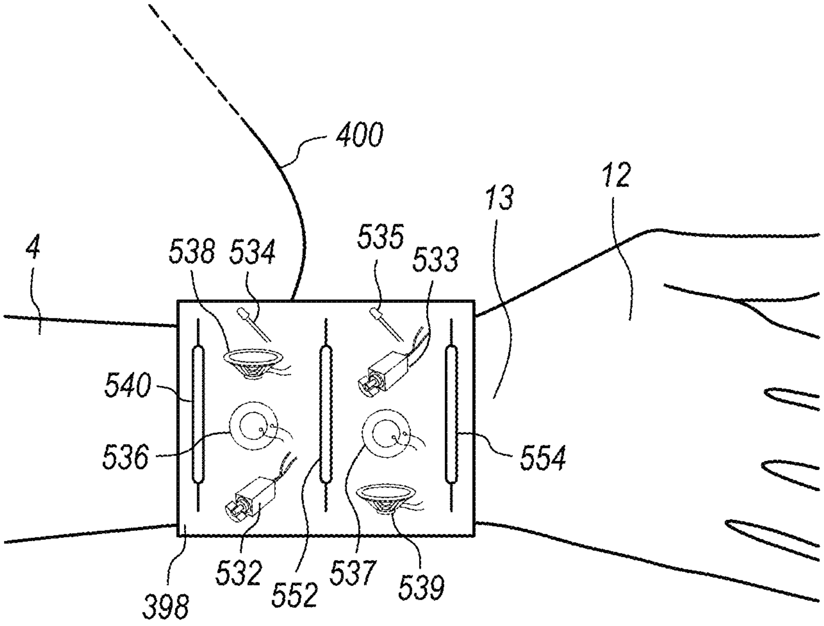

Again, referring back to FIG. 30A, a touch translation interface may comprise a plurality (530) of touch translation elements which may be similar to each other, or different. For example, referring to FIG. 33A, a touch translation interface (398), operatively coupled (400), such as via wired or wireless communications configuration, to a computing system, may be removably coupled to a user (4), such as at a wrist (13) position, and may comprise three or more controllably actuatable shape memory alloy segments (540, 552, 554) positioned longitudinally relative to each other as coupled into the touch translation interface (398). FIG. 33B illustrates a configuration wherein a touch translation interface comprises a fairly broad plurality of touch translation elements, such as a plurality of SMA segments (540, 552, 554), a plurality of haptic motors (532, 533), a plurality of piezoelectric assemblies (536, 537), a plurality of audio speaker assemblies (538, 539), and a plurality of LEDs (534, 535), each of which may be individually and/or independently actuated and controlled to provide an enhanced perception for the user at the local touch workstation.

Figure 36:
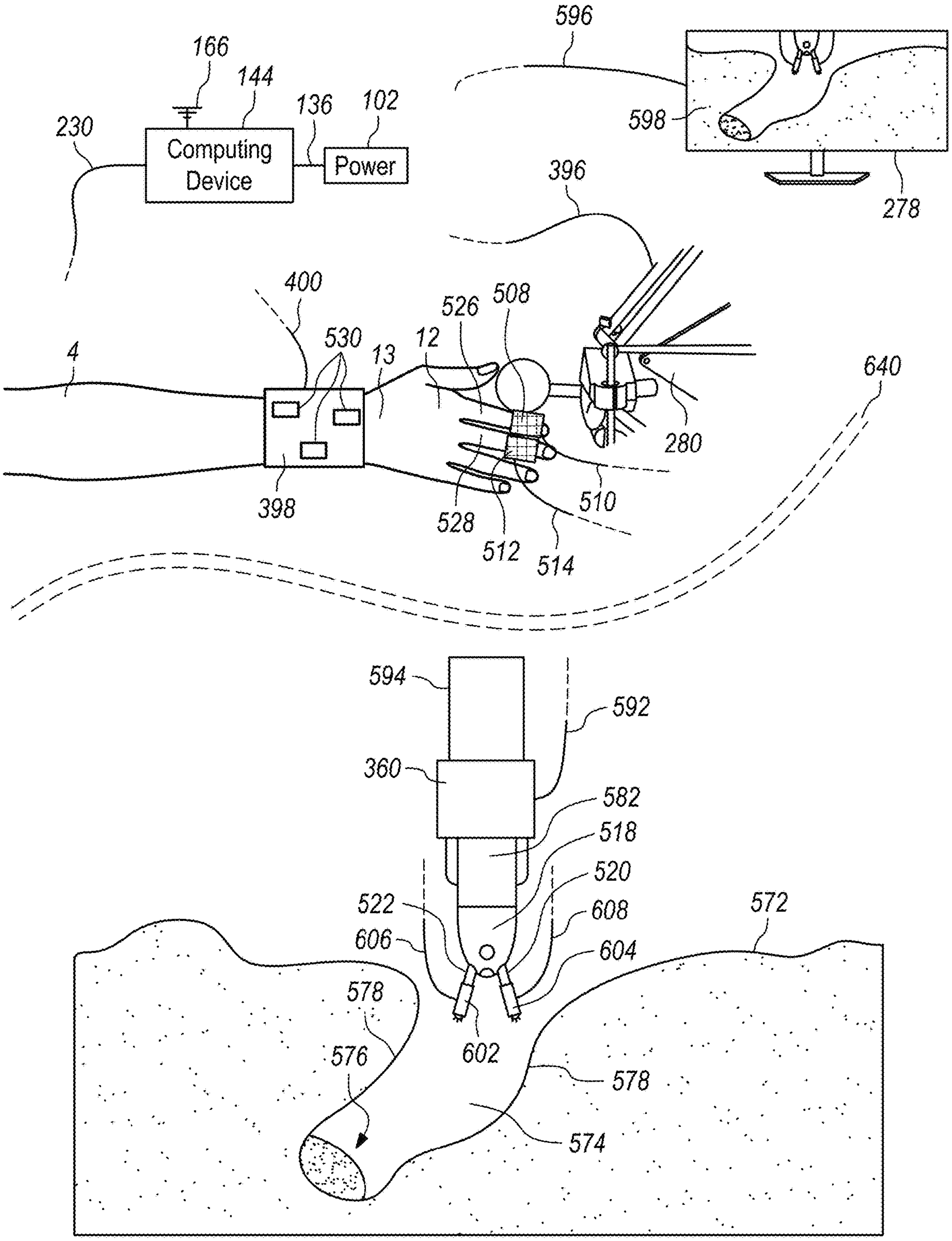
FIGS. 36, 39, 40, 42, and 46-47 illustrate aspects of medical system and method integrations wherein one or more touch sensing assemblies may be utilized to assist in translating physical engagement at a tissue intervention location back to a user at a workstation which may be local or remote relative to the physical engagement of the tissue.

Referring ahead to FIG. 36, a surgical robotics integration configuration is illustrated wherein an operator positioned at an touch-sensing-facilitated operator workstation may utilize a surgical robotic system at a remote location, such as a location separated (640) across the room, across the country, or across the globe from the operator workstation, and wherein touch translation elements may be utilized to enhance the operator's understanding of contacts, touches, and other activities at the remote location during surgical navigation and operation of a robotic surgery end effector, such as a grasper (518), relative to a targeted portion (576) of a targeted tissue structure (572). As shown in FIG. 36, the operator workstation may comprise a one or more (530) element touch translation interface (398) removably coupled to a portion of a user (4) such as a wrist (13), which may be configured to respond to contacts at a robotic instrument (594) wrist portion (582) touch sensing assembly (360). The operator workstation further may comprise two additional touch translation interfaces (508, 512) which may be configured to respond to contacts at touch sensing assemblies (602, 604) coupled to each of the corresponding robotic grasper opposing members (522, 520). The touch translation interfaces may be operatively coupled (400, 510, 514, 230, 166), such as via wired or wireless connectivity, to a computing system (144). The touch sensing assemblies similarly may be operatively coupled (592, 606, 608, 230, 166), such as via wired or wireless connectivity, to a computing system (144). Thus as the remotely controllable robotic instrument (594) is advanced and navigated toward the target portion (576) of the targeted tissue structure (572), the user (4) at the workstation may be provided with intuitive perceptive cues pertaining to contact and touching between aspects of the instrument and aspects of the tissue, such as contacts between the robot instrument wrist (582) and walls or margins (578) of the tissue structure (572), and contacts between the robot instrument grasper (518) members (520, 522) and walls or margins (578, 576) of the tissue structure (572). Preferably one or more image capture devices may be configured to capture one or more views of the surgical scenario to be presented (598) for the user (4) at the operator workstation, such as on the display (278), which may be operatively coupled to the computing system (144), such as by wired or wireless connectivity.

Figure 34:
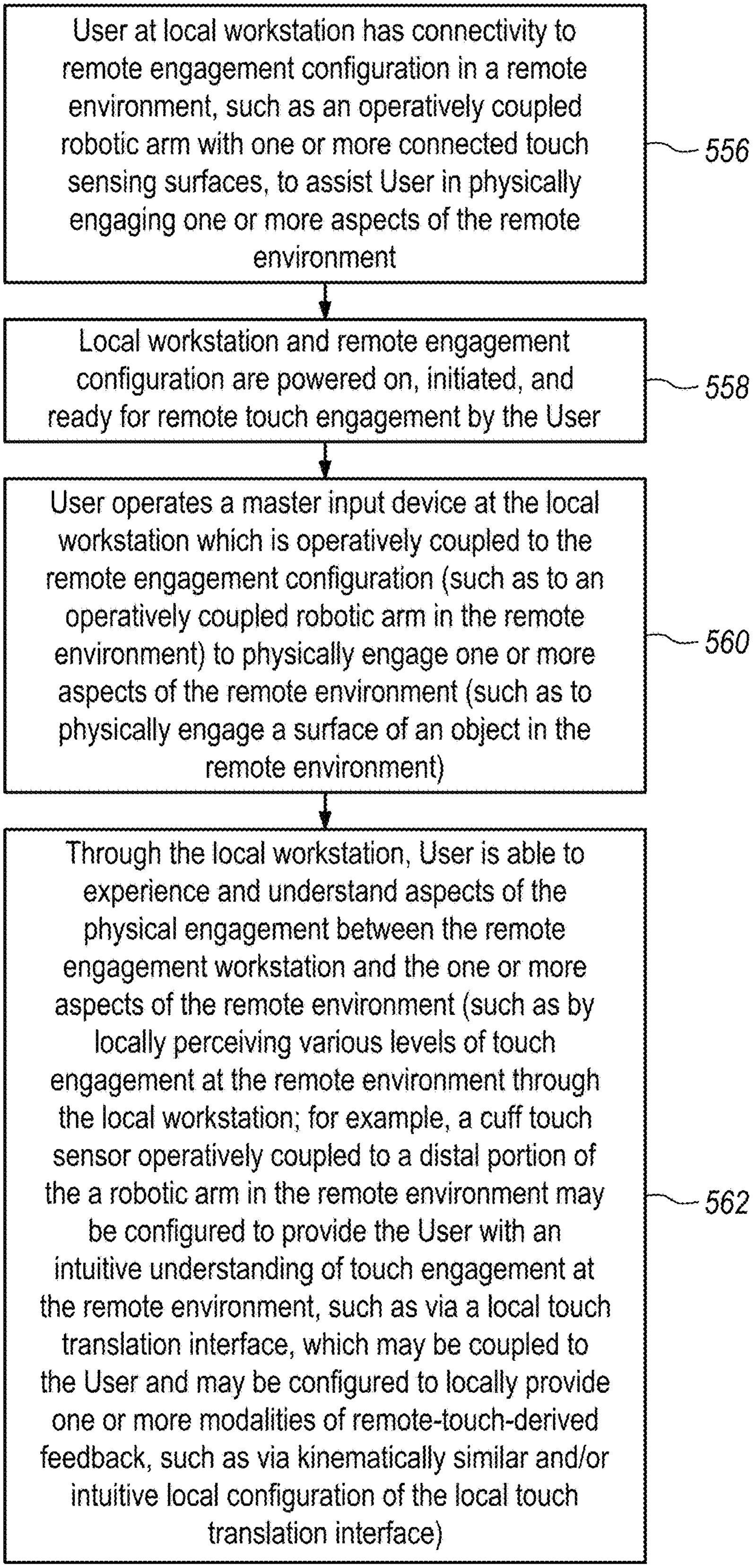

Thus referring to the process flow of FIG. 34, a user at local workstation has connectivity to remote engagement configuration in a remote environment, such as an operatively coupled robotic arm with one or more connected touch sensing surfaces, to assist the user in physically engaging one or more aspects of the remote environment (556). The local workstation and remote engagement configuration may be powered on, initiated, and ready for remote touch engagement by the user (558). The user may operate a master input device at the local workstation which is operatively coupled to the remote engagement configuration (such as to an operatively coupled robotic arm in the remote environment) to physically engage one or more aspects of the remote environment (such as to physically engage a surface of an object in the remote environment) (560). Through the local workstation, the user may be able to experience and understand aspects of the physical engagement between the remote engagement workstation and the one or more aspects of the remote environment (such as by locally perceiving various levels of touch engagement at the remote environment through the local workstation; for example, a cuff touch sensor operatively coupled to a distal portion of the a robotic arm in the remote environment may be configured to provide the user with an intuitive understanding of touch engagement at the remote environment, such as via a local touch translation interface, which may be coupled to the User and may be configured to locally provide one or more modalities of remote-touch-derived feedback, such as via kinematically similar and/or intuitive local configuration of the local touch translation interface) (562).

Figure 37:
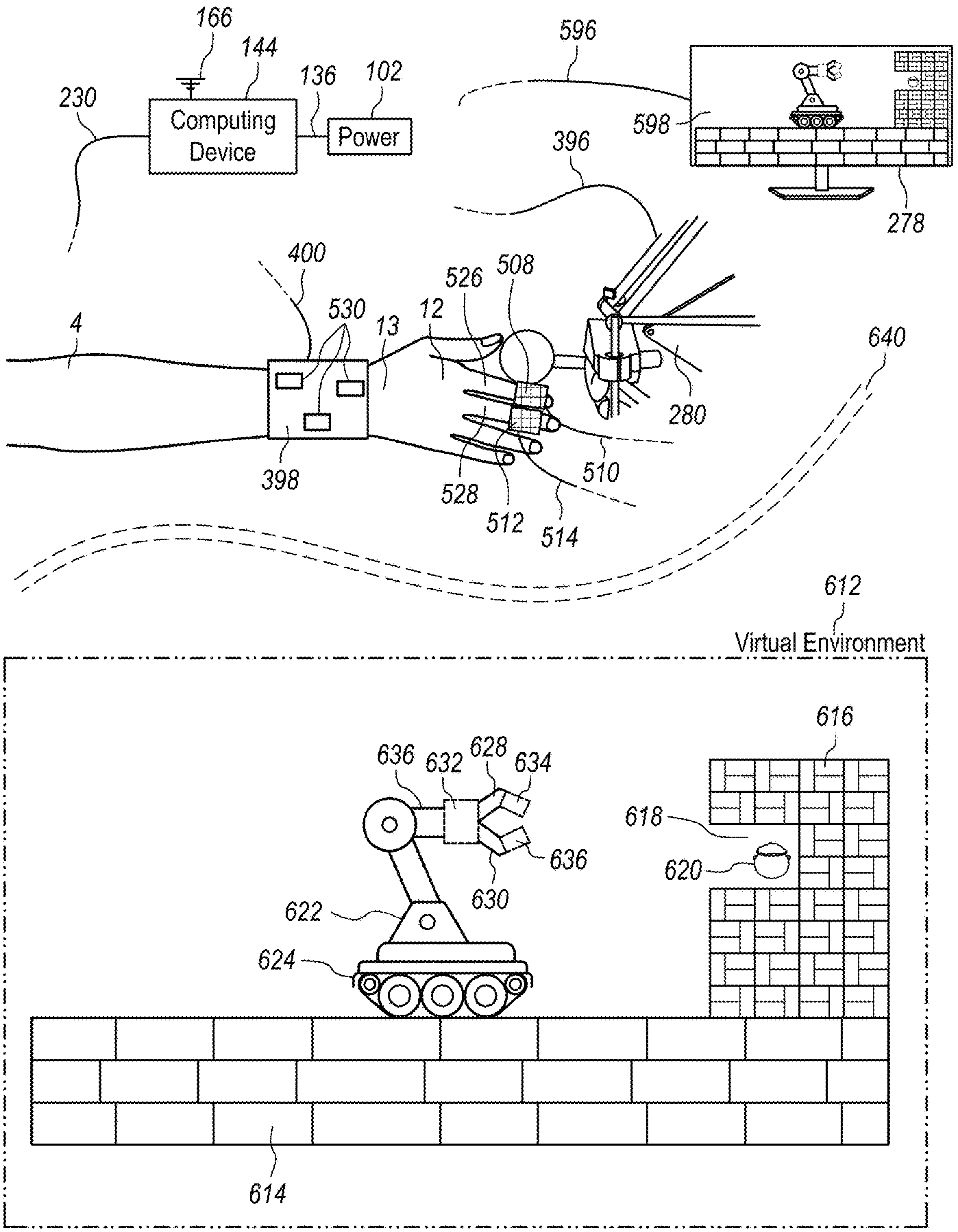
FIGS. 37 and 41 illustrate aspects of gaming or virtual engagement system and method integrations wherein one or more simulated touch sensing assemblies may be utilized to assist in translating physical engagement at a user interface workstation.

Referring to FIG. 37, similar use of touch translation interfaces and a touch-based operator workstation may be utilized to assist a user in experiencing contacts, touches, and related activities in a remote environment that is truly remote in that it is a virtual environment (612) (i.e., only "real" to the extent that it is created upon a computer). For example, in the embodiment of FIG. 37, the user is able to utilize the haptic master input device (280) to navigate a mobile arm robot (622) virtual element around in a virtual environment (612) that comprises virtual aspects such as a virtual road (614), a virtual wall (616) that defines a cavity (618), and a virtual prize element (620) or objective, such as a game-based "pot of gold" element which may be acquired or won by the user if the user is able to successfully virtually grasp the virtual prize element (620) using the virtual grasper elements (628, 630) which are mounted to a virtual robot arm (626), which are mounted to a virtual mobile base (624) in the depicted virtual environment (612). Virtual touch sensing elements (632, 634, 636) may be virtually coupled to the wrist portion of the virtual robot arm (626) and the virtual grasper elements (628, 630) and configured to function in providing an actual user at the user workstation with perceptions of touches or contacts with the virtual robot structures versus other aspects of the virtual environment (612), such as portions of the virtual wall (616). In other words, if the user drives the virtual robot (622) such that the virtual grasper elements (628, 630) hit a portion of the virtual wall (616), such contacts and/or intersections may be translated back to the touch translation interfaces (508, 512, 398) at the user workstation to assist in providing the user with an intuitive perception regarding the activities in the virtual environment (612).

Figure 35:
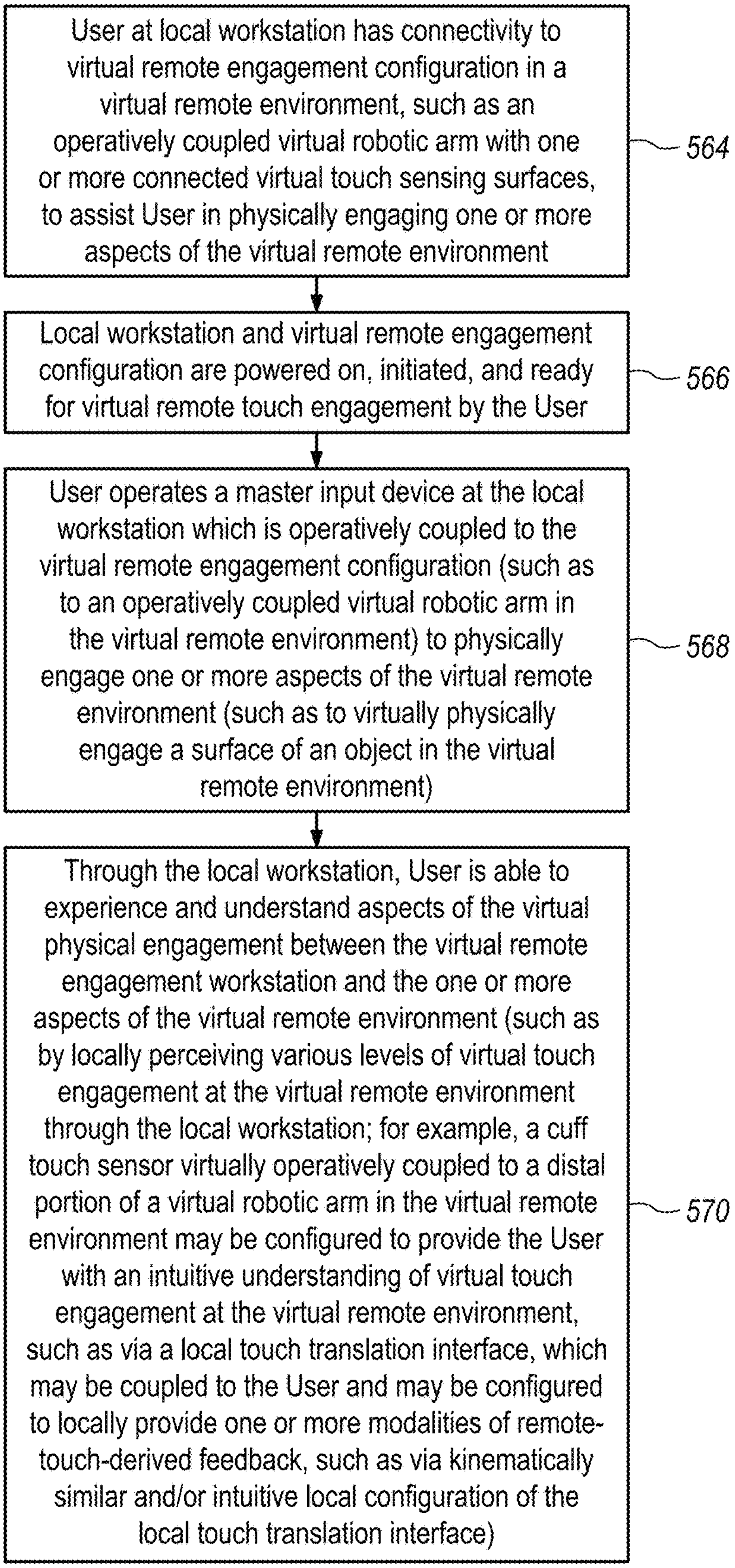

Thus referring to FIG. 35, a user at a local workstation may have connectivity to virtual remote engagement configuration in a virtual remote environment, such as an operatively coupled virtual robotic arm with one or more connected virtual touch sensing surfaces, to assist the user in physically engaging one or more aspects of the virtual remote environment (564). The local workstation and virtual remote engagement configuration may be powered on, initiated, and ready for virtual remote touch engagement by the user (566). The user may operate a master input device at the local workstation which is operatively coupled to the virtual remote engagement configuration (such as to an operatively coupled virtual robotic arm in the virtual remote environment) to physically engage one or more aspects of the virtual remote environment (such as to virtually physically engage a surface of an object in the virtual remote environment) (568). Through the local workstation, the user may be able to experience and understand aspects of the virtual physical engagement between the virtual remote engagement workstation and the one or more aspects of the virtual remote environment (such as by locally perceiving various levels of virtual touch engagement at the virtual remote environment through the local workstation; for example, a cuff touch sensor virtually operatively coupled to a distal portion of a virtual robotic arm in the virtual remote environment may be configured to provide the User with an intuitive understanding of virtual touch engagement at the virtual remote environment, such as via a local touch translation interface, which may be coupled to the User and may be configured to locally provide one or more modalities of remote-touch-derived feedback, such as via kinematically similar and/or intuitive local configuration of the local touch translation interface) (570).

Figure 38A:
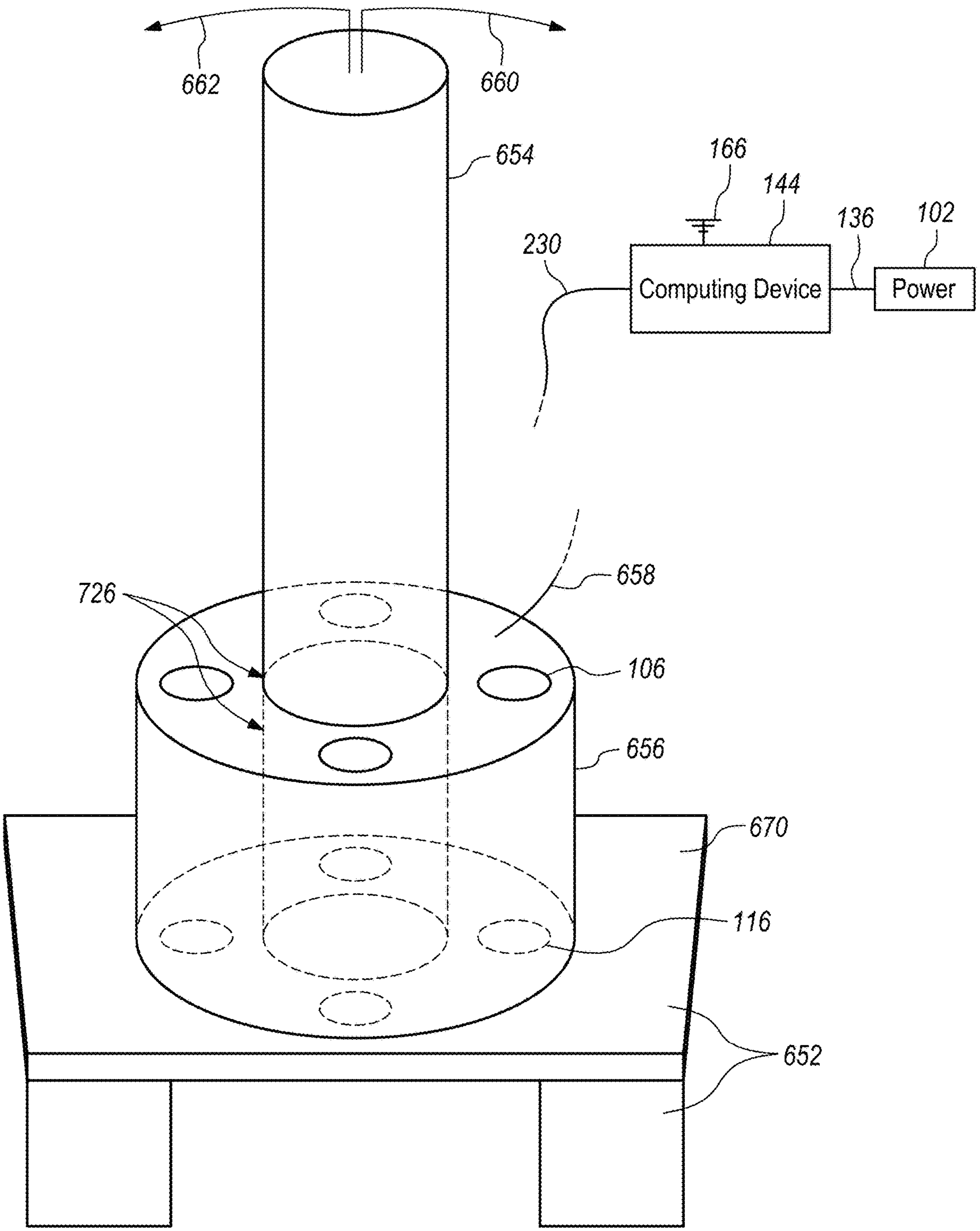
FIGS. 38A-38F and 43-45 illustrate aspects of integrations wherein one or more sensing assemblies may be utilized to assist in characterizing one or more key working members of an assembly or machine.

Referring to FIG. 38A, an orthogonal view is shown featuring a bushing or at least partially cylindrical type touch sensing assembly (656) which may be fixedly or removably coupled to a structural element such as a shaft member (654) of a machine or machine component which is desirably understood in terms of loading configuration during operation. For illustrative purposes, the touch sensing assembly (656) is shown along with the shaft member (654) mounted upon a top surface (670) of a table (652), and the interface (726) between the touch sensing assembly (656) and shaft member (654) may be bonded to generally prevent relative motion during loading. The touch sensing assembly (656) may be operatively coupled (658, 230, 166), such as via wired or wireless coupling, to a computing system (144), and may comprise a plurality of imaging devices (106) and sources (116). In operation, with loading of the shaft member (654), such as bending back and forth (662, 660), portions of the touch sensing assembly (656) may be placed into compression, tension, shear, and the like, and such loading may be detected and characterized at the computing system using the pertinent imaging devices (106) and sources (116), which may be placed in sectors (for example, four pairings are shown around the perimeter of the touch sensing assembly 656). A side view of a similar configuration is illustrated in FIG. 38B.

Figure 38B:
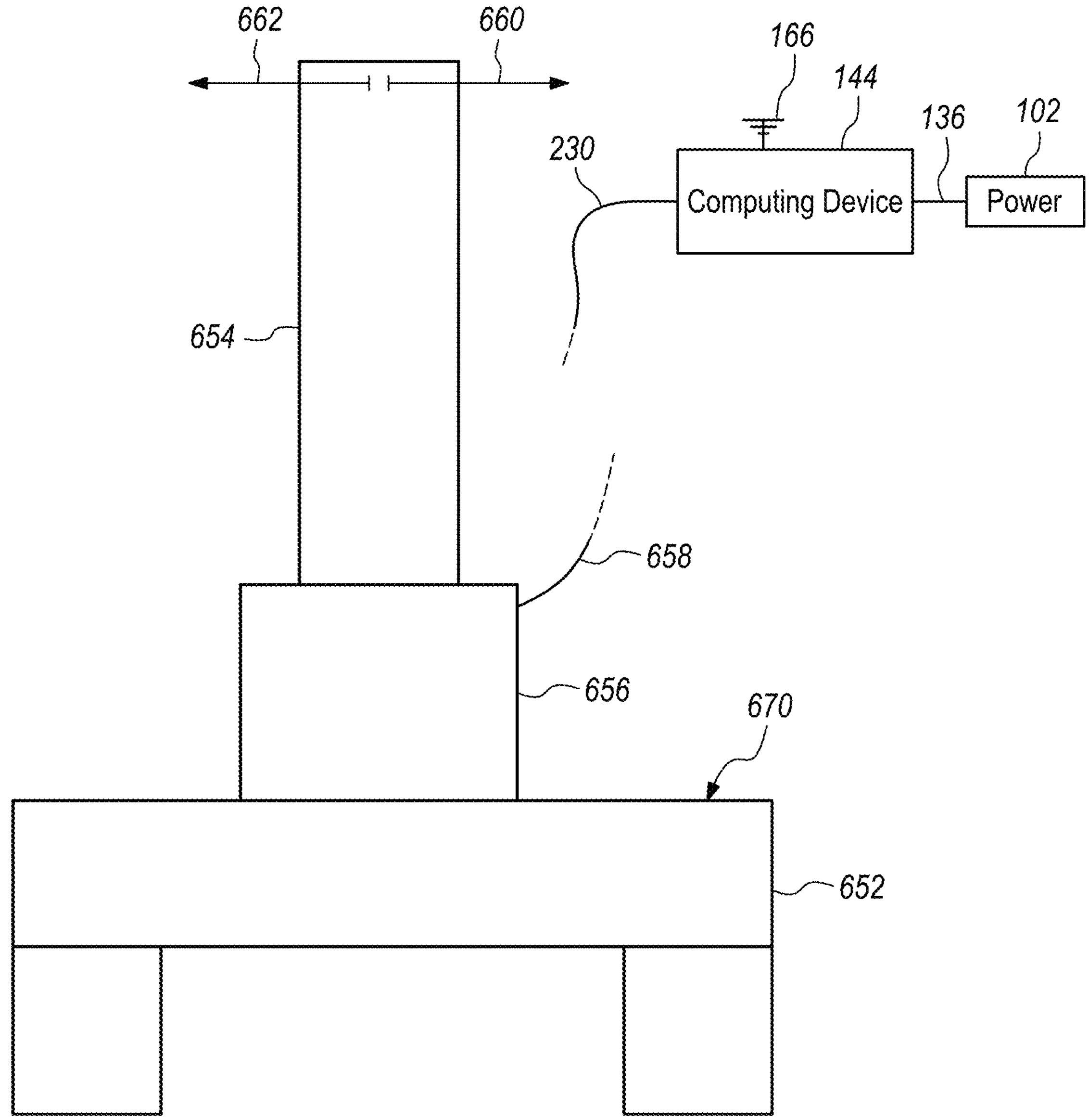
Figure 38C:
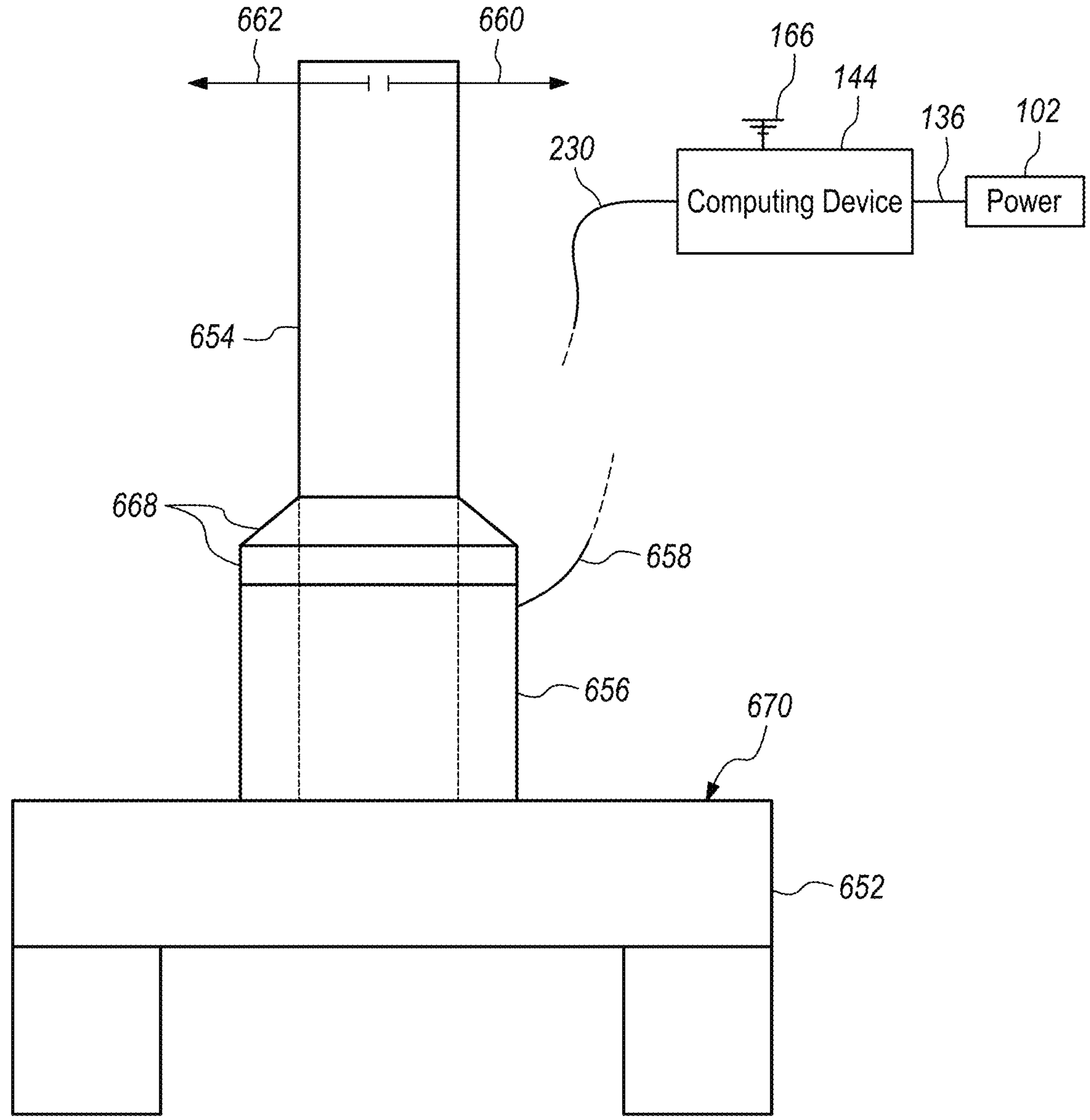

FIG. 38C illustrates a somewhat similar configuration to that of FIG. 38B, but with the addition of a structural cap member (668) which may be configured to constrain the touch sensing assembly (656) at the junction of the structural cap member (668) and shaft member (654). With such a configuration, the cylindrical touch sensing assembly (656) may be placed in more pure compression or tension with bending (662, 660) of the shaft member (654).

Figure 38D:
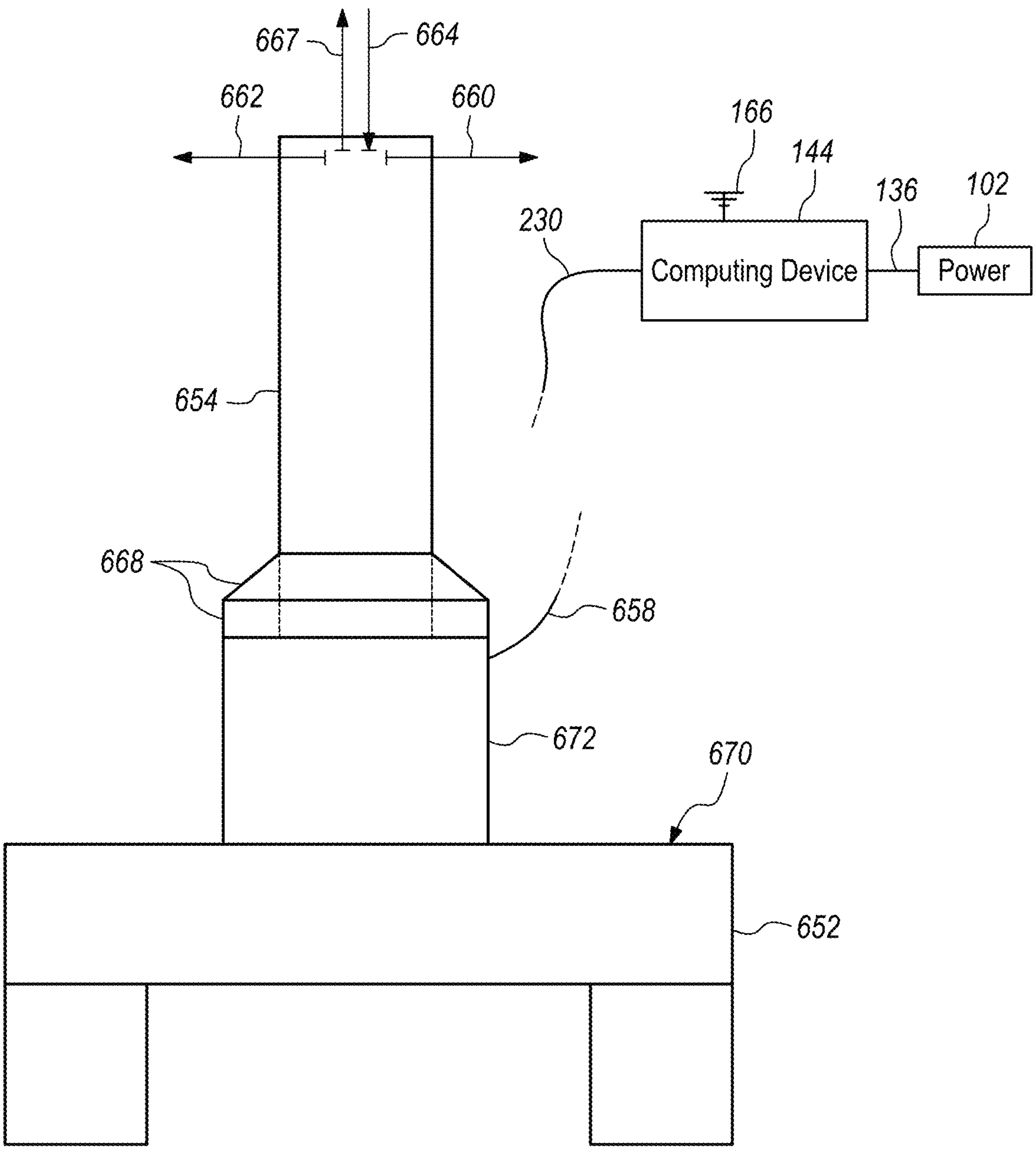

Referring to FIG. 38D, a configuration somewhat similar to that of FIG. 38C is illustrated, but with a solid cylindrical touch sensing assembly (672) which forms a cylindrical base or pad to which the structural cap (668) and shaft (654) end may be mounted (i.e., the shaft shown in FIG. 38D does not cross through the cylindrical touch sensing assembly 672).

Such a configuration also facilitates the cylindrical touch sensing assembly (672) in detecting not only bending (662, 660) type of loading, but also tensile or compressive loading (667, 664) upon the shaft member (654), and generally depending upon the source/imaging device (such as 116/106 in FIG. 38A), fairly broad characterization of the loading paradigm in the associated structural member (654).

Figure 38E:
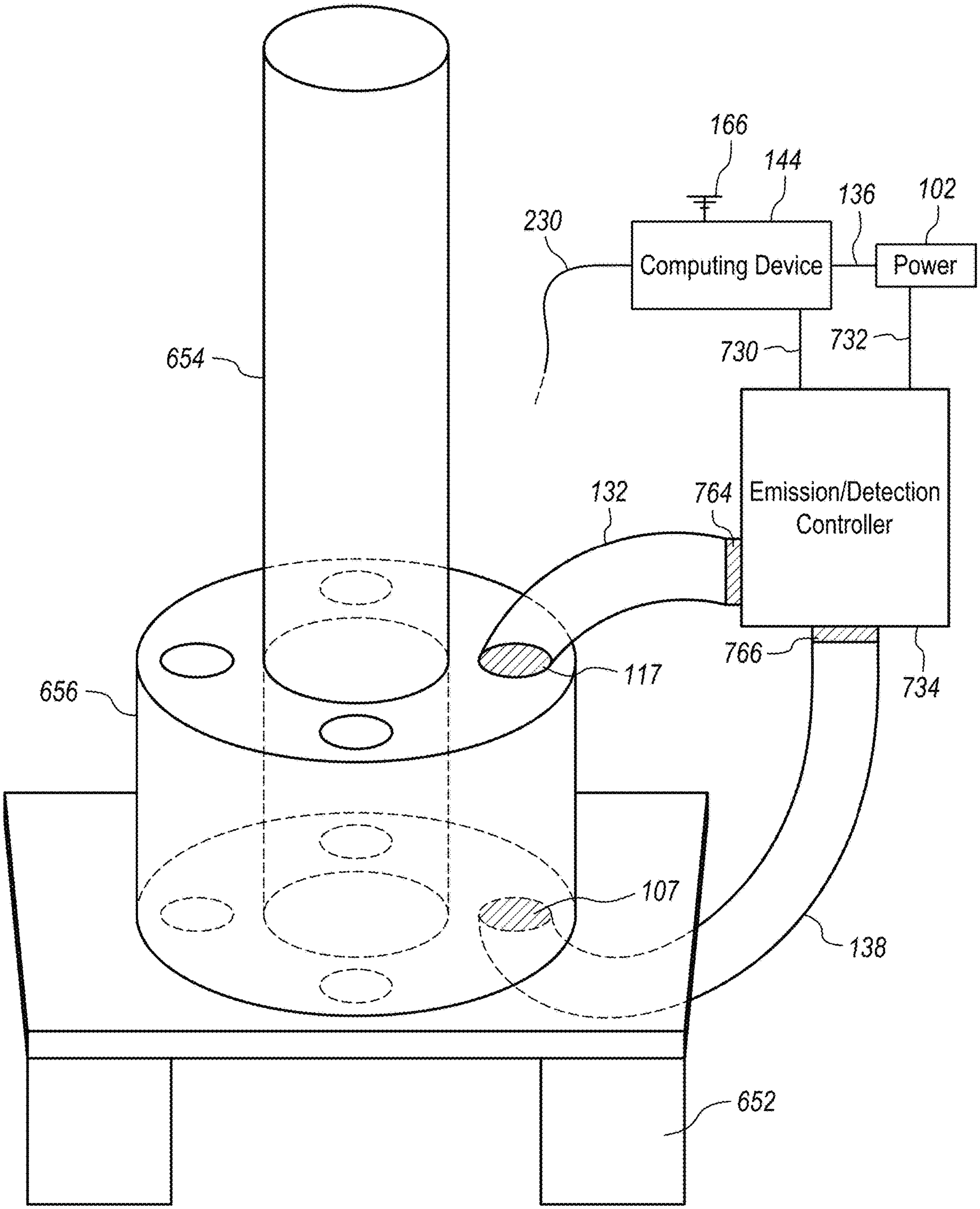

Referring to FIG. 38E, it is important to note that sensor and/or emitter portions may be placed in immediate contact with the optical element matter of the touch sensing assembly (656), as in the configuration of FIG. 38A, or may be placed in more removed locations through the use of configurations such as fibers or bundles thereof (132, 138) to operatively couple to other locations, such as the emission detection controller (734) module illustrated (and operatively coupled to the computing system 144 and power source 102; 730, 732), which may contain interfaces (764, 766) configured to efficiently transport light or other radiation to and from one or more sources and one or more image capture devices which may be housed therein.

Figure 38F:
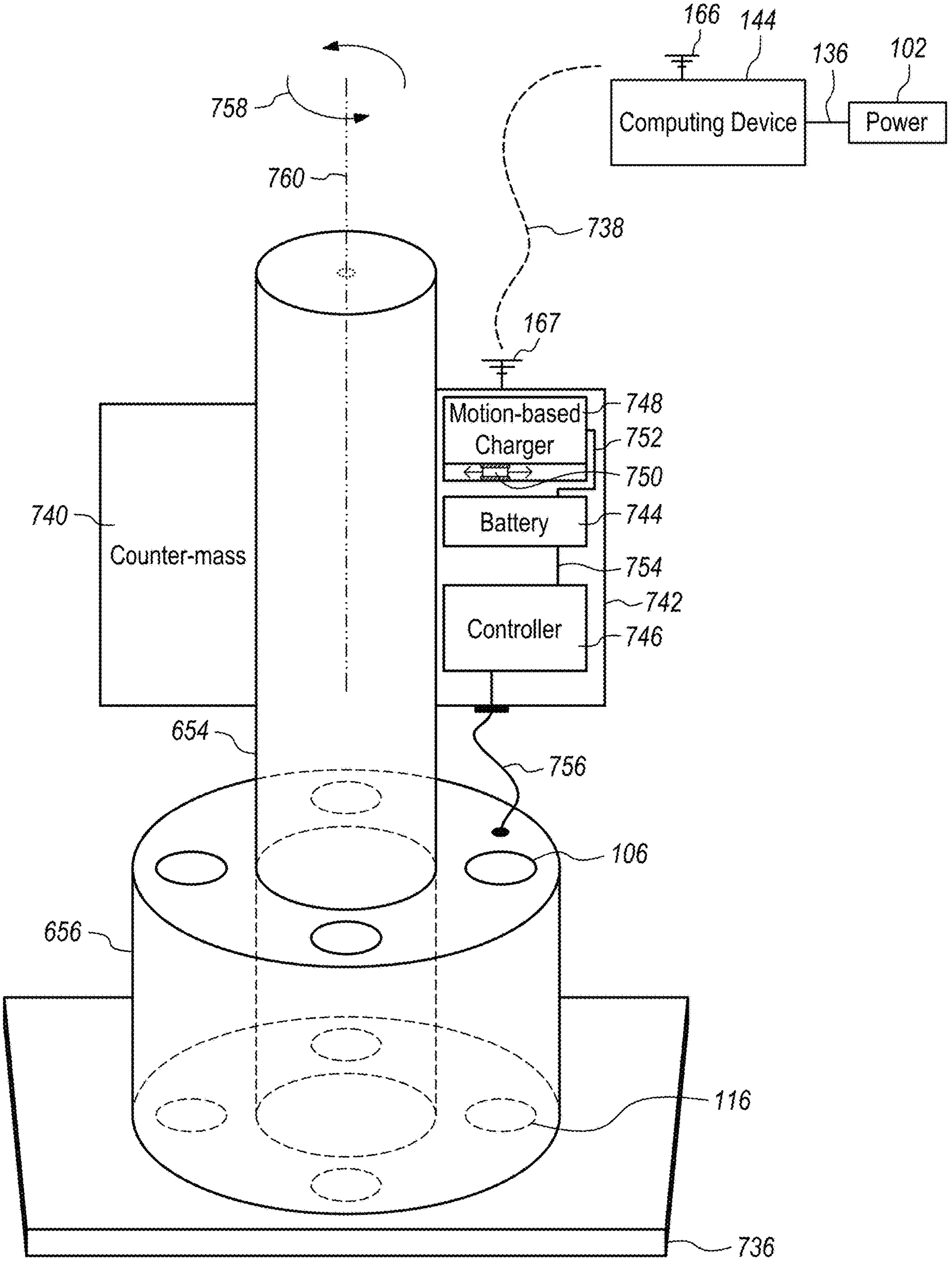

Referring to FIG. 38F, to assist in the removal of tethers and wired couplings, such as in a cyclical torsional loading (758) about an axis (760) scenario, such as in a machine application, various aspects of the system configuration may be coupled to the machine parts and wirelessly connected to avoid various tether-based restrictions. For example, referring to FIG. 38F, a module or housing (742) may contain intercoupled (752, 754) power supply (744), battery charging (748), and computer/controller (746) elements which may be intercoupled (756) to the touch sensing assembly (656) and a more remotely located computing device (144) via wireless connectivity (167, 166). A motion based charger (748) featuring a small mass (750) configured to oscillate and provide low levels of current based upon oscillatory motion of the associated shaft (654) may be configured to continuously charge the battery (744); for example, the mass (750) may be configured to move a magnetic material through one or more coils in an oscillatory manner, or may be configured to load a piezoelectric member (such as via angular acceleration and velocity-squared/radius relationships) with shaft motion to provide low levels of charging current for the battery (744).

Figure 39:
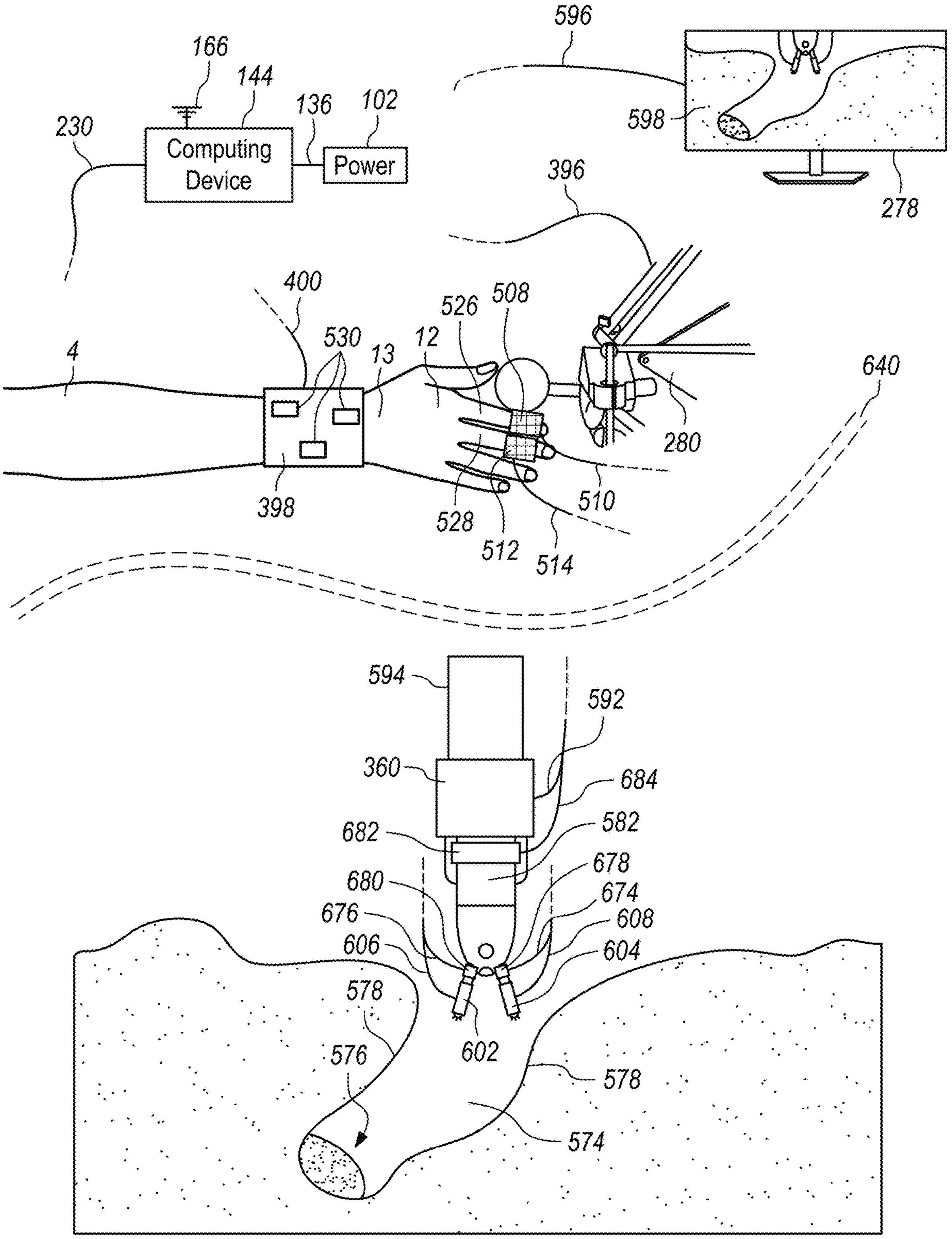

Referring to FIG. 39, a configuration somewhat similar to that of FIG. 36 is illustrated, with the addition of small touch sensing assembly pads (678, 680) intercoupled (674, 676, 230, 166) to the computing system (144), such as via wired or wireless connectivity, to provide further characterization of the opposing grasper elements of the grasper tool (582), in a manner akin to the description above pertaining to FIG. 38D.

Figure 40:
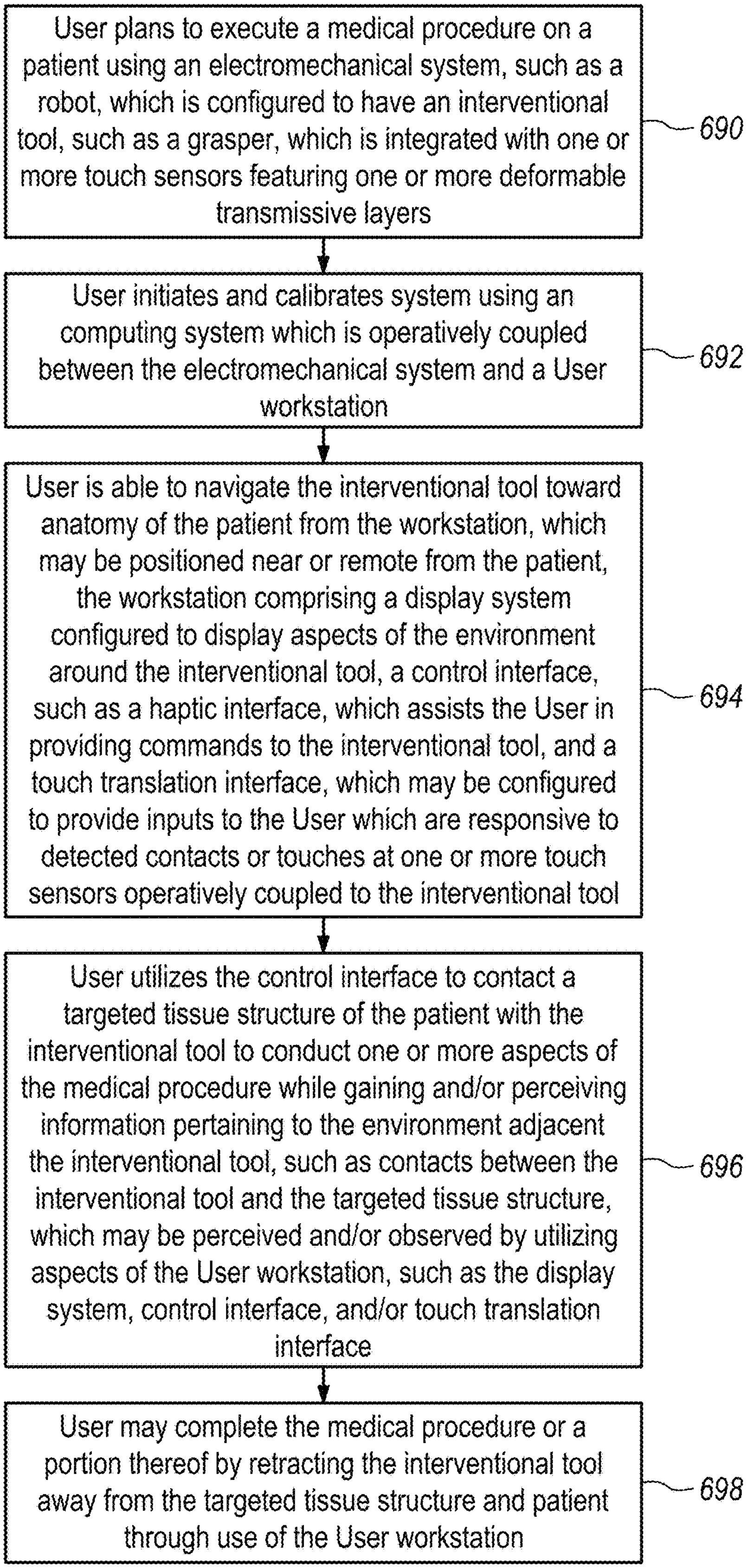

Referring to FIG. 40, a user plans to execute a medical procedure on a patient using an electromechanical system, such as a robot, which is configured to have an interventional tool, such as a grasper, which is integrated with one or more touch sensors featuring one or more deformable transmissive layers (690). The user may initiate and calibrate the system using an computing system which is operatively coupled between the electromechanical system and a user workstation (692). The user may be able to navigate the interventional tool toward anatomy of the patient from the workstation, which may be positioned near or remote from the patient, the workstation comprising a display system configured to display aspects of the environment around the interventional tool, a control interface, such as a haptic interface, which assists the User in providing commands to the interventional tool, and a touch translation interface, which may be configured to provide inputs to the User which are responsive to detected contacts or touches at one or more touch sensors operatively coupled to the interventional tool (694). The user may utilize the control interface to contact a targeted tissue structure of the patient with the interventional tool to conduct one or more aspects of the medical procedure while gaining and/or perceiving information pertaining to the environment adjacent the interventional tool, such as contacts between the interventional tool and the targeted tissue structure, which may be perceived and/or observed by utilizing aspects of the User workstation, such as the display system, control interface, and/or touch translation interface (696). The user may complete the medical procedure or a portion thereof by retracting the interventional tool away from the targeted tissue structure and patient through use of the user workstation (698).

Figure 41:
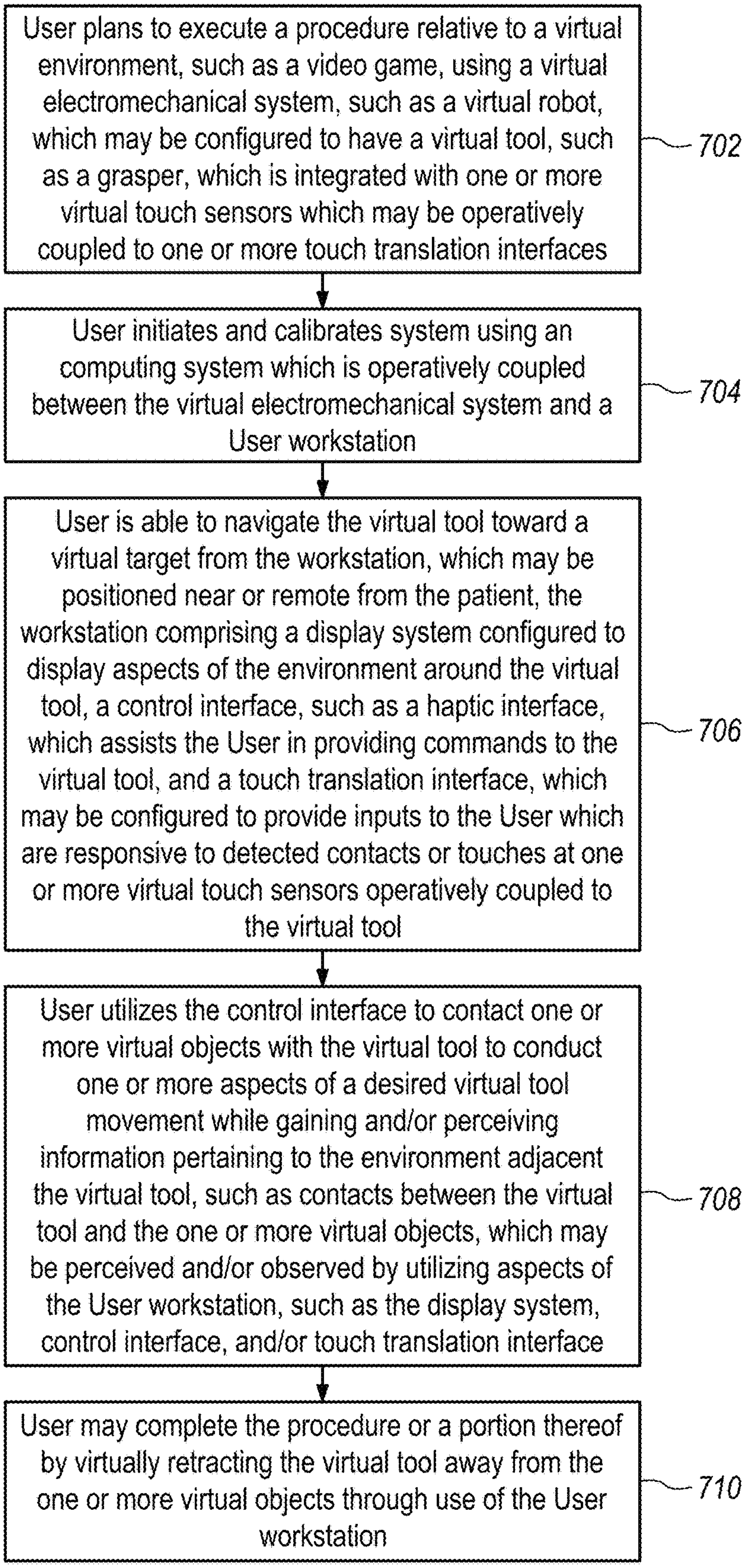

Referring to FIG. 41, a user may plan to execute a procedure relative to a virtual environment, such as a video game, using a virtual electromechanical system, such as a virtual robot, which may be configured to have a virtual tool, such as a grasper, which is integrated with one or more virtual touch sensors which may be operatively coupled to one or more touch translation interfaces (702). The user may initiate and calibrate the system using a computing system which is operatively coupled between the virtual electromechanical system and a user workstation (704). The user may be able to navigate the virtual tool toward a virtual target from the workstation, which may be positioned near or remote from the patient, the workstation comprising a display system configured to display aspects of the environment around the virtual tool, a control interface, such as a haptic interface, which assists the User in providing commands to the virtual tool, and a touch translation interface, which may be configured to provide inputs to the User which are responsive to detected contacts or touches at one or more virtual touch sensors operatively coupled to the virtual tool (706). The user may utilize the control interface to contact one or more virtual objects with the virtual tool to conduct one or more aspects of a desired virtual tool movement while gaining and/or perceiving information pertaining to the environment adjacent the virtual tool, such as contacts between the virtual tool and the one or more virtual objects, which may be perceived and/or observed by utilizing aspects of the User workstation, such as the display system, control interface, and/or touch translation interface (708). The user may complete the procedure or a portion thereof by virtually retracting the virtual tool away from the one or more virtual objects through use of the User workstation (710).

Figure 42:
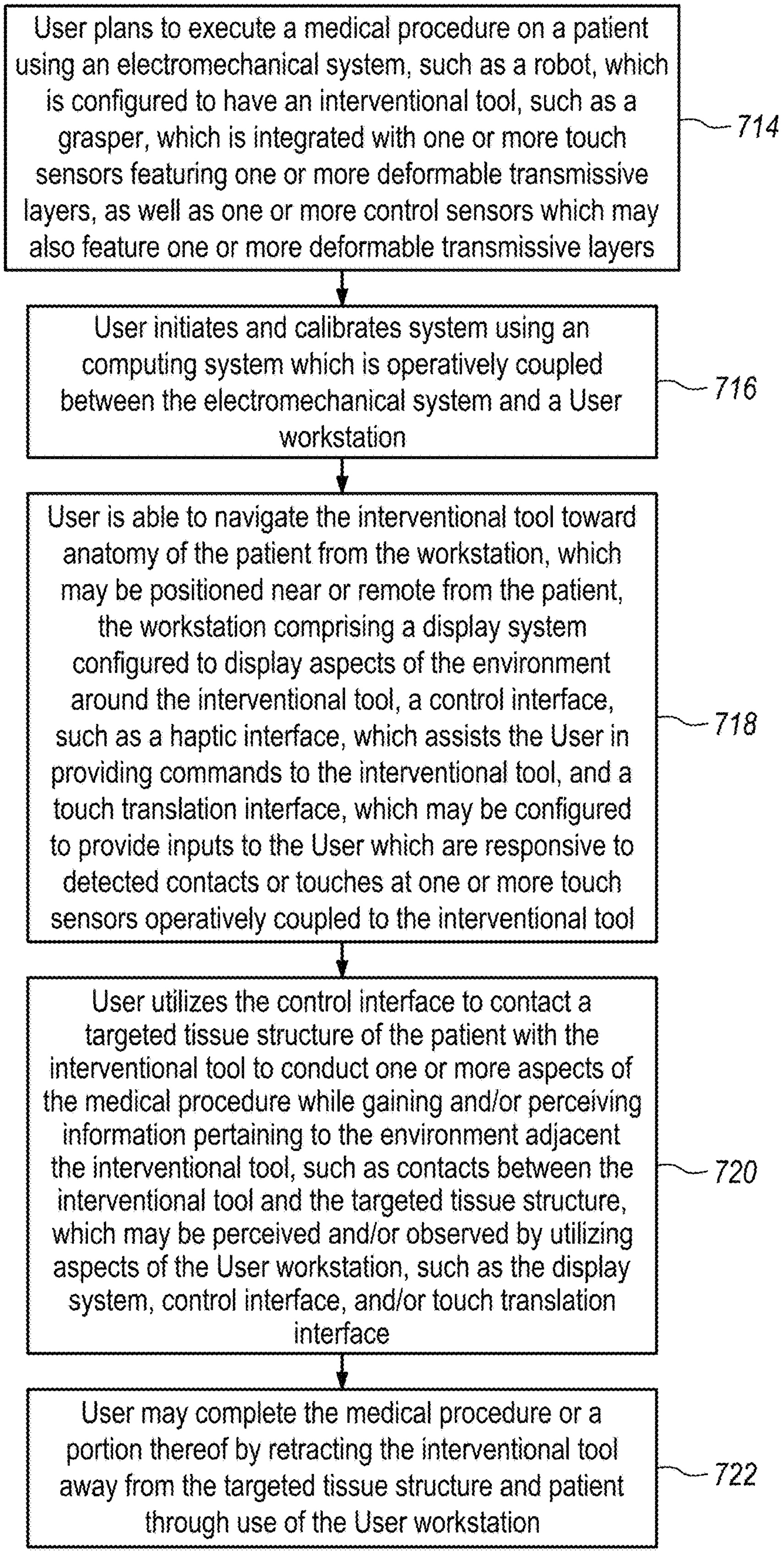

Referring to FIG. 42, the user may plan to execute a medical procedure on a patient using an electromechanical system, such as a robot, which is configured to have an interventional tool, such as a grasper, which is integrated with one or more touch sensors featuring one or more deformable transmissive layers, as well as one or more control sensors which may also feature one or more deformable transmissive layers (714). The user may initiate and calibrate the system using an computing system which is operatively coupled between the electromechanical system and a User workstation (716). The user may be able to navigate the interventional tool toward anatomy of the patient from the workstation, which may be positioned near or remote from the patient, the workstation comprising a display system configured to display aspects of the environment around the interventional tool, a control interface, such as a haptic interface, which assists the User in providing commands to the interventional tool, and a touch translation interface, which may be configured to provide inputs to the User which are responsive to detected contacts or touches at one or more touch sensors operatively coupled to the interventional tool (718). The user may utilize the control interface to contact a targeted tissue structure of the patient with the interventional tool to conduct one or more aspects of the medical procedure while gaining and/or perceiving information pertaining to the environment adjacent the interventional tool, such as contacts between the interventional tool and the targeted tissue structure, which may be perceived and/or observed by utilizing aspects of the User workstation, such as the display system, control interface, and/or touch translation interface (720). The user may complete the medical procedure or a portion thereof by retracting the interventional tool away from the targeted tissue structure and patient through use of the user workstation (722).

Figure 43:
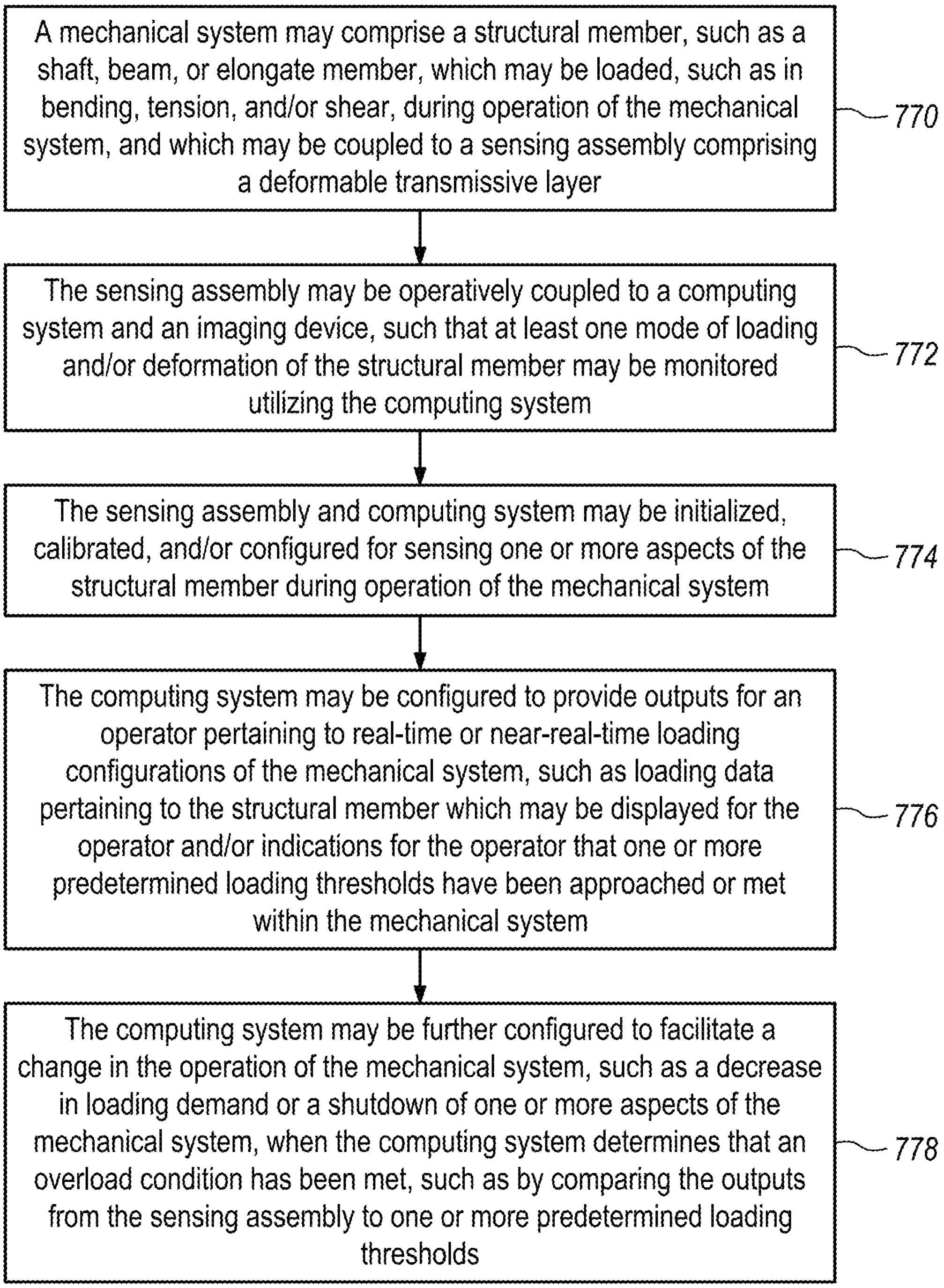

Referring to FIG. 43, a mechanical system may comprise a structural member, such as a shaft, beam, or elongate member, which may be loaded, such as in bending, tension, and/or shear, during operation of the mechanical system, and which may be coupled to a sensing assembly comprising a deformable transmissive layer (770). The sensing assembly may be operatively coupled to a computing system and an imaging device, such that at least one mode of loading and/or deformation of the structural member may be monitored utilizing the computing system (772). The sensing assembly and computing system may be initialized, calibrated, and/or configured for sensing one or more aspects of the structural member during operation of the mechanical system (774). The computing system may be configured to provide outputs for an operator pertaining to real-time or near-real-time loading configurations of the mechanical system, such as loading data pertaining to the structural member which may be displayed for the operator and/or indications for the operator that one or more predetermined loading thresholds have been approached or met within the mechanical system (776). The computing system may be further configured to facilitate a change in the operation of the mechanical system, such as a decrease in loading demand or a shutdown of one or more aspects of the mechanical system, when the computing system determines that an overload condition has been met, such as by comparing the outputs from the sensing assembly to one or more predetermined loading thresholds (778).

Figure 44:
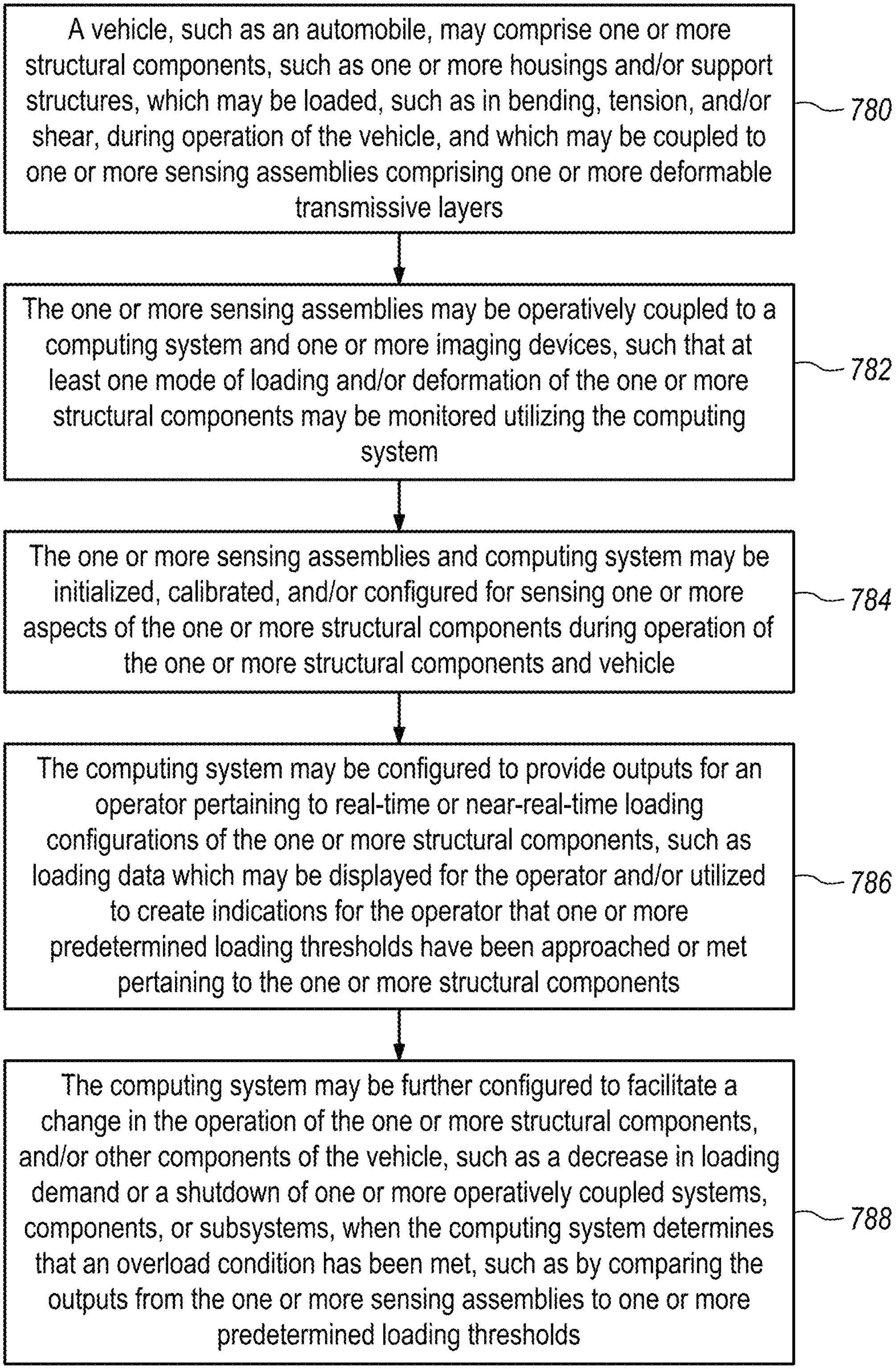

Referring to FIG. 44, a vehicle, such as an automobile, may comprise one or more structural components, such as one or more housings and/or support structures, which may be loaded, such as in bending, tension, and/or shear, during operation of the vehicle, and which may be coupled to one or more sensing assemblies comprising one or more deformable transmissive layers (780). The one or more sensing assemblies may be operatively coupled to a computing system and one or more imaging devices, such that at least one mode of loading and/or deformation of the one or more structural components may be monitored utilizing the computing system (782). The one or more sensing assemblies and computing system may be initialized, calibrated, and/or configured for sensing one or more aspects of the one or more structural components during operation of the one or more structural components and vehicle (784). The computing system may be configured to provide outputs for an operator pertaining to real-time or near-real-time loading configurations of the one or more structural components, such as loading data which may be displayed for the operator and/or utilized to create indications for the operator that one or more predetermined loading thresholds have been approached or met pertaining to the one or more structural components (786). The computing system may be further configured to facilitate a change in the operation of the one or more structural components, and/or other components of the vehicle, such as a decrease in loading demand or a shutdown of one or more operatively coupled systems, components, or subsystems, when the computing system determines that an overload condition has been met, such as by comparing the outputs from the one or more sensing assemblies to one or more predetermined loading thresholds (788).

Figure 45:
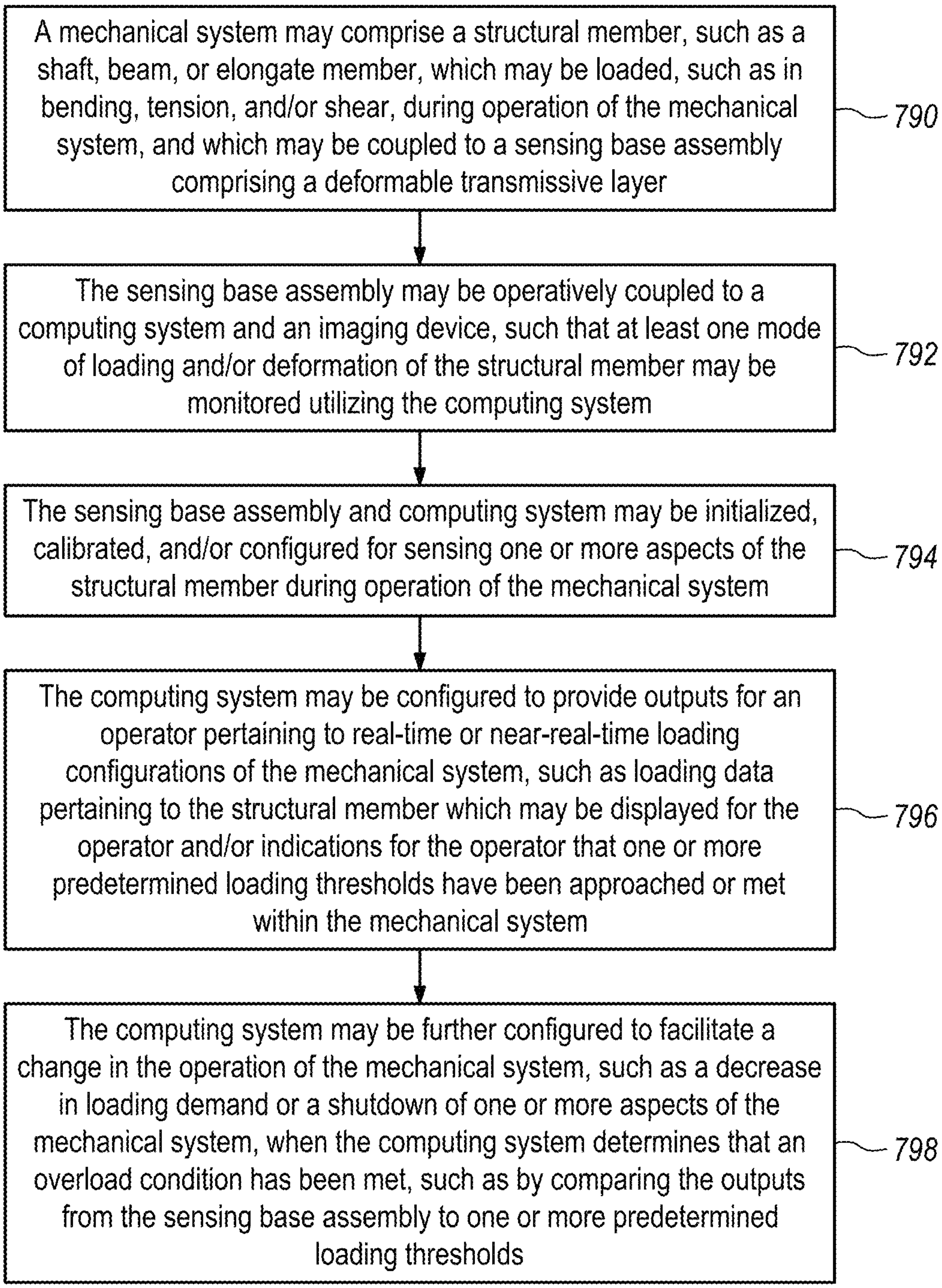

Referring to FIG. 45, a mechanical system may comprise a structural member, such as a shaft, beam, or elongate member, which may be loaded, such as in bending, tension, and/or shear, during operation of the mechanical system, and which may be coupled to a sensing base assembly comprising a deformable transmissive layer (790). The sensing base assembly may be operatively coupled to a computing system and an imaging device, such that at least one mode of loading and/or deformation of the structural member may be monitored utilizing the computing system (792). The sensing base assembly and computing system may be initialized, calibrated, and/or configured for sensing one or more aspects of the structural member during operation of the mechanical system (794). The computing system may be configured to provide outputs for an operator pertaining to real-time or near-real-time loading configurations of the mechanical system, such as loading data pertaining to the structural member which may be displayed for the operator and/or indications for the operator that one or more predetermined loading thresholds have been approached or met within the mechanical system (796). The computing system may be further configured to facilitate a change in the operation of the mechanical system, such as a decrease in loading demand or a shutdown of one or more aspects of the mechanical system, when the computing system determines that an overload condition has been met, such as by comparing the outputs from the sensing base assembly to one or more predetermined loading thresholds (798).

Figure 46:
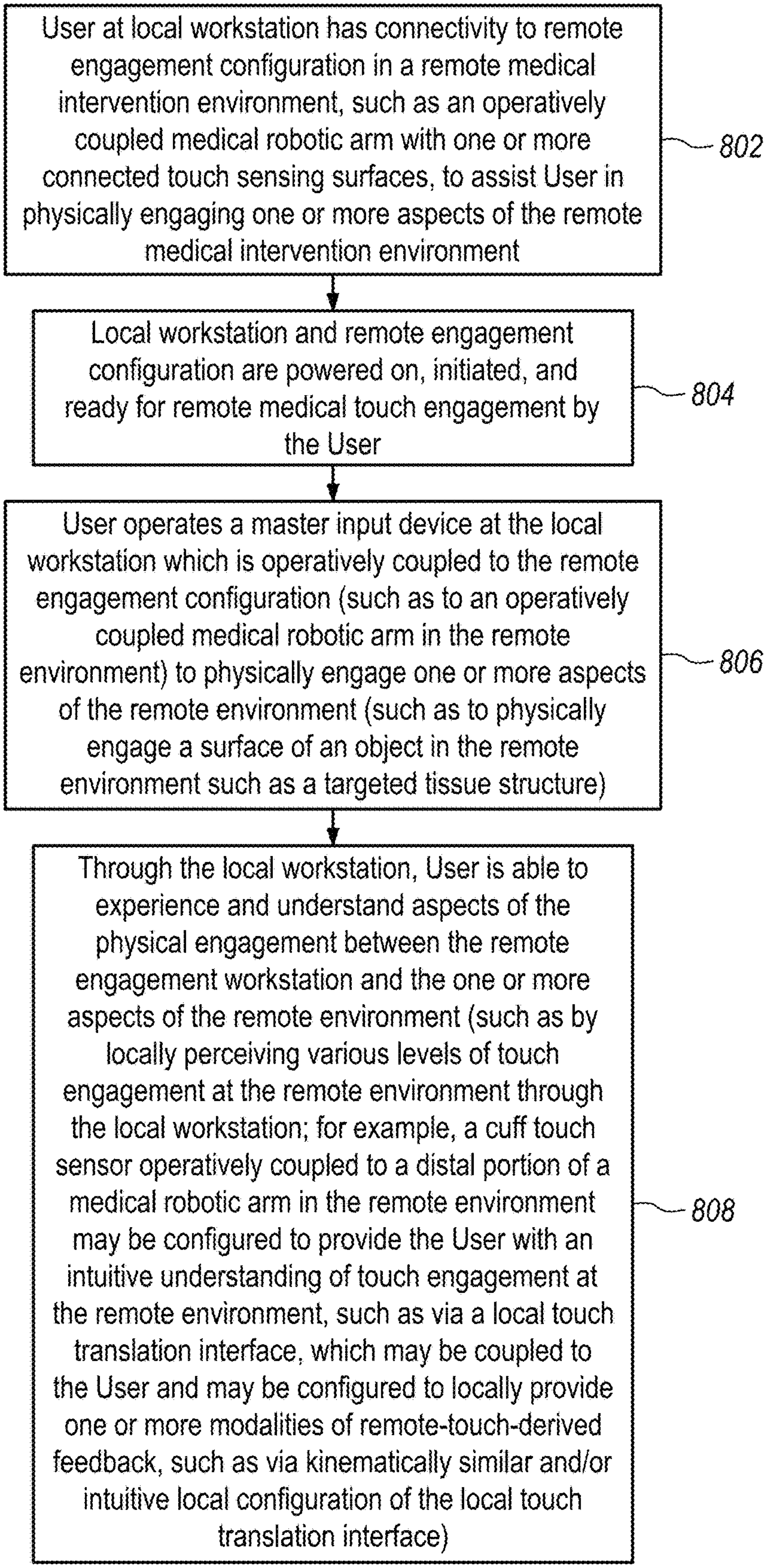

Referring to FIG. 46, a user at local workstation may have connectivity to remote engagement configuration in a remote medical intervention environment, such as an operatively coupled medical robotic arm with one or more connected touch sensing surfaces, to assist User in physically engaging one or more aspects of the remote medical intervention environment (802). The local workstation and remote engagement configuration may be powered on, initiated, and ready for remote medical touch engagement by the user (804). The user may operate a master input device at the local workstation which is operatively coupled to the remote engagement configuration (such as to an operatively coupled medical robotic arm in the remote environment) to physically engage one or more aspects of the remote environment (such as to physically engage a surface of an object in the remote environment such as a targeted tissue structure) (806). Through the local workstation, the user may be able to experience and understand aspects of the physical engagement between the remote engagement workstation and the one or more aspects of the remote environment (such as by locally perceiving various levels of touch engagement at the remote environment through the local workstation; for example, a cuff touch sensor operatively coupled to a distal portion of a medical robotic arm in the remote environment may be configured to provide the User with an intuitive understanding of touch engagement at the remote environment, such as via a local touch translation interface, which may be coupled to the User and may be configured to locally provide one or more modalities of remote-touch-derived feedback, such as via kinematically similar and/or intuitive local configuration of the local touch translation interface) (808).

Figure 47:
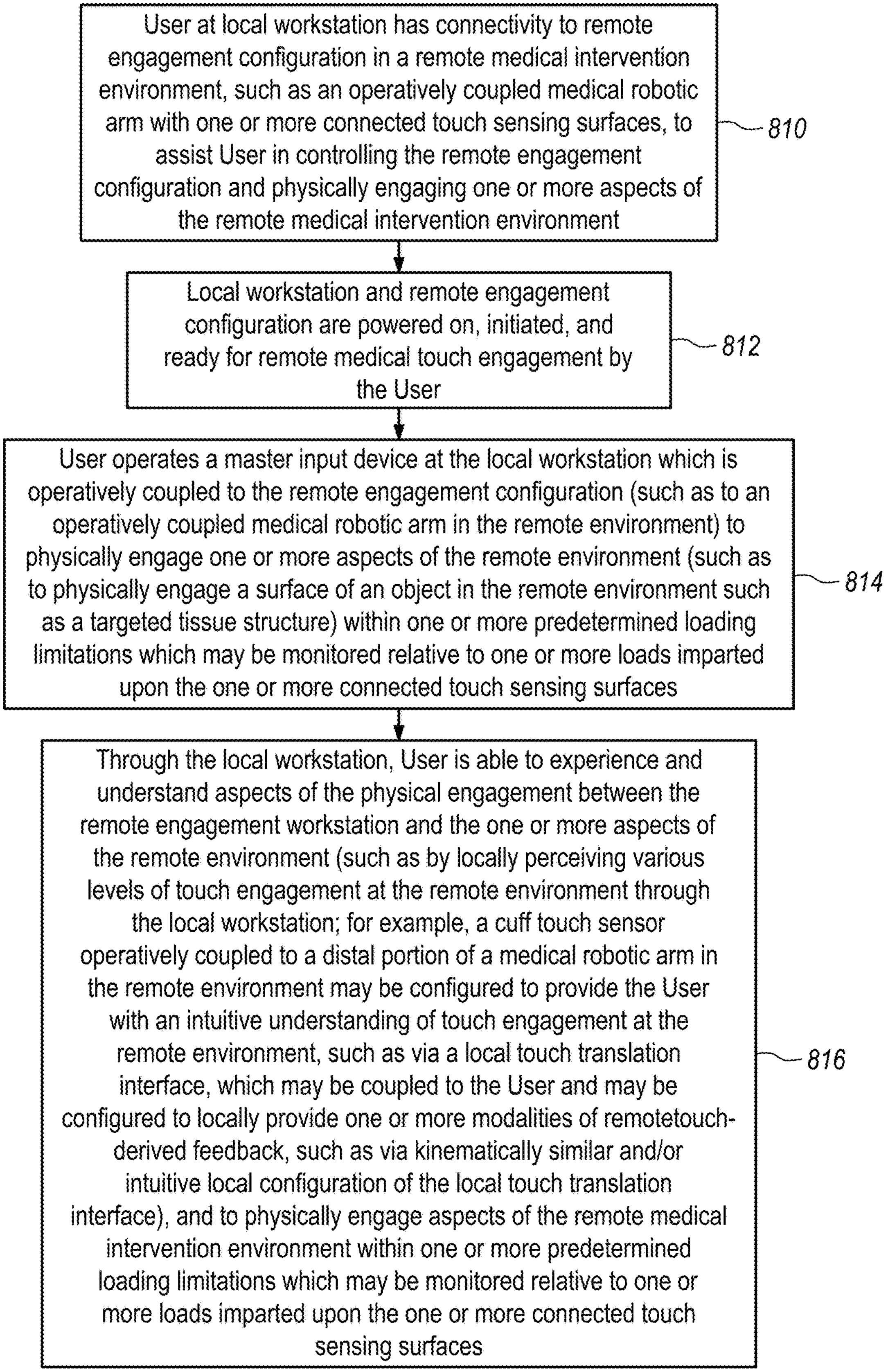

Referring to FIG. 47, a user at local workstation may have connectivity to remote engagement configuration in a remote medical intervention environment, such as an operatively coupled medical robotic arm with one or more connected touch sensing surfaces, to assist User in controlling the remote engagement configuration and physically engaging one or more aspects of the remote medical intervention environment (810). The local workstation and remote engagement configuration may be powered on, initiated, and ready for remote medical touch engagement by the user (812). The user may operate a master input device at the local workstation which is operatively coupled to the remote engagement configuration (such as to an operatively coupled medical robotic arm in the remote environment) to physically engage one or more aspects of the remote environment (such as to physically engage a surface of an object in the remote environment such as a targeted tissue structure) within one or more predetermined loading limitations which may be monitored relative to one or more loads imparted upon the one or more connected touch sensing surfaces (814). Through the local workstation, the user may be able to experience and understand aspects of the physical engagement between the remote engagement workstation and the one or more aspects of the remote environment (such as by locally perceiving various levels of touch engagement at the remote environment through the local workstation; for example, a cuff touch sensor operatively coupled to a distal portion of a medical robotic arm in the remote environment may be configured to provide the User with an intuitive understanding of touch engagement at the remote environment, such as via a local touch translation interface, which may be coupled to the user and may be configured to locally provide one or more modalities of remote-touch-derived feedback, such as via kinematically similar and/or intuitive local configuration of the local touch translation interface), and to physically engage aspects of the remote medical intervention environment within one or more predetermined loading limitations which may be monitored relative to one or more loads imparted upon the one or more connected touch sensing surfaces (816).

Figure 48:
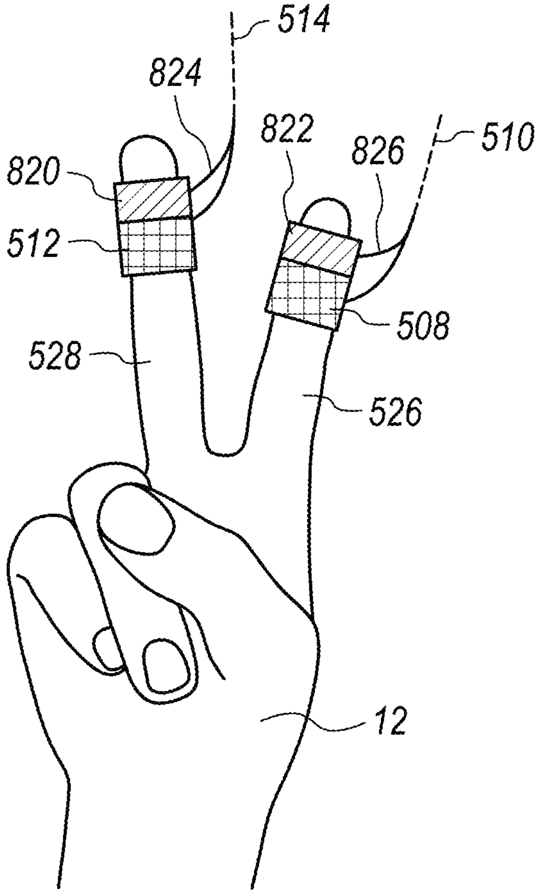

Referring to FIG. 48, an embodiment similar to that of FIG. 29C is shown to illustrate a hybrid configuration of both touch sensing and touch translation for each of two fingers (index finger 526, middle finger 528), wherein a touch translation interface (508, 512) may be removably coupled to each finger for kinematically similar feedback as described above in reference to FIG. 29C, for example, with the addition of cuff style touch sensing interfaces (822, 820; similar, for example, to those 360, 362, described above in reference to FIG. 18C), removably coupled to the fingers, and operatively coupled (826, 824), such as via wired or wireless connectivity (510, 514) to a computing system. Such a configuration may be configured and operated to provide a user with not only one or more sensations that intuitively pertain to activity at an intercoupled system such as a remotely located robotic grasper, for example, but also to provide the intercoupled computing system with further information pertaining to the local activity of the fingers of the user (for example, the touch sensing interfaces (822, 820) may be utilized to sense related increases or decreases in hoop-stress or hoop-strain which may be correlated with actuations, activities, motions, or intents thereof, of the fingers, as well as contacts between the fingers and other objects.

Figure 49:
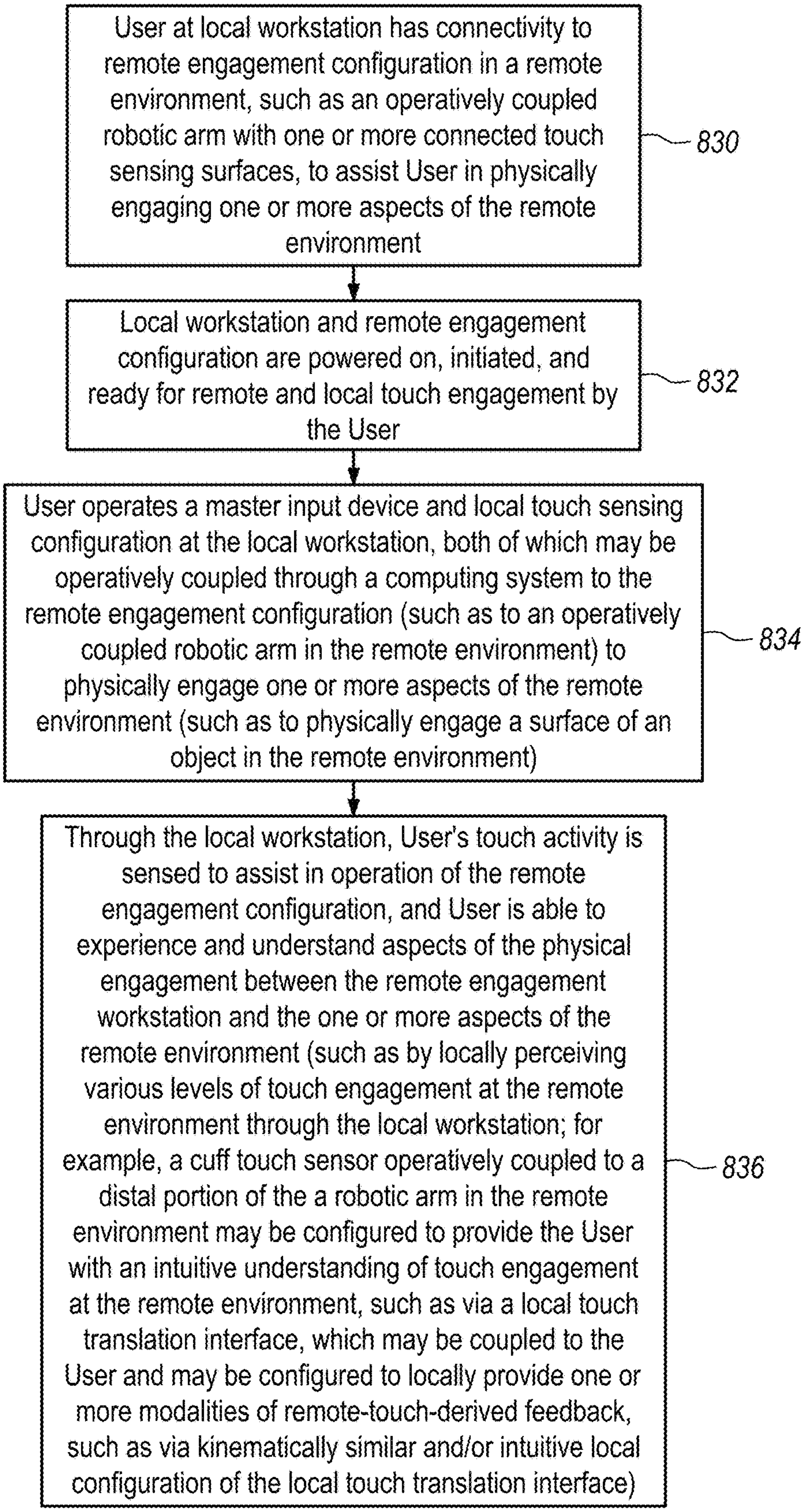

Thus referring to FIG. 49, an illustrative variation is shown wherein a configuration such as that described above in reference to FIG. 48 may be employed. Referring to FIG. 49, a user at local workstation may have connectivity to remote engagement configuration in a remote environment, such as an operatively coupled robotic arm with one or more connected touch sensing surfaces, to assist the user in physically engaging one or more aspects of the remote environment (830). The local workstation and remote engagement configuration may be powered on, initiated, and ready for remote and local touch engagement by the user (832). The user may operate a master input device and local touch sensing configuration at the local workstation, both of which may be operatively coupled through a computing system to the remote engagement configuration (such as to an operatively coupled robotic arm in the remote environment) to physically engage one or more aspects of the remote environment (such as to physically engage a surface of an object in the remote environment) (834). Through the local workstation, the user's touch activity may be sensed to assist in operation of the remote engagement configuration, and the user may be able to experience and understand aspects of the physical engagement between the remote engagement workstation and the one or more aspects of the remote environment (such as by locally perceiving various levels of touch engagement at the remote environment through the local workstation; for example, a cuff touch sensor operatively coupled to a distal portion of the a robotic arm in the remote environment may be configured to provide the User with an intuitive understanding of touch engagement at the remote environment, such as via a local touch translation interface, which may be coupled to the User and may be configured to locally provide one or more modalities of remote-touch-derived feedback, such as via kinematically similar and/or intuitive local configuration of the local touch translation interface) (836).

Referring to FIG. 50, a configuration similar to that of FIG. 49 is illustrated, but wherein the operator/user may utilize a similar hybrid local interface to operate within a synthetic or virtual environment. Referring to FIG. 50, a user at local workstation may have connectivity to virtual remote engagement configuration in a virtual remote environment, such as an operatively coupled virtual robotic arm with one or more connected virtual touch sensing surfaces, to assist the user in physically engaging one or more aspects of the virtual remote environment (840). The local workstation and virtual remote engagement configuration may be powered on, initiated, and ready for virtual remote touch engagement by the user (842). The user may operate a master input device and local touch sensing configuration at the local workstation, both of which may be operatively coupled to the virtual remote engagement configuration (such as to an operatively coupled virtual robotic arm in the virtual remote environment) to physically engage one or more aspects of the virtual remote environment (such as to virtually physically engage a surface of an object in the virtual remote environment) (844). Through the local workstation, touch activity pertaining to the user may be sensed to assist in operation of the virtual remote engagement configuration, and the user may be able to experience and understand aspects of the virtual physical engagement between the virtual remote engagement workstation and the one or more aspects of the virtual remote environment (such as by locally perceiving various levels of virtual touch engagement at the virtual remote environment through the local workstation; for example, a cuff touch sensor virtually operatively coupled to a distal portion of a virtual robotic arm in the virtual remote environment may be configured to provide the User with an intuitive understanding of virtual touch engagement at the virtual remote environment, such as via a local touch translation interface, which may be coupled to the User and may be configured to locally provide one or more modalities of remote-touch-derived feedback, such as via kinematically similar and/or intuitive local configuration of the local touch translation interface) (846).

Figure 51A:
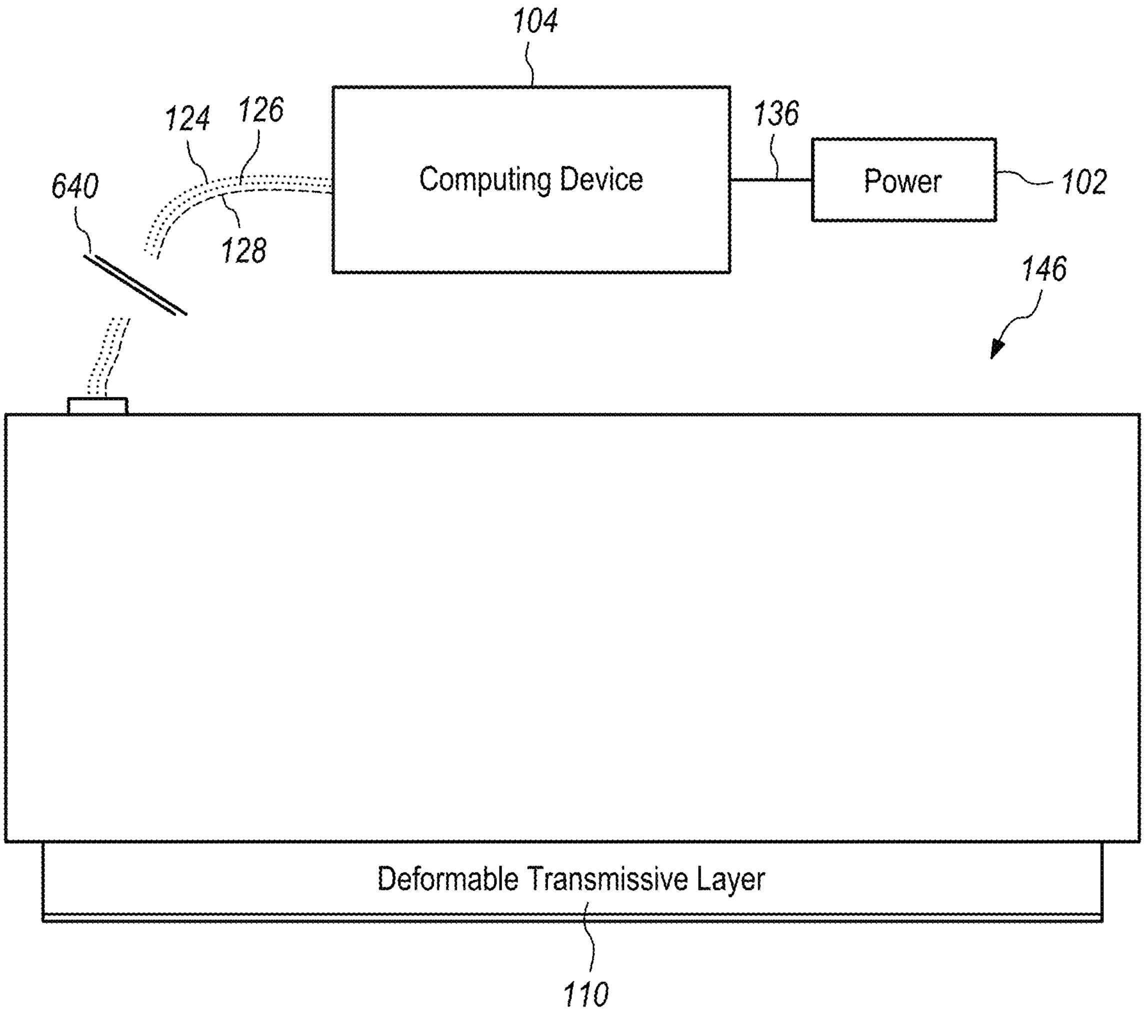
FIGS. 51A-51I illustrate various geometric configurations for tactile sensing which may be used, for example, to address various geometries of targeted surfaces.
Figure 51B:
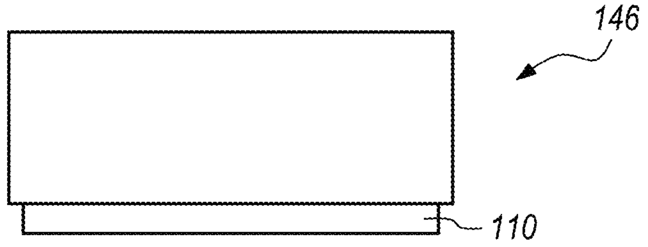
Figure 51C:
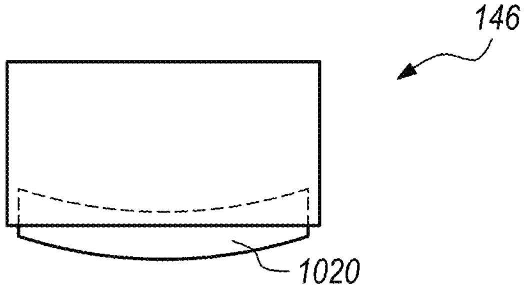
Figure 51D:
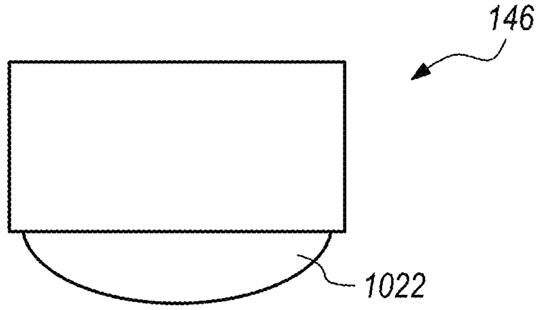
Figure 51E:
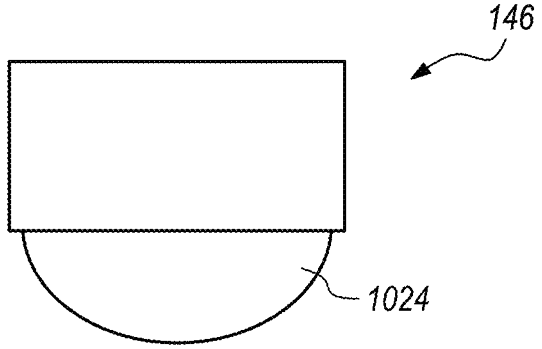
Figure 51F:
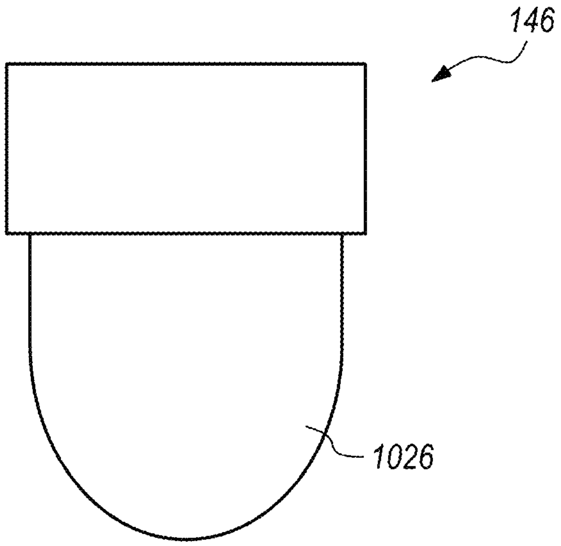
Figure 51G:
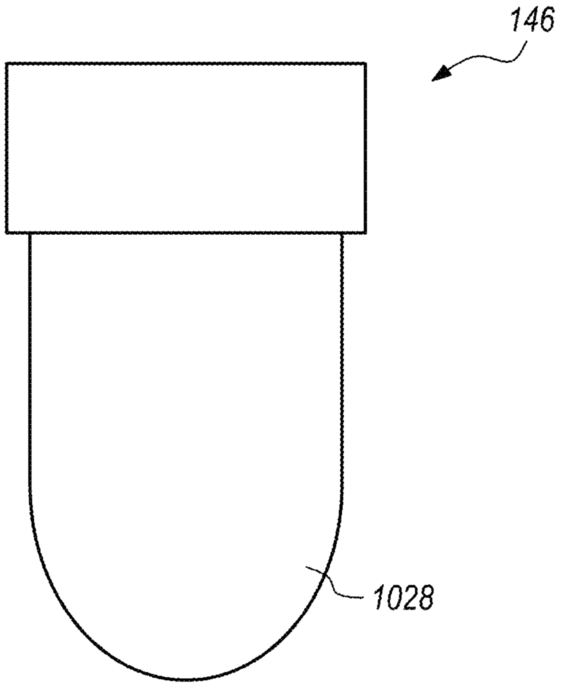
Figure 51H:
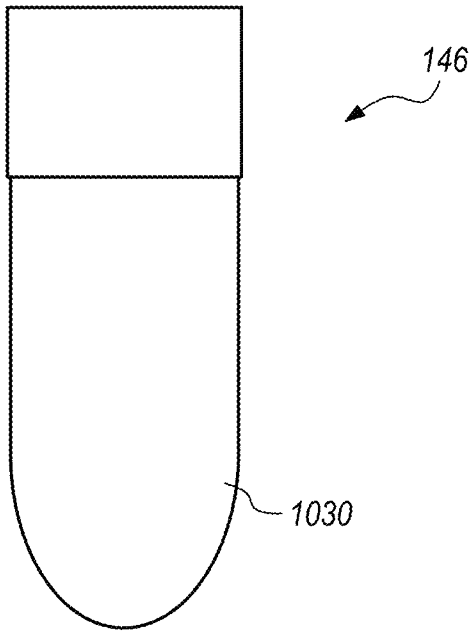
Figure 51I:
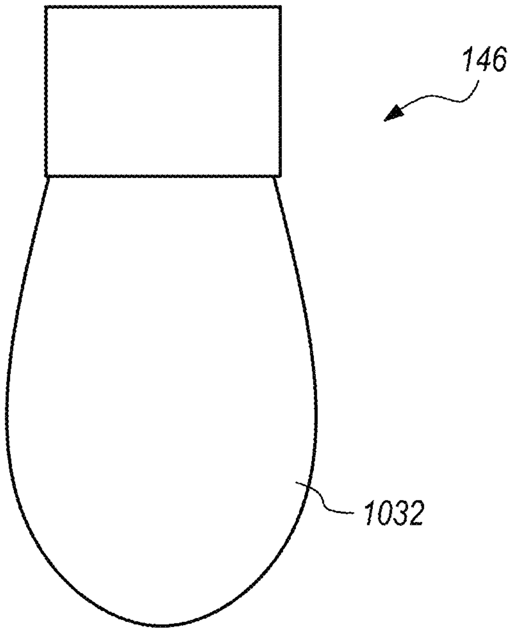

Referring to FIG. 51A, a system configuration similar to that described in reference to FIG. 7A is illustrated, such that a touch sensing assembly (146) featuring a deformable transmissive layer (110) is configured to be placed in contact with a surface of an object to be characterized. In various embodiments it may be useful to have a planar or semi-planar deformable transmissive layer (110), such as in a scenario wherein it is desired to observe and characterize the surface of a bill of currency placed on a flat table or perhaps a fingerprint pattern of a finger pressed toward the deformable transmissive layer. Referring to FIG. 51B, for comparison purposes, a smaller version of the touch sensing assembly (146) configuration of FIG. 51A is shown. Depending upon the particular scenario, it may be desirable to have a touch sensing assembly (146) featuring a deformable transmissive layer having an unloaded shape other than a planar or semi-planar shape, as noted above. For example, referring to FIG. 51C, a touch sensing assembly (146) is shown having an arcuate deformable transmissive layer (1020), which may be useful in addressing an arcuate or concave surface. FIGS. 51D and 51E illustrate variations featuring deformable transmissive layer shapes with may be, for example, ellipsoid (1022), or hemispherical (1024). FIGS. 51F and 51G illustrate variations featuring deformable transmissive layer shapes with may be semi-ellipsoid or semi-hemispherical with proximal elongate portions as shown (1026, 1028). Configurations such as those illustrated in FIGS. 51F and 51G may be useful for inspecting and/or characterizing surfaces which may be concave or cylindrical, for example. Referring to FIGS. 51H and 51I, a touch sensing assembly (146) may be configured to have an expandable lumen or bladder, such that it may be inserted to engage a surface, such as a hole or cylindrical surface, in a small and more elongate insertion configuration (i.e., with the inflation lumen or bladder in a relatively un-inflated configuration, such as with a gas or liquid) (1030) as shown in FIG. 51H, and then once in position for measurement and/or surface characterization, the deformable transmissive layer may be increased in volume (i.e., with the with the inflation lumen or bladder in a relatively inflated configuration, such as via positive pressure of a gas or liquid) (1032) such that it will be urged against the surrounding targeted surface for measurement and/or surface characterization, after which it may be again deflated and returned to a minimal configuration (1030) and removed. With a knowledge of the modulus of the deformable transmissive layer material along with precision deflection information pertaining to the surface, interfacial loading may be characterized as well. Indeed, with a knowledge of the characteristics of the deformable transmissive layer material, various properties of interfaced materials may be determined as well by using specific loading patterns at the interface. For example, in one embodiment, responses of a targeted surface detected through the deformable transmissive layer may be utilized to estimate, measure, and/or determine aspects of the structural modulus of the interfaced structure, as well as static and/or kinetic coefficients of friction (i.e., by detecting interfacial loads before slippage with applied loading, as well as after initial slippage into kinetic coefficient with continued applied loading). In addition to sliding, a rolling type of deformable transmissive layer may be utilized, such as one comprising a cylindrical or partially cylindrical deformable transmissive layer. Such a configuration may be utilized to capture data as rolled in the preferred roll direction along the targeted surface as dictated by the roll degree of freedom of the rollable deformable transmissive layer (i.e., like rolling paint with a paint roller), and/or the roller may be slided in another direction (i.e., in a manner that one would smear a paint roller in a direction not aligned with the paint roller's preferred direction of rolling relative to a wall).

The radius of curvature for the deformable transmissive layer, such as shown in FIGS. 51C-51I (1020, 1022, 1024, 1026, 1028, 1030, 1032) may be configured to address the particular application at hand. For example, in various embodiments, as noted above, a radius of curvature may be selected to at least partially match a radius of curvature of a targeted surface. In other embodiments, a relative small radius of curvature may be utilized, such as in the range of about 0.5 mm to about 5 mm, to assist in effectively characterizing the location of a point in space. In other embodiments, the deformable transmissive layer may comprise a relatively high modulus or high stiffness portion (such as a relatively small spherical or cuboid portion within the larger deformable transmissive layer) located at a known X-Y location within the larger deformable transmissive layer, to provide an effective point sensor functionality at that known point.

Figure 52:
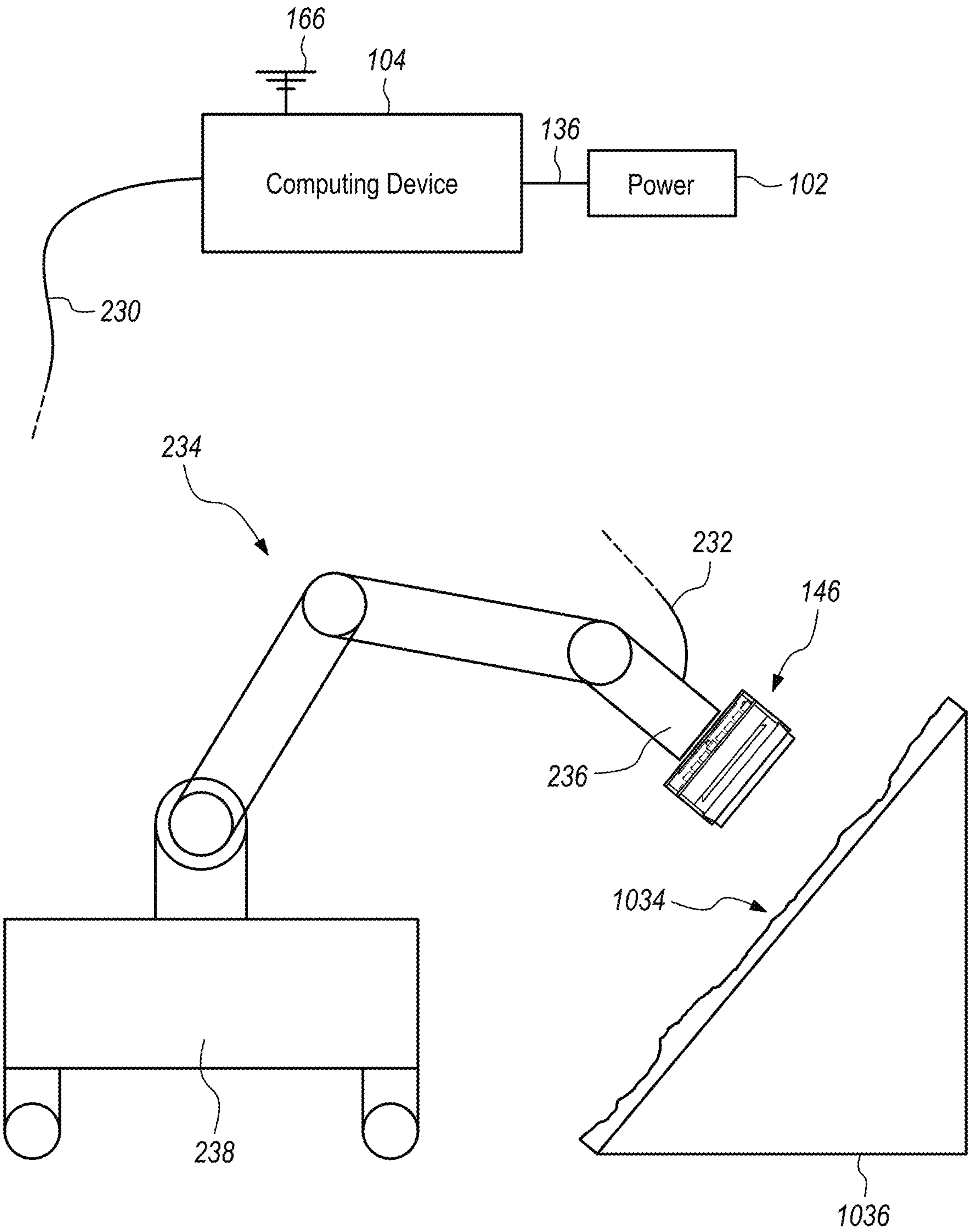
FIGS. 52-58 and FIG. 59A-59B illustrate various aspects of tactile sensing system configurations featuring one or more computing devices or computing systems operatively coupled with one or more deformable transmissive layers which may be utilized to provide geometric information regarding a targeted structure, such as a riveted surface structure, an engine block, or other structure and/or surface.

Referring to FIG. 52, a configuration similar to that described in reference to FIG. 11 is illustrated, with a touch sensing assembly (146), such as those illustrated in reference to FIGS. 51A-51I, coupled to an electromechanical arm (234), such as a robotic arm, which may be affirmatively controlled, such as via drive commands from a user, or via drive commands from a software-based controller. The arm (234) may be utilized to controllably and accurately position and orient the touch sensing assembly (146) using affirmative electromechanical navigation and/or movement (such as via intercoupled motors) such that a surface (1034) which may be supported by a mount or substrate (1036) may be characterized using the touch sensing assembly (146).

Figure 53:
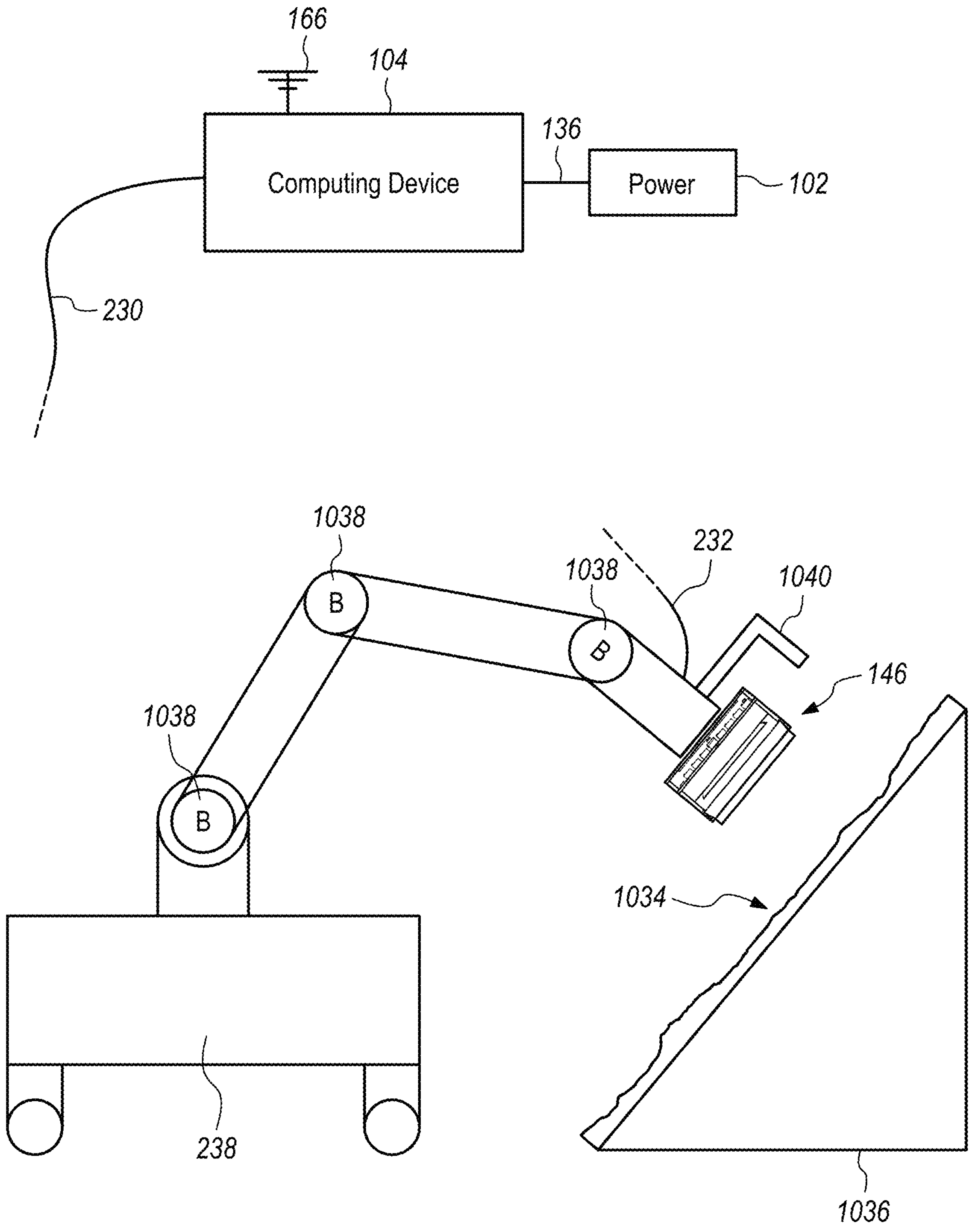

Referring to FIG. 53, a configuration similar to that of FIG. 52 is illustrated, but rather than having affirmative electromechanical movement provided by the associated articulated arm, the arm may be configured to be pulled around for positioning and orientation by a user using one or more handles (1040, 1041), and the joints of the arm may be electromechanically braked such that the user may command the brakes (1038) to hold a position and/or orientation in space (in other words the arm may be configured to be clutched and unclutched to facilitate manual movement by the user with the handle). The braked joints (1038) may be configured to have joint position sensors, such as optical encoders, to assist in determination of joint positions for overall position and orientation determination of the touch sensing assembly (146), such as relative to a global coordinate system.

Figure 54:
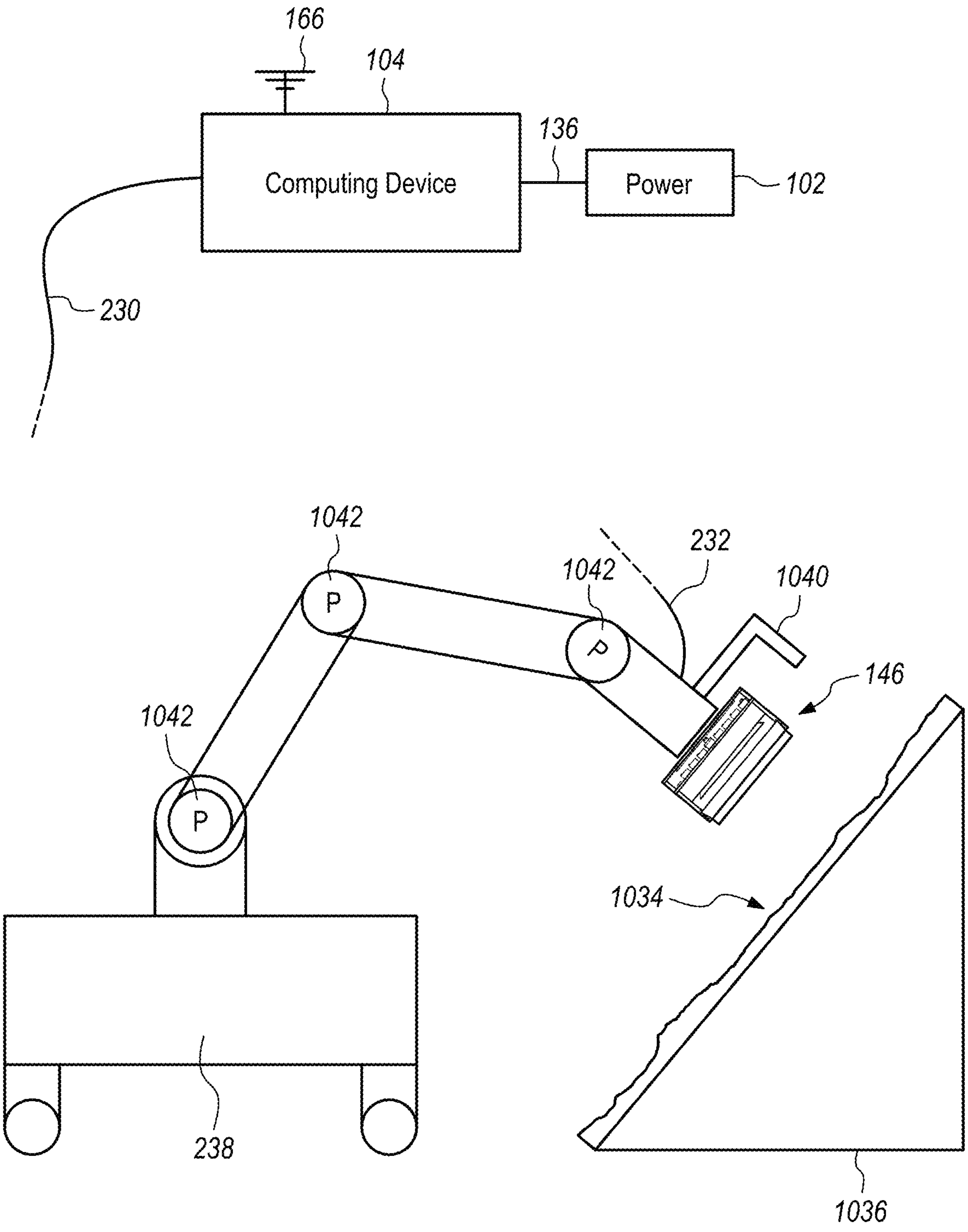

Referring to FIG. 54, a configuration similar to that of FIG. 53 is shown, but with passive (i.e., un-braked) joints (1042), such that the user may pull the touch sensing assembly (146) around in space and into engagement with the surface (1034) manually while the joint positions of the arm may be utilized to track the position and/or orientation of the touch sensing assembly (146), such as relative to a global coordinate system.

Figure 55:
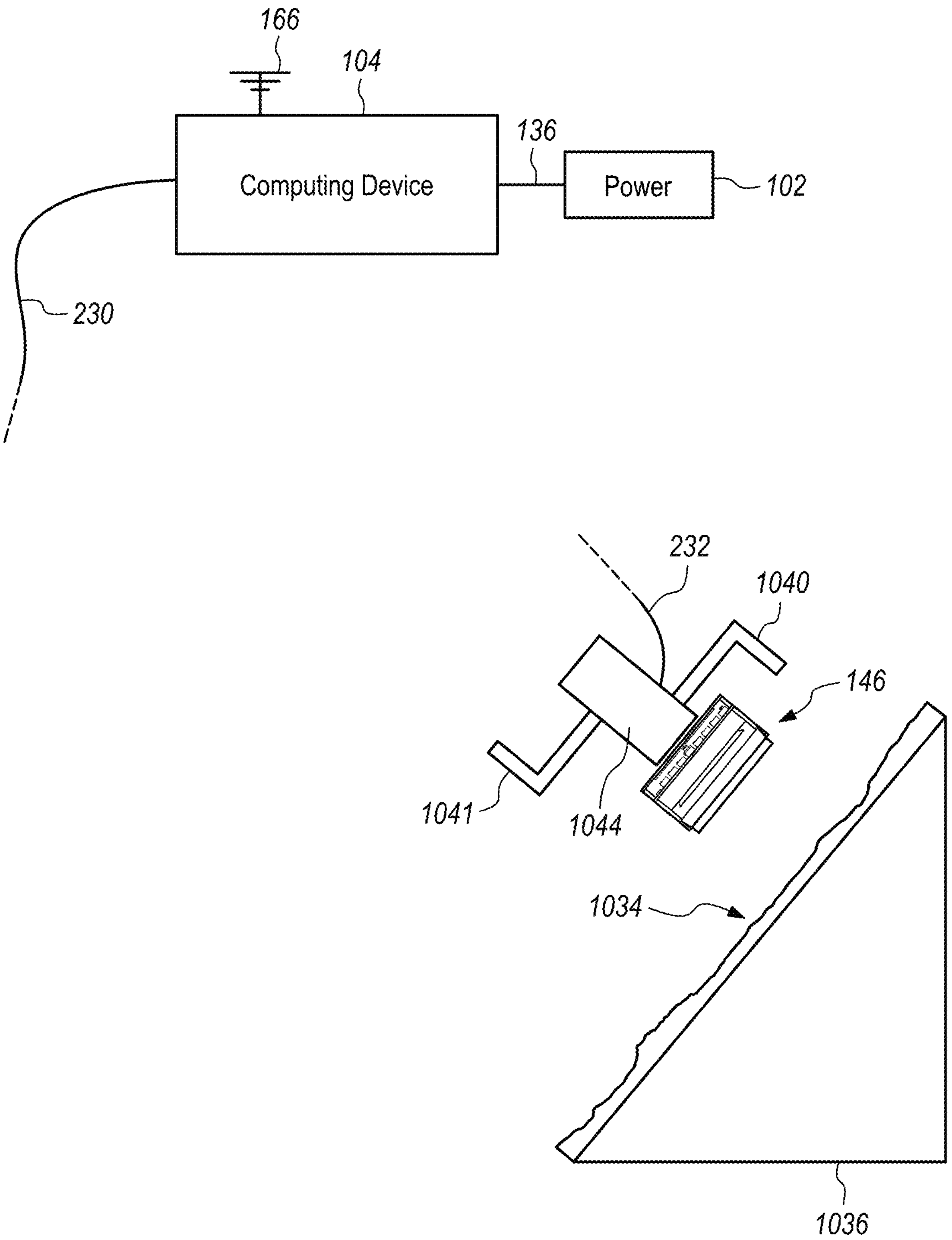
Figure 56:
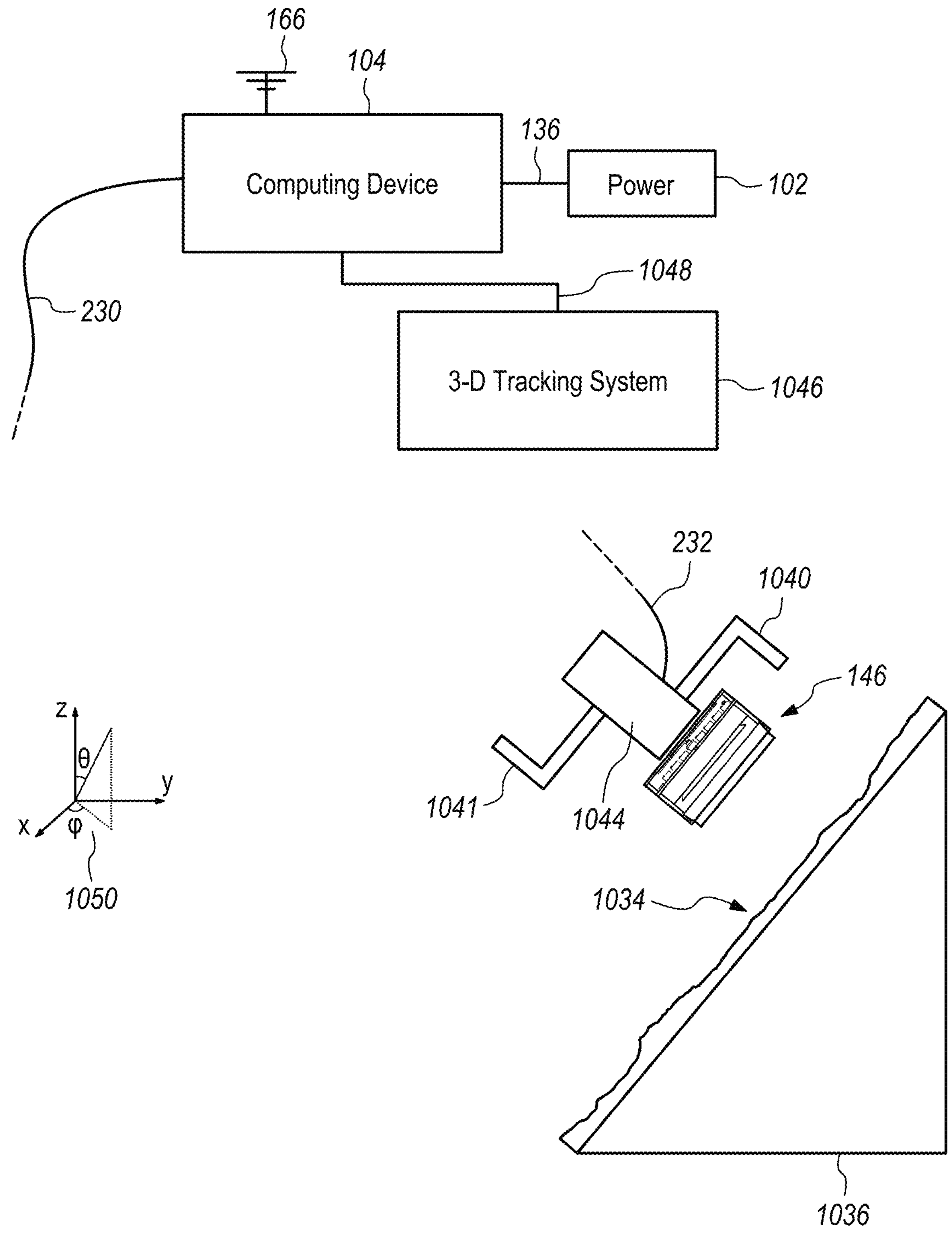
Figure 57:
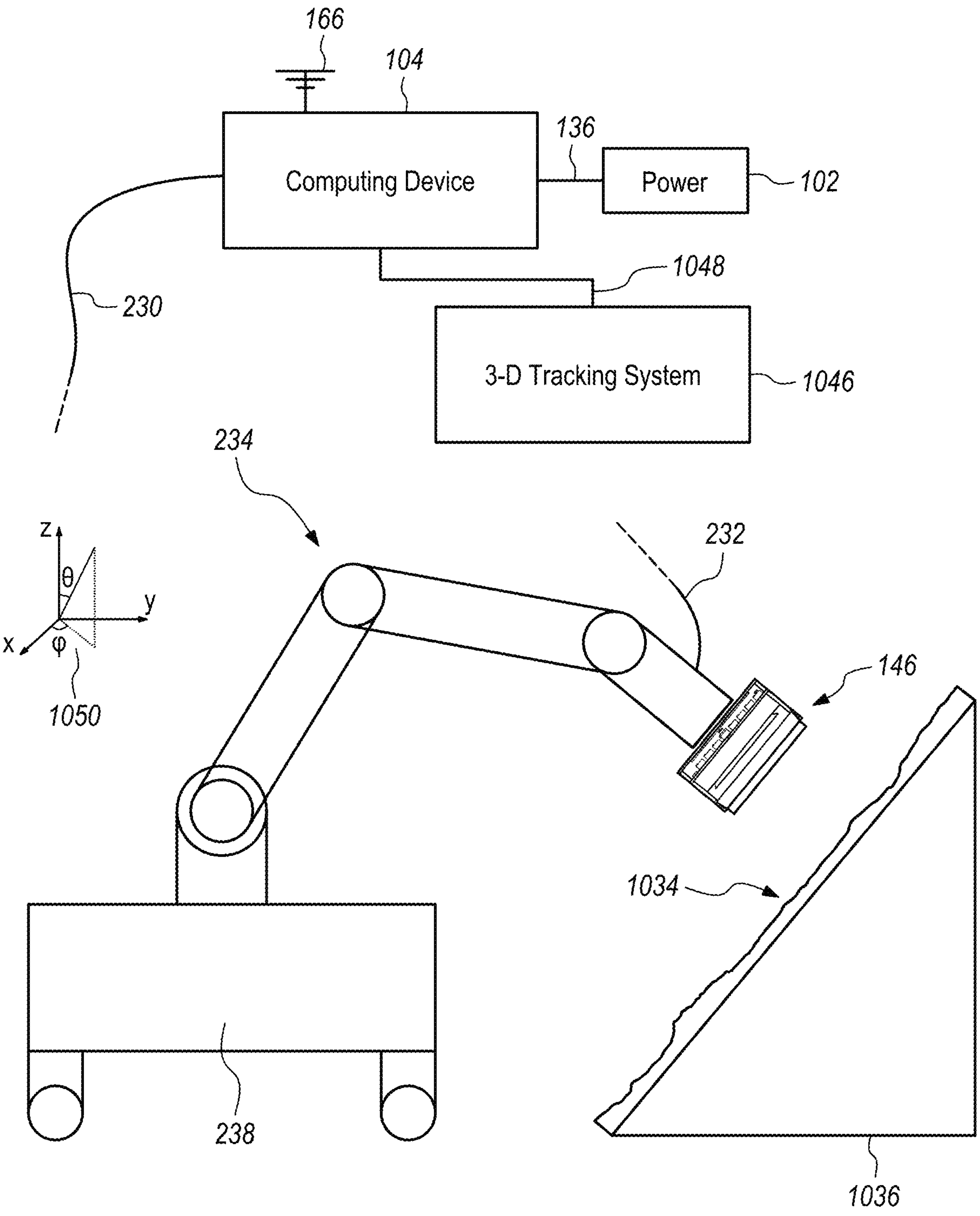

Referring to FIG. 55, a configuration is illustrated without a support arm, such that it may be held in position/orientation manually by an operator or user, such as by using the handles (1040, 1041) that are coupled to main housing (1044) which is coupled to the touch sensing assembly (146). Referring ahead to associated FIG. 56, to assist in tracking the position and/or orientation of the touch sensing assembly (146) in space and relative to the surface (1034) of interest and/or a global coordinate system (1050), one or more tracking systems (1046) may be operatively coupled, such as via wired or wireless connection (1048), to the computing device (104) to assist in such position and/or orientation determination. For example, in various embodiments, optical tracking configurations using tracked fiducials mounted, for example, upon the housing (1044) or touch sensing assembly (146), and a detector, such as a stereo-detector based configuration comprising the 3-D tracking system (such as those available from Northern Digital, Inc.) may be utilized. Similarly electromagnetic tracking systems, such as those available from Ascension, Inc., may be utilized for tracking, such as relative to a global coordinate system (1050). Indeed, referring to FIG. 57, such tracking systems (1046) may be utilized in addition to kinematic-based tracking configurations (such as those which may employ an arm 234). Further, referring to FIG. 58, a configuration having some components in common with FIG. 13A, for example, is illustrated also comprising tracking components such as those illustrated in FIG. 57 for use in tracking and/or determination of position and/or orientation, such as relative to a global coordinate system (1050). The illustrated imaging or image capture devices (270, 272) may comprise various detector types, and may also be utilized along with texture projectors and in stereo configuration to assist in depth and other characterization, as well as to address occlusions (i.e., by being positioned at different view vectors toward the subject surface) which may occur at various positions and/or orientations of the assembly (146). Further, the image capture device resident within the touch sensing assembly (146), as described above, may be also utilized for image capture through the deformable transmissive layer. Capture of various images and/or data points may be induced in various ways, such as manually by an operator (such as by control interface initiation through buttons, software, voice activation, remote connected-device triggering, and the like), and/or automatically such as via a force limitation, determined geometric or measured limitation, or based upon an optics or image capture device focus limitation.

Figure 58:
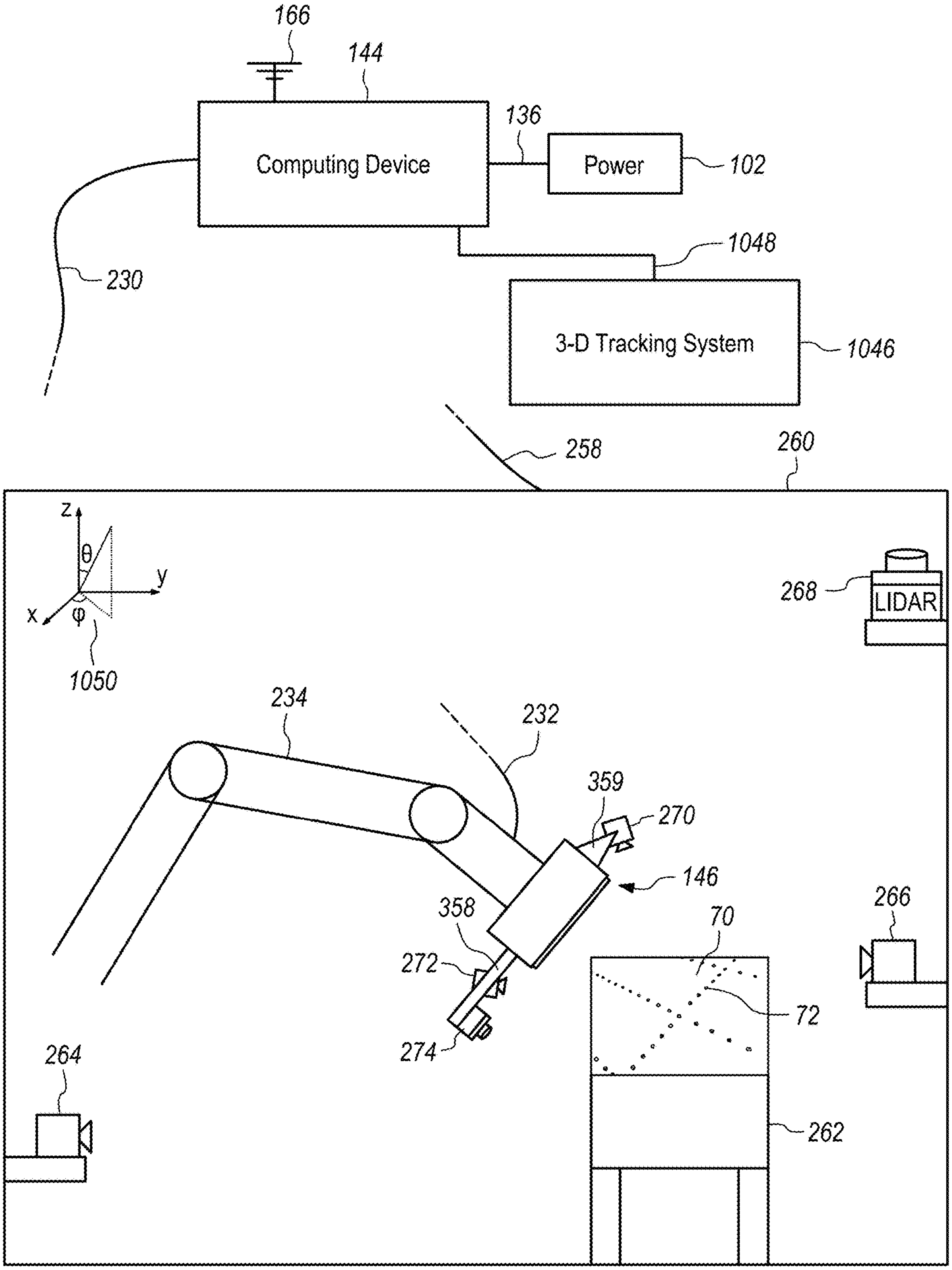
Figure 59A:
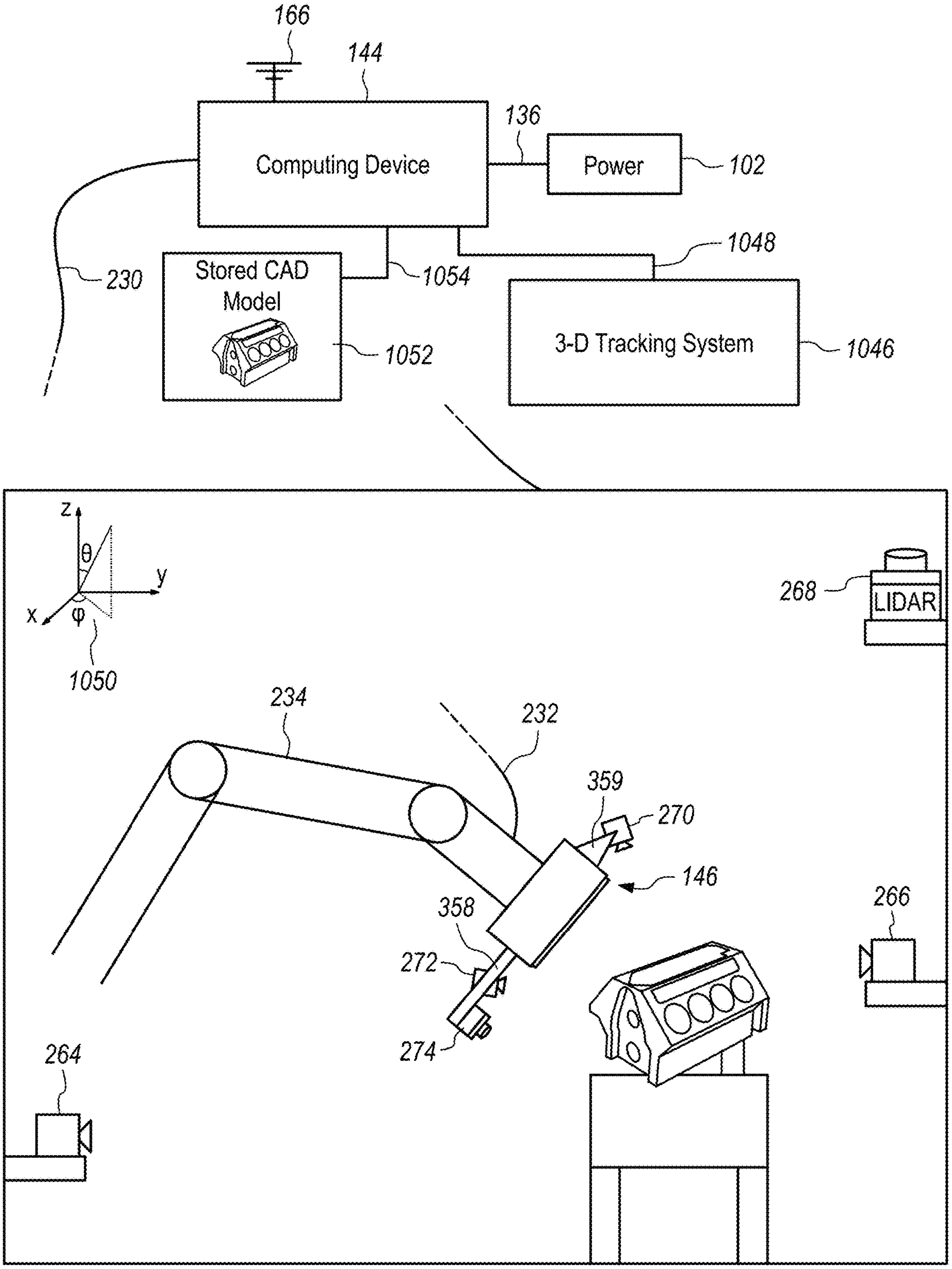

Referring to FIG. 59A, a configuration similar to that of FIG. 58 is illustrated in a scenario wherein a touch sensing assembly (146) is being positioned and oriented to characterize various aspects of an engine block mechanical part (1126) which has been manufactured. In various embodiments, the articulated arm (234) may be utilized to position and/or orient the touch sensing assembly (146) to various positions and orientation such that surfaces of the engine block (1126) may be characterized. Further, a model of the engine block, such as an ideal "as-designed" computer-aided-design ("CAD") model, may be stored on a storage device or system (1052), which may be operatively coupled to the computing system (144), such as via wired or wireless connectivity (1054)—and this model may be utilized in the analysis and observation of the engine block mechanical part being inspected (1126) with the touch sensing assembly (146), such as via comparison to the ideal model. In various embodiments, the model may become registered in position and orientation to the observed version, such as via gathering a sequence of points and/or surfaces and determining a registration alignment, after which measurements may be made of the actual part to determine compliance with the ideal model, for example for quality assurance purposes. Indeed, in various embodiments, a digital representation version of the ideal model may be represented to illustrate changes, defects (for example, geometric changes, more subtle issues such as scratches, and the like), and/or deviations from the ideal model (i.e., if a member is supposed to be straight in the ideal model, but is bent in the measured model, it maybe represented as bent in the digital representation version, and may be visually highlighted as a deviation, such as via distinguishing coloration in the pertinent display interface).

Figure 59B:
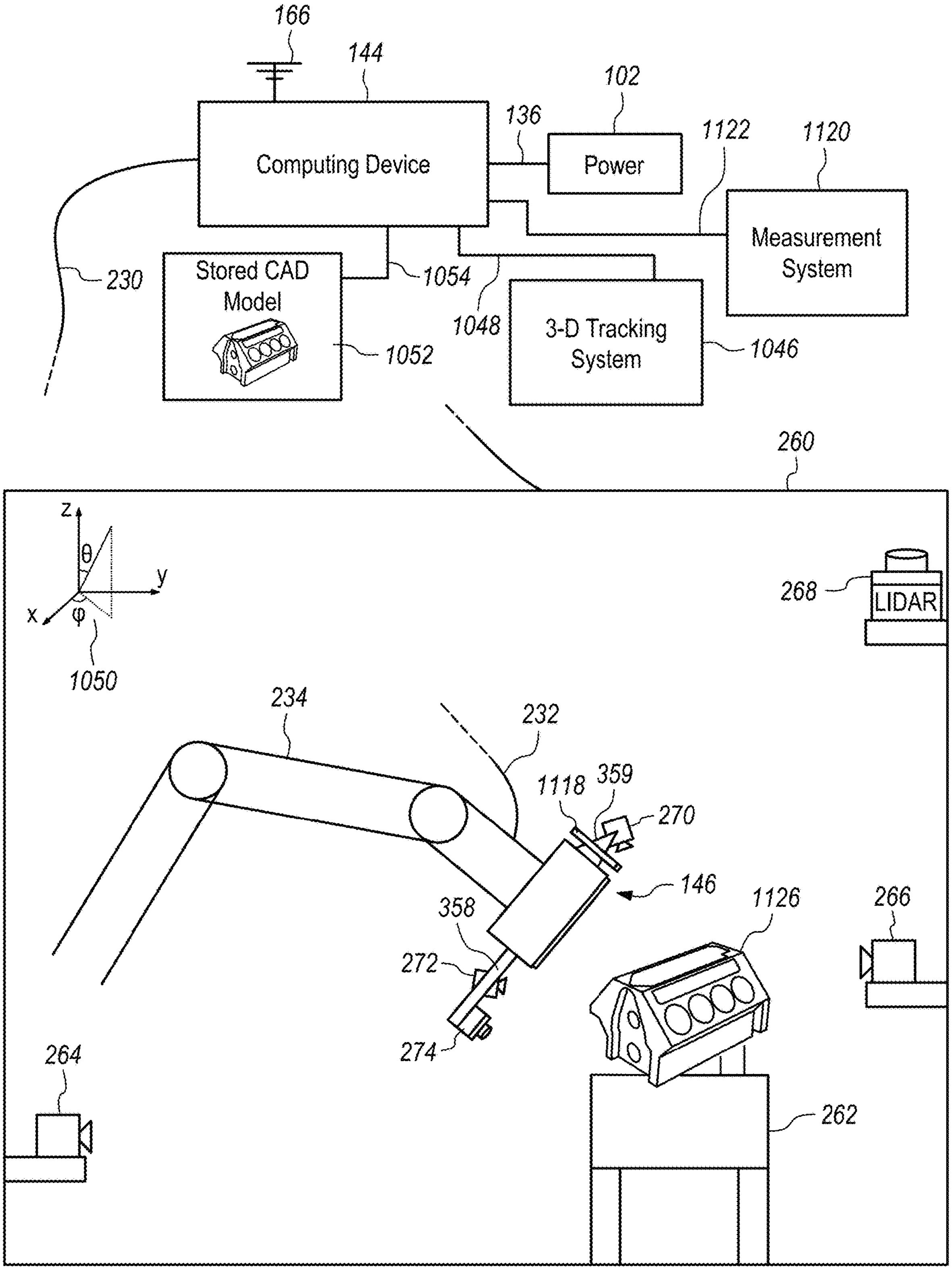

Referring to FIG. 59B, a configuration similar to that of FIG. 59A is illustrated, with the addition of an operatively coupled measurement system (1120) and measurement probe (1118). The measurement probe (1118) may be configured to provide a point determination in addition to (i.e., such as in parallel to) the information gathered by the other integrated system components (146, 234, 144, etc). Suitable measurement probes (1118) may also be referred to as "touch probes", "coordinate measuring machine probes" or "CMM probes" ("CMM" generally referring to coordinate measuring machines which feature measurement probes and may be configured to utilize such probes to provide measurement). The measurement system may be operatively coupled, such as via wired or wireless connectivity (1122) to the computing device (144).

Figure 60A:
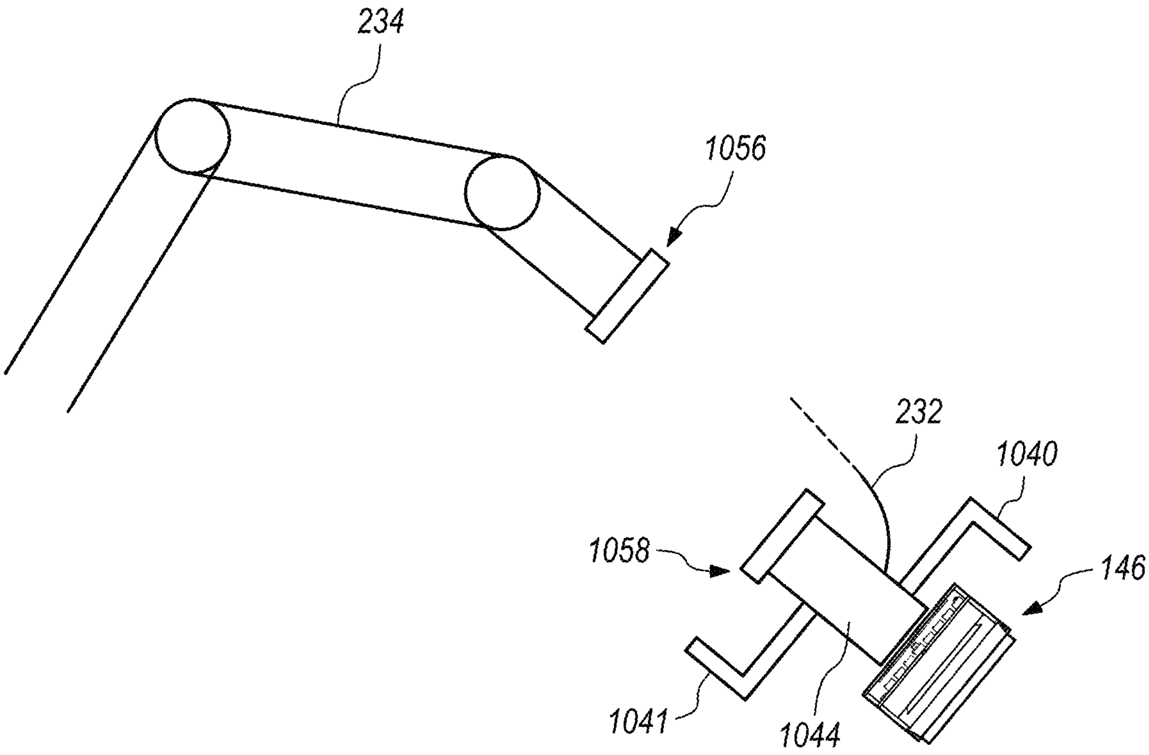
FIGS. 60A-61F illustrate various aspects of tactile sensing system configurations which may be removably coupled from certain physical support structures to form hand-held configurations which may be utilized to provide geometric information regarding a targeted structure.
Figure 60B:
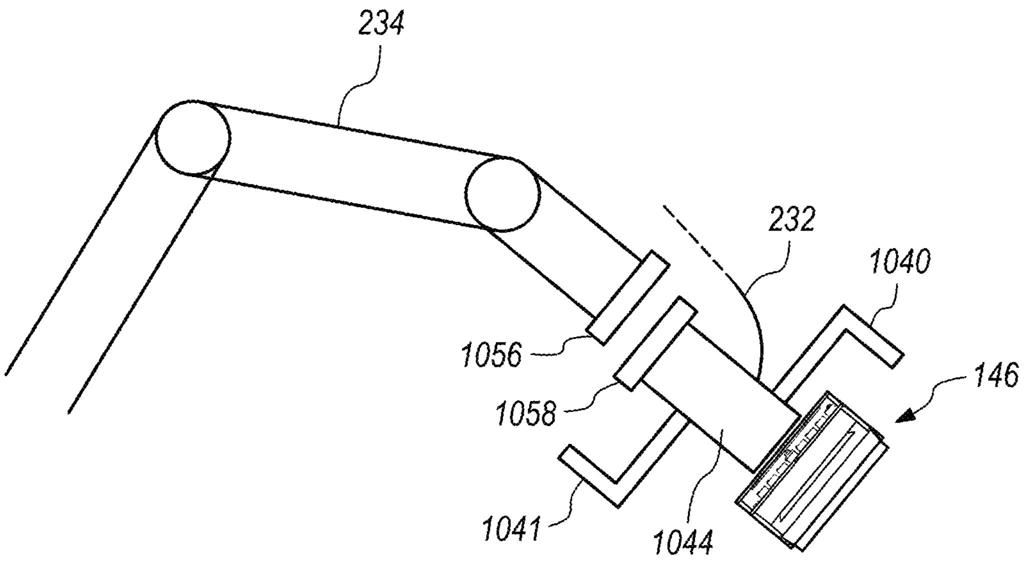
Figure 60C:
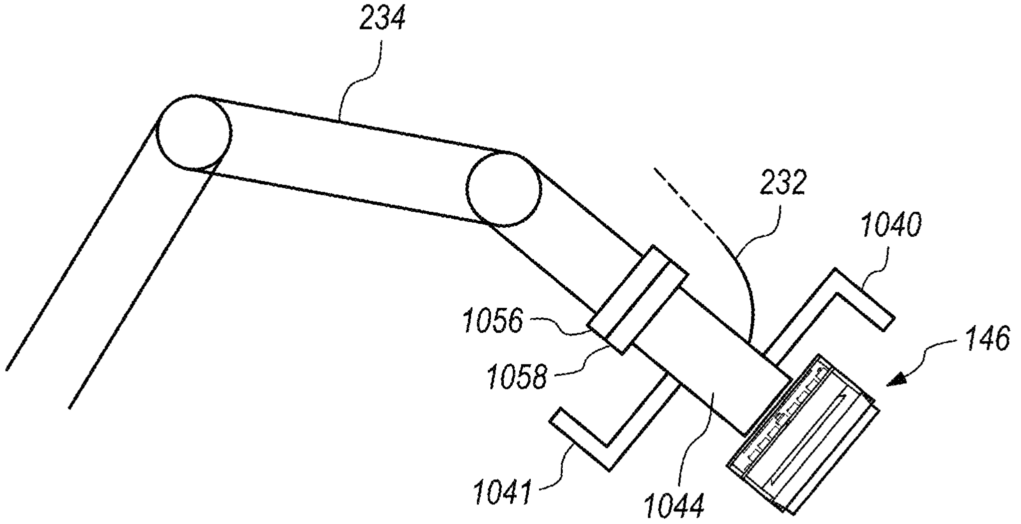
Figure 60D:
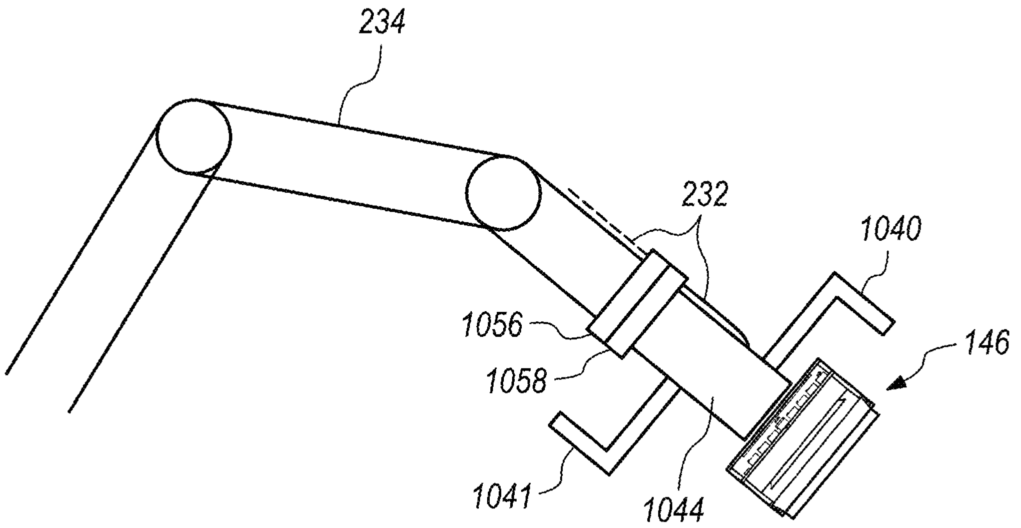
Figure 60E:
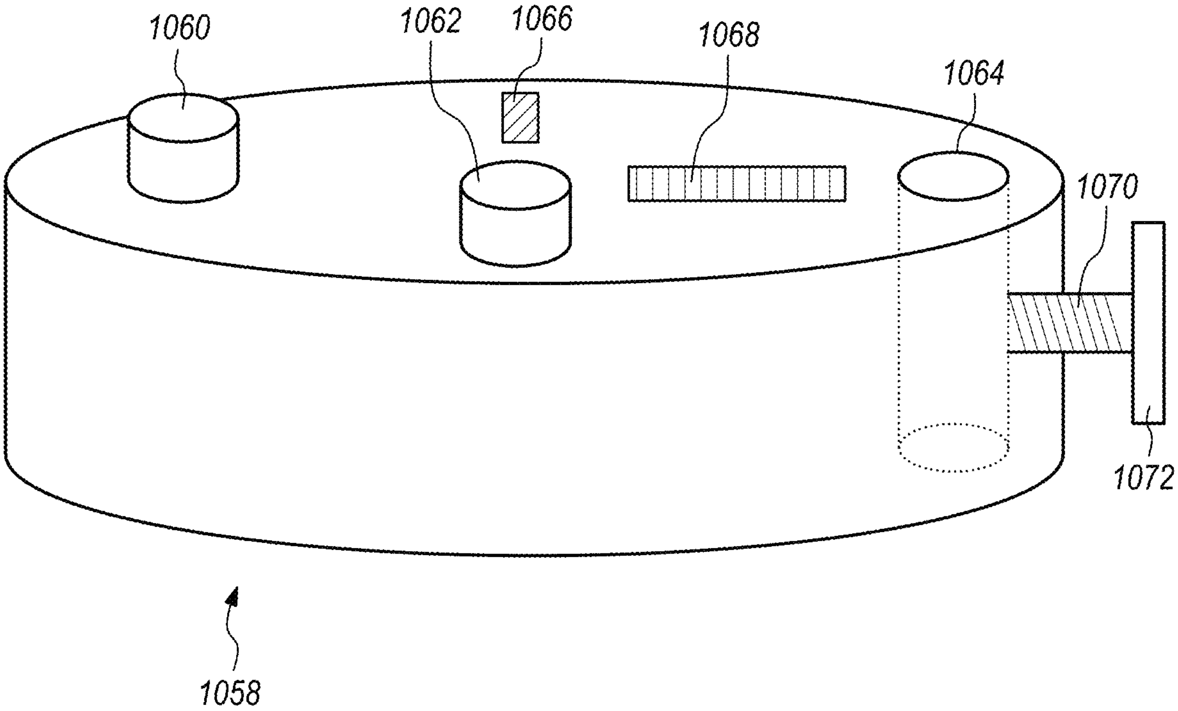

Referring to FIG. 60A, it may be desirable to have a convenient interface for mechanically and/or electromechanically interfacing a touch sensing assembly (146) and associated hardware to an arm (234). A set of removable coupling interfaces (1056, 1058) may be configured such that they may be securely urged and locked together during operation (as shown, for example, in FIGS. 60B, 60C, and 60D), and then conveniently decoupled later back to a state such as shown in FIG. 60A. Referring to FIG. 60E, an interface configuration, such as one of a mating pair (1056, 1058), is illustrated having a plurality of protruding features (1060, 1062) and one or more cavity features (1064) as well as electronic engagement features (for example, a power lead may be passed by contact through the interface 1066; an information I/O interface may be passed by contact through the interface 1068). An opposite/opposing interface (for example with a protruding member configured to fit into the cavity 1064 shown and cavities configured to precisely engage the protruding members shown 1060, 1062) may be conveniently removably intercoupled with a known relative orientation. To retain engagement of the mechanical and electrical (1066, 1068) interfaces when desired, a screw (1070) may be rotated with a handle (1072) (i.e., to screw in and fix against an inserted protruding member matched to the cavity 1064 shown) for temporary fixation during coupling. FIG. 60D illustrates the electronic and/or power coupling (232) going across the removable engagement.

Figure 61A:
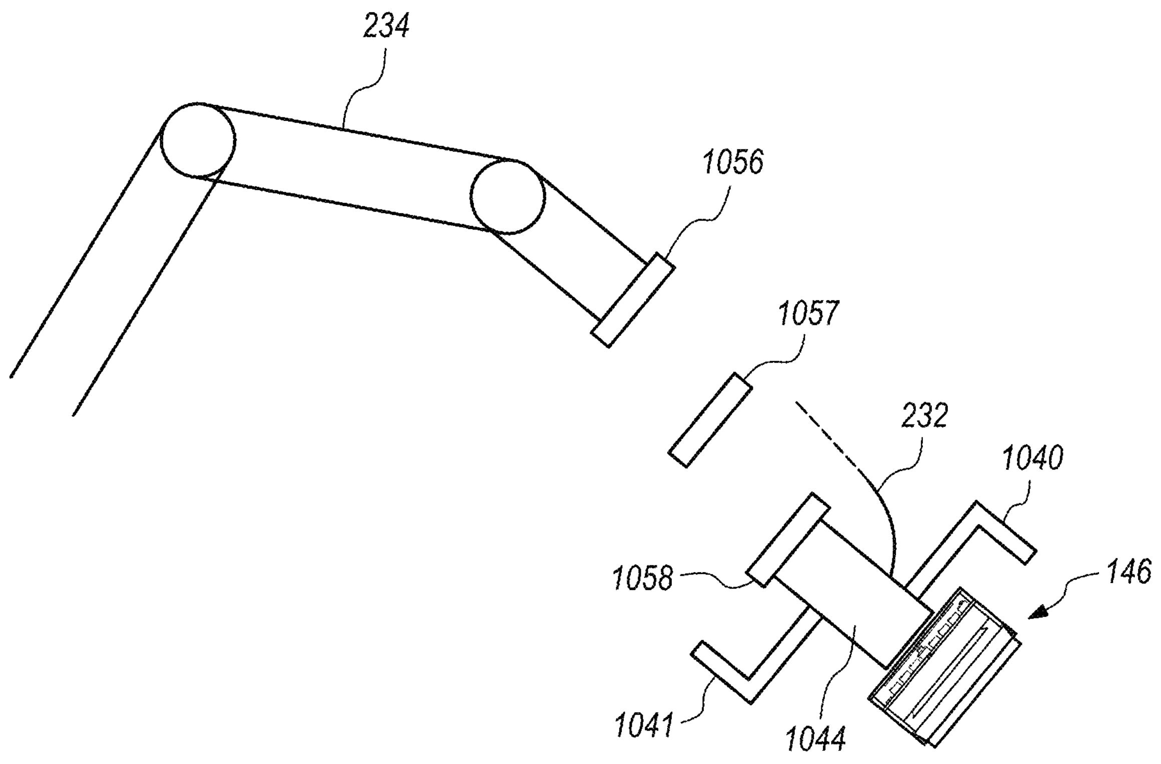
Figure 61B:
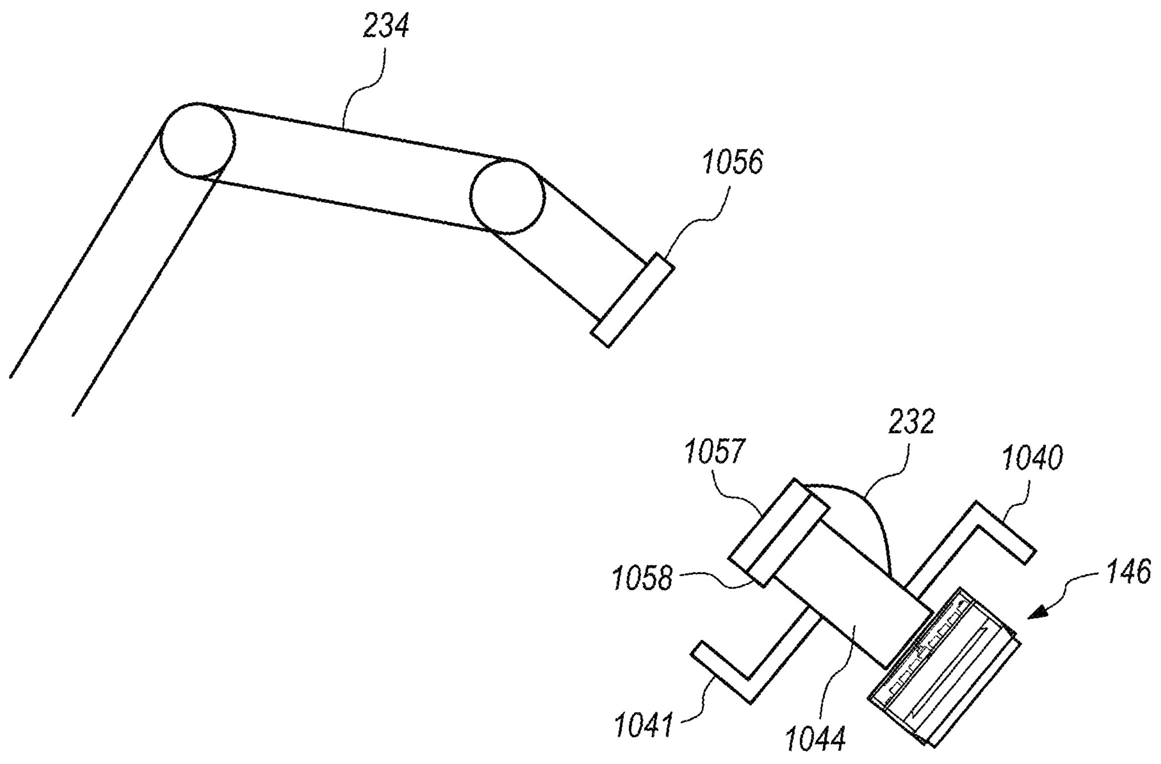
Figure 61C:
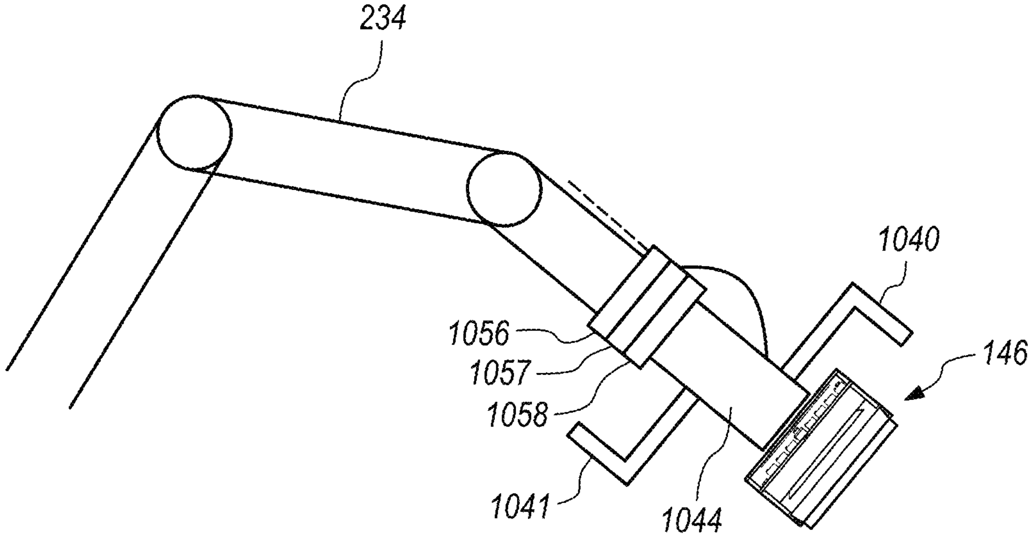

Referring to FIGS. 61A-61C, an intermediate adaptor member (1057) may be utilized to accommodate coupling between two interfaces which are may not be designed to couple with each other (in other words, if A is not designed to couple to C, an adaptor 1057 may be configured to provide a removable coupling by having one aspect of the adaptor coupleable to A and another aspect of the adaptor coupleable to C; i.e., A-(AB/BC)-C, the "AB/BC" portion of this simple representation being the adaptor (1057).

Figure 61D:
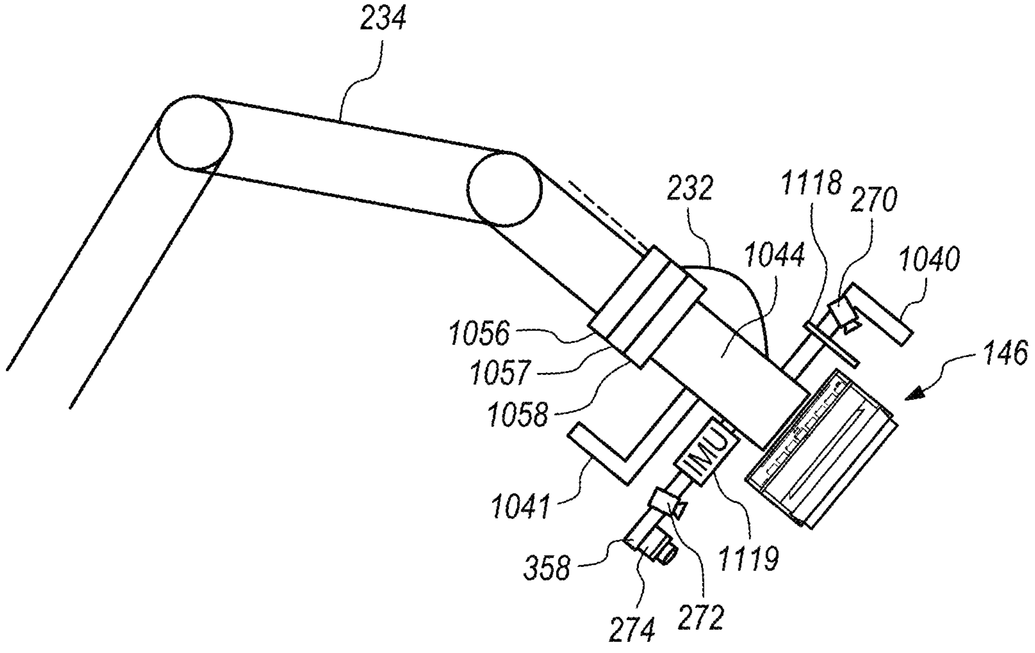
Figure 61E:
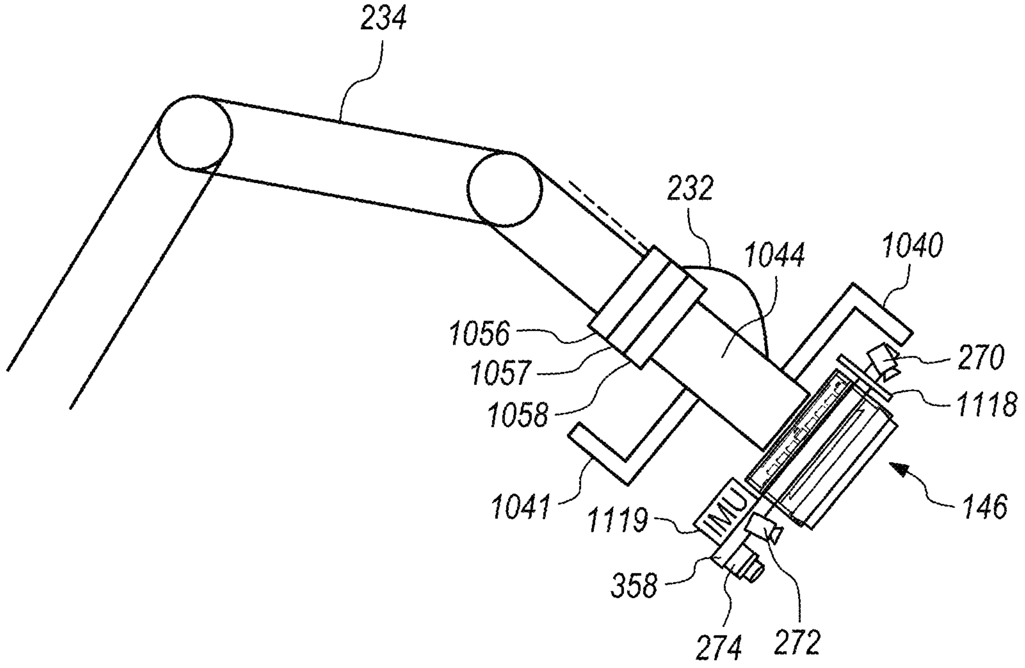
Figure 61F:
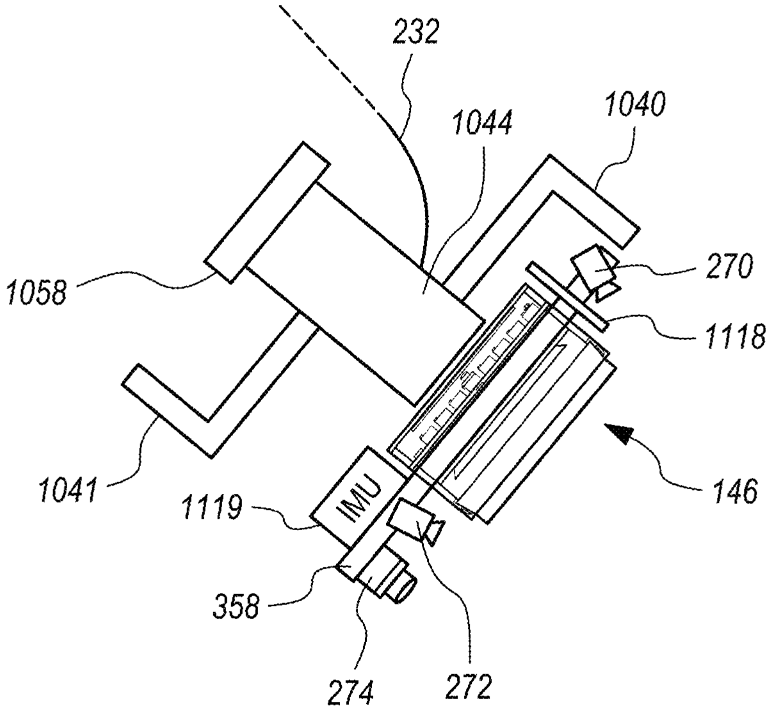

Referring to FIGS. 61D-61F, one of more variations of a structural member or mounting member (358) may be utilized to demonstrate that a removably coupleable or detachable configuration designed to become handheld as desired (such as those illustrated in detached form FIGS. 60A, 60B, 61A, 61B, and 61F) may be instrumented in a manner similar to as illustrated in reference to the attached variations (such as in FIGS. 58, 59A-B, for example) to enhance operational capabilities relative to targeted surfaces and/or structures. For example, referring to FIGS. 61D and 61E, a sensing assembly (146) is illustrated still coupled to a support structure such as a robotic arm (234). The variation of FIG. 61D has a more proximal mounting member (358) coupled to the main housing (1044) which has an image capture device (272), a LIDAR device (274), and an inertial measurement unit (IMU 1119; may comprise one or more accelerometers and one or more gyros to assist in sensing linear and angular accelerations, for example) coupled thereto. The opposing manipulation handle (1040) may be utilized for mounting or coupling an additional image capture device (270) and measurement probe (1118) as described above, such that the touch sensing interface of the sensing assembly (146) may be manually or automatically monitored and/or positioned relative to other objects, such as targeted surfaces. The embodiment of FIGS. 61E and 61F illustrate similar instrumentation, but with the mounting structure (358) carrying the instrumentation (270, 272, 274, 1119, 1118) closer to the touch sensing interface of the sensing assembly (146) with a coupling of the mounting structure (358) directly to the sensing assembly (146). FIG. 61F illustrates the distal portion decoupled from the proximally supporting robot arm (234) of FIG. 61E, such that it may be handheld and freely movable in space relative to other objects, while also being trackable using the instrumentation (for example 270, 272, 274, 1119, 1118). For example, the embodiments of FIG. 61E or 61F may be utilized to be electromechanically moved (61E) or manually moved (61F) to conduct a tactile analysis of a targeted object within reach of the sensing assembly (146), for example via individual touch/contact vectors or approaches, by repeated patterns of adjacent touches/contacts, via a predetermined pattern (for example of adjacent touches/contacts), or via a more exploratory series of approaches using a simultaneous localization and mapping ("SLAM") approach to explore and characterize one or more geometric feature which may, for example, be heretofore uncharacterized (for example, such as down a hole or aperture, or inside of a defect or very difficult to access or image surface or feature). In various embodiments, the operatively coupled computing system may be configured and utilized to stitch geometrically adjacent geometric profiles together using interpolation of the geometric profiles and relative positions and orientations thereof, and/or to present to a user a two or three dimensional mapping of one or more geometric profiles relative to each other, such as within a global coordinate system, using a graphical user interface.

Figure 62:
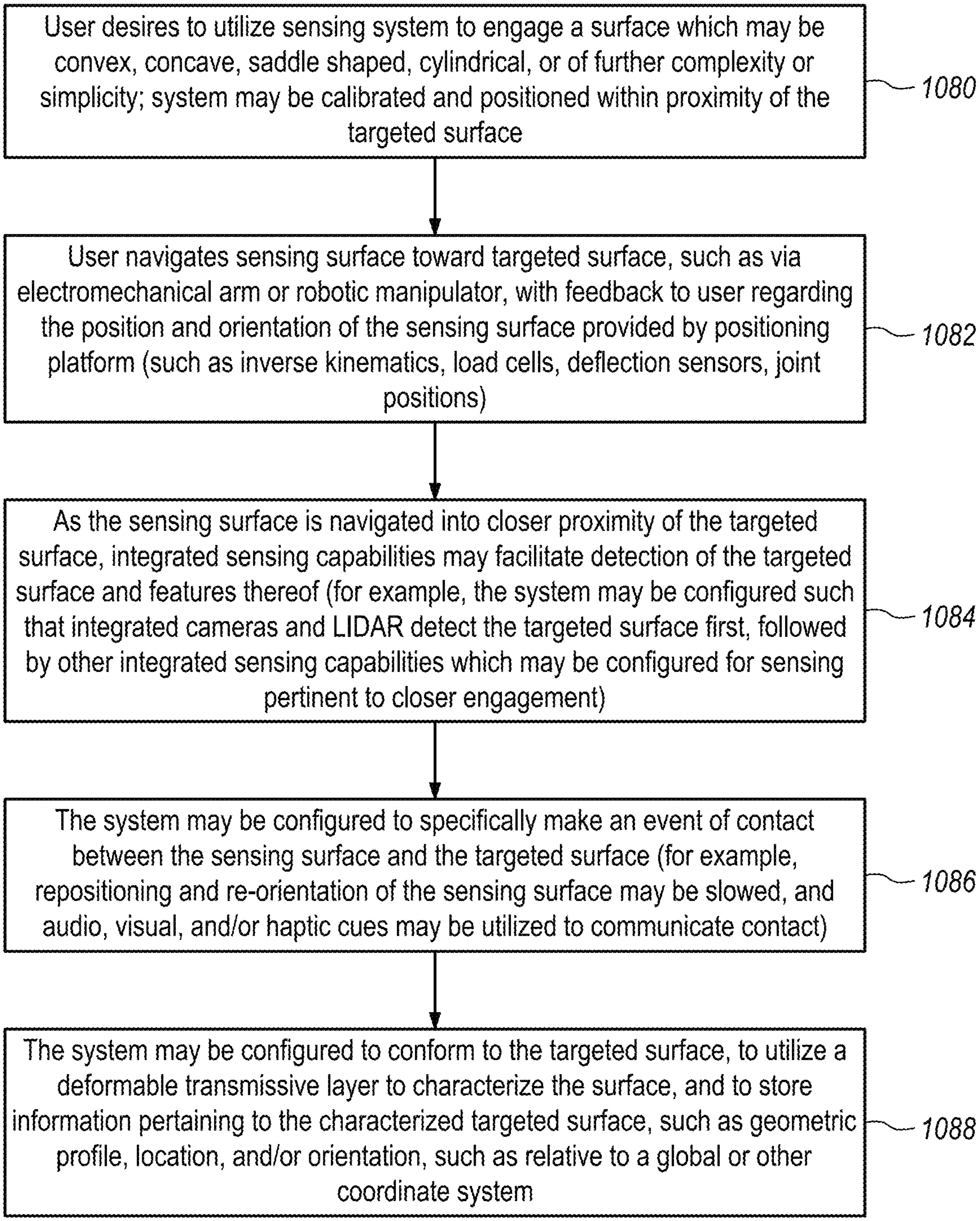

Referring to FIG. 62, in one embodiment, a user desires to utilize sensing system to engage a surface which may be convex, concave, saddle shaped, cylindrical, or of further complexity or simplicity; system may be calibrated and positioned within proximity of the targeted surface (1080). The user may navigate a sensing surface toward a targeted surface, such as via an electromechanical arm or robotic manipulator, with feedback to user regarding the position and orientation of the sensing surface provided by positioning platform (such as inverse kinematics, load cells, deflection sensors, joint positions) (1082). As the sensing surface is navigated into closer proximity of the targeted surface, integrated sensing capabilities may facilitate detection of the targeted surface and features thereof (for example, the system may be configured such that integrated cameras and LIDAR detect the targeted surface first, followed by other integrated sensing capabilities which may be configured for sensing pertinent to closer engagement) (1084). The system may be configured to specifically make an event of contact between the sensing surface and the targeted surface (for example, repositioning and re-orientation of the sensing surface may be slowed, and audio, visual, and/or haptic cues may be utilized to communicate contact) (1086). The system may be configured to conform to the targeted surface, to utilize a deformable transmissive layer to characterize the surface, and to store information pertaining to the characterized targeted surface, such as geometric profile, location, and/or orientation, such as relative to a global or other coordinate system (1088).

Referring to FIG. 63, in one embodiment a user desires to utilize a sensing system to engage a surface which may be convex, concave, saddle shaped, cylindrical, or of further complexity or simplicity; the system may be calibrated and positioned within proximity of the targeted surface (1080). The user may navigate a sensing surface toward a targeted surface, such as via an electromechanical arm or robotic manipulator, with feedback to user regarding the position and orientation of the sensing surface provided by positioning platform (such as inverse kinematics, load cells, deflection sensors, joint positions) (1082). As the sensing surface is navigated into closer proximity of the targeted surface, integrated sensing capabilities may facilitate detection of the targeted surface and features thereof (for example, the system may be configured such that integrated cameras and LIDAR detect the targeted surface first, followed by other integrated sensing capabilities which may be configured for sensing pertinent to closer engagement) (1084). The system may be configured to specifically make an event of contact between the sensing surface and the targeted surface (for example, repositioning and re-orientation of the sensing surface may be slowed, and audio, visual, and/or haptic cues may be utilized to communicate contact), and the system may be configured to alter the shape or compliance of the sensing surface or associated substrate structure, such as via controlled inflation or deflation of a bladder and/or lumen with fluid or gas (1092). The system may be configured to conform to the targeted surface, to utilize a deformable transmissive layer to characterize the surface, and to store information pertaining to the characterized targeted surface, such as geometric profile, location, and/or orientation, such as relative to a global or other coordinate system (1094). The system may be configured to again alter the shape or compliance of the sensing surface or associated substrate structure, such as via controlled inflation or deflation of a bladder and/or lumen with fluid or gas (1096).

Figure 64:
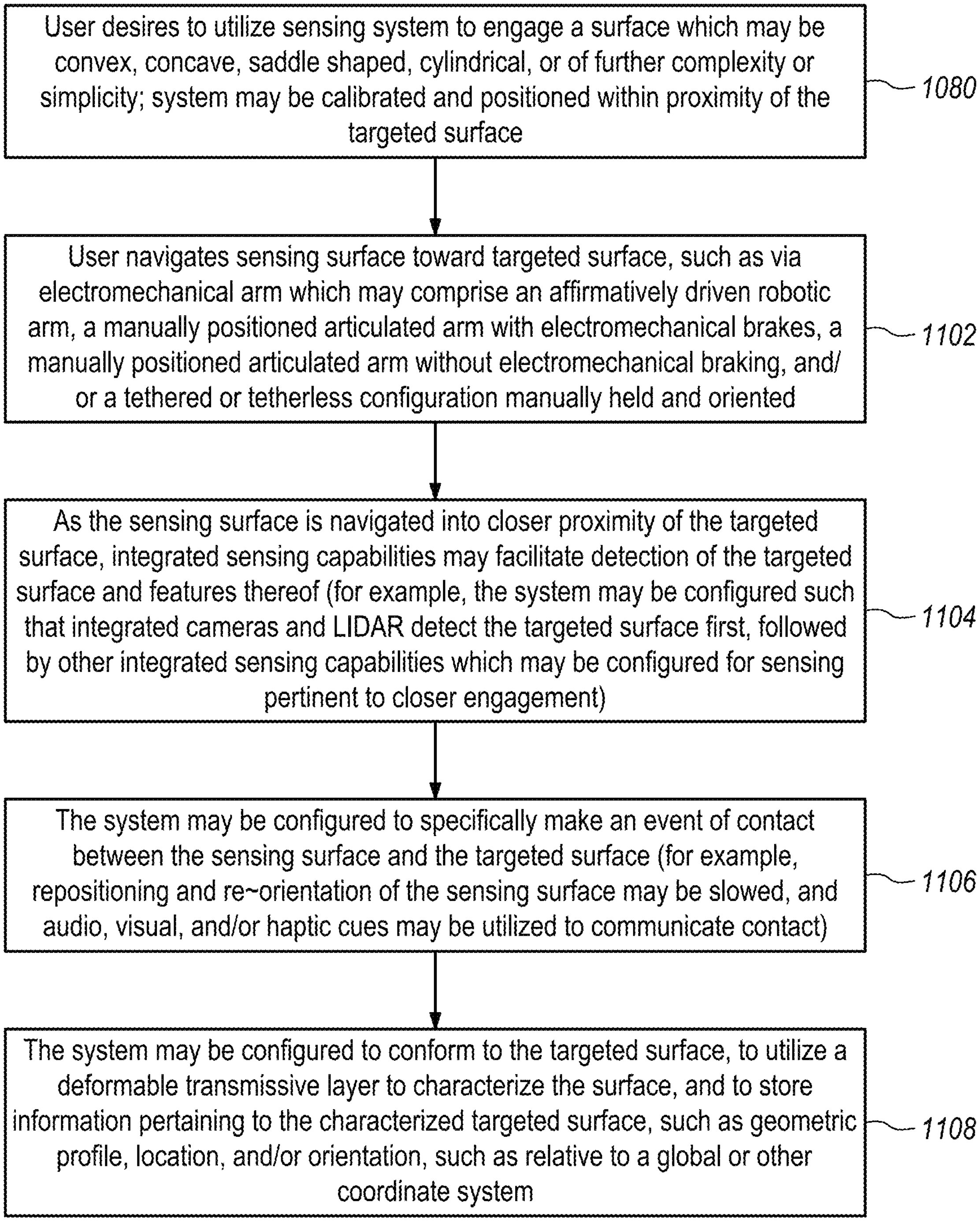

Referring to FIG. 64, in one embodiment the user desires to utilize a sensing system to engage a surface which may be convex, concave, saddle shaped, cylindrical, or of further complexity or simplicity; the system may be calibrated and positioned within proximity of the targeted surface (1080). The user may navigate the sensing surface toward targeted surface, such as via electromechanical arm which may comprise an affirmatively driven robotic arm, a manually positioned articulated arm with electromechanical brakes, a manually positioned articulated arm without electromechanical braking, and/or a tethered or tetherless configuration manually held and oriented (1102). As the sensing surface is navigated into closer proximity of the targeted surface, integrated sensing capabilities may facilitate detection of the targeted surface and features thereof (for example, the system may be configured such that integrated cameras and LIDAR detect the targeted surface first, followed by other integrated sensing capabilities which may be configured for sensing pertinent to closer engagement) (1104). The system may be configured to specifically make an event of contact between the sensing surface and the targeted surface (for example, repositioning and re-orientation of the sensing surface may be slowed, and audio, visual, and/or haptic cues may be utilized to communicate contact) (1106). The system may be configured to conform to the targeted surface, to utilize a deformable transmissive layer to characterize the surface, and to store information pertaining to the characterized targeted surface, such as geometric profile, location, and/or orientation, such as relative to a global or other coordinate system (1108).

Figure 65:
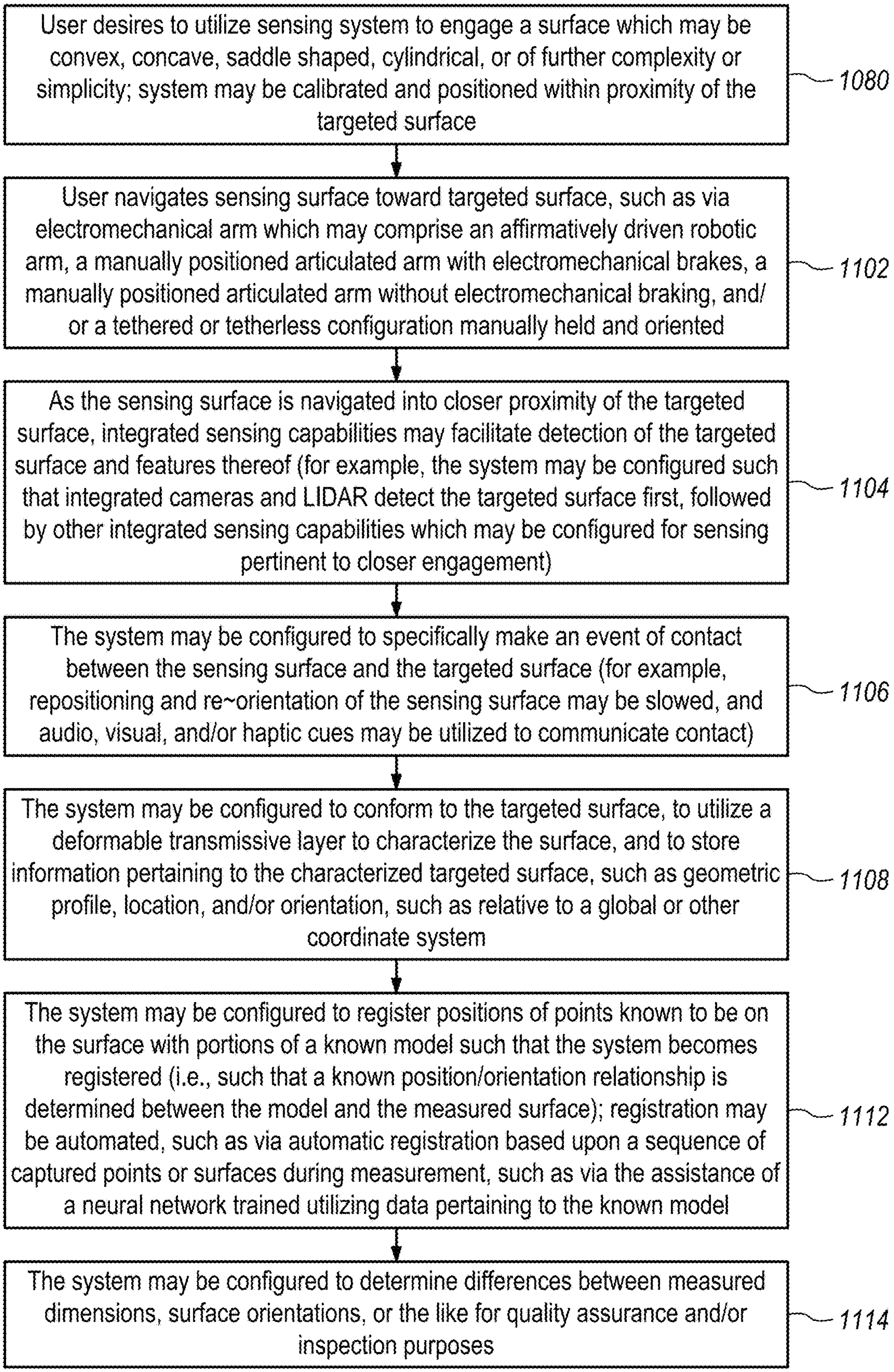

Referring to FIG. 65, in one embodiment the user desires to utilize a sensing system to engage a surface which may be convex, concave, saddle shaped, cylindrical, or of further complexity or simplicity; the system may be calibrated and positioned within proximity of the targeted surface (1080). The user may navigate the sensing surface toward targeted surface, such as via electromechanical arm which may comprise an affirmatively driven robotic arm, a manually positioned articulated arm with electromechanical brakes, a manually positioned articulated arm without electromechanical braking, and/or a tethered or tetherless configuration manually held and oriented (1102). As the sensing surface is navigated into closer proximity of the targeted surface, integrated sensing capabilities may facilitate detection of the targeted surface and features thereof (for example, the system may be configured such that integrated cameras and LIDAR detect the targeted surface first, followed by other integrated sensing capabilities which may be configured for sensing pertinent to closer engagement) (1104). The system may be configured to specifically make an event of contact between the sensing surface and the targeted surface (for example, repositioning and re-orientation of the sensing surface may be slowed, and audio, visual, and/or haptic cues may be utilized to communicate contact) (1106). The system may be configured to conform to the targeted surface, to utilize a deformable transmissive layer to characterize the surface, and to store information pertaining to the characterized targeted surface, such as geometric profile, location, and/or orientation, such as relative to a global or other coordinate system (1108). The system may be configured to register positions of points known to be on the surface with portions of a known model such that the system becomes registered (i.e., such that a known position/orientation relationship is determined between the model and the measured surface); registration may be automated, such as via automatic registration based upon a sequence of captured points or surfaces during measurement, such as via the assistance of a neural network trained utilizing data pertaining to the known model (1112). The system may be configured to determine differences between measured dimensions, surface orientations, or the like for quality assurance and/or inspection purposes (1114).

Various exemplary embodiments of the invention are described herein. Reference is made to these examples in a non-limiting sense. They are provided to illustrate more broadly applicable aspects of the invention. Various changes may be made to the invention described and equivalents may be substituted without departing from the true spirit and scope of the invention. In addition, many modifications may be made to adapt a particular situation, material, composition of matter, process, process act(s) or step(s) to the objective(s), spirit or scope of the present invention. Further, as will be appreciated by those with skill in the art that each of the individual variations described and illustrated herein has discrete components and features which may be readily separated from or combined with the features of any of the other several embodiments without departing from the scope or spirit of the present inventions. All such modifications are intended to be within the scope of claims associated with this disclosure.

The invention includes methods that may be performed using the subject devices. The methods may comprise the act of providing such a suitable device. Such provision may be performed by the end user. In other words, the "providing" act merely requires the end user obtain, access, approach, position, set-up, activate, power-up or otherwise act to provide the requisite device in the subject method. Methods recited herein may be carried out in any order of the recited events which is logically possible, as well as in the recited order of events.

Exemplary aspects of the invention, together with details regarding material selection and manufacture have been set forth above. As for other details of the present invention, these may be appreciated in connection with the above-referenced patents and publications as well as generally known or appreciated by those with skill in the art. The same may hold true with respect to method-based aspects of the invention in terms of additional acts as commonly or logically employed.

In addition, though the invention has been described in reference to several examples optionally incorporating various features, the invention is not to be limited to that which is described or indicated as contemplated with respect to each variation of the invention. Various changes may be made to the invention described and equivalents (whether recited herein or not included for the sake of some brevity) may be substituted without departing from the true spirit and scope of the invention. In addition, where a range of values is provided, it is understood that every intervening value, between the upper and lower limit of that range and any other stated or intervening value in that stated range, is encompassed within the invention.

Also, it is contemplated that any optional feature of the inventive variations described may be set forth and claimed independently, or in combination with any one or more of the features described herein. Reference to a singular item, includes the possibility that there are plural of the same items present. More specifically, as used herein and in claims associated hereto, the singular forms "a," "an," "said," and "the" include plural referents unless the specifically stated otherwise. In other words, use of the articles allow for "at least one" of the subject item in the description above as well as claims associated with this disclosure. It is further noted that such claims may be drafted to exclude any optional element. As such, this statement is intended to serve as antecedent basis for use of such exclusive terminology as "solely," "only" and the like in connection with the recitation of claim elements, or use of a "negative" limitation.

Without the use of such exclusive terminology, the term "comprising" in claims associated with this disclosure shall allow for the inclusion of any additional element—irrespective of whether a given number of elements are enumerated in such claims, or the addition of a feature could be regarded as transforming the nature of an element set forth in such claims. Except as specifically defined herein, all technical and scientific terms used herein are to be given as broad a commonly understood meaning as possible while maintaining claim validity.

The breadth of the present invention is not to be limited to the examples provided and/or the subject specification, but rather only by the scope of claim language associated with this disclosure.

The invention claimed is:

1. A system for geometric surface characterization, comprising:

a. a deformable transmissive layer coupled to a mounting structure and to an interface membrane, wherein the interface membrane is interfaced against at least one aspect of an interfaced object having a surface to be characterized;

b. a first illumination source operatively coupled to the deformable transmissive layer and configured to emit first illumination light into the deformable transmissive layer at a known first illumination orientation relative to the deformable transmissive layer, such that at least a portion of the first illumination light interacts with the deformable transmissive layer;

c. a detector configured to detect light from within at least a portion of the deformable transmissive layer;

d. a computing system configured to operate the detector to detect at least a portion of light directed from the deformable transmissive layer, to determine surface orientations pertaining to positions along the interface membrane based at least in part upon interaction of the first illumination light with the deformable transmissive layer, and to utilize the determined surface orientations to characterize a geometric profile of the surface of the object as interfaced against the interface membrane; and e. a sensor operatively coupled to the computing system and configured to provide inputs which may be utilized by the computing system to further geometrically characterize the surface of the interfaced object;

wherein the surface of the interfaced object is located and oriented within a global coordinate system, and wherein the computing system is configured to characterize a geometric profile of the surface of the object as interfaced against the interface membrane with a position and an orientation relative to the global coordinate system;

wherein the computer system is configured to gather two or more geometric profiles of two or more portions of the surface of the object as interfaced against the interface membrane and determine a position and an orientation pertaining to the two or more geometric profiles relative to each other in the global coordinate system;

wherein the computing system is configured to provide a three-dimensional mapping pertaining to the two or more geometric profiles relative to each other in the global coordinate system; and wherein the computing system is configured to stitch geometrically adjacent geometric profiles together using interpolation of the geometric profiles and relative positions and orientations thereof.

2. The system of claim 1, wherein the sensor is coupled to the deformable transmissive layer.

3. The system of claim 1, further comprising a sensor mounting structure coupled to the deformable transmissive layer, wherein the sensor is coupled to the sensor mounting structure.

4. The system of claim 1, wherein the sensor and deformable transmissive layer reside within an operational environment comprising one or more wall structures, and wherein the sensor is coupled to one of the one or more wall structures.

5. The system of claim 1, wherein the sensor is selected from the group consisting of: an inertial measurement unit (IMU), a capacitive touch sensor, a resistive touch sensor, a LIDAR device, a strain sensor, a load sensor, a temperature sensor, and an image capture device.

6. The system of claim 1, wherein the first illumination source comprises a light emitting diode.

7. The system of claim 1, wherein the detector is a photodetector.

8. The system of claim 1, wherein the detector is an image capture device.

9. The system of claim 8, wherein the image capture device is a CCD or CMOS device.

10. The system of claim 1, further comprising a lens operatively coupled between the detector and the deformable transmissive layer.

11. The system of claim 1, wherein the computing system is operatively coupled to the detector and configured to receive information from the detector pertaining to light detected by the detector from within the deformable transmissive layer.

12. The system of claim 1, wherein the computing system is operatively coupled to the first illumination source and is configured to control emissions from the first illumination source.

13. The system of claim 1, wherein the deformable transmissive layer comprises an elastomeric material.

14. The system of claim 13, wherein the elastomeric material is selected from the group consisting of: silicone, urethane, polyurethane, thermoplastic elastomer (TPE), and thermoplastic polyurethane (TPU).

15. The system of claim 13, wherein the deformable transmissive layer comprises a composite having a pigment material distributed within an elastomeric matrix, the pigment material configured to provide an illumination reflectance which is greater than that of the elastomer matrix.

16. The system of claim 15, wherein the pigment material comprises a metal oxide.

17. The system of claim 1, wherein the interface membrane comprises an elastomeric material.

* * * * *